US012761578B2

(12) United States Patent
Ito

(10) Patent No.: US 12,761,578 B2
(45) Date of Patent: Oct. 13, 2026

(54) LIGHT SOURCE APPARATUS AND IMAGE FORMING APPARATUS

(71) Applicant: CANON KABUSHIKI KAISHA, Tokyo (JP)

(72) Inventor: Narumasa Ito, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 13 days.

(21) Appl. No.: 19/094,235

(22) Filed: Mar. 28, 2025

(65) Prior Publication Data

US 2025/0321512 A1 Oct. 16, 2025

(30) Foreign Application Priority Data

Apr. 12, 2024 (JP) ................................ 2024-064389
Apr. 12, 2024 (JP) ................................ 2024-064411
Apr. 12, 2024 (JP) ................................ 2024-064433

(51) Int. Cl.
*G03G 15/04* (2006.01)

(52) U.S. Cl.
CPC ................ *G03G 15/04054* (2013.01); *G03G 15/0409* (2013.01); *G03G 2215/0409* (2013.01)

(58) Field of Classification Search
CPC ......... G03G 15/04054; G03G 15/0409; G03G 2215/0409
See application file for complete search history.

(56) References Cited

U.S. PATENT DOCUMENTS

| | | | | |
|---|---|---|---|---|
| 9,277,082 | B2 | 3/2016 | Sugiyama | |
| 2011/0128594 | A1* | 6/2011 | Sowa ................ | G03G 15/0409 358/475 |
| 2017/0353622 | A1* | 12/2017 | Ishikawa .......... | G03G 15/04054 |
| 2022/0272223 | A1* | 8/2022 | Niisaka ........... | G03G 15/04054 |

FOREIGN PATENT DOCUMENTS

| | | | |
|---|---|---|---|
| JP | H11-170611 | A | 6/1999 |
| JP | 2002-205423 | A | 7/2002 |
| JP | 2002-248803 | A | 9/2002 |
| JP | 2018-118479 | A | 8/2018 |

* cited by examiner

*Primary Examiner* — Sandra Brase

(74) *Attorney, Agent, or Firm* — Carter, DeLuca & Farrell LLP

(57) ABSTRACT

A light source apparatus includes a first light-emitting unit and a second light-emitting unit having centers located at different positions in a first direction and a second direction orthogonal to the first direction, and a lens unit configured to condense light from the first light-emitting unit and the second light-emitting unit onto a target surface that is rotatable. Each of the first light-emitting unit and the second light-emitting unit includes a plurality of light-emitting elements arranged in the first direction. A predetermined inequality is satisfied.

20 Claims, 81 Drawing Sheets

LIGHT SOURCE APPARATUS AND IMAGE FORMING APPARATUS

BACKGROUND

Technical Field

The present disclosure relates to a light source apparatus for use with an exposure head etc. in an image forming apparatus (imaging apparatus).

Description of Related Art

Some electrophotographic printers use an exposure head that uses an LED, an organic EL, or the like to expose a photosensitive drum as a target surface (surface to be irradiated) and form a latent image. The exposure head includes a light source that includes a plurality of light-emitting units arranged in the longitudinal direction of the photosensitive drum, and a lens unit (lens array) configured to condense and image light from the light source onto the photosensitive drum.

Japanese Patent Laid-Open No. 2002-248803 discloses an exposure head that uses a light source in which a plurality of light-emitting units are arranged in two staggered rows, and a gradient index lens array.

SUMMARY

A light source apparatus according to one aspect of the disclosure includes a first light-emitting unit and a second light-emitting unit having centers located at different positions in a first direction and a second direction orthogonal to the first direction, and a lens unit configured to condense light from the first light-emitting unit and the second light-emitting unit onto a target surface that is rotatable. Each of the first light-emitting unit and the second light-emitting unit includes a plurality of light-emitting elements arranged in the first direction. The following inequality is satisfied:

$$0.6 \le W/T \le 2.0$$

where when viewed from the first direction, T is a distance between a center of a first light-emitting element in the first light-emitting unit and a center of a second light-emitting element in the second light-emitting unit, a first straight line is a straight line passing through a first point that is a midpoint between the center of the first light-emitting element and the center of the second light-emitting element, a second point that is a rotation center of the target surface, and W is a longer one of a distance between the first straight line and a third point that is a center of an image of the first light-emitting element formed on the target surface by the lens unit, and a distance between the first straight line and a fourth point that is a center of an image of the second light-emitting element formed on the target surface by the lens unit.

A light source apparatus according to another aspect of the disclosure includes a first light-emitting unit and a second light-emitting unit, the first light-emitting unit and the second light-emitting unit having centers located at different positions in a first direction and a second direction orthogonal to the first direction, and a lens unit configured to condense light from the first light-emitting unit and the second light-emitting unit. Each of the first light-emitting unit and the second light-emitting unit includes a plurality of light-emitting elements arranged in the first direction. The following inequality is satisfied:

$$0.16 \le T/D \le 0.31$$

where when viewed from the first direction, T is a distance between a center of a first light-emitting element in the first light-emitting unit and a center of a second light-emitting element in the second light-emitting unit, and D is a distance from a first straight line that passes the center of a first light-emitting element and the center of the second light-emitting element and a center of an entrance surface of the lens unit.

A light source apparatus according to another aspect of the disclosure includes a first light-emitting unit and a second light-emitting unit disposed on a first surface of a substrate, and a lens unit configured to condense light from the first light-emitting unit and the second light-emitting unit. The first light-emitting unit and the second light-emitting unit have centers located at different positions in a first direction and a second direction orthogonal to the first direction. Each of the first light-emitting unit and the second light-emitting unit includes a second surface, and a plurality of light-emitting elements arranged in the first direction on the second surface. When viewed from the first direction, the second surface of at least one of the first light-emitting unit and the second light-emitting unit is tilted relative to the first surface. A light amount that is emitted from a light-emitting unit including the second surface tilted relative to the first surface, is reflected by the lens unit, is reflected by the second surface of another light-emitting unit, and enters the lens unit is less than a light amount in a case where the second surface is not tilted.

Further features of various embodiments of the disclosure will become apparent from the following description of embodiments with reference to the attached drawings.

BRIEF DESCRIPTION OF THE DRAWINGS

FIGS. 23A and 22B illustrate a positional relationship among the first and second light-emitting units, the gradient index lens array, and the photosensitive drum in Example 4.

FIGS. 120A and 120B are B-sectional views illustrating the optical path of the exposure head in Example 19.

FIGS. 121A and 121B are C-sectional views illustrating optical paths of the exposure head in Example 19.

FIG. 122 illustrates a light-emitting substrate, first and second light-emitting units, and a gradient index lens array in Example 20.

FIGS. 123A and 123B are A-sectional views illustrating optical paths of the exposure head in Example 20.

FIGS. 124A and 124B are B-sectional views illustrating optical paths of an exposure head in Example 20.

FIGS. 125A and 125B are C-sectional views illustrating optical paths of the exposure head in Example 20.

FIG. 126 illustrates a light-emitting substrate and first and second light-emitting units in an exposure head in a variation.

FIGS. 127A and 127B are A-sectional views illustrating optical paths of an exposure head in comparative example 5.

FIGS. 128A and 128B are B-sectional views illustrating optical paths of the exposure head in comparative example 5.

FIGS. 129A and 129B are C-sectional views illustrating optical paths of the exposure head in comparative example 5.

FIG. 130 illustrates a light distribution characteristic of a light-emitting element.

DETAILED DESCRIPTION

Exemplary embodiments of the present invention will hereinafter be described with reference to the accompanying drawings.

Examples 1 to 12 correspond to claims 1 to 8, and 18.

Example 1

Image Forming Apparatus

Figure 1:
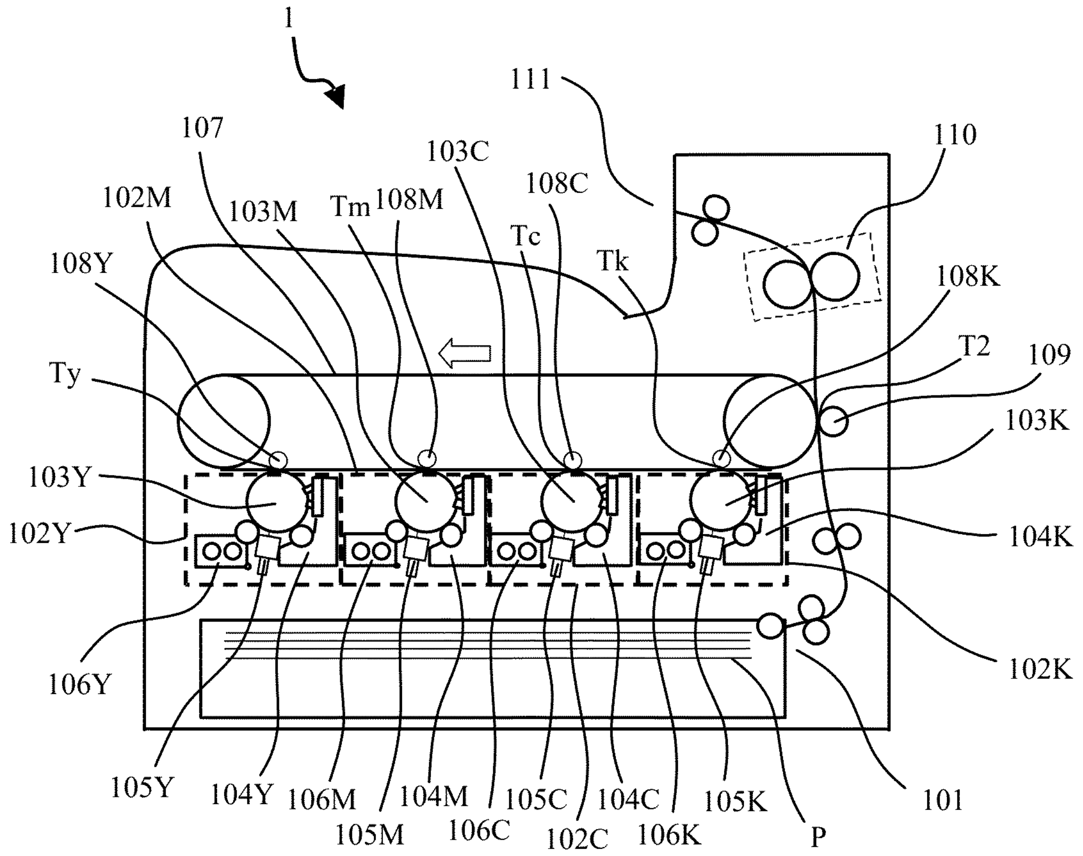
FIG. 1 illustrates the configuration of an image forming apparatus that uses an exposure head in Example 1.

FIG. 1 illustrates the configuration of an image forming apparatus 1 using an exposure head as a light source apparatus according to this example. The image forming apparatus 1 is a color printer (multifunction Printer (MFP)) having a reader (or scanner). However, the image forming apparatus may be a copier having no reader. The image forming apparatus 1 is a so-called tandem type color image forming apparatus having a plurality of photosensitive drums (target surface) 103. However, the image forming apparatus may be a color image forming apparatus having a single photosensitive drum or an image forming apparatus for forming monochrome images.

The image forming apparatus 1 includes four image forming units 102Y, 102M, 102C, and 102K configured to form toner images of colors of yellow (Y), magenta (M), cyan (C), and black (K). The symbols Y, M, C, and K indicate the corresponding toner colors. The image forming units 102Y, 102M, 102C, and 102K include photosensitive drums 103Y, 103M, 103C, and 103K, respectively. These photosensitive drums 103Y, 103M, 103C, and 103K are spaced from each other.

The image forming units 102Y, 102M, 102C, and 102K include electrifiers 104Y, 104M, 104C, and 104K configured to charge the photosensitive drums 103Y, 103M, 103C, and 103K, respectively. The image forming units 102Y, 102M, 102C, and 102K include LED exposure heads 105Y, 105M, 105C, and 105K that serve as light source apparatuses that emit light to expose the photosensitive drums 103Y, 103M, 103C, and 103K, respectively. The image forming apparatus 1 is a so-called "lower surface exposure type" image forming apparatus that exposes the photosensitive drums 103Y, 103M, 103C, and 103K from below.

The image forming units 102Y, 102M, 102C, and 102K include developers 106Y, 106M, 106C, and 106K configured to develop electrostatic latent images on the photosensitive drums 103Y, 103M, 103C, and 103K with toner as a developing agent. Toner images (developed images) of respective colors are formed on the photosensitive drums 103Y, 103M, 103C, and 103K by developers 106Y, 106M, 106C, and 106K.

The image forming apparatus 1 includes an intermediate transfer belt 107 onto which the toner images formed on the photosensitive drums 103Y, 103M, 103C, and 103K are transferred, and primary transfer rollers 108Y, 108M, 108C, and 108K that sequentially transfer the toner images formed on the photosensitive drums 103Y, 103M, 103C, and 103K to the intermediate transfer belt 107. The image forming apparatus 1 further includes a secondary transfer roller 109 configured to transfer the toner image on the intermediate transfer belt 107 to recording paper P conveyed from a paper feeder 101, and a fixing device 110 configured to fix the secondary transferred image onto the recording paper P.

Image Forming Process

The photosensitive drums 103Y, 103M, 103C, and 103K that are uniformly charged by the electrifiers 104Y, 104M, 104C, and 104K are exposed by the LED exposure heads 105Y, 105M, 105C, and 105K to form electrostatic latent images. The electrostatic latent images are visualized as toner images of the respective colors by the developers 106Y, 106M, 106C, and 106K, and are transferred to the intermediate transfer belt 107 at the primary transfer stations Ty, Tm, Tc, and Tk.

The toner images of the respective colors superimposed on the intermediate transfer belt 107 are transferred collectively by the secondary transfer roller 109 at a secondary transfer unit T2 onto the recording paper P transported from the paper feeder 101. The recording paper P onto which the toner images have been transferred is transported to the fixing device 110, where the toner images are fixed by heat and pressure, and then discharged from a paper discharger 111.

Basic Configuration of Exposure Head

The basic configuration of an exposure head 105 according to Example 1 will be described with reference to FIGS. 2A, 2B, 3, and 4.

Figure 2A:
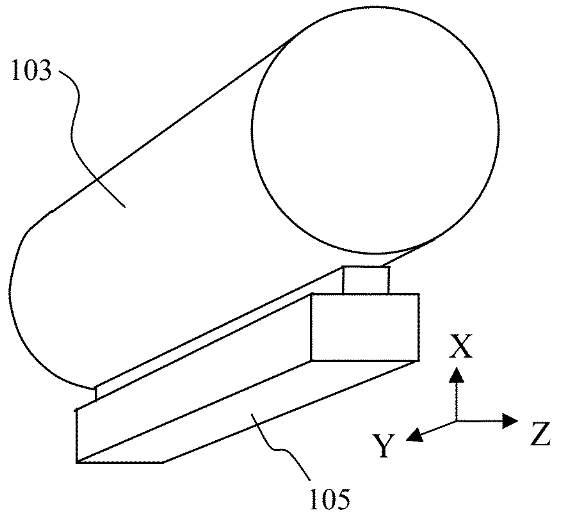
FIGS. 2A and 2B illustrate the exposure head and a photosensitive drum in Example 1.
Figure 2B:
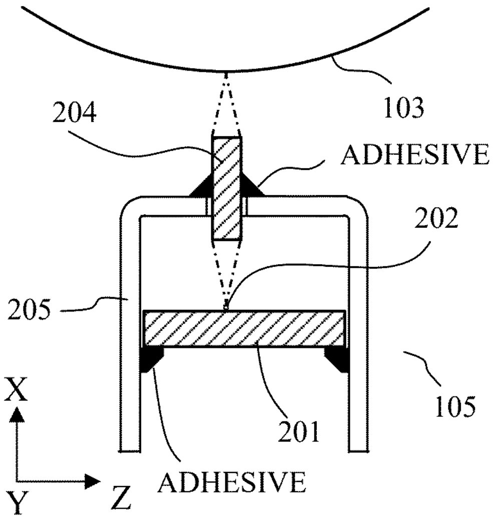

FIG. 2A illustrates the arrangement of the exposure head 105 relative to the photosensitive drum 103. FIG. 2B illustrates a ZX section (short side (widthwise) section, sub-scanning section), which is a plane orthogonal (perpendicular) to the Y direction when viewed from the Y direction, and illustrates how light emitted from the light source unit 202 is condensed on the photosensitive drum 103 by a gradient index lens array 204 serving as a lens unit. This example uses a gradient index lens array as the lens unit, but may use another lens array.

Figure 3:
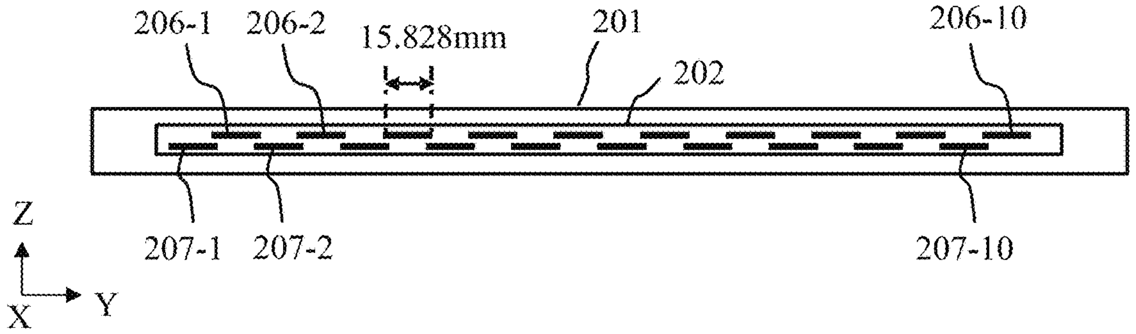
FIG. 3 illustrates a light-emitting substrate in the exposure head in Example 1.

FIG. 3 illustrates a YZ section of the light source unit 202. The light source unit 202 includes a plurality of first light-emitting units 206 (206-1 to 206-10) and a plurality of second light-emitting units 207 (207-1 to 207-10) serving as light-emitting element array chips. Each light-emitting unit has a light-emitting element row (light emitter) including a plurality of light-emitting elements arranged in a row in the Y direction. The light-emitting elements are light-emitting devices such as LEDs and organic ELs.

Figure 4:
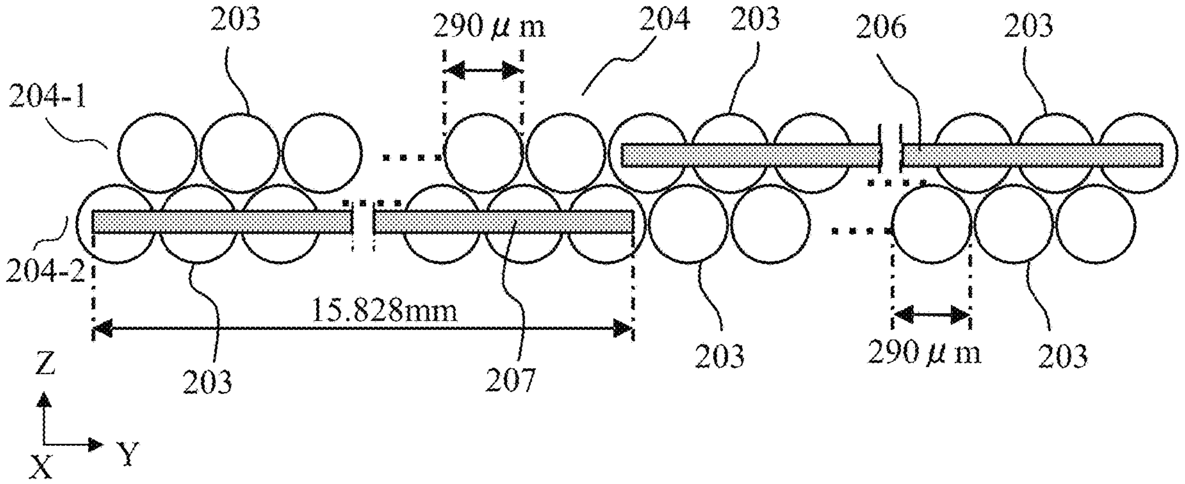
FIG. 4 illustrates a light emitter and a gradient index lens array in the exposure head in Example 1.

FIG. 4 illustrates a positional relationship among the plurality of first light-emitting units 206 and the plurality of second light-emitting units 207 and the gradient index lens array 204 in the YZ section.

As illustrated in FIGS. 2B and 3, the exposure head 105 has a plurality of first light-emitting units 206 (206-1 to 206-10) and a plurality of second light-emitting units 207 (207-1 to 207-10) mounted on a light-emitting substrate 201, a gradient index lens array 204, and a housing 205. The plurality of first light-emitting units 206 and the plurality of second light-emitting units 207 are mounted on a substrate mounting surface of the light-emitting substrate 201.

The plurality of first light-emitting units 206 (206-1 to 206-10) are arranged in a row in the Y direction (first direction, main scanning direction), which is the longitudinal direction of each light-emitting unit. The second light-emitting units 207 (207-1 to 207-10) are arranged in a row in the Y direction at different positions in the Z direction (second direction orthogonal to the first direction, sub-scanning direction) which is the short side direction of each light-emitting unit relative to the arrangement position of the first light-emitting units 206. The first light-emitting units 206 and the second light-emitting units 207 are arranged at positions shifted from each other in the Y direction. Thus, the first light-emitting units 206 and the second light-emitting units 207 are arranged in two rows in a staggered pattern. In other words, the first light-emitting unit and the second light-emitting unit have centers located at different positions in a first direction and a second direction orthogonal to the first direction.

In each of the first light-emitting units 206 and the second light-emitting units 207, a light-emitting element row including a plurality of light-emitting elements is mounted on the unit mounting surface. In this example, n=748 light-emitting elements are arranged in the light-emitting element row of each light-emitting unit in the Y direction at a predetermined image resolution pitch. The image resolution pitch is, for example, 1200 dpi (approximately 21.16 μm). The length from the −Y direction end to the +Y direction end of the light-emitting element row including 748 light-emitting elements is approximately 15.8 mm.

Each of the plurality of first light-emitting units 206 and the plurality of second light-emitting units 207 includes 10 light-emitting units. In other words, the total number of first light-emitting units 206 and second light-emitting units 207 is 20. Thereby, the total number of light-emitting elements is 14960, and an image corresponding to an image width of approximately 316 mm can be formed.

This example uses light-emitting elements having the Lambertian light-emission characteristic. However, the light-emission characteristic of the light-emitting elements is not limited to this example. In this example, the light-emission spectrum of the light-emitting elements has a peak at 600 nm, but the light-emission spectrum is not limited to this example, and light-emitting elements that emit near-infrared light with a peak at 780 nm, for example, may be used.

The gradient index lens array 204 illustrated in FIG. 4 has a first gradient index lens array (first lens array) 204-1 extending in the Y direction, and a second gradient index lens array (second lens array) 204-2 extending in the Y direction at a position shifted in the Z direction from the first gradient index lens array 204-1. Each of the first and second gradient index lens arrays 204-1 and 204-2 includes a plurality of gradient index lenses 203 arranged at a predetermined pitch in the Y direction. As an example, each cylindrical gradient index lens 203 has a diameter of 290 μm.

In the ZX section illustrated in FIG. 2B, the gradient index lens array 204 is disposed so that the distance from the light-emitting element row of the light source unit 202 to each lens 203 is a first predetermined distance, and the distance from the exit surface of each lens 203 to the surface of the photosensitive drum 103 is a second predetermined distance. The first predetermined distance and the second predetermined distance are approximately equal to each other. The gradient index lens array 204 images the light emitted from the row of light-emitting elements on the photosensitive drum 103 so that an erect image is formed at equal magnification.

The gradient index lens array 204 and the light-emitting substrate 201 are fixed to the housing 205 with an adhesive (agent).

The exposure head 105 having the above configuration is assembled individually at the factory, and is completed by performing focusing and light amount adjustment to adjust the spot at the light-condensing position to a predetermined size. In the focusing, the attachment position of the gradient index lens array 204 is adjusted so that the distance between the gradient index lens array 204 and the light-emitting element row is the first predetermined distance. In the light amount adjustment, each of the plurality of light-emitting elements in the light-emitting element row is sequentially made to emit light, and the drive current of each light-emitting element is adjusted so that the light condensed on the photosensitive drum 103 via the gradient index lens array 204 has a predetermined light amount.

Detailed Configuration of Exposure Head

The detailed configuration of the exposure head 105 according to Example 1 will be described with reference to FIGS. 5, 6A, 6B, 7A, 7B, and 8A, 8B.

Figure 5:
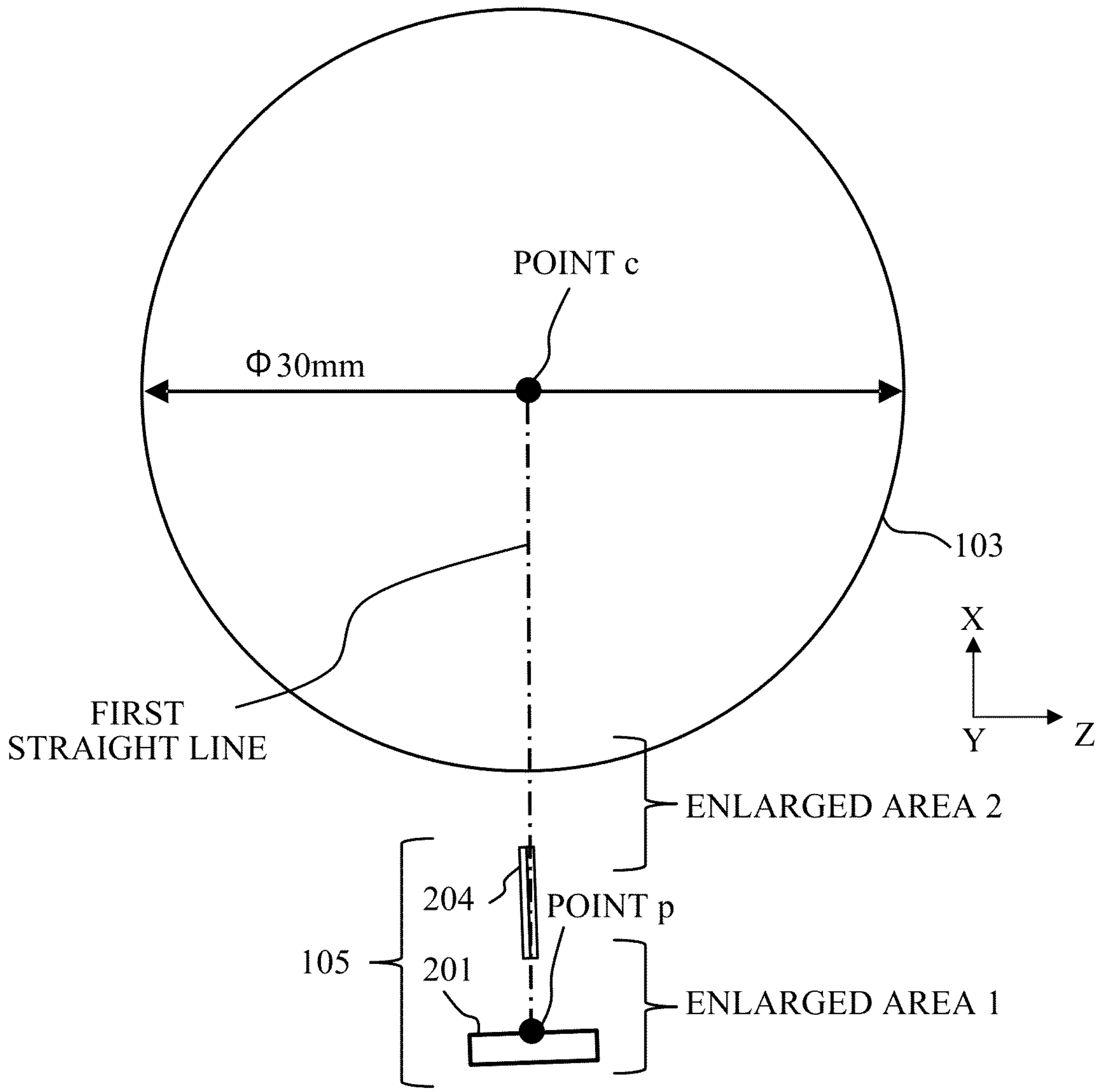
FIG. 5 is a schematic diagram illustrating the exposure head and photosensitive drum in Example 1.
Figure 6A:
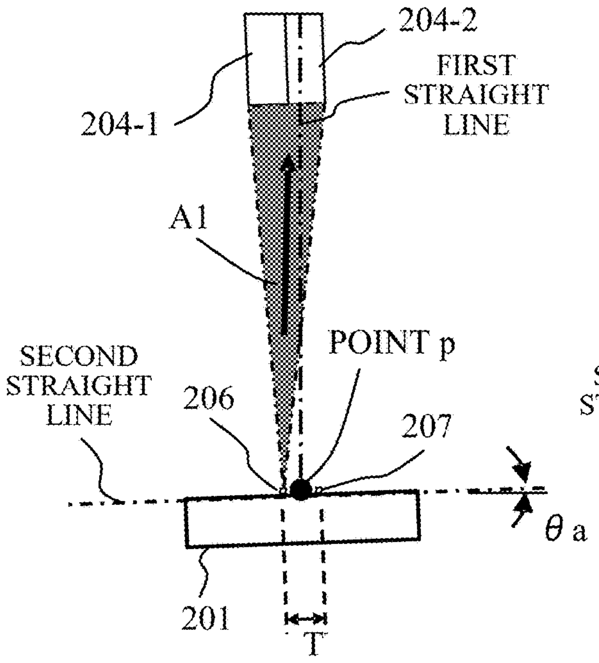
FIGS. 6A and 6B illustrate optical paths from the first and second light-emitting units in Example 1.
Figure 6B:
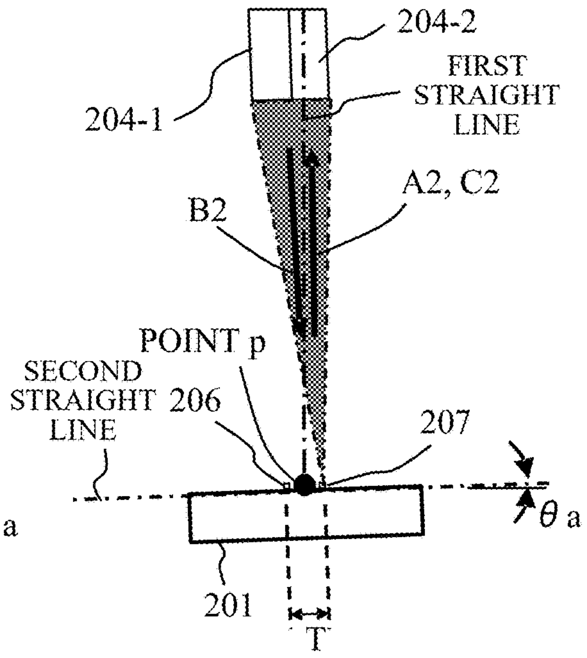

FIG. 5 illustrates a ZX section when viewed from the Y direction, and the arrangement of the exposure head 105 (light-emitting substrate 201 and gradient index lens array 204) relative to the photosensitive drum 103. FIGS. 6A and 6B illustrate an enlarged view of an enlarged area 1 in FIG. 5 when viewed from the Y direction. FIG. 6A illustrates how the light ray A1 emitted from the first light-emitting unit 206 enters the first and second gradient index lens arrays 204-1 and 204-2. FIG. 6B illustrates how the light ray A2 emitted from the second light-emitting unit 207 enters the first and second gradient index lens arrays 204-1 and 204-2.

Figure 7A:
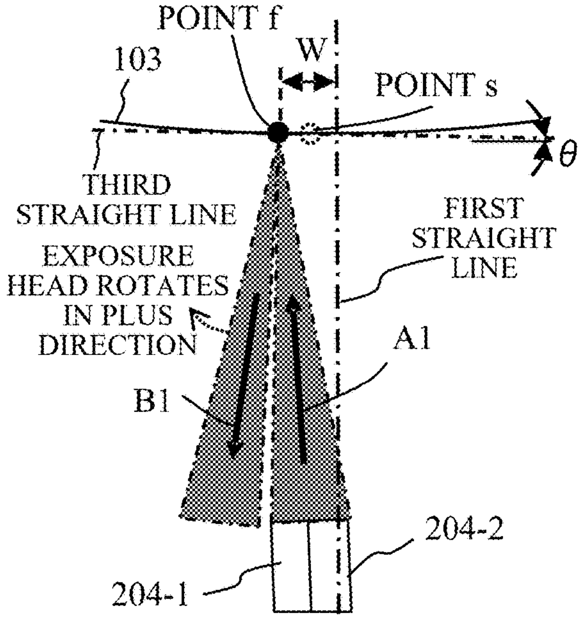
FIGS. 7A and 7B illustrate optical paths from the gradient index lens array in Example 1.
Figure 7B:
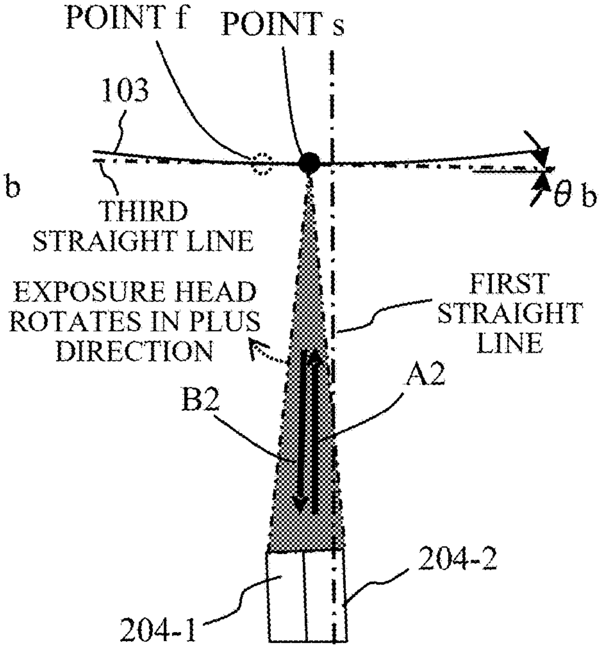

FIGS. 7A and 7B illustrate an enlarged view of an enlarged area 2 in FIG. 5. FIG. 7A illustrates how the light ray A1 emitted from the first light-emitting unit 206 and then from the first and second gradient index lens arrays 204-1 and 204-2 is condensed (irradiated) on the photosensitive drum 103, and a light ray B1 generated when the light ray A1 is reflected by the photosensitive drum 103. FIG. 7B illustrates how the light ray A2 emitted from the second light-emitting unit 207 and then from the first and second gradient index lens arrays 204-1 and 204-2 is condensed on the photosensitive drum 103, and a light ray B2 generated when the light ray A2 is reflected by the photosensitive drum 103.

Figure 8A:
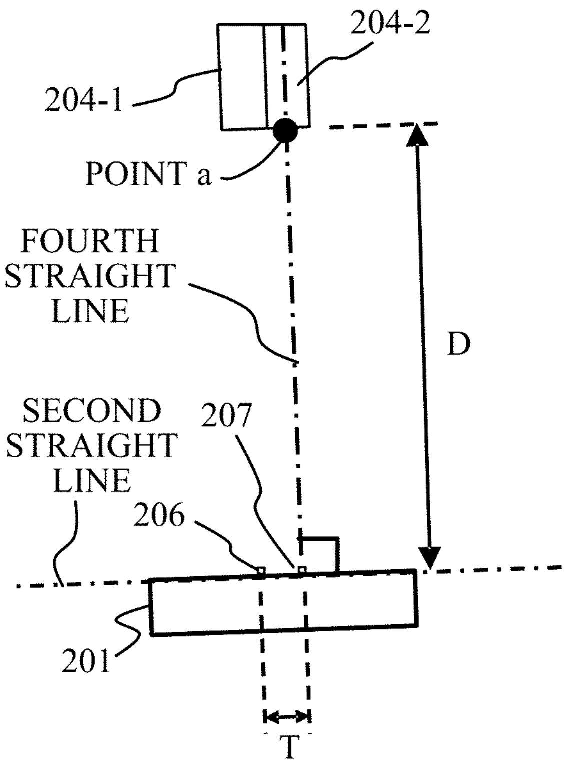
FIGS. 8A and 8B illustrate a positional relationship among the first and second light-emitting units, the gradient index lens array, and the photosensitive drum in Example 1.
Figure 8B:
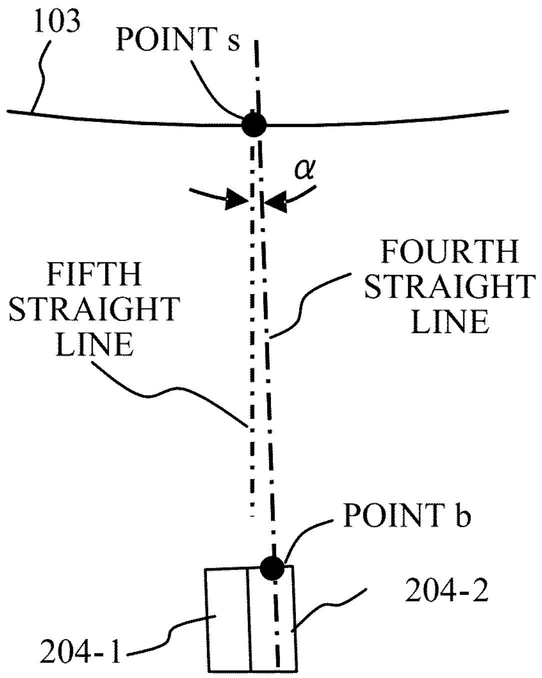

FIG. 8A illustrates a positional relationship among the first and second light-emitting units 206 and 207 and the first and second gradient index lens arrays 204-1 and 204-2. FIG. 8B illustrates a positional relationship among the first and second gradient index lens arrays 204-1 and 204-2 and the photosensitive drum 103.

In attaching the exposure head 105 to the body (chassis) of the image forming apparatus 1, even if the attachment angle shifts from the expected value due to an attachment error, the light amount emitted from the exposure head 105 and condensed on the photosensitive drum 103 may not vary much from the expected light amount.

The exposure head 105 according to this example has a configuration that satisfies the following inequalities in order to suppress light amount fluctuation on the photosensitive drum 103 due to the attachment error. When the exposure head 105 is viewed from the Y direction, T is defined as a distance between the center of the light emitter (first light-emitting element) of the first light-emitting unit 206 and the center of the light emitter (second light-emitting element) of the second light-emitting unit 207.

As illustrated in the above figures, point p as a first point is defined as a midpoint between the center of the light emitters of the first light-emitting unit 206 and the center of the light emitters of the second light-emitting unit 207, point c as the second point is defined as a rotation center of the photosensitive drum 103 as the target surface, and a first straight line is defined as a straight line connecting (passing through) the points p and c. Point f as a third point is defined as a center of a light source image formed on the photosensitive drum 103 as the target surface by the light from the light emitter of the first light-emitting unit 206, and point s as the fourth point is defined as a center of a light source image formed on the photosensitive drum 103 by the light from the light emitter of the second light-emitting unit 207.

W is a longer one of a distance between the first straight line and the point f and a distance between the first straight line and the point s. The distance, as used herein, is referred to as the shortest distance. At this time, the exposure head 105 satisfies inequality (1):

$$0.6 \leq W/T \leq 2.0 \quad (1)$$

Inequality (1) defines proper arrangement of the exposure head 105 relative to the photosensitive drum 103. In a case where W/T is within the range of inequality (1), the light amount fluctuation on the photosensitive drum 103 caused by the attachment error of the exposure head 105 to the image forming apparatus 1 can be reduced, and a good image with a small difference in actual density from the expected density can be formed. In a case where W/T becomes lower than the lower limit of inequality (1), the light amount fluctuation due to the attachment error cannot be reduced, and a good image cannot be formed. In a case where W/T becomes higher than the upper limit of inequality (1), the size of the image forming apparatus 1 increases.

In this example, the diameter of the photosensitive drum 103 is 30 mm, and T is 0.25 mm. In this example, when viewed from the Y direction, the exposure head 105 is tilted by 2.0° (θa described later) compared to a case where there is no tilt (tilt angle is 0°) as in comparative example 1 described later, and W=0.40 mm. Thus, W/T=1.60, which satisfies inequality (1).

When viewed from the Y direction, a second straight line is defined as a straight line connecting the center of the light emitter of the first light-emitting unit 206 and the center of the light emitter of the second light-emitting unit 207, and a third straight line is a straight line connecting points f and s. At this time, the exposure head 105 is disposed with a tilt such that the second straight line and the third straight line are not parallel to each other. When viewed from the Y direction, the tilt angle of the second straight line according to this example relative to the second straight line of comparative example 1 is θa=2.0°, and the tilt angle of the third straight line according to this example relative to the third straight line of comparative example 1 is θb=0.7°. Therefore, the second straight line and the third straight line are not parallel to each other.

When viewed from the Y direction, point a is defined as a fifth point as the center of an entrance surface (light incident surface) of the gradient index lens 203 included in the gradient index lens array 204, and point b is defined as a sixth point as the center of an exit surface of the gradient index lens 203. A fourth straight line is defined as a straight line connecting the points a and b, and a fifth straight line is defined as a normal to the photosensitive drum 103 at point f or point s, whichever is closer to the first straight line, is defined as the fifth straight line. α is defined as an angle (tilt angle) between the fourth straight line and the fifth straight line, and D is a distance from an intersection of the fourth straight line and the second straight line to an intersection of the fourth straight line and the entrance surface of the gradient index lens 203. Then, the exposure head 105 may satisfy the following inequality (2):

$$0.15 \leq \alpha/\tan^{-1}(T/D) \leq 0.50 \quad (2)$$

Inequality (2) defines a proper tilt amount (tilt angle α) of the exposure head 105 relative to the photosensitive drum 103 when viewed from the Y direction. In a case where $\alpha/\tan^{-1}$(T/D) is within the range of inequality (2), the light amount fluctuation caused by the attachment error of the exposure head 105 can be more effectively reduced. In a case where $\alpha/\tan^{-1}$(T/D) becomes lower than the lower limit of inequality (2), the light amount fluctuation caused by the attachment error cannot be effectively reduced. In a case where $\alpha/\tan^{-1}$(T/D) becomes higher than the upper limit of inequality (2), the size of the image forming apparatus 1 increases.

In this example, D=2.74 mm. The shortest distance to the first straight line is shorter at point s than at point f. Therefore, the fifth straight line is the normal at point s. The angle between the fourth straight line and the fifth straight line is α=2.2°. Therefore, $\alpha/\tan^{-1}$(T/D)=0.42, which satisfies inequality (2).

When viewed from the Y direction, the exposure head 105 may satisfy the following inequality (3):

$$0.05 \leq T/D \leq 0.20 \quad (3)$$

Inequality (3) defines a proper relationship between the distance between the centers of the light emitters of the first and second light-emitting units 206 and 207 when viewed from the Y direction and the distance from these first and second light-emitting units 206 and 207 to the entrance surface of the gradient index lens 203. In a case where T/D is within the range of inequality (3), the light amount fluctuation caused by the attachment error of the exposure head 105 can be more effectively reduced. In this example, T/D=0.09, which satisfies inequality (3).

When viewed from the Y direction, the exposure head 105 is disposed at an angle, so the second straight line and the fourth straight line are orthogonal to each other. Although not illustrated, T1 is defined as a distance from the intersection of the second straight line and the fourth straight line connecting the points a and b of the lens 203 in the first gradient index lens array 204-1 to the center of the light emitter of the first light-emitting unit 206 when viewed from the Y direction. Similarly, T2 is defined as a distance from the intersection of the second straight line and the fourth straight line connecting the points a and b of the lens 203 in the second gradient index lens array 204-2 to the center of the light emitter of the second light-emitting unit 207 when viewed from the Y direction. Then, T1 and T2 are equal to each other.

The above inequalities in this example are satisfied in all combinations of the first and second light-emitting units in the plurality of first light-emitting units 206 and the plurality of second light-emitting units 207. This is similarly applicable to Examples 2 and 3 described below.

Referring now to FIGS. 65, 66A, 66B, 67A, 67B, 68A, 68B, and 69, a description will be given of comparative example 1 and the light amount fluctuation in comparative example 1.

Figure 65:
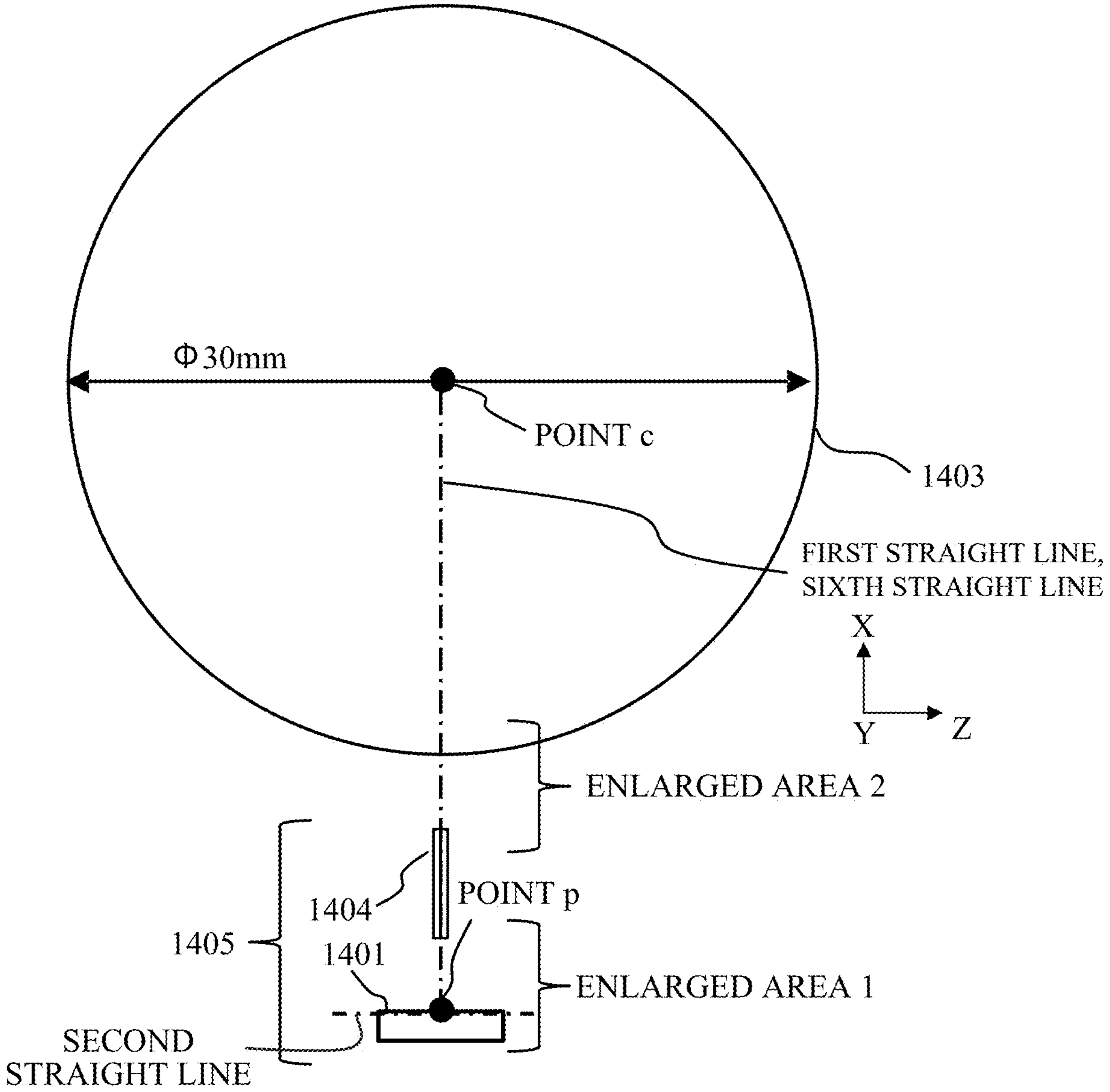
FIG. 65 is a schematic diagram illustrating an exposure head and photosensitive drum in comparative example 1.
Figure 66A:
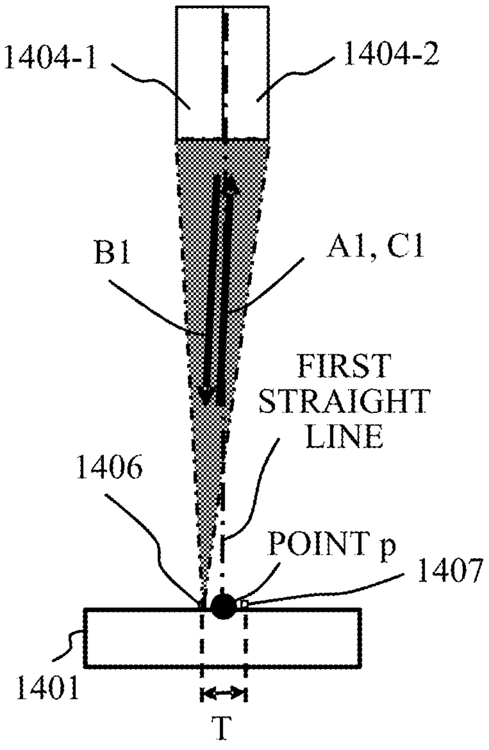
FIGS. 66A and 66B illustrate optical paths from first and second light-emitting units in comparative example 1.
Figure 66B:
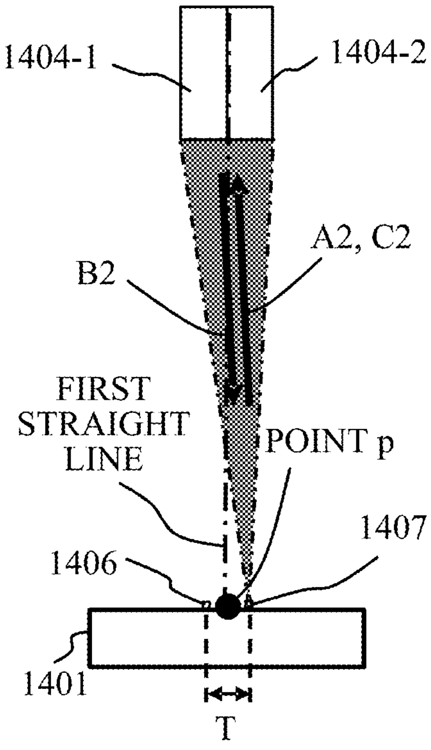

FIG. 65 illustrates the arrangement of the exposure head 1405 relative to the photosensitive drum 1403 in the ZX section when viewed from the Y direction. FIGS. 66A and 66B illustrate an enlarged view of enlarged area 1 in FIG. 65. FIGS. 67A, 67B, 68A, and 68B illustrate an enlarged view of enlarged area 2 in FIG. 65. The exposure head 1405 of comparative example 1 has a configuration similar to that of the exposure head 105 according to Example 1, except that it is disposed without being tilted relative to the photosensitive drum 1403.

Figure 67A:
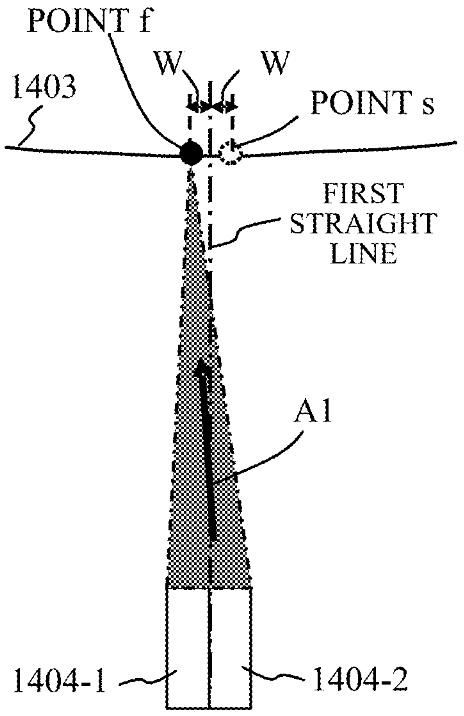
FIGS. 67A and 67B illustrate optical paths from a gradient index lens array in comparative example 1.

FIG. 66A illustrates how the light ray A1 emitted from the first light-emitting unit 1406 enters the first and second gradient index lens arrays 1404-1 and 1404-2. FIG. 66B illustrates how the light ray A2 emitted from the second light-emitting unit 1407 enters the first and second gradient index lens arrays 1404-1 and 1404-2. FIG. 67A illustrates how the light ray A1 emitted from the first light-emitting unit 1406 and then from the first and second gradient index lens arrays 1404-1 and 1404-2 is condensed on the photosensitive drum 1403. FIG. 66B illustrates how the light ray A2 emitted from the second light-emitting unit 1407 and then emitted from the first and second gradient index lens arrays 1404-1 and 1404-2 is condensed on the photosensitive drum 1403.

Figure 68A:
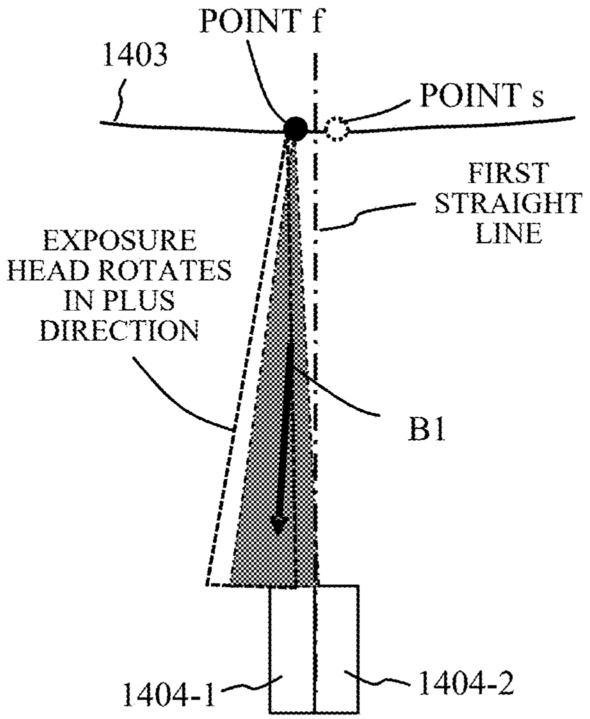
FIGS. 68A and 68B illustrate optical paths from the photosensitive drum in comparative example 1.
Figure 68B:
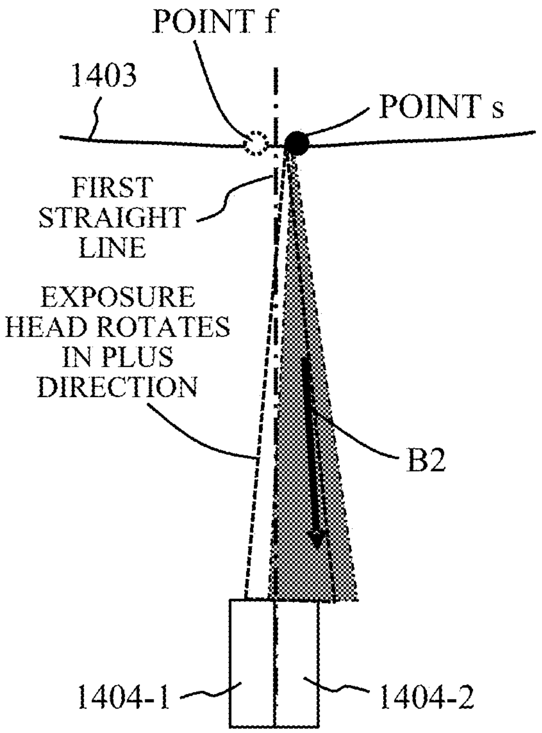

FIG. 68A illustrates light ray B1 generated when the light ray A1 emitted from the first light-emitting unit 1406 and condensed (irradiated) on the photosensitive drum 1403 via the first and second gradient index lens arrays 1404-1 and 1404-2 is reflected by the photosensitive drum 1403. FIG. 68B illustrates light ray B2 generated when light ray A2 emitted from the second light-emitting unit 1407 and condensed on the photosensitive drum 1403 via the first and second gradient index lens arrays 1404-1 and 1404-2 is reflected by the photosensitive drum 1403.

In comparative example 1, the diameter of the photosensitive drum 1403 is 30 mm, and T is 0.25 mm. Since the exposure head 1405 is not tilted relative to the photosensitive drum 1403, W is 0.125 mm. Therefore, W/T is 0.50, which does not satisfy inequality (1). The second and third straight lines have tilt angles (θa, θb) of 0, and are parallel to each other.

In attaching the exposure head 1405 to the image forming apparatus 1, the attachment angle may shift (rotate) from the expected value due to the attachment error. Now assume that the fluctuation range of the attachment angle of the exposure head 1405 caused by the attachment error is ±0.5°. Assume that the expected value of the attachment angle of the exposure head 1405 in this example is 0°, and the light amount emitted from the first and second light-emitting units 1406 and 1407 and condensed on the photosensitive drum 1403 at this expected value is 100.00.

Figure 69:
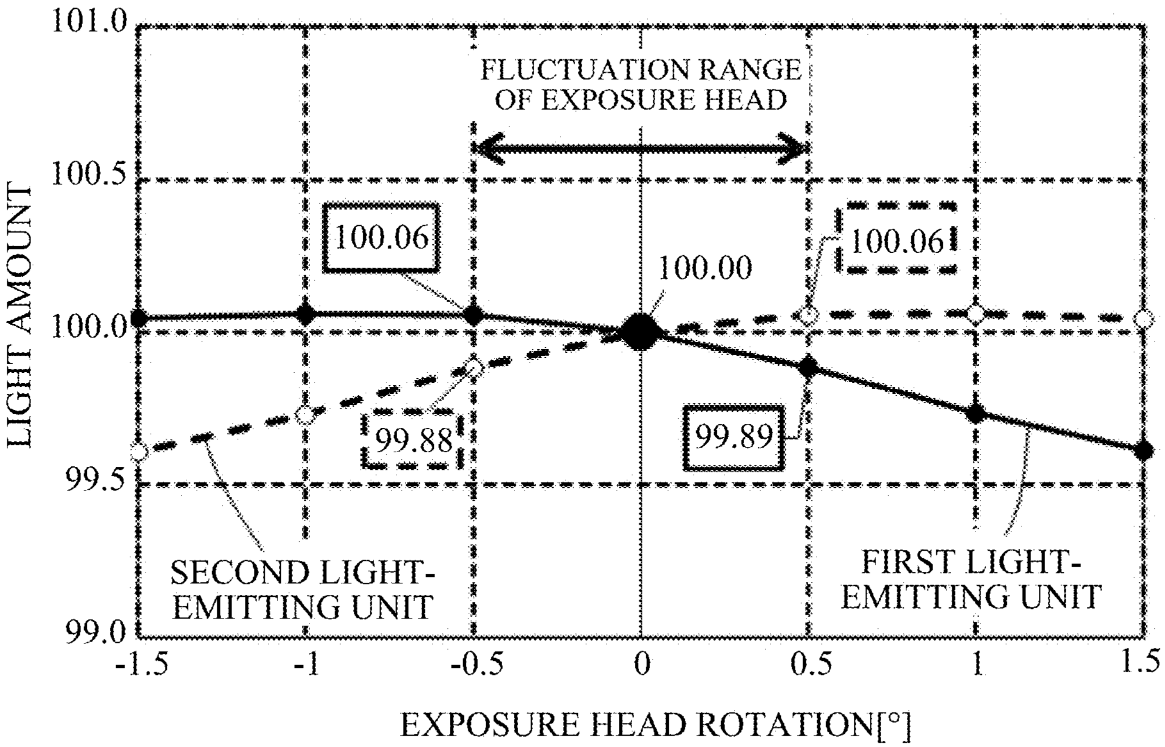
FIG. 69 illustrates a light amount on the photosensitive drum in comparative example 1.

FIG. 69 illustrates a relationship between the attachment error (rotation angle) of the exposure head 1405 and the light amount on the photosensitive drum 1403 in comparative example 1. In a case where the exposure head 1405 rotates by +0.5° due to the attachment error, the light amount emitted from the first light-emitting unit 1406 and condensed on the photosensitive drum 1403 decreases to 99.89. On the other hand, the light amount emitted from the second light-emitting unit 1407 and condensed on the photosensitive drum 1403 increases to 100.06. Conversely, in a case where the exposure head 1405 rotates by −0.5° due to the attachment error, the light amount emitted from the first light-emitting unit 1406 and condensed on the photosensitive drum 1403 increases to 100.06. On the other hand, the light amount emitted from the second light-emitting unit 1407 and condensed on the photosensitive drum 1403 decreases to 99.88. Thus, if there is light amount fluctuation due to the attachment error of the exposure head 1405, the density of the image formed on the photosensitive drum 1403 changes, and an image with the expected density cannot be obtained.

The reason why the light amount condensed on the photosensitive drum 1403 varies in a case where the exposure head 1405 rotates due to the attachment error will be described. As illustrated in FIG. 66A, the light ray A1 emitted from the first light-emitting unit 1406 enters the first and second gradient index lens arrays 1404-1 and 1404-2. The light ray A1 emitted from the first and second gradient index lens arrays 1404-1 and 1404-2 is condensed on an area centered on the point f on the photosensitive drum 1403 as illustrated in FIG. 67A to form a light source image.

The surface of the photosensitive drum generally has a reflectance greater than 0%. Therefore, the light ray A1 condensed on the point f is also reflected. This comparative example assumes that the reflectance of the photosensitive drum 1403 is 10.0%. As illustrated in FIG. 68A, a part of the light rays B1 generated when the light rays A1 are reflected on the photosensitive drum 1403 enters the first and second gradient index lens arrays 1404-1 and 1404-2. The light ray B1 emitted from the first and second gradient index lens arrays 1404-1 and 1404-2 is condensed on the first light-emitting unit 1406 as illustrated in FIG. 66A. In general, the surface of the light-emitting unit also has a reflectance greater than 0%. Therefore, the light ray B1 is also reflected by the first light-emitting unit 1406. This comparative example assumes that the reflectance of the first light-emitting unit 1406 is 25.0%. As illustrated in FIG. 66A, a light ray C1 reflected by the first light-emitting unit 1406 follows a similar optical path to that of the light ray A1 as multireflection light and is condensed on the photosensitive drum 1403.

Figure 67B:
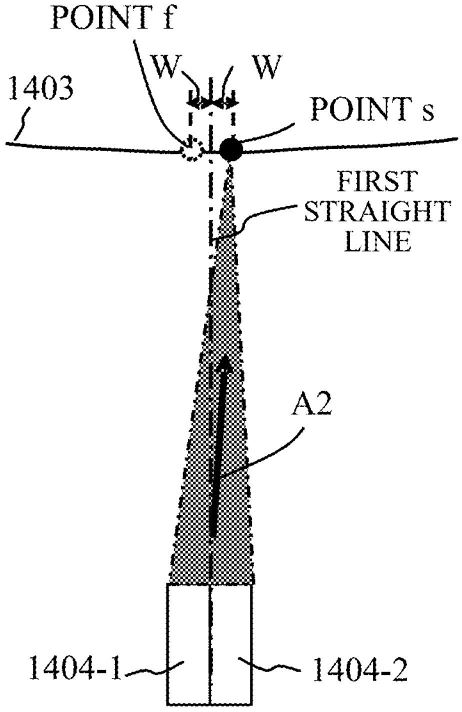

As illustrated in FIG. 66B, the light ray A2 emitted from the second light-emitting unit 1407 enters the first and second gradient index lens arrays 1404-1 and 1404-2. Then, the light ray A2 emitted from the first and second gradient index lens arrays 1404-1 and 1404-2 is condensed in an area centered on the point s on the photosensitive drum 1403 to form a light source image, as illustrated in FIG. 67B.

As illustrated in FIG. 68B, a part of the light rays B2 generated when the light rays A2 are reflected on the photosensitive drum 1403 enters the first and second gradient index lens arrays 1404-1 and 1404-2. Then, the light ray B2 emitted from the first and second gradient index lens arrays 1404-1 and 1404-2 is condensed on the second light-emitting unit 1407 as illustrated in FIG. 66B and reflected by the second light-emitting unit 1407. The reflectance of the second light-emitting unit 1407 is also 25.0%. As illustrated in FIG. 66B, a light ray C2 reflected by the second light-emitting unit 1407 follows a similar optical path to that of the light ray A2 as multireflection light and is condensed on the photosensitive drum 1403.

FIGS. 68A and 68B illustrate the light rays B1 and B2 reflected by the photosensitive drum 1403 while there is no attachment error of the exposure head 1405 (attachment angle is 0°) by alternate long and short dash lines, and the light rays B1 and B2 reflected by the photosensitive drum 1403 rotated (to +0.5°) due to the attachment error by broken lines.

In a case where the exposure head 1405 is rotated from 0° to +0.5°, regarding the light rays (broken lines) B1 emitted from the first light-emitting unit 1406 and reflected by the photosensitive drum 1403, a percentage (or ratio) of a part of the light rays B1 to the light rays B1, which part enters the first and second gradient index lens arrays 1404-1 and 1404-2, decreases compared to the light ray (alternate long and short dash line) in a case where there is no attachment error. Thus, as illustrated in FIG. 69, the light amount emitted from the first light-emitting unit 1406 and condensed on the photosensitive drum 1403 decreases to 99.89. On the other hand, regarding the light rays (broken line) B2 emitted from the second light-emitting unit 1407 and reflected by the photosensitive drum 1403, a percentage (or ratio) of a part of the light rays B2 to the light rays B2, which part enters the first and second gradient index lens arrays 1404-1 and 1404-2, increases compared to the light ray (alternate long and short dash line) in a case where there is no attachment error. Thus, the light amount emitted from the second light-emitting unit 1407 and condensed on the photosensitive drum 1403 increases to 100.06.

In a case where the exposure head 1405 is rotated from 0° to −0.5°, the light amount emitted from the first light-emitting unit 1406 and condensed on the photosensitive drum 1403 increases to 100.06, contrary to the case where it is rotated by +0.5°. On the other hand, the light amount emitted from the second light-emitting unit 1407 and condensed on the photosensitive drum 1403 decreases to 99.88.

Thus, in comparative example 1, the exposure head 1405 rotates to ±0.5°, the amount of multireflection light increases or decreases, and the light amount fluctuation on the photosensitive drum 1403 is a maximum of 0.12% (=|99.88−100.00|).

Figure 9:
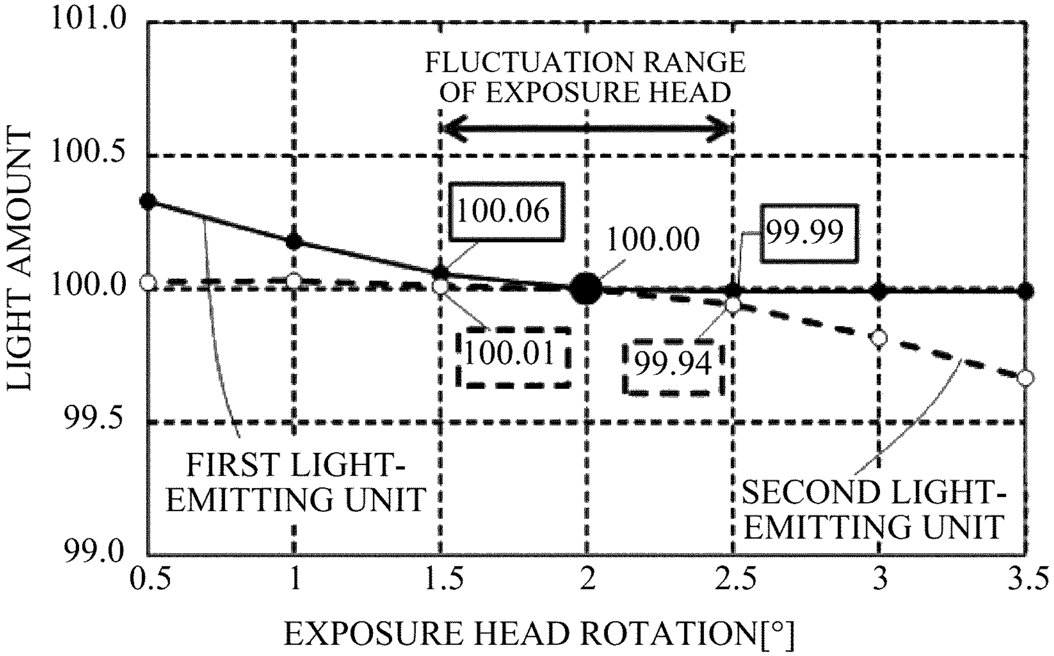
FIG. 9 illustrates a light amount on the photosensitive drum in Example 1.

FIG. 9 illustrates a relationship between the attachment error (rotation angle) of the exposure head 105 and the light amount on the photosensitive drum 103 in this example. In this example, the exposure head 105 is rotated from 0° to 2.0°. Thereby, as illustrated in FIG. 7A, regarding the light rays B1 generated when the light rays A1 emitted from the first light-emitting unit 206 are reflected by the photosensitive drum 103, a percentage of a part of the light rays B1 to the light rays B1, which part enters the first and second gradient index lens arrays 204-1 and 204-2, is feeble (for example, 1% or less). Thus, as is not illustrated in FIG. 6A, there is little multireflection light. Therefore, as illustrated in FIG. 9, even if the exposure head 105 is rotated from 0° to +0.5° and the attachment angle becomes 2.5°, the light amount emitted from the first light-emitting unit 206 and condensed on the photosensitive drum 103 is 99.99, and the light amount fluctuation from 100.00 can be almost eliminated.

In a case where the exposure head 105 is rotated by −0.5° and the attachment angle becomes 1.5°, regarding the light rays B1 emitted from the first light-emitting unit 206 and reflected by the photosensitive drum 103, a percentage of a part of the light rays B1 to the light rays B1, which part enters the first and second gradient index lens arrays 204-1 and 204-2, increases. As a result, as illustrated in FIG. 9, the light amount that is emitted from the first light-emitting unit 206 and condensed on the photosensitive drum 103 becomes 100.06.

On the other hand, in the exposure head 105 rotated by 2.0°, as illustrated in FIG. 7B, regarding the light rays B2 emitted from the second light-emitting unit 207 and reflected by the photosensitive drum 103, a percentage of a part of the light rays B2 to the light rays B2, which part enters the first and second gradient index lens arrays 204-1 and 204-2, increases. As a result, as illustrated in FIG. 6B, the light amount C2 as multireflection light increases. Therefore, even if the exposure head 105 rotates by ±0.5°, the increase or decrease in the light amount C2 that reaches the photosensitive drum 103 can be suppressed. Therefore, as illustrated in FIG. 9, in a case where the exposure head 105 rotates by +0.5°, the light amount emitted from the second light-emitting unit 207 and condensed on the photosensitive drum 103 is 99.94, and in a case where the exposure head 105 rotates by −0.5°, the light amount condensed on the photosensitive drum 103 is 100.01. From the above, the light amount fluctuation on the photosensitive drum 103 in this example is a maximum of 0.06% (=|100.06−100.00|).

Thus, the light amount fluctuation on the photosensitive drum 103 in this example is at most 0.06% (=|100.06−100.00|). That is, this example can suppress the light amount fluctuation by 50% of the light amount fluctuation of 0.12% (|−0.12|) in comparative example 1.

In this example and comparative example 1, the reflectance of the photosensitive drum is 10.0%, and the reflectance of each light-emitting unit is 25.0%. A description will now be given of a relationship between these reflectances and the light amount fluctuation on the photosensitive drum. In a case where the reflectance of the photosensitive drum is reduced from 10.0% to 5.0%, which is half, the light amount fluctuation is reduced to |0.03| in this example and |0.06| in comparative example 1. Even in this case, the light amount fluctuation in this example is suppressed to the half of that in comparative example 1, and is the same as a case where the reflectance of the photosensitive drum is 10.0%. The reflectance of the photosensitive drum may be 5.0% or more.

In a case where the reflectance of each light-emitting unit is reduced from 25.0% to 12.5%, the light amount fluctuation is reduced to the half, i.e., |0.03| in this example and |0.06| in comparative example 1. Even in this case, the light amount fluctuation is improved by 50% compared to comparative example 1, and is the same as a case where the reflectance of each light-emitting unit is 25.0%. The reflectance of each light-emitting unit may be 10.0% or more. The reflectances of the photosensitive drum and each light-emitting unit are similarly applicable to those in other embodiments described later.

Thus, this example can suppress the light amount fluctuation on the photosensitive drum 103 due to the attachment error of the exposure head 105 more effectively than comparative example 1, and reduce the density change in the image formed on the photosensitive drum 103 from the expected density.

Example 2

An exposure head according to Example 2 will now be described. An image forming apparatus in which the exposure head according to Example 2 is used is similar to the image forming apparatus 1 described in Example 1. The exposure head according to Example 2 is different from the exposure head 105 according to Example 1 in the distance T, and other configurations are similar to those of the exposure head 105 according to Example 1.

Figure 10:
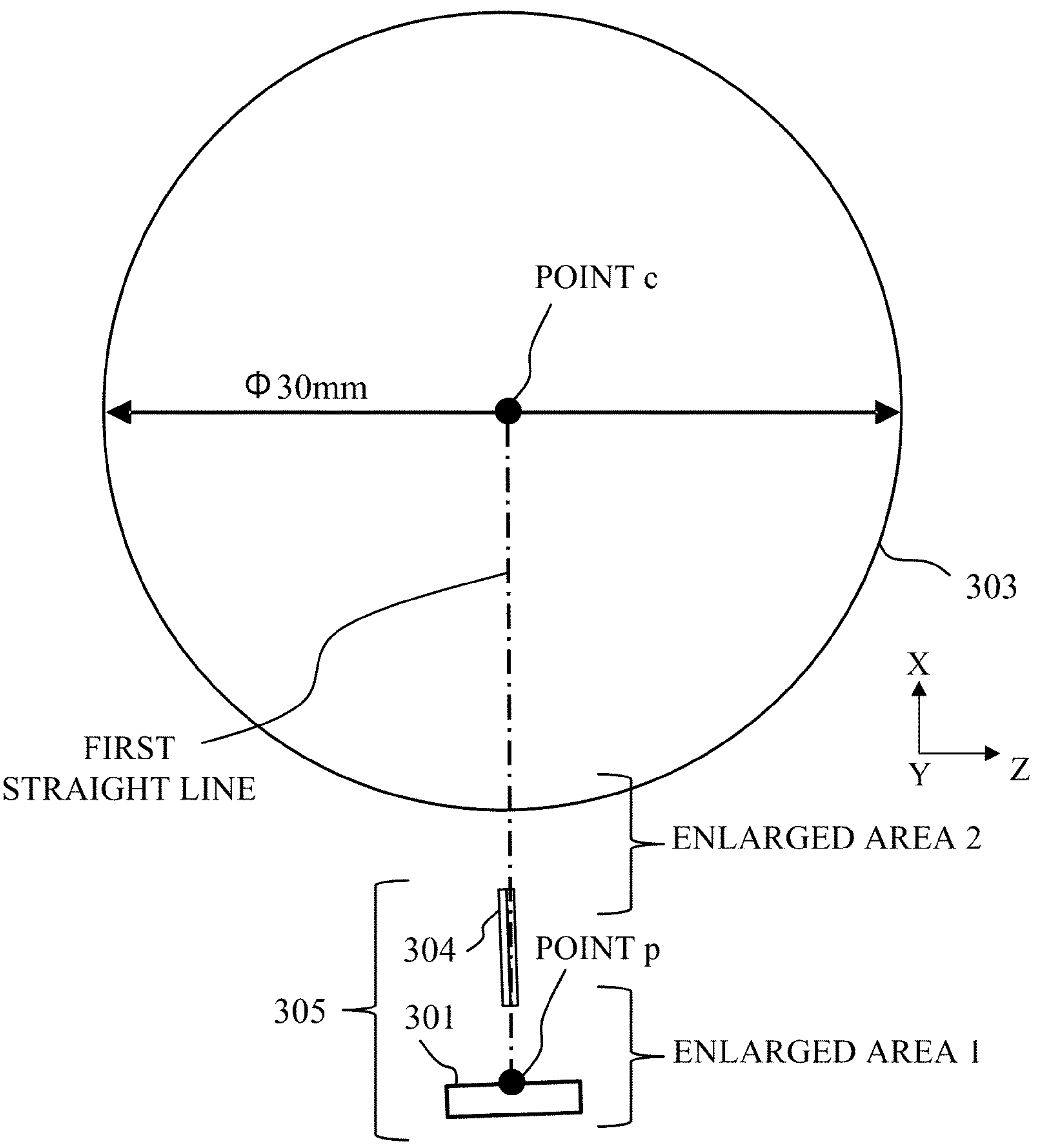
FIG. 10 is a schematic diagram illustrating an exposure head and photosensitive drum in Example 2.
Figure 11A:
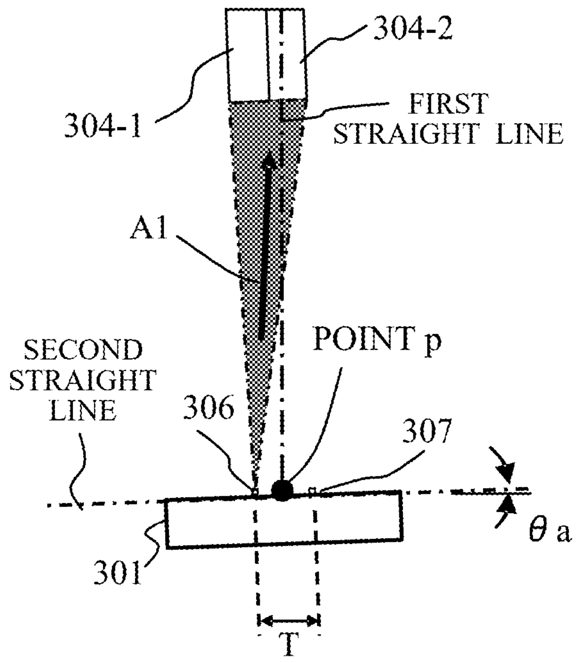
FIGS. 11A and 11B illustrate optical paths from first and second light-emitting units in Example 2.
Figure 11B:
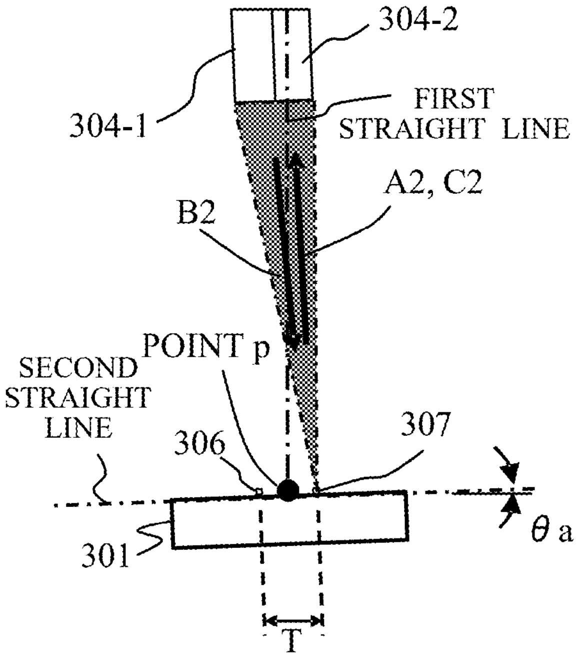

An exposure head 305 according to this example will be described with reference to FIGS. 10, 11A, 11B, 12A, 12B, 13A, 13B, and 14. FIG. 10 illustrates a ZX section when viewed from the Y direction, and the arrangement of the exposure head 305 (light-emitting substrate 301 and gradient index lens array 304) relative to the photosensitive drum 303. FIGS. 11A and 11B illustrate an enlarged view of the enlarged area 1 in FIG. 10 when viewed from the Y direction. FIG. 11A illustrates how the light ray A1 emitted from the first light-emitting unit 306 enters the first and second gradient index lens arrays 304-1 and 304-2. FIG. 11B illustrates how the light ray A2 emitted from the second light-emitting unit 307 enters the first and second gradient index lens arrays 304-1 and 304-2.

Figure 12A:
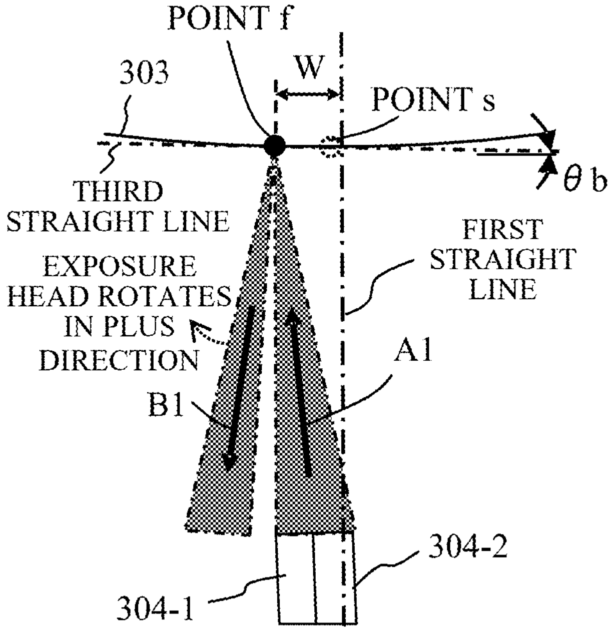
FIGS. 12A and 12B illustrate optical paths from a gradient index lens array in Example 2.
Figure 12B:
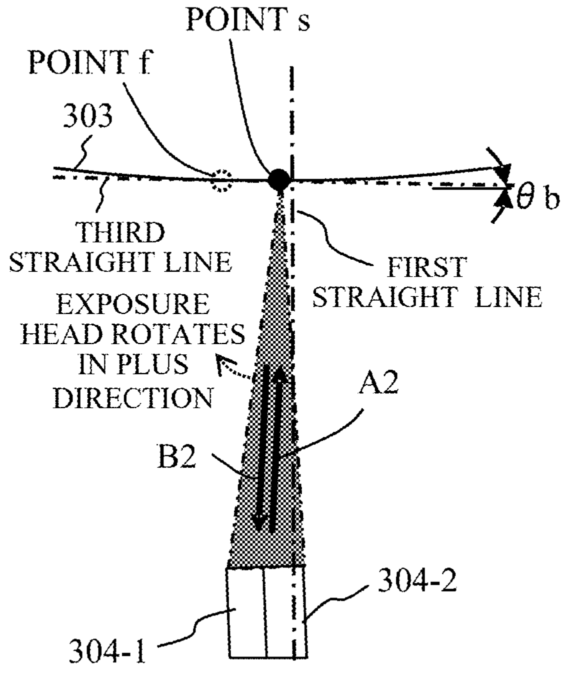

FIGS. 12A and 12B illustrate an enlarged view of the enlarged area 2 in FIG. 10. FIG. 12A illustrates how the light ray A1 emitted from the first light-emitting unit 306 and then from the first and second gradient index lens arrays 304-1 and 304-2 is condensed at the point f on the photosensitive drum 303, and the light ray B1 generated when the light ray A1 is reflected by the photosensitive drum 303. FIG. 12B illustrates how the light ray A2 emitted from the second light-emitting unit 307 and then from the first and second gradient index lens arrays 304-1 and 304-2 is condensed at the point s on the photosensitive drum 303, and the light ray B2 generated when the light ray A2 is reflected by the photosensitive drum 303.

Figure 13A:
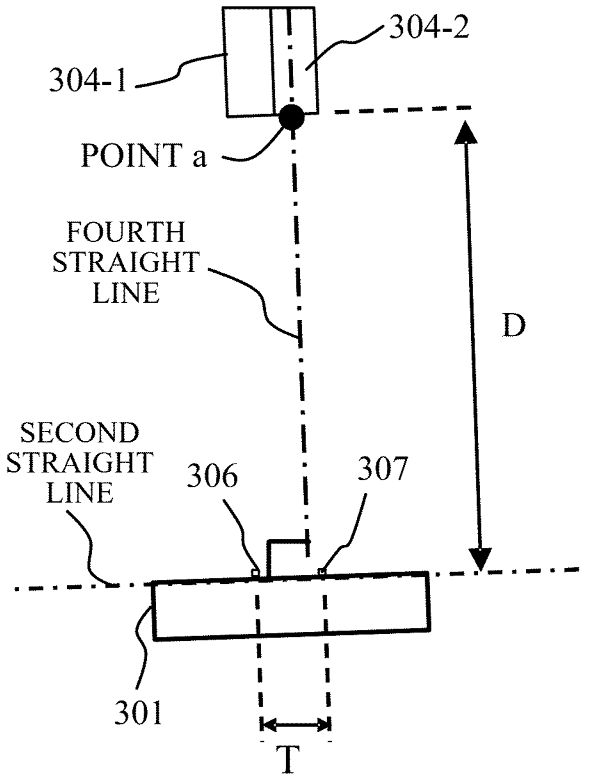
FIGS. 13A and 13B illustrate a positional relationship among the first and second light-emitting units, the gradient index lens array, and the photosensitive drum in Example 2.
Figure 13B:
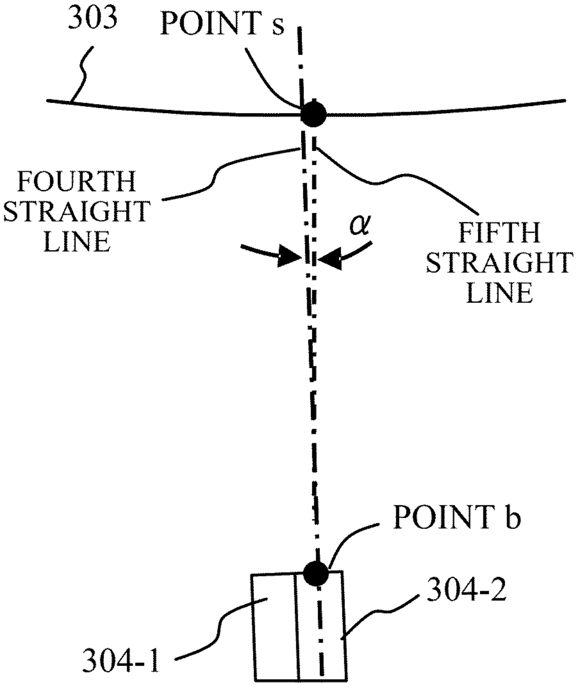

FIG. 13A illustrates a positional relationship among the first and second light-emitting units 306 and 307 and the first and second gradient index lens arrays 304-1 and 304-2. FIG. 13B illustrates a positional relationship among the first and second gradient index lens arrays 304-1 and 304-2 and the photosensitive drum 303.

In this example, the diameter of the photosensitive drum 303 is 30 mm and T is 0.40 mm. In this example, when viewed from the Y direction, the exposure head 305 is tilted by 2.0° (θa) compared to a case where there is no tilt (tilt angle is 0°) as in comparative example 2 described later, and W is 0.48 mm. Therefore, W/T=1.20, which satisfies inequality (1). The tilt angle of the second straight line is θa=2.0°, the tilt angle of the third straight line is θb=0.7°, and the second straight line and the third straight line are not parallel to each other.

In this example, D=2.74 mm. The shortest distance to the first straight line is shorter at the point s than at the point f. Therefore, the fifth straight line is the normal to the photosensitive drum 303 at the point s. The angle between the fourth straight line and the fifth straight line is α=1.9°. Therefore, $\alpha/\tan^{-1}(T/D)=0.23$, which satisfies inequality (2). T/D=0.15, which satisfies inequality (3).

Even in this example, the exposure head 305 is disposed while being tilted when viewed from the Y direction, so the second straight line and the fourth straight line are orthogonal to each other. Even in this example, the distance corresponding to the distance T1 and the distance corresponding to the distance T2 when viewed from the Y direction, which are described in Example 1, are equal to each other.

Referring now to FIGS. 70, 71A, 71B, 72A, 72B, 73A, 73B, and 74, a description will be given of comparative example 2 and the light amount fluctuation in comparative example 2.

Figure 70:
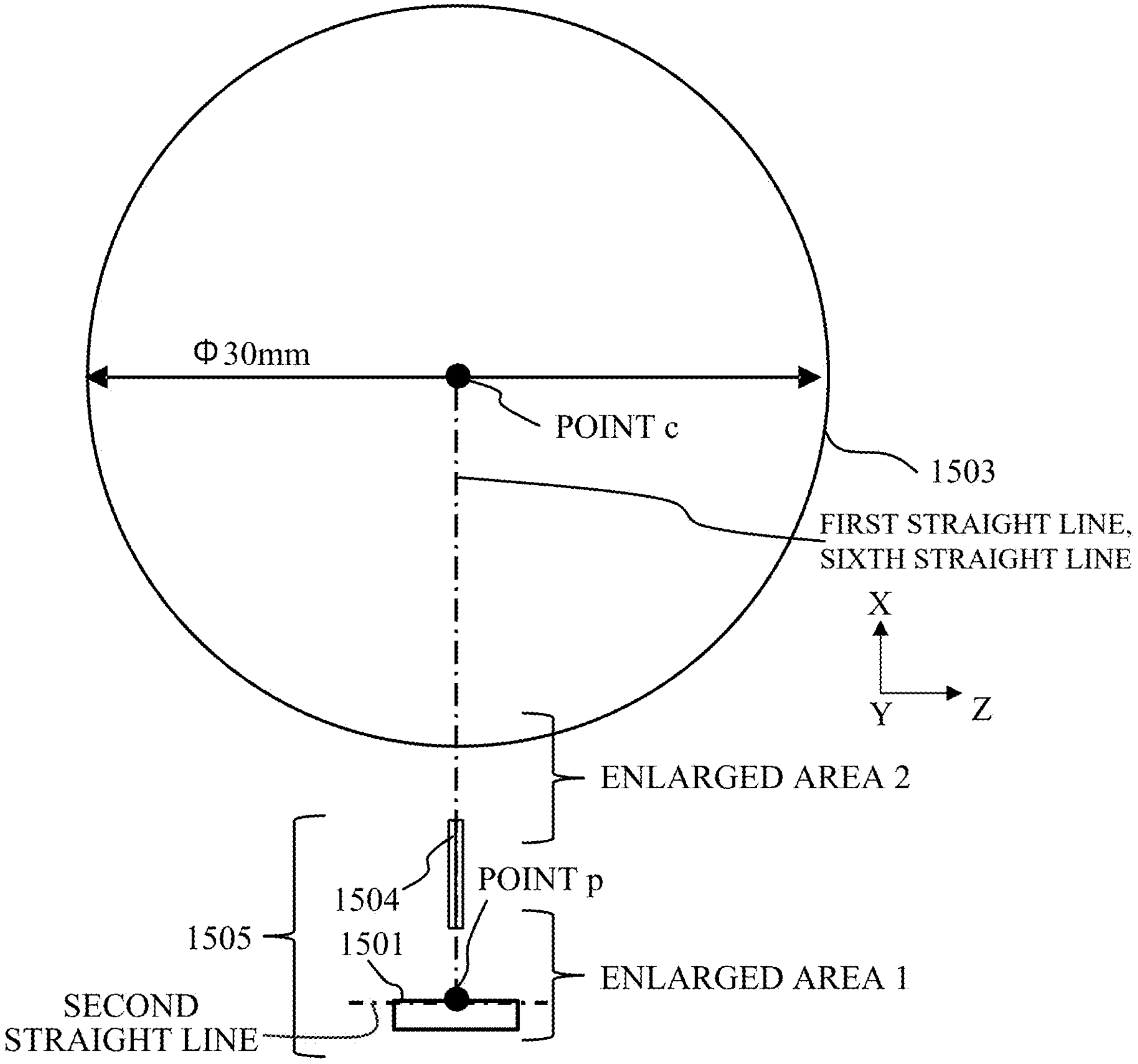
FIG. 70 is a schematic diagram illustrating an exposure head and photosensitive drum in comparative example 2.
Figure 71A:
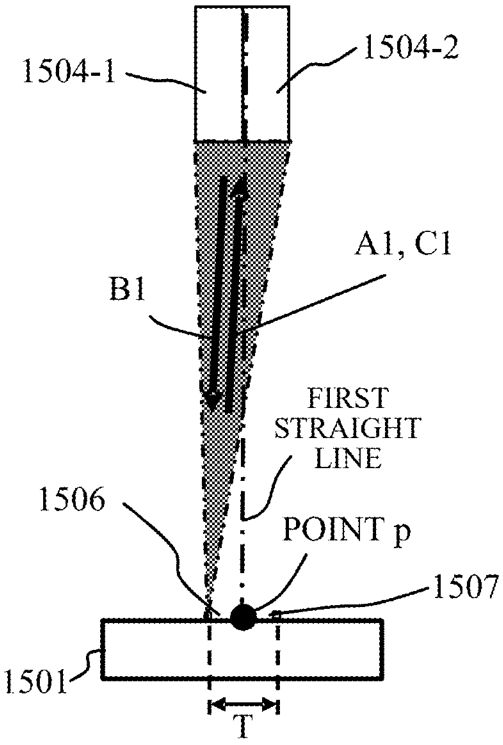
FIGS. 71A and 71B illustrate optical paths from first and second light-emitting units in comparative example 2.
Figure 71B:
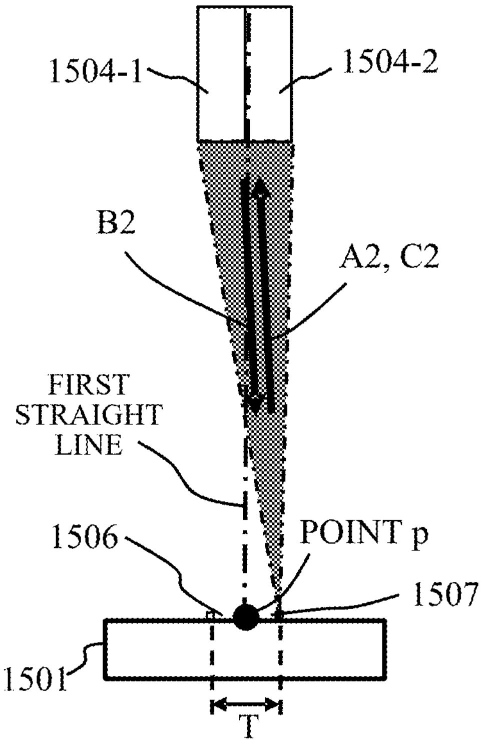

FIG. 70 illustrates the arrangement of the exposure head 1505 relative to the photosensitive drum 1503 in the ZX section when viewed from the Y direction. FIGS. 71A and 71B illustrate an enlarged view of the enlarged area 1 in FIG. 70. FIGS. 72A, 72B, 73A, and 73B illustrate an enlarged view of the enlarged area 2 in FIG. 70. The exposure head 1505 according to comparative example 2 has a similar configuration to that of the exposure head 305 according to Example 2, except that it is disposed without being tilted relative to the photosensitive drum 1503.

Figure 72A:
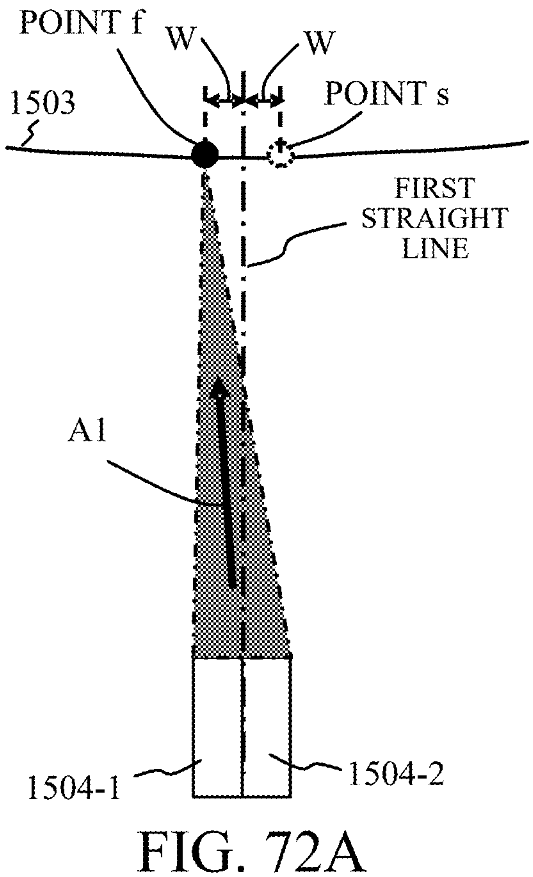
FIGS. 72A and 72B illustrate optical paths from a gradient index lens array in comparative example 2.
Figure 72B:
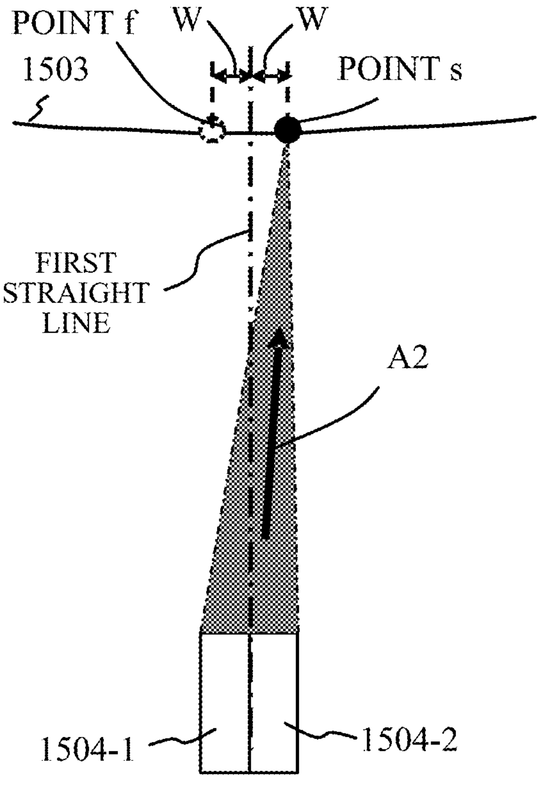

FIG. 71A illustrates how the light ray A1 emitted from the first light-emitting unit 1506 enters the first and second gradient index lens arrays 1504-1 and 1504-2. FIG. 71B illustrates how the light ray A2 emitted from the second light-emitting unit 1507 enters the first and second gradient index lens arrays 1504-1 and 1504-2. FIG. 72A illustrates how the light ray A1 emitted from the first light-emitting unit 1506 and then from the first and second gradient index lens arrays 1504-1 and 1504-2 is condensed on the photosensitive drum 1503. FIG. 72B illustrates how the light ray A2 emitted from the second light-emitting unit 1507 and then emitted from the first and second gradient index lens arrays 1504-1 and 1504-2 is condensed on the photosensitive drum 1503.

Figure 73A:
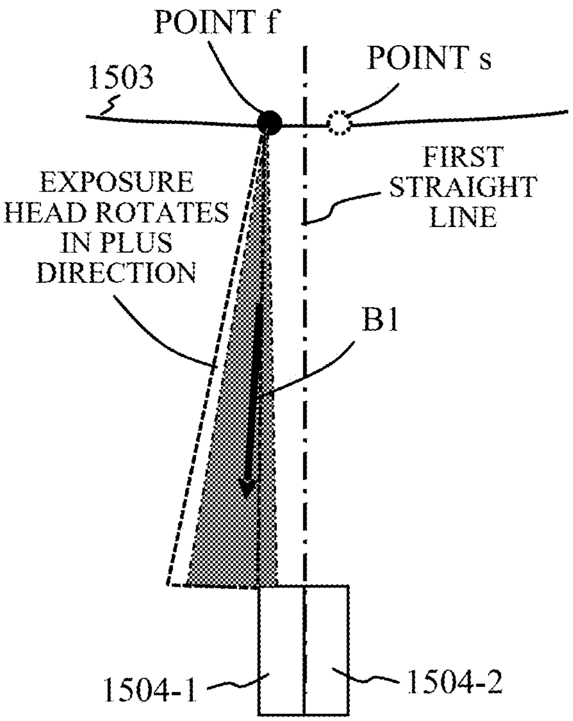
FIGS. 73A and 73B illustrate optical paths from the photosensitive drum in comparative example 2.
Figure 73B:
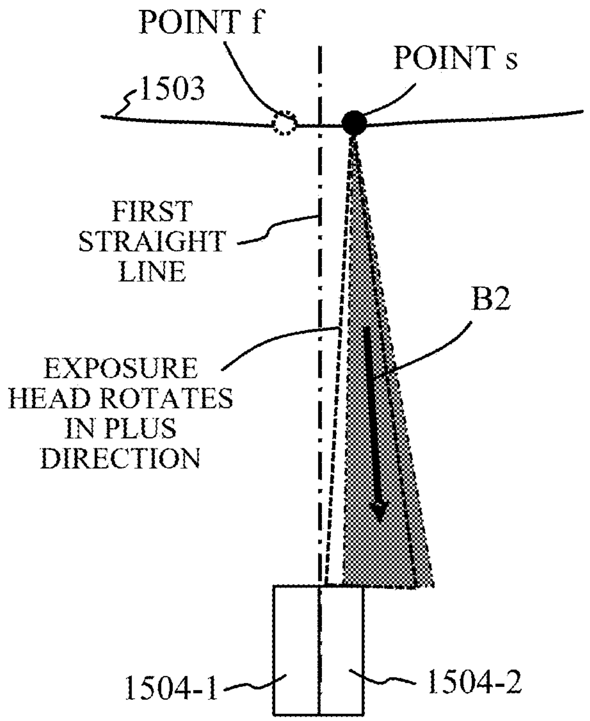

FIG. 73A illustrates the light ray B1 generated when the light ray A1 emitted from the first light-emitting unit 1506 and condensed (irradiated) on the photosensitive drum 1503 via the first and second gradient index lens arrays 1504-1 and 1504-2 is reflected by the photosensitive drum 1503. FIG. 73B illustrates the light ray B2 generated when the light ray A2 emitted from the second light-emitting unit 1507 and condensed on the photosensitive drum 1503 via the first and second gradient index lens arrays 1504-1 and 1504-2 is reflected by the photosensitive drum 1503.

In comparative example 2, the diameter of the photosensitive drum 1503 is 30 mm and T is 0.40 mm. Since the exposure head 1505 is not tilted, W is 0.20 mm. Therefore, W/T is 0.50, which does not satisfy inequality (1). The second and third straight lines are parallel to each other.

Figure 74:
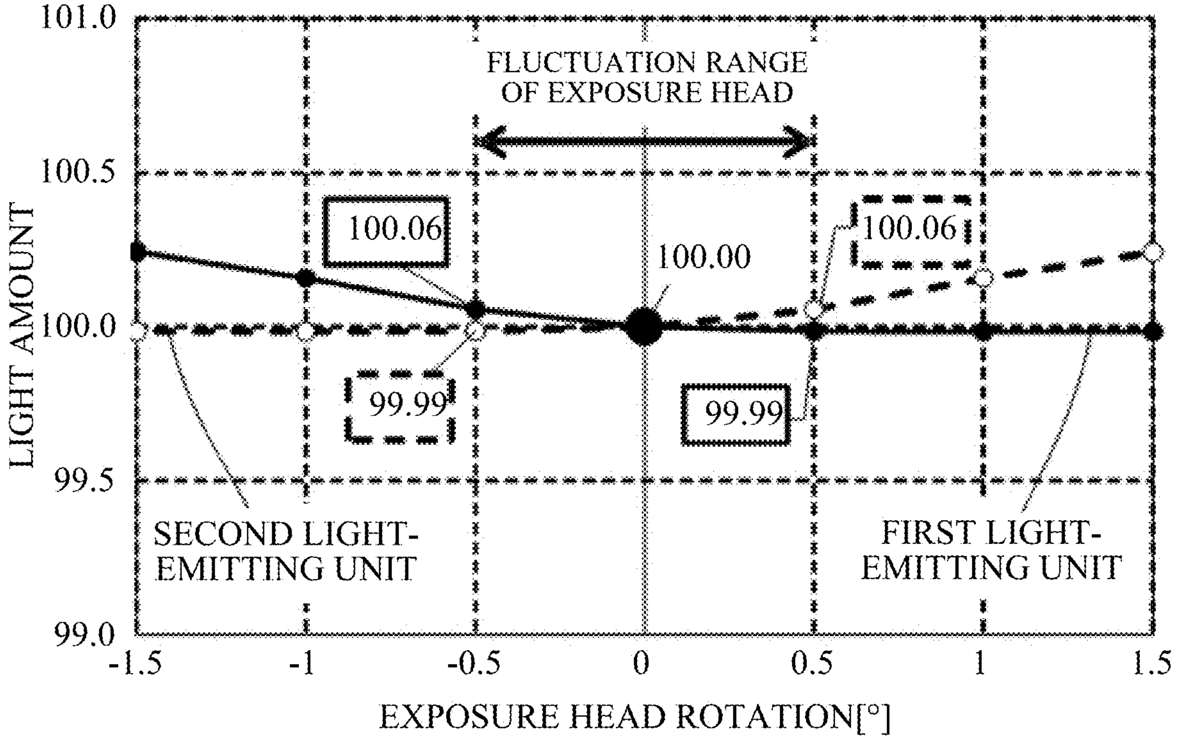
FIG. 74 illustrates a light amount on the photosensitive drum in comparative example 2.

FIG. 74 illustrates a relationship between the attachment error (rotation angle) of the exposure head 1505 and the light amount on the photosensitive drum 1503 in comparative example 2. Here again, the assumed value of the installation angle of the exposure head 1505 is 0°, and the light amount on the photosensitive drum 1503 at this assumed value is 100.00.

As in comparative example 1, in a case where the exposure head 1505 rotates by +0.5° due to the attachment error, the light amount emitted from the first light-emitting unit 1506 and condensed on the photosensitive drum 1503 decreases from 100.00 to 99.99. On the other hand, the light amount emitted from the second light-emitting unit 1507 and condensed on the photosensitive drum 1503 increases to 100.06. Conversely, in a case where the exposure head 1505 rotates by −0.5° due to the attachment error, the light amount emitted from the first light-emitting unit 1506 and condensed on the photosensitive drum 1503 increases to 100.06. On the other hand, the light amount emitted from the second light-emitting unit 1507 and condensed on the photosensitive drum 1503 decreases to 99.99. Thus, in a case where there is light amount fluctuation due to the attachment error of the exposure head 1505, the density of the image formed on the photosensitive drum 1503 changes, and an image with the expected density cannot be obtained.

The reason why the light amount condensed on the photosensitive drum 1503 varies when the exposure head 1505 rotates due to the attachment error will be described. As illustrated in FIG. 71A, the light ray A1 emitted from the first light-emitting unit 1506 enters the first and second gradient index lens arrays 1504-1 and 1504-2. Then, as illustrated in FIG. 72A, the light ray A1 emitted from the first and second gradient index lens arrays 1504-1 and 1504-2 is condensed on an area centered on the point f on the photosensitive drum 1503 to form a light source image.

As illustrated in FIG. 73A, a part of the light rays B1 generated when the light rays A1 condensed at the point f are reflected by the photosensitive drum 1503, which has a reflectance of 10.0%, enters the first and second gradient index lens arrays 1504-1 and 1504-2. Then, the light ray B1 emitted from the first and second gradient index lens arrays 1504-1 and 1504-2 is condensed on the first light-emitting unit 1506 as illustrated in FIG. 71A. The light ray C1 reflected by the first light-emitting unit 1506, which has a reflectance of 25.0%, follows a similar optical path to that of the light ray A1 as multireflection light and is condensed on the photosensitive drum 1503.

Similarly, as illustrated in FIG. 71B, the light ray A2 emitted from the second light-emitting unit 1507 enters the first and second gradient index lens arrays 1504-1 and 1504-2. Then, the light ray A2 emitted from the first and second gradient index lens arrays 1504-1 and 1504-2 is condensed on an area centered on the point s on the photosensitive drum 1503 to form a light source image, as illustrated in FIG. 72B.

As illustrated in FIG. 73B, a part of the light rays B2 generated when the light rays A2 condensed at the point s are reflected by photosensitive drum 1503 enters first and second gradient index lens arrays 1504-1 and 1504-2. Then, the light ray B2 emitted from first and second gradient index lens arrays 1504-1 and 1504-2 is condensed on the second light-emitting unit 1507 as illustrated in FIG. 71B. The light ray C2 reflected by the second light-emitting unit 1507, which has a reflectance of 25.0%, follows a similar optical path to that of the light ray A2 as multireflection light and is condensed on the photosensitive drum 1503.

FIGS. 73A and 73B illustrate the light rays B1 and B2 reflected by the photosensitive drum 1503 while there is no attachment error of the exposure head 1505 (attachment angle is 0°) by alternate long and short dash lines, and the light rays B1 and B2 reflected by the photosensitive drum 1503 rotated (by +0.5°) due to the attachment error by broken lines.

In a case where the exposure head 1505 is rotated from 0° to +0.5°, regarding the light rays B1 (broken line) emitted from the first light-emitting unit 1506 and reflected by the photosensitive drum 1503, a percentage of a part of the light rays B1 to the light rays B1, which part enters the first and second gradient index lens arrays 1504-1 and 1504-2, decreases compared to the light ray (alternate long and short dash line) in a case where there is no attachment error. Therefore, as illustrated in FIG. 74, the light amount emitted from the first light-emitting unit 1506 and condensed on the photosensitive drum 1503 is reduced to 99.99. On the other hand, regarding the light rays B2 (broken line) emitted from the second light-emitting unit 1507 and reflected by the photosensitive drum 1503, a percentage of a part of the light rays B2 to the light rays B2, which part enters the first and second gradient index lens arrays 1504-1 and 1504-2, increases compared to the light ray (alternate long and short dash line) in a case where there is no attachment error. Thus, the light amount emitted from the second light-emitting unit 1507 and condensed on the photosensitive drum 1503 increases to 100.06.

In a case where the exposure head 1505 is rotated from 0° to −0.5°, contrary to the case where the exposure head 1505 is rotated +0.5°, the light amount emitted from the first light-emitting unit 1506 and condensed on the photosensitive drum 1503 increases to 100.06. On the other hand, the light amount emitted from the second light-emitting unit 1507 and condensed on the photosensitive drum 1503 decreases to 99.99.

Thus, in comparative example 2, rotating the exposure head 1505 by ±0.5° increases or decreases the amount of multireflection light, and the light amount fluctuation on the photosensitive drum 1503 is a maximum of 0.06% (=|100.06−100.00|).

Figure 14:
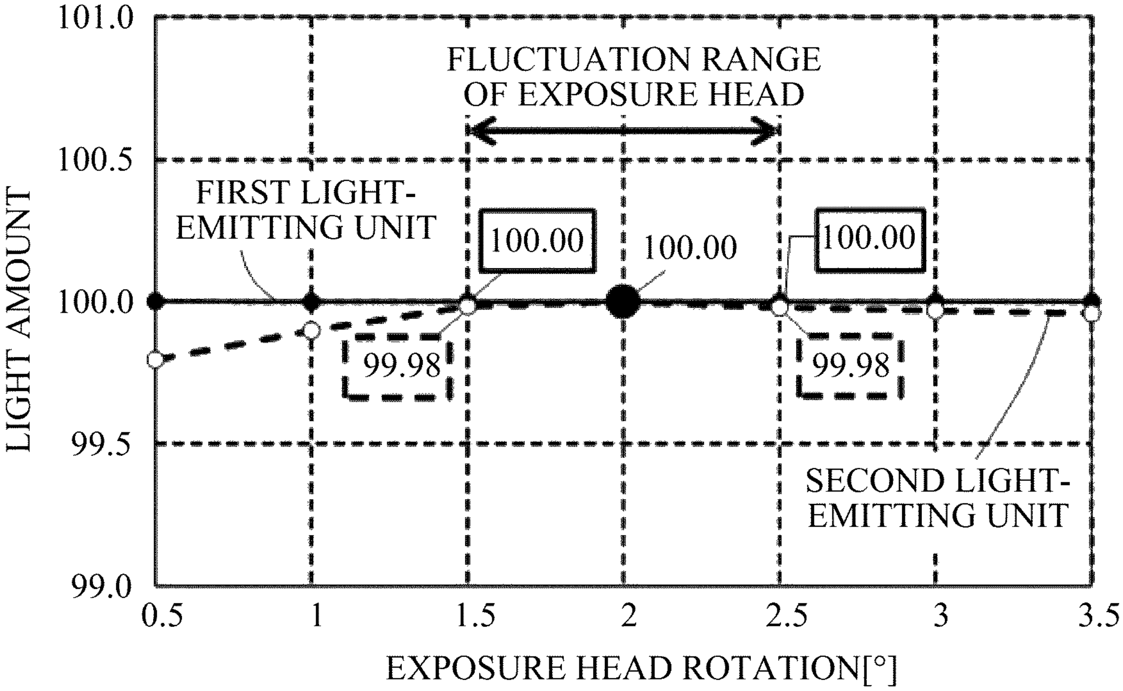
FIG. 14 illustrates a light amount on the photosensitive drum in Example 2.

FIG. 14 illustrates a relationship between the attachment error (rotation angle) of the exposure head 305 and the light amount on the photosensitive drum 303 in this example. In this example, the exposure head 305 is rotated from 0° to 2.0°. Thereby, as illustrated in FIG. 12A, none of the light rays B1 generated when the light rays A1 emitted from the first light-emitting unit 306 are reflected by the photosensitive drum 303 enter the first and second gradient index lens arrays 304-1 and 304-2. Thus, no multireflection light occurs, as not illustrated in FIG. 11A. As a result, as illustrated in FIG. 14, even if the exposure head 305 rotates from 0° to +0.5° and the attachment angle becomes 2.5°, the light amount emitted from the first light-emitting unit 306 and condensed on the photosensitive drum 303 is 100.00, and there is no light amount fluctuation.

In a case where the exposure head 305 is rotated by −0.5° and the attachment angle becomes 1.5°, none of the light rays B1 emitted from the first light-emitting unit 306 and reflected by the photosensitive drum 303 enter the first and second gradient index lens arrays 304-1 and 304-2. As a result, as illustrated in FIG. 14, the light amount emitted from the first light-emitting unit 306 and condensed on the photosensitive drum 303 is 100.00, and there is no light amount fluctuation.

On the other hand, in a case where the exposure head 305 is rotated by 2.0°, as illustrated in FIG. 12B, regarding the light rays B2 emitted from the second light-emitting unit 307 and reflected by the photosensitive drum 303, a percentage of a part of the light rays B2 to the light rays B2, which part enters the first and second gradient index lens arrays 304-1 and 304-2, increases. As a result, as illustrated in FIG. 11B, the light amount C2 as multireflection light increases. Even if the exposure head 305 rotates by ±0.5°, an increase or decrease in the light amount C2 that reaches the photosensitive drum 303 can be suppressed. Thus, as illustrated in FIG. 14, in a case where the exposure head 305 is rotated by +0.5° and −0.5°, the light amounts emitted from the second light-emitting unit 307 and condensed on the photosensitive drum 303 are both 99.98.

Thus, the light amount fluctuation on the photosensitive drum 303 in this example is a maximum of 0.02% (=|99.98−100.00|). That is, this example can suppress the light amount fluctuation by 67% of the light amount fluctuation of 0.06% (|0.06|) in comparative example 2.

Thus, this example can suppress the light amount fluctuation on the photosensitive drum 303 due to the attachment error of the exposure head 305 more effectively than comparative example 2, and reduce the density change in the image formed on the photosensitive drum 303 from the expected density.

Example 3

An exposure head according to Example 3 will now be described. An image forming apparatus in which the exposure head according to Example 3 is used is similar to the image forming apparatus 1 described in Example 1. The exposure head according to Example 3 is different from the exposure head 105 according to Example 1 in the distance T, the diameter of the photosensitive drum, and the tilt of the exposure head, but the other configurations are similar to those of the exposure head 105 according to Example 1.

Figure 15:
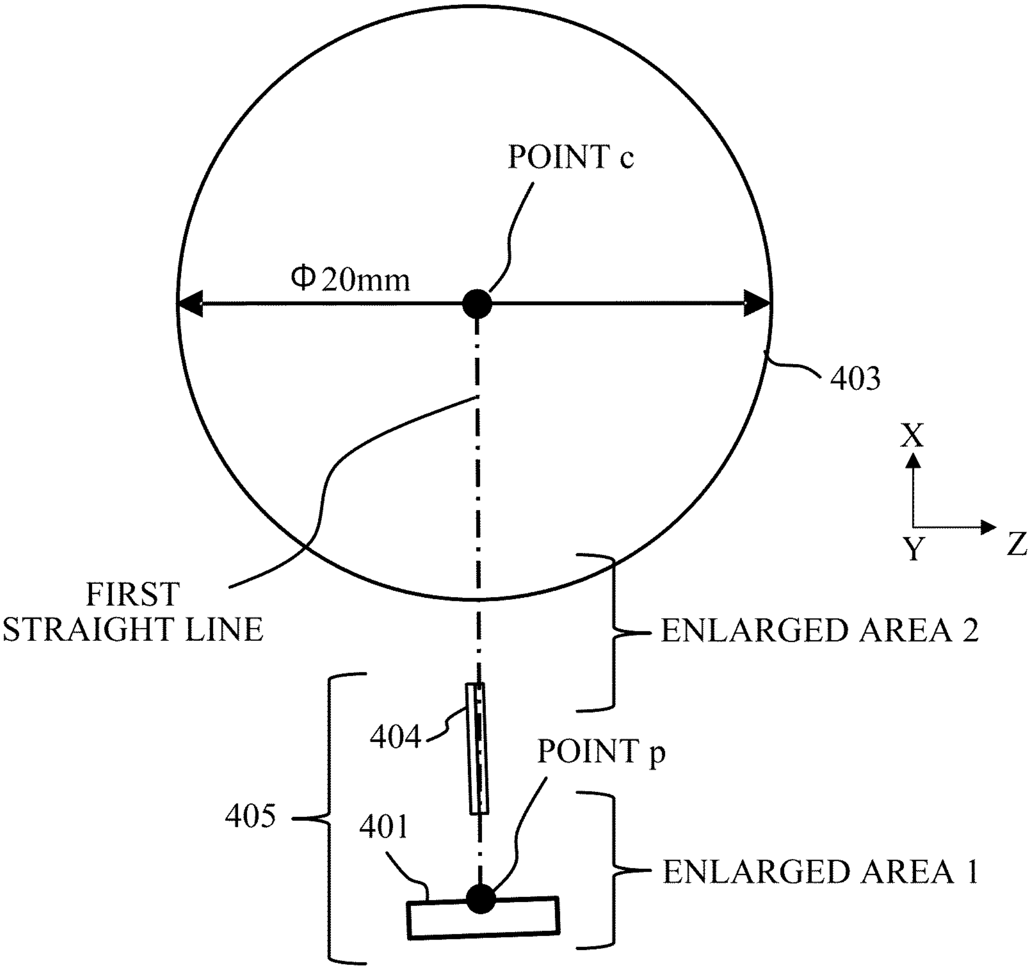
FIG. 15 is a schematic diagram illustrating an exposure head and photosensitive drum in Example 3.
Figure 16A:
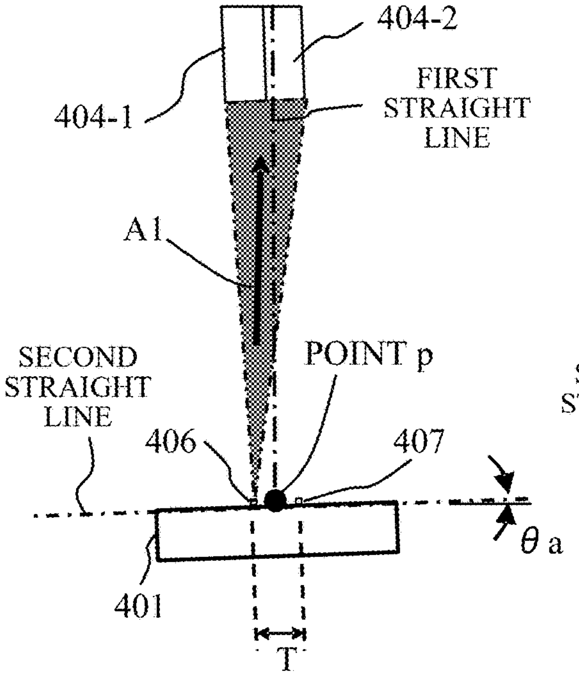
FIGS. 16A and 16B illustrate optical paths from first and second light-emitting units in Example 3.
Figure 16B:
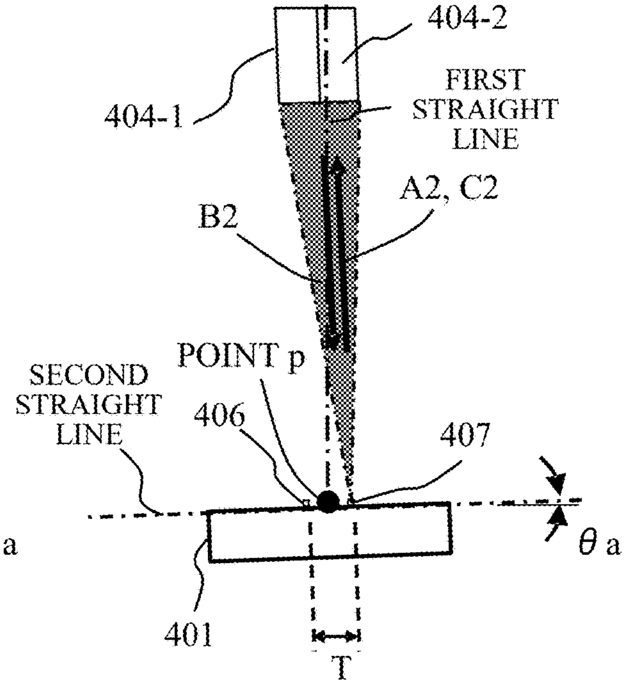

An exposure head 405 according to this example will be described with reference to FIGS. 15, 16A, 16B, 17A, 17B, 18A, 18B, and 19. FIG. 15 illustrates a ZX section when viewed from the Y direction, and the arrangement of the exposure head 405 (light-emitting substrate 401 and gradient index lens array 404) relative to the photosensitive drum 403. FIGS. 16A and 16B illustrate an enlarged view of the enlarged area 1 in FIG. 15 when viewed from the Y direction. FIG. 16A illustrates how the light ray A1 emitted from the first light-emitting unit 406 enters the first and second gradient index lens arrays 404-1 and 404-2. FIG. 16B illustrates how the light ray A2 emitted from the second light-emitting unit 407 enters the first and second gradient index lens arrays 404-1 and 404-2.

Figure 17A:
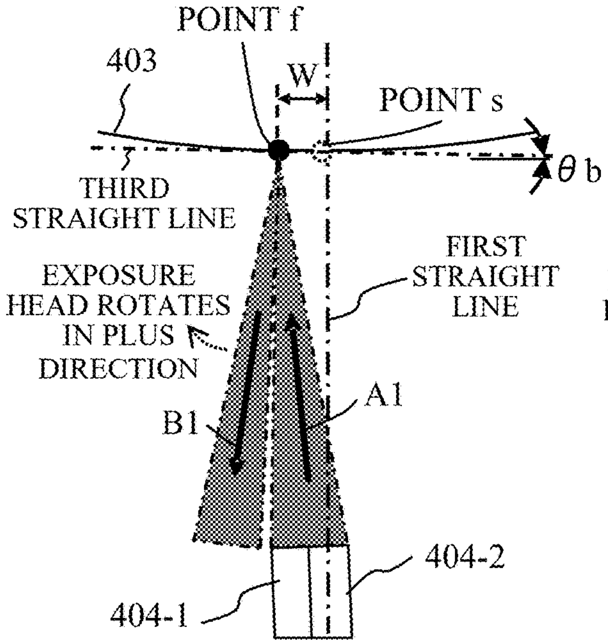
FIGS. 17A and 17B illustrate optical paths from a gradient index lens array in Example 3.
Figure 17B:
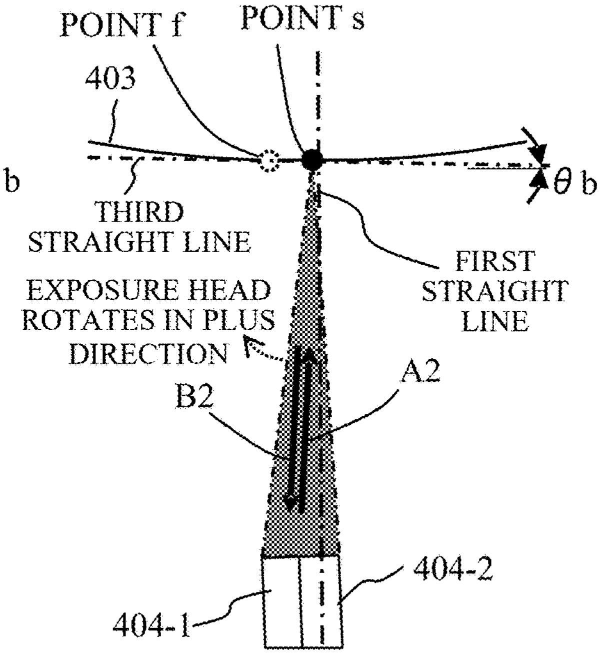

FIGS. 17A and 17B illustrate an enlarged view of the enlarged area 2 in FIG. 15. FIG. 17A illustrates how the light ray A1 emitted from the first light-emitting unit 406 and then from the first and second gradient index lens arrays 404-1 and 404-2 is condensed at the point f on the photosensitive drum 403, and the light ray B1 generated when the light ray A1 is reflected by the photosensitive drum 403. FIG. 14B illustrates how the light ray A2 emitted from the second light-emitting unit 407 and then from the first and second gradient index lens arrays 404-1 and 404-2 is condensed at the point s on the photosensitive drum 403, and the light ray B2 generated when light ray A2 is reflected by the photosensitive drum 403.

Figure 18A:
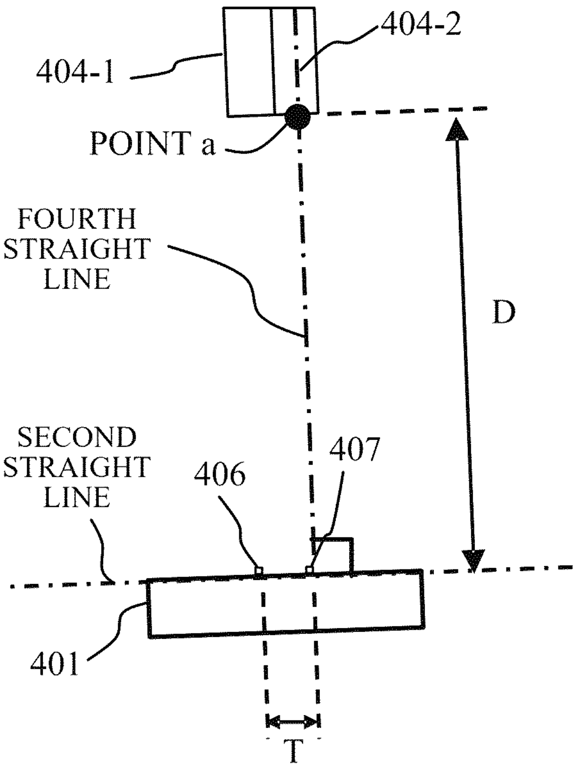
FIGS. 18A and 18B illustrate a positional relationship among the first and second light-emitting units, the gradient index lens array, and the photosensitive drum in Example 3.
Figure 18B:
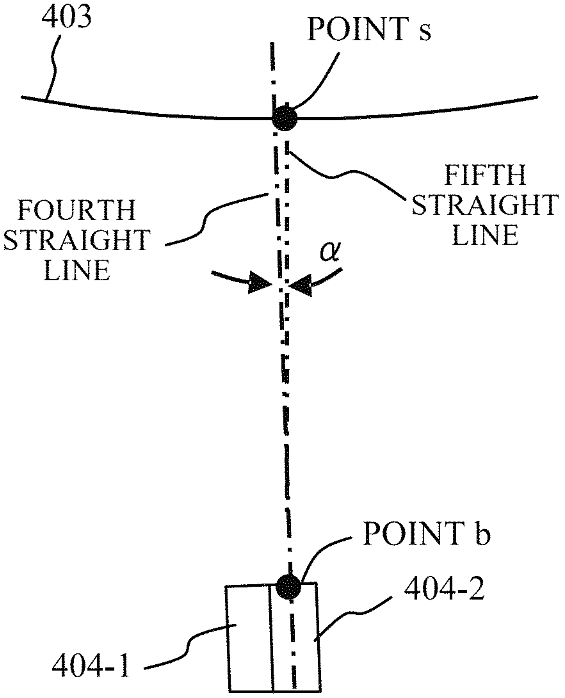

FIG. 18A illustrates a positional relationship between the first and second light-emitting units 406 and 407 and the first and second gradient index lens arrays 404-1 and 404-2. FIG. 18B illustrates a positional relationship among the first and second gradient index lens arrays 404-1 and 404-2 and the photosensitive drum 403.

In this example, the diameter of the photosensitive drum 403 is 20 mm, and T is 0.30 mm. In this example, when viewed from the Y direction, the exposure head 405 is tilted by 1.5° (θa) compared to a case where there is no tilt (tilt angle is 0°) as in comparative example 3 described later, and W is 0.34 mm. Therefore, W/T is 1.13, which satisfies inequality (1). The tilt angle of the second straight line is θa=1.5°, and the tilt angle of the third straight line is θb=0.7°, and the second straight line and the third straight line are not parallel to each other.

In this example, D is 2.74 mm. The shortest distance to the first straight line is shorter at the point s than at the point f. Therefore, the fifth straight line is a normal at the point s. The angle between the fourth straight line and the fifth straight line is α=1.4°. Therefore, $\alpha/\tan^{-1}(T/D)=0.22$, which satisfies inequality (2). T/D=0.11, which satisfies inequality (3).

Even in this example, the exposure head 405 is disposed while being tilted when viewed from the Y direction, so the second straight line and the fourth straight line are orthogonal to each other. Even in this example, the distance corresponding to the distance T1 and the distance equivalent to distance T2 when viewed from the Y direction, which are described in Example 1, are equal to each other.

Referring now to FIGS. 75, 76A, 76B, 77A, 77B, 78A, 78B, and 79, a description will be given of comparative example 3 and the light amount fluctuation in comparative example 3.

Figure 75:
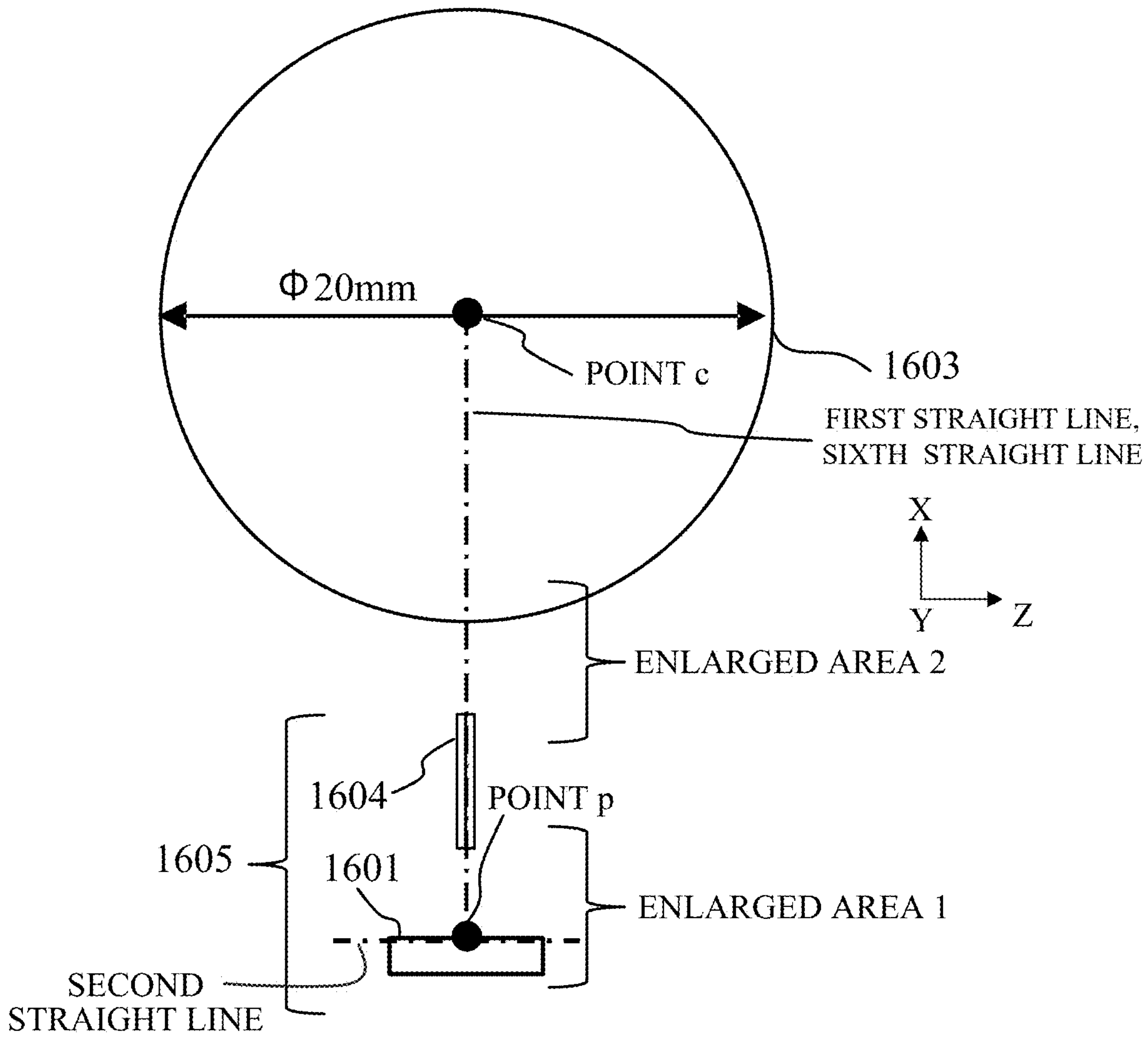
FIG. 75 is a schematic diagram illustrating an exposure head and photosensitive drum in comparative example 3.
Figure 76A:
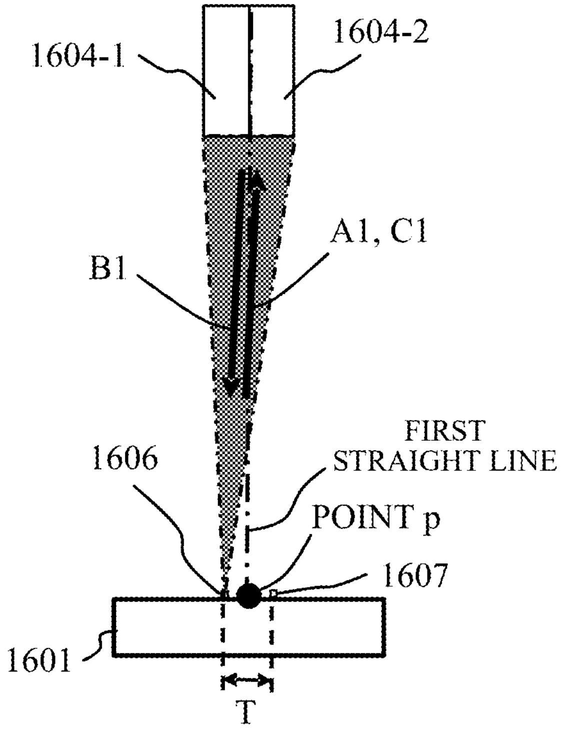
FIGS. 76A and 76B illustrate optical paths from first and second light-emitting units in comparative example 3.
Figure 76B:
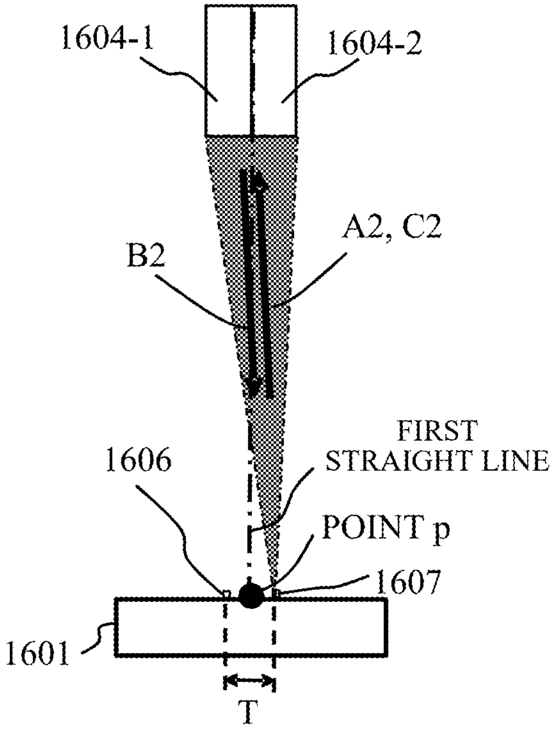

FIG. 75 illustrates the arrangement of the exposure head 1605 relative to the photosensitive drum 1603 in the ZX section when viewed from the Y direction. FIGS. 76A and 76B illustrate an enlarged view of the enlarged area 1 in FIG. 75. FIGS. 77A, 77B, 78A, and 78B illustrate an enlarged view of the enlarged area 2 in FIG. 75. The exposure head 1605 according to comparative example 3 has a similar configuration to that of the exposure head 405 according to Example 3, except that it is disposed without being tilted relative to the photosensitive drum 1603.

Figure 77A:
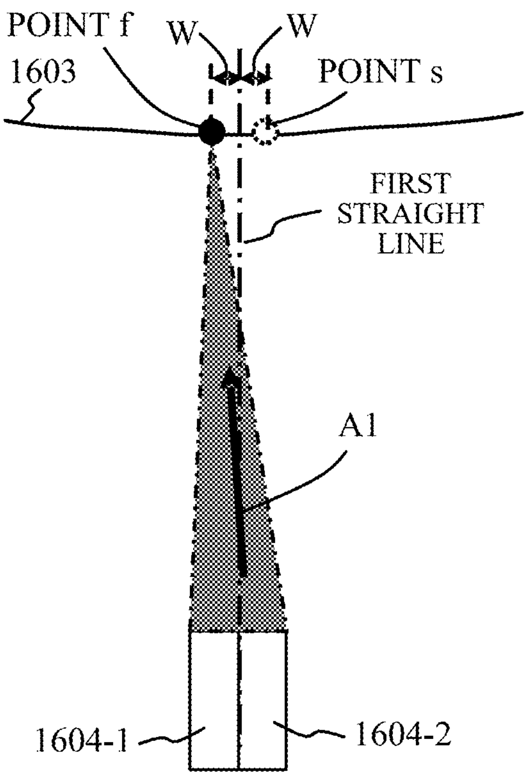
FIGS. 77A and 77B illustrate optical paths from a gradient index lens array in comparative example 3.
Figure 77B:
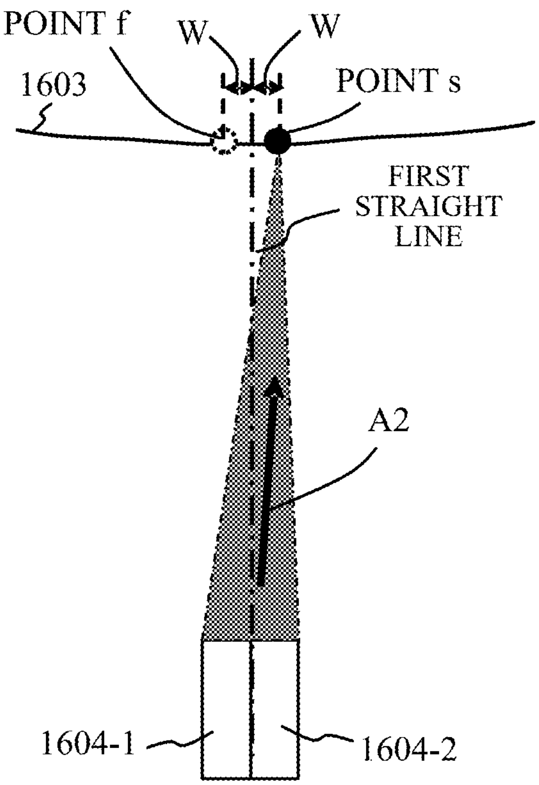

FIG. 76A illustrates how the light ray A1 emitted from the first light-emitting unit 1606 enters the first and second gradient index lens arrays 1604-1 and 1604-2. FIG. 76B illustrates how the light ray A2 emitted from the second light-emitting unit 1607 enters the first and second gradient index lens arrays 1604-1 and 1604-2. FIG. 77A illustrates how the light ray A1 emitted from the first light-emitting unit 1606 and then emitted by the first and second gradient index lens arrays 1604-1 and 1604-2 is condensed on the photosensitive drum 1603. FIG. 77B illustrates how the light ray A2 emitted from the second light-emitting unit 1507 and then emitted by the first and second gradient index lens arrays 1604-1 and 1604-2 is condensed on the photosensitive drum 1603.

Figure 78A:
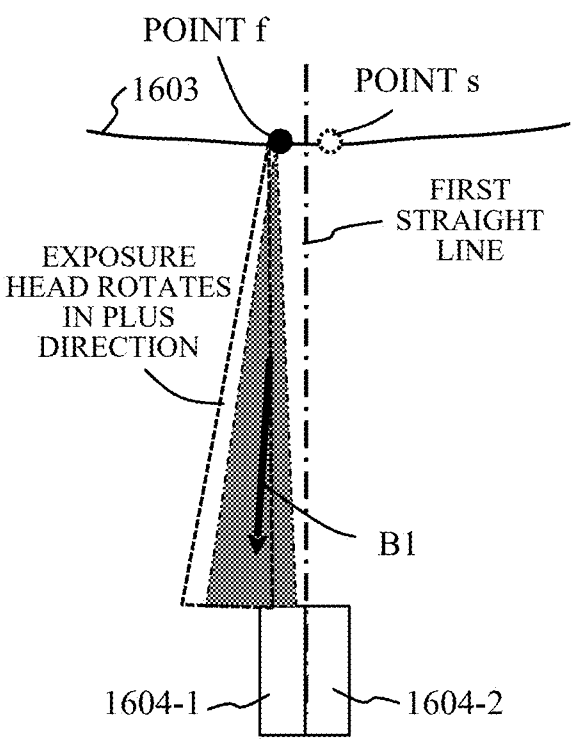
FIGS. 78A and 78B illustrate optical paths from a photosensitive drum in comparative example 3.

FIG. 78A illustrates the light ray B1 generated when the light ray A1 emitted from the first light-emitting unit 1606 and condensed (irradiated) on the photosensitive drum 1603 via the first and second gradient index lens arrays 1604-1 and 1604-2 is reflected by the photosensitive drum 1603. FIG. 73B illustrates the light ray B2 generated when the light ray A2 emitted from the second light-emitting unit 1607 and condensed on the photosensitive drum 1603 via the first and second gradient index lens arrays 1604-1 and 1604-2 is reflected by the photosensitive drum 1603.

In comparative example 3, the diameter of the photosensitive drum 1503 is 20 mm and T is 0.30 mm. Since the exposure head 1605 is not tilted, W is 0.15 mm. Therefore, W/T is 0.50, which does not satisfy inequality (1). The second and third straight lines are parallel to each other.

Figure 79:
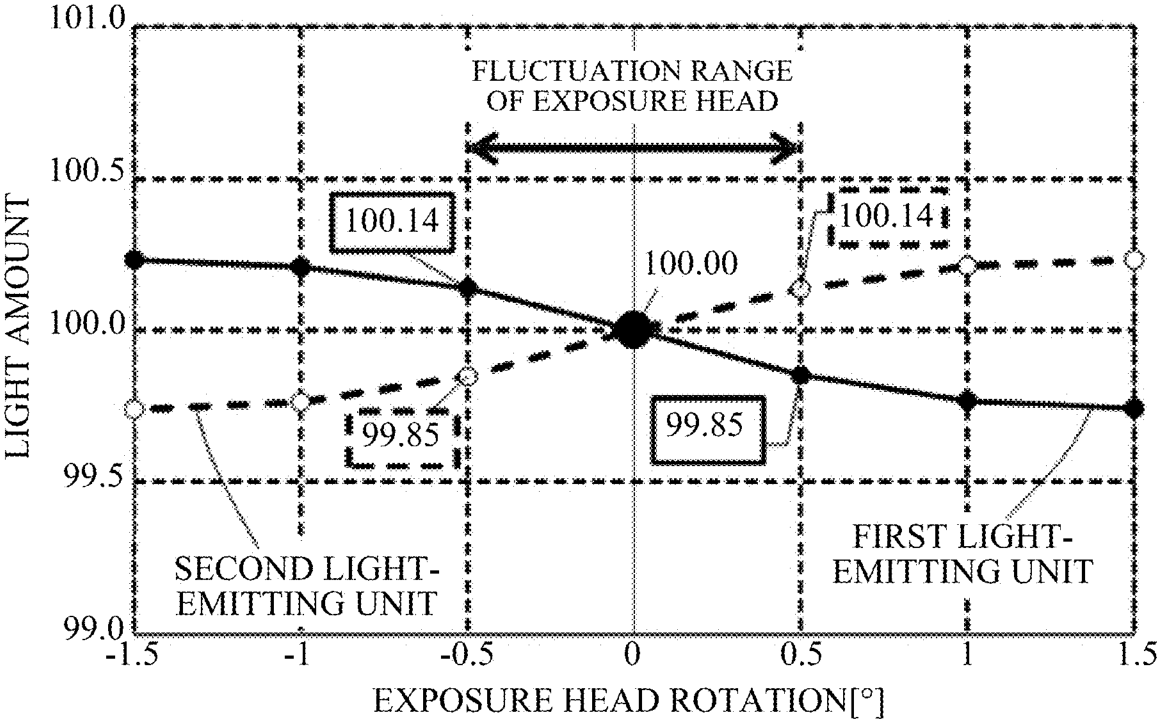
FIG. 79 illustrates a light amount on the photosensitive drum in comparative example 3.

FIG. 79 illustrates a relationship between the attachment error (rotation angle) of the exposure head 1605 and the light amount on the photosensitive drum 1603 in comparative example 3. Here again, the assumed attachment angle of the exposure head 1605 is 0°, and the light amount on the photosensitive drum 1603 at this assumed value is 100.00.

As in comparative examples 1 and 2, in a case where the exposure head 1605 rotates by +0.5° due to the attachment error, the light amount emitted from the first light-emitting unit 1606 and condensed on the photosensitive drum 1603 decreases from 100.00 to 99.85. On the other hand, the light amount emitted from the second light-emitting unit 1607 and condensed on the photosensitive drum 1603 increases to 100.14. Conversely, in a case where the exposure head 1605 rotates by −0.5° due to the attachment error, the light amount emitted from the first light-emitting unit 1606 and condensed on the photosensitive drum 1603 increases to 100.14. On the other hand, the light amount emitted from the second light-emitting unit 1607 and condensed on the photosensitive drum 1603 decreases to 99.85. Thus, in a case where there is light amount fluctuation due to the attachment error of the exposure head 1605, the density of the image formed on the photosensitive drum 1603 changes, and an image with the expected density cannot be obtained.

The reason why the light amount condensed on the photosensitive drum 1603 varies when the exposure head 1605 rotates due to the attachment error will be described. As illustrated in FIG. 76A, the light ray A1 emitted from the first light-emitting unit 1606 enters the first and second gradient index lens arrays 1604-1 and 1604-2. Then, as illustrated in FIG. 77A, the light ray A1 emitted from the first and second gradient index lens arrays 1604-1 and 1604-2 is condensed on an area centered on the point f on the photosensitive drum 1603 to form a light source image.

As illustrated in FIG. 78A, a part of the light rays B1 generated when the light rays A1 condensed at the point f are reflected by the photosensitive drum 1603, which has a reflectance of 10.0%, enters the first and second gradient index lens arrays 1604-1 and 1604-2. Then, the light ray B1 emitted from first and second gradient index lens arrays 1604-1 and 1604-2 is condensed on the first light-emitting unit 1606, as illustrated in FIG. 76A. The light ray C1 reflected by the first light-emitting unit 1606, which has a reflectance of 25.0%, follows a similar optical path to that of the light ray A1 as multireflection light and is condensed on photosensitive drum 1603.

Similarly, as illustrated in FIG. 76B, the light ray A2 emitted from the second light-emitting unit 1607 enters the first and second gradient index lens arrays 1604-1 and 1604-2. Then, the light ray A2 emitted from the first and second gradient index lens arrays 1604-1 and 1604-2 is condensed on an area centered on point s on the photosensitive drum 1603 to form a light source image, as illustrated in FIG. 77B.

Figure 78B:
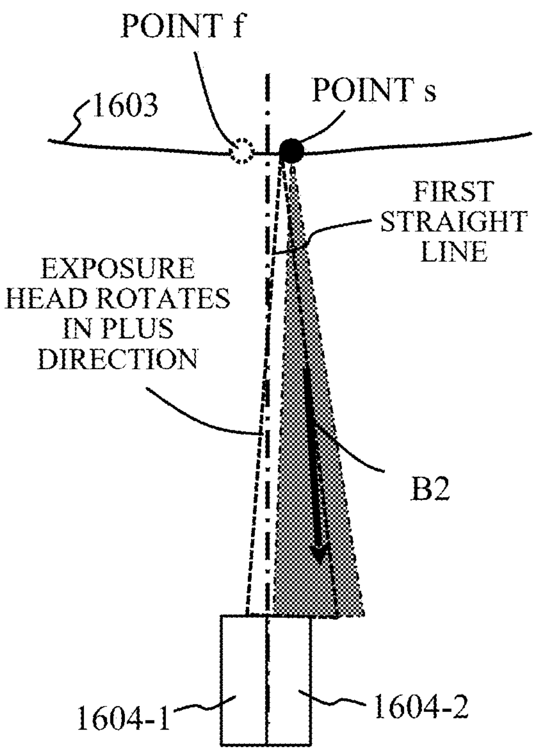

As illustrated in FIG. 78B, a part of light ray B2 generated when the light ray A2 condensed at the point s is reflected by the photosensitive drum 1603 enters the first and second gradient index lens arrays 1604-1 and 1604-2. Then, the light ray B2 emitted from the first and second gradient index lens arrays 1604-1 and 1604-2 is condensed on the second light-emitting unit 1607 as illustrated in FIG. 76B. The light ray C2 reflected by the second light-emitting unit 1607, which has a reflectance of 25.0%, follows a similar optical path to that of the light ray A2 as multireflection light and is condensed on the photosensitive drum 1603.

FIGS. 78A and 78B illustrate the light rays B1 and B2 reflected by the photosensitive drum 1603 while there is no attachment error of the exposure head 1605 (attachment angle is 0°) by alternate long and short dash lines, and the light rays B1 and B2 reflected by the photosensitive drum 1603 rotated (by +0.5°) due to the attachment error by broken lines.

In a case where the exposure head 1605 is rotated from 0° to +0.5°, regarding the light rays B1 (broken line) emitted from the first light-emitting unit 1606 and reflected by the photosensitive drum 1603, a percentage of a part of the light rays B1 to the light rays B1, which part enters the first and second gradient index lens arrays 1604-1 and 1606-2, decreases compared to the light ray (alternate long and short dash line) in a case where there is no attachment error. Therefore, as illustrated in FIG. 79, the light amount emitted from the first light-emitting unit 1606 and condensed on the photosensitive drum 1603 is reduced to 99.85. On the other hand, regarding the light rays B2 (broken line) emitted from the second light-emitting unit 1607 and reflected by the photosensitive drum 1603, a percentage of a part of the light rays B2 to the light rays B2, which part enters the first and second gradient index lens arrays 1604-1 and 1604-2, increases compared to the light ray (alternate long and short dash line) in a case where there is no attachment error. Thus, the light amount emitted from the second light-emitting unit 1607 and condensed on the photosensitive drum 1603 increases to 100.14.

In a case where the exposure head 1605 is rotated from 0° to −0.5°, contrary to the case where the exposure head 1605 is rotated +0.5°, the light amount emitted from the first light-emitting unit 1606 and condensed on the photosensitive drum 1603 increases to 100.14. On the other hand, the light amount emitted from the second light-emitting unit 1607 and condensed on the photosensitive drum 1603 decreases to 99.85.

Thus, in comparative example 3, rotating the exposure head 1605 by ±0.5° increases or decreases the amount of multireflection light, and the light amount fluctuation on the photosensitive drum 1603 is a maximum of 0.15% (=|99.85−100.00|).

Figure 19:
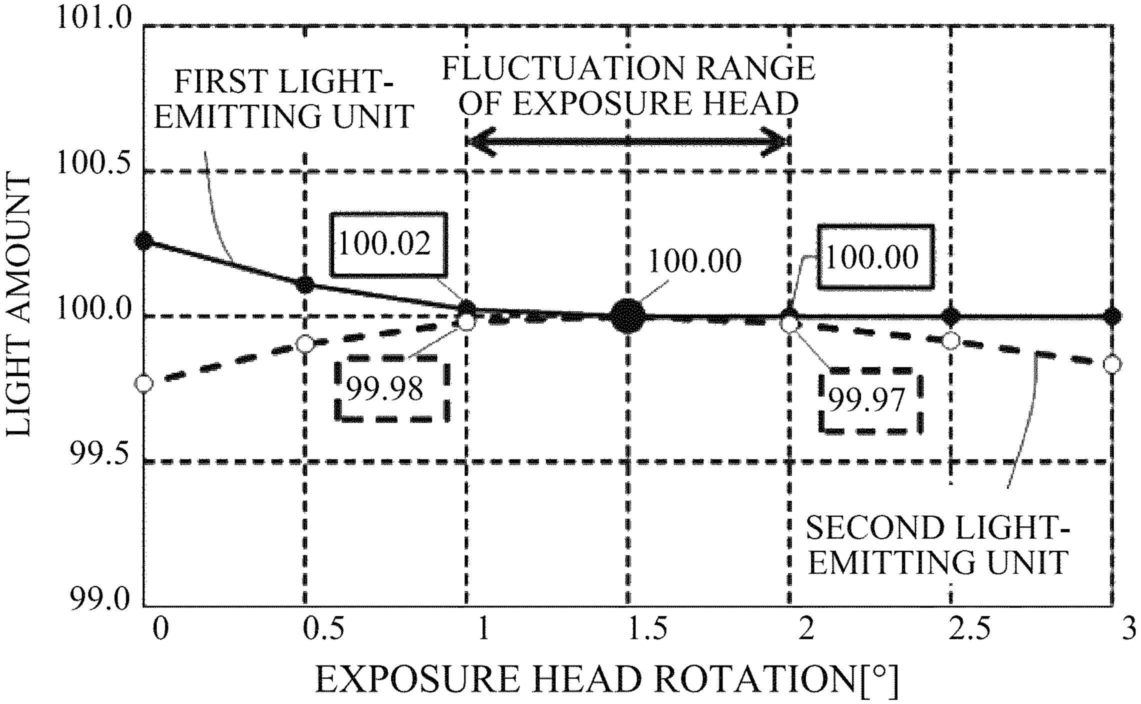
FIG. 19 illustrates a light amount on the photosensitive drum in Example 3.

FIG. 19 illustrates a relationship between the attachment error (rotation angle) of the exposure head 405 and the light amount on the photosensitive drum 403 in this example. In this example, the exposure head 405 is rotated from 0° to 1.5°. Thereby, as illustrated in FIG. 17A, none of the light rays B1 generated when the light rays A1 emitted from the first light-emitting unit 406 are reflected by the photosensitive drum 403 enter the first and second gradient index lens arrays 404-1 and 404-2. Thus, no multireflection light occurs as not illustrated in FIG. 16A. As a result, as illustrated in FIG. 19, even if the exposure head 405 rotates from 0° to +0.5° and the attachment angle becomes 2.0°, the light amount emitted from the first light-emitting unit 406 and condensed on the photosensitive drum 403 is 100.00, and there is no light amount fluctuation.

In a case where the exposure head 305 is rotated by −0.5° and the attachment angle becomes 1.5°, regarding the light rays B1 emitted from the first light-emitting unit 306 and reflected by the photosensitive drum 303, a percentage of a part of the light rays B1 to the light rays B1, which part enters the first and second gradient index lens arrays 304-1 and 304-2, increases slightly. As a result, as illustrated in FIG. 19, the light amount emitted from the first light-emitting unit 406 and condensed on the photosensitive drum 403 becomes 100.02.

On the other hand, in a case where the exposure head 405 is rotated by 1.5°, as illustrated in FIG. 17B, regarding the light rays B2 emitted from the second light-emitting unit 407 and reflected by the photosensitive drum 403, a percentage of a part of the light rays B2 to the light rays B2, which part enters the first and second gradient index lens arrays 404-1 and 404-2, increases. As a result, as illustrated in FIG. 16B, the light amount C2 as multireflection light increases. Even if the exposure head 405 rotates by ±0.5°, an increase or decrease in the light amount beam C2 that reaches the photosensitive drum 403 can be suppressed. Thus, as illustrated in FIG. 19, in a case where the exposure head 405 is rotated by +0.5° and −0.5°, the light amounts emitted from the second light-emitting unit 407 and condensed on the photosensitive drum 403 are 99.98 and 99.97, respectively.

Thus, the light amount fluctuation on the photosensitive drum 403 in this example is a maximum of 0.03% (=|99.97−100.00|). That is, this example can suppress the light amount fluctuation by 80% of the light amount fluctuation of 0.15% (|0.15|) in comparative example 3.

Thus, this example can suppress the light amount fluctuation on the photosensitive drum 403 due to the attachment error of the exposure head 405 more effectively than comparative example 3, and reduce the density change in the image formed on the photosensitive drum 403 from the expected density.

Example 4

An exposure head according to Example 4 will now be described. An image forming apparatus in which the exposure head according to Example 4 is used is similar to the image forming apparatus 1 described in Example 1. The exposure head according to Example 4 is different from the exposure head 105 according to Example 1 in that it has no tilt (i.e., similarly to comparative example 1) and is disposed at a position moved parallel to (translated relative to) the photosensitive drum, but other configurations are similar to those of the exposure head 105 according to Example 1.

Figure 20:
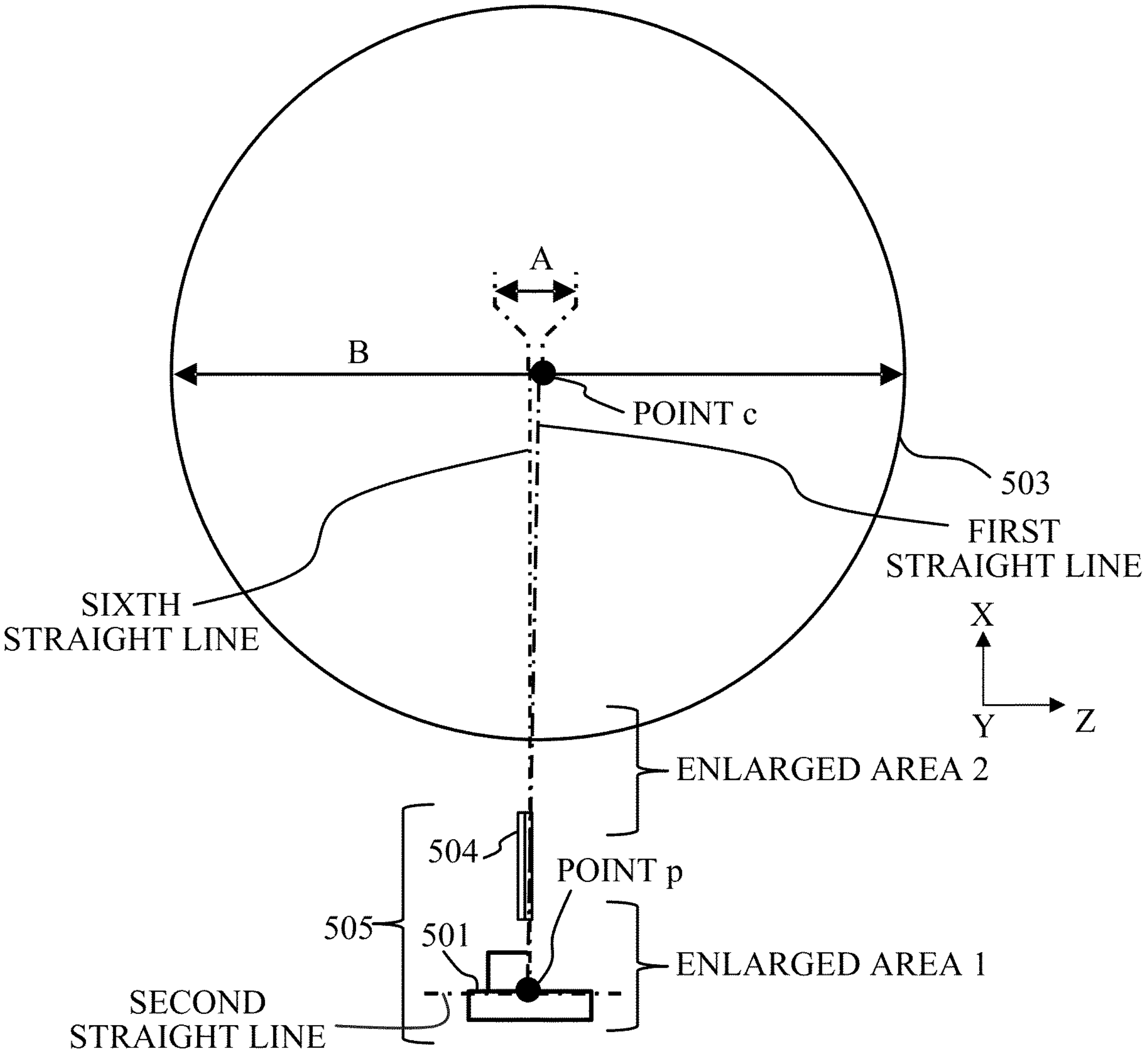
FIG. 20 is a schematic diagram illustrating an exposure head and photosensitive drum in Example 4.
Figure 21A:
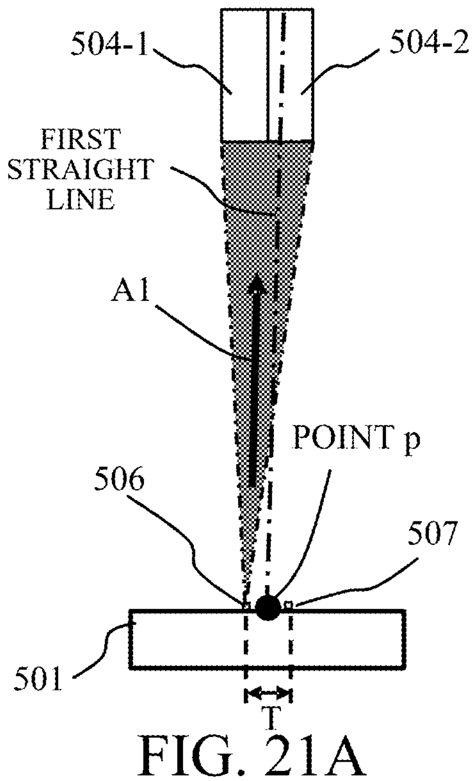
FIGS. 21A and 21B illustrate optical paths from the first and second light-emitting units in Example 4.
Figure 21B:
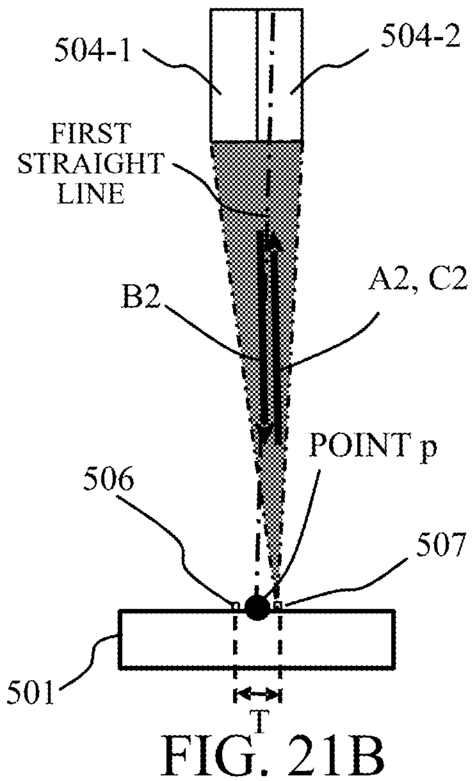

An exposure head 505 according to this example will be described with reference to FIGS. 20, 21A, 21B, 22A, 22B, 23A, 23B, and 24. FIG. 20 illustrates a ZX section when viewed from the Y direction, and the arrangement of the exposure head 505 (light-emitting substrate 501 and gradient index lens array 504) relative to the photosensitive drum 503. FIGS. 21A and 21B illustrate an enlarged view of the enlarged area 1 in FIG. 20 when viewed from the Y direction. FIG. 21A illustrates how the light ray A1 emitted from the first light-emitting unit 506 enters the first and second gradient index lens arrays 504-1 and 504-2. FIG. 21B illustrates how the light ray A2 emitted from the second light-emitting unit 507 enters the first and second gradient index lens arrays 504-1 and 504-2.

Figure 22A:
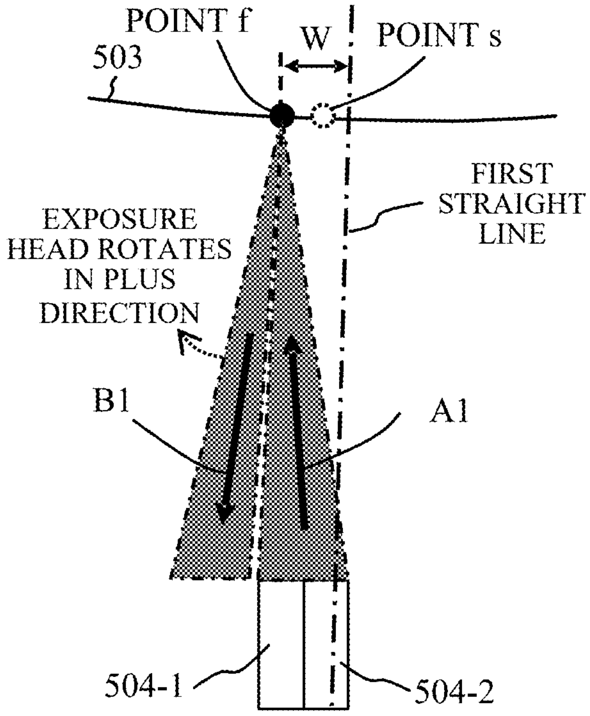
FIGS. 22A and 22B illustrate optical paths from a gradient index lens array in Example 4.
Figure 22B:
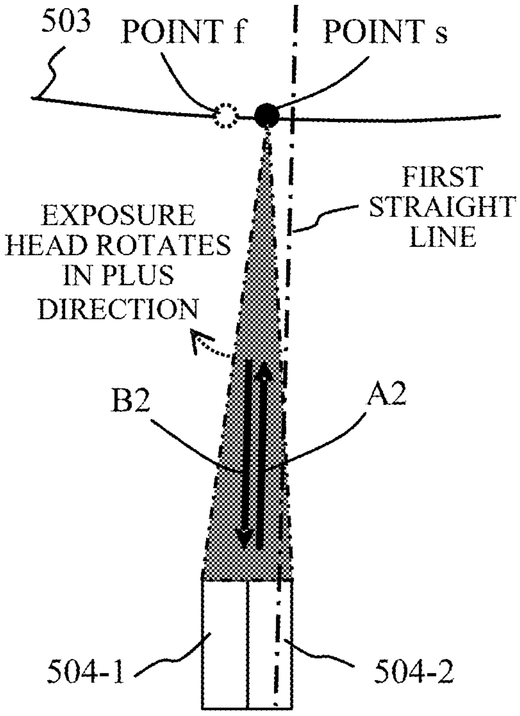

FIGS. 22A and 22B illustrate an enlarged view of the enlarged area 2 in FIG. 20. FIG. 22A illustrates how the light ray A1 emitted from the first light-emitting unit 506 and then from the first and second gradient index lens arrays 504-1 and 504-2 is condensed at the point f on the photosensitive drum 503, and the light ray B1 generated when the light ray A1 is reflected by the photosensitive drum 503. FIG. 22B illustrates how the light ray A2 emitted from the second light-emitting unit 507 and then from the first and second gradient index lens arrays 504-1 and 504-2 is condensed at the point s on the photosensitive drum 503, and the light ray B2 generated when the light ray A2 is reflected by the photosensitive drum 503.

Figure 23A:
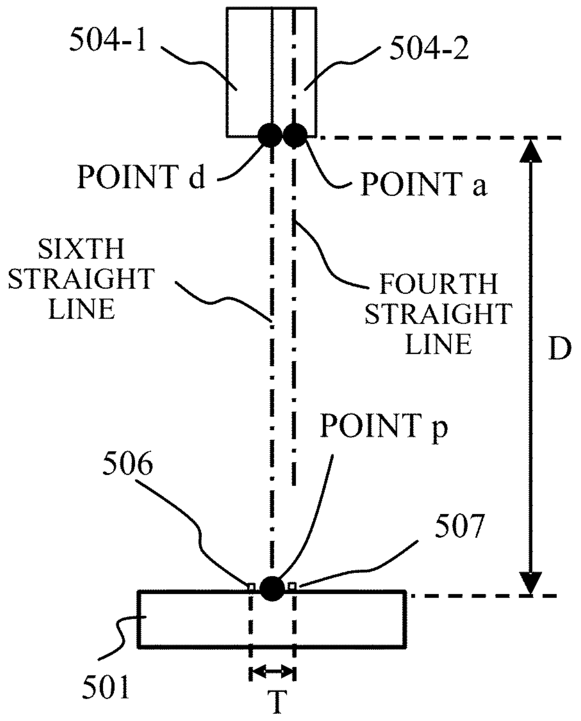
Figure 23B:
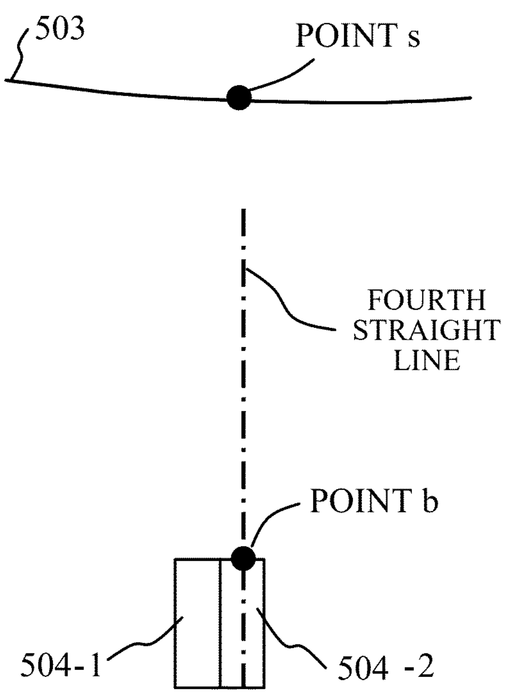

FIG. 23A illustrates a positional relationship between the first and second light-emitting units 506 and 507 and the first and second gradient index lens arrays 504-1 and 504-2. FIG. 23B illustrates a positional relationship among the first and second gradient index lens arrays 504-1 and 504-2 and the photosensitive drum 503.

In the exposure head 505 according to this example, T=0.25 mm. The exposure head 505 according to this example is disposed at a position shifted in parallel by 0.7 mm in the Z direction when viewed from the Y direction compared to comparative example 1. W=0.40 mm. Therefore, W/T=1.60, which satisfies inequality (1).

In this example, a sixth straight line is defined as a straight line that passes through the point p and is orthogonal to the second straight line when viewed from the Y direction. Then, the exposure head 505 in this example is disposed at a position where the sixth straight line does not pass through the point c as the rotation center of the photosensitive drum (target surface) 503, as illustrated in FIG. 20.

As illustrated in FIGS. 20 and 23A, when viewed from the Y direction, A is defined as a distance (parallel movement amount) between the sixth straight line and the point c, B is defined as the diameter of the photosensitive drum 503, and D is defined as a distance from the point p as an intersection of the sixth straight line and the second straight line, to the intersection of the sixth straight line and the entrance surface of the gradient index lens. Then, the exposure head 505 may satisfy the following inequality (4):

$$2 \le (B \times T)/(D \times A) \le 10 \quad (4)$$

Inequality (4) defines a proper parallel movement amount A in the Z direction of the exposure head 505 relative to the photosensitive drum 503. Setting (B×T)/(D×A) within the range of inequality (4) can reduce the light amount fluctuation on the photosensitive drum 503 caused by the attachment error of the exposure head 505. In a case where (B×T)/(D×A) becomes lower than the lower limit of inequality (4), the size of the image forming apparatus increases. In a case where (B×T)/(D×A) becomes higher than the upper limit of inequality (4), the light amount fluctuation due to the attachment error cannot be reduced.

In this example, A=0.7 mm, B=30 mm, and D=2.74 mm. Therefore, (B×T)/(D×A)=3.9, which satisfies inequality (4). T/D=0.09, which satisfies inequality (3).

In this example, as illustrated in FIGS. 23A and 23B, when viewed from the Y direction, a fourth straight line is defined as a straight line connecting the point a as the center of the entrance surface of the gradient index lens included in each gradient index lens array (504-1 and 504-2), and the point b as the center of the exit surface of the lens. Then, the exposure head 505 is disposed so that the fourth straight line and the sixth straight line are parallel to each other. When viewed from the Y direction, the sixth straight line passes through the point d as a midpoint (seventh point) between the center of the entrance surface of the gradient index lens included in the first gradient index lens array 504-1 and the center of the entrance surface of the gradient index lens included in the second gradient index lens array 504-2.

The above inequalities described in this example are satisfied in all combinations of first and second light-emitting units in the plurality of first light-emitting units 506 and the plurality of second light-emitting units 507. This is similarly applicable to Examples 5 and 6 described later.

Figure 24:
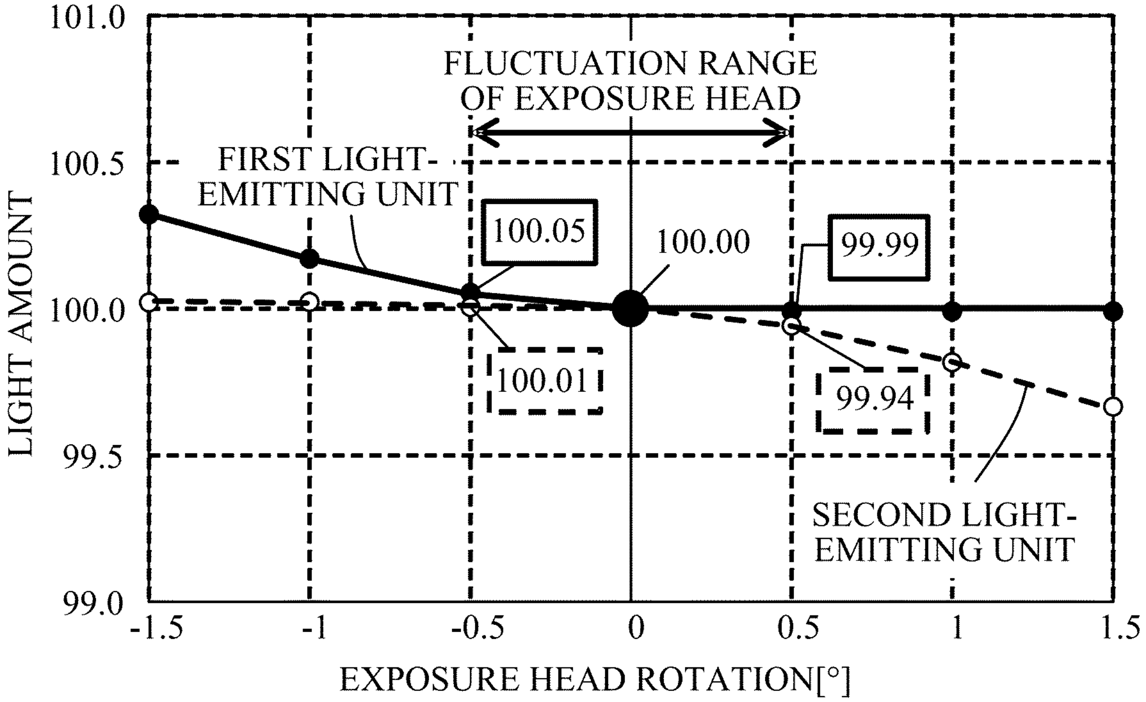
FIG. 24 illustrates a light amount on the photosensitive drum in Example 4.

FIG. 24 illustrates a relationship between the attachment error (rotation angle) of the exposure head 505 and the light amount on the photosensitive drum 503 in this example. The assumed value of the attachment angle of the exposure head 505 in this example is 0°, as in comparative example 1.

As illustrated in FIG. 22A, regarding the light rays B1 generated when the light rays A1 emitted from the first light-emitting unit 506 are reflected by the photosensitive drum 503, a percentage of a part of the light rays B1 to the light rays B1, which part enters the first and second gradient index lens arrays 504-1 and 504-2, is feeble. Therefore, as is not illustrated in FIG. 21A, little multireflection light occurs. As a result, as illustrated in FIG. 24, even if the exposure head 505 rotates from 0° to +0.5°, the light amount condensed on the photosensitive drum 503 is 99.99, and there is almost no light amount fluctuation on the photosensitive drum 503. In a case where the exposure head 505 is rotated by −0.5°, regarding the light rays B1 generated when the light rays A1 emitted from the first light-emitting unit 506 are reflected by the photosensitive drum 503, a percentage of a part of the light rays B1 to the light rays B1, which part enters the first and second gradient index lens arrays 504-1 and 504-2, increases. Therefore, the light amount condensed on the photosensitive drum 503 becomes 100.05.

On the other hand, as illustrated in FIG. 22B, regarding the light rays B2 generated when the light rays A2 emitted from the second light-emitting unit 507 are reflected by the photosensitive drum 503, a percentage of a part of the light rays B2 to the light rays B2, which part enters the first and second gradient index lens arrays 504-1 and 504-2, increases. At this time, at a position where the exposure head 505 is moved in parallel by 0.7 mm in the Z direction, the amount of the light ray C2 as multireflection light increases, as illustrated in FIG. 21B. Therefore, even if the exposure head 505 is rotated by ±0.5°, an increase or decrease in multireflection light can be suppressed. As a result, as illustrated in FIG. 24, the light amount condensed on the photosensitive drum 503 in a case where the exposure head 505 is rotated +0.5° is 99.94, and the light amount condensed on the photosensitive drum 503 in a case where the exposure head 505 is rotated −0.5° is 100.01.

Thus, the light amount fluctuation on the photosensitive drum 503 in this example is a maximum of 0.06% (=|99.94−100.00|). In other words, this example can suppress the light amount fluctuation by 50% of the light amount fluctuation of 0.12% (|0.12|) in comparative example 1.

Thus, this example can suppress the light amount fluctuation on the photosensitive drum 503 caused by the attachment error of the exposure head 505 more effectively than comparative example 1, and reduce the density change in the image formed on the photosensitive drum 503 from the expected density.

Example 5

An exposure head according to Example 5 will now be described. An image forming apparatus in which the exposure head according to Example 5 is used is similar to the image forming apparatus 1 described in Example 1. The exposure head according to Example 5 is different from the exposure head 305 according to Example 2 in that it has no tilt (i.e., similarly to comparative example 2) and is disposed at a position shifted parallel to the photosensitive drum, but other configurations are similar to those of the exposure head 305 according to Example 2.

Figure 25:
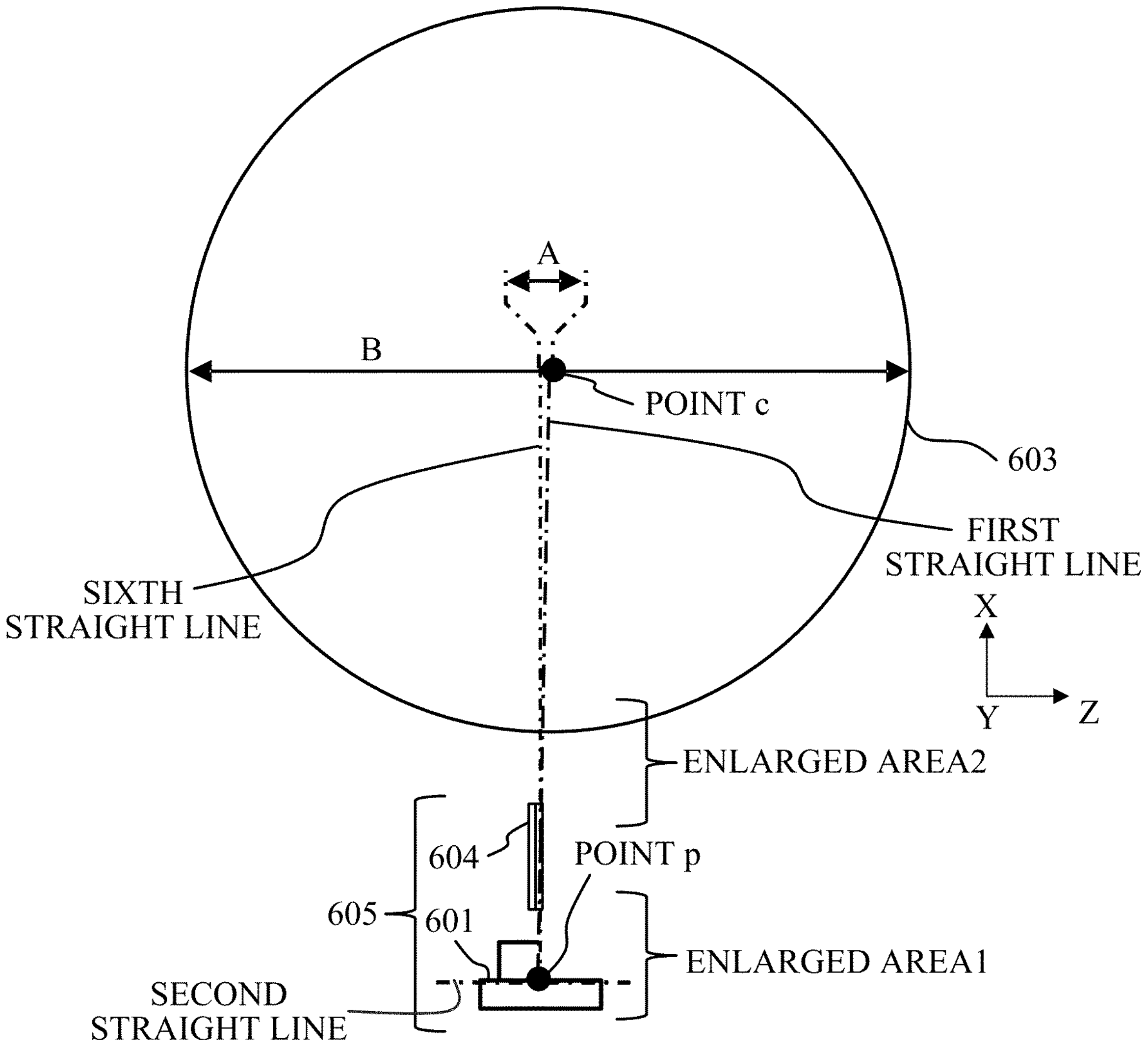
FIG. 25 is a schematic diagram illustrating an exposure head and photosensitive drum in Example 5.
Figure 26A:
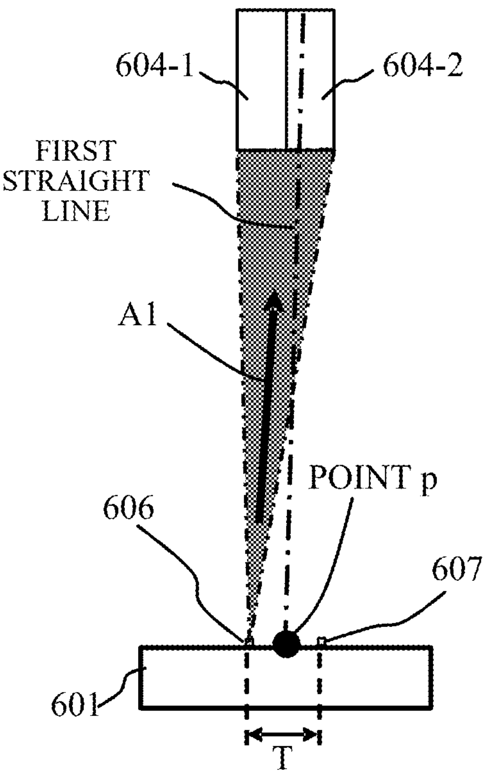
FIGS. 26A and 26B illustrate optical paths from first and second light-emitting units in Example 5.
Figure 26B:
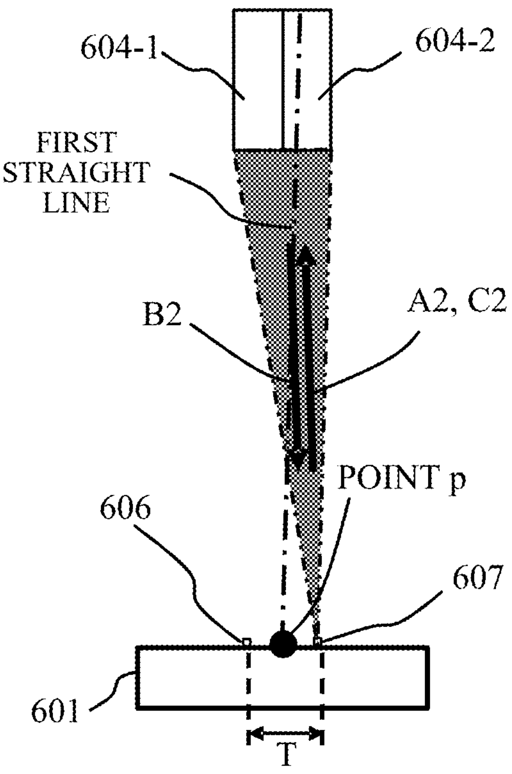

An exposure head 605 according to this example will be described with reference to FIGS. 25, 26A, 26B, 27A, 27B, 28A, 28B, and 29. FIG. 25 illustrates a ZX section when viewed from the Y direction, and the arrangement of the exposure head 605 (light-emitting substrate 601 and gradient index lens array 604) relative to the photosensitive drum 603. FIGS. 26A and 26B illustrate an enlarged view of the enlarged area 1 in FIG. 25 when viewed from the Y direction. FIG. 26A illustrates how the light ray A1 emitted from the first light-emitting unit 606 enters the first and second gradient index lens arrays 604-1 and 604-2. FIG. 26B illustrates how the light ray A2 emitted from the second light-emitting unit 607 enters the first and second gradient index lens arrays 604-1 and 604-2.

Figure 27A:
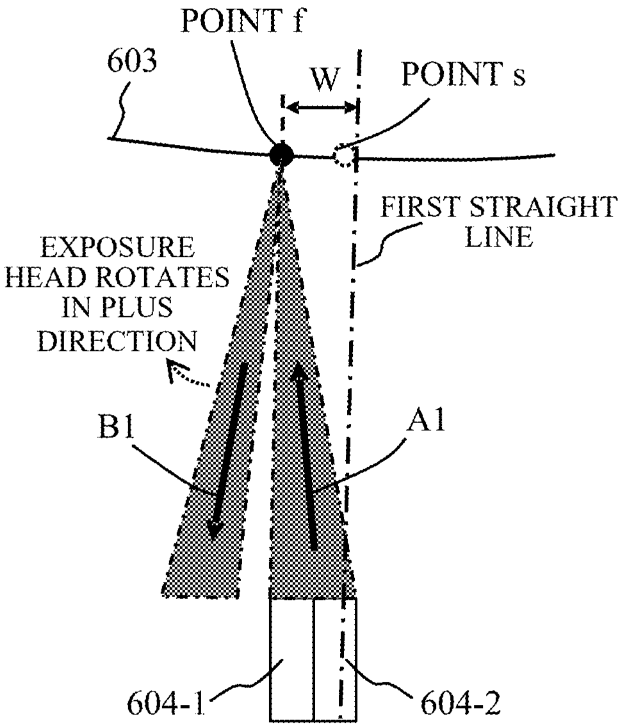
FIGS. 27A and 27B illustrate optical paths from a gradient index lens array in Example 5.
Figure 27B:
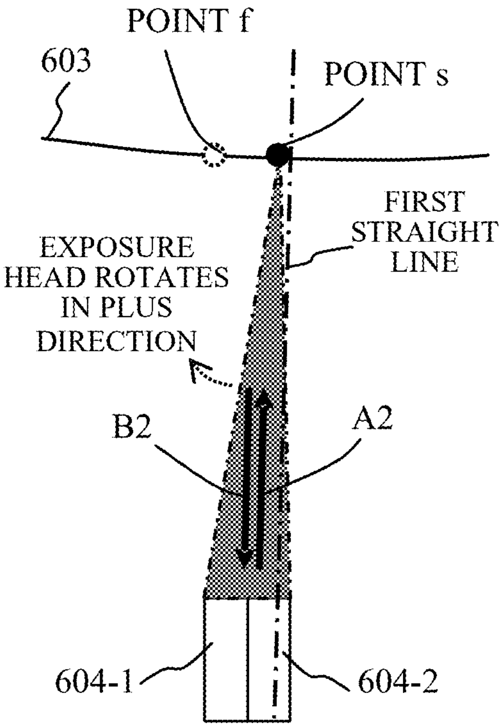

FIGS. 27A and 27B illustrate an enlarged view of the enlarged area 2 in FIG. 25. FIG. 27A illustrates how the light ray A1 emitted from the first light-emitting unit 606 and then from the first and second gradient index lens arrays 604-1 and 604-2 is condensed at the point f on the photosensitive drum 603, and light ray B1 generated when light ray A1 is reflected by the photosensitive drum 603. FIG. 27B illustrates how the light ray A2 emitted from the second light-emitting unit 607 and then emitted from the first and second gradient index lens arrays 604-1 and 604-2 is condensed at the point s on the photosensitive drum 603, and the light ray B2 generated when the light ray A2 is reflected by the photosensitive drum 603.

Figure 28A:
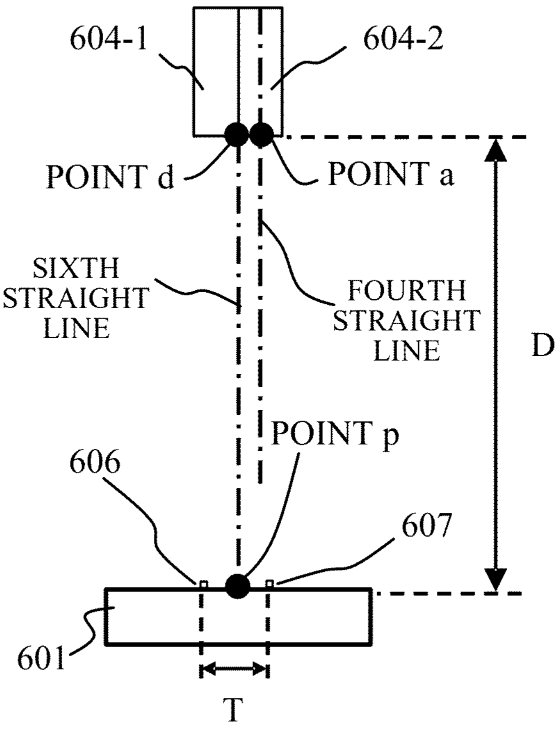
FIGS. 28A and 28B illustrate a positional relationship among the first and second light-emitting units, the gradient index lens array, and the photosensitive drum in Example 5.
Figure 28B:
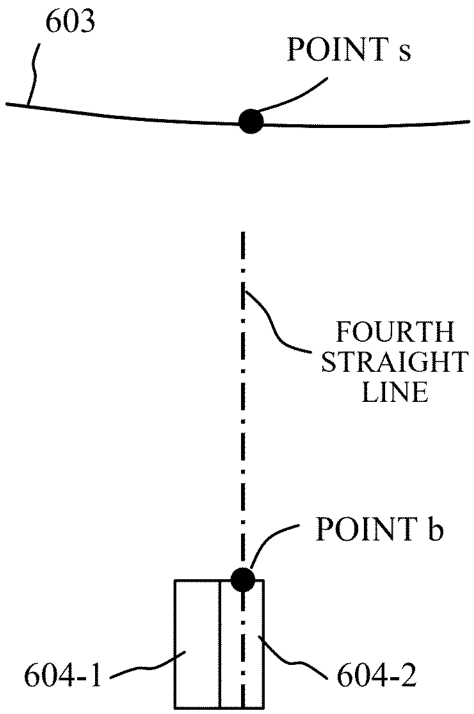

FIG. 28A illustrates a positional relationship between the first and second light-emitting units 606 and 607 and the first and second gradient index lens arrays 604-1 and 604-2. FIG. 28B illustrates a positional relationship among the first and second gradient index lens arrays 604-1 and, 604-2 and the photosensitive drum 603.

In the exposure head 605 according to this example, T=0.40 mm. The exposure head 605 according to this example is disposed at a position shifted in parallel by 0.7 mm in the Z direction when viewed from the Y direction relative to comparative example 2. W=0.40 mm. Therefore, W/T=1.20, which satisfies inequality (1).

The exposure head 605 according to this example is disposed at a position where the sixth straight line does not pass through the point c, which is the rotation center of the photosensitive drum 603, as illustrated in FIG. 25.

In this example, A=0.7 mm, B=30 mm, and D=2.74 mm. Therefore, (B×T)/(D×A)=6.3, which satisfies inequality (4). T/D=0.15, which satisfies inequality (3).

In this example, as illustrated in FIGS. 28A and 28B, when viewed from the Y direction, a fourth straight line is defined as a straight line connecting the point a as the center of the entrance surface of the gradient index lens included in each gradient index lens array (604-1 and 604-2), and the point b as the center of the exit surface of the lens. Then, the exposure head 605 is disposed so that the fourth straight line and the sixth straight line are parallel to each other. When viewed from the Y direction, the sixth straight line passes through the point d as a midpoint between the center of the entrance surface of the gradient index lens included in the first gradient index lens array 604-1 and the center of the entrance surface of the gradient index lens included in the second gradient index lens array 604-2.

Figure 29:
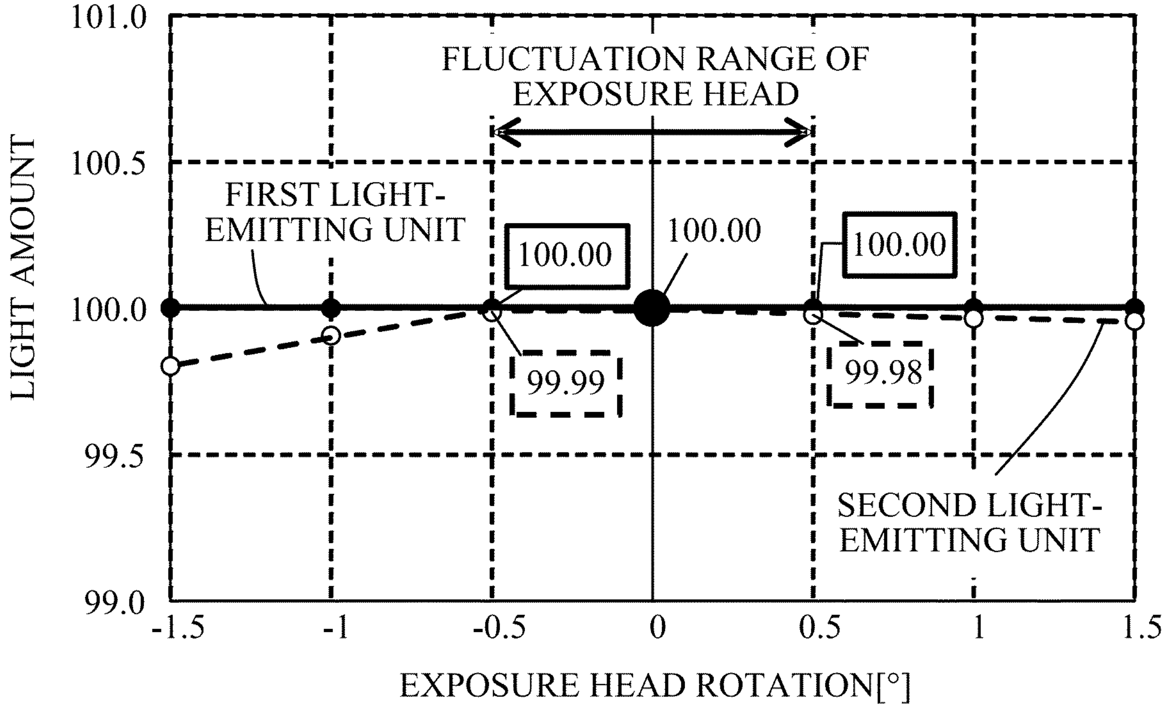
FIG. 29 illustrates a light amount on the photosensitive drum in Example 5.

FIG. 29 illustrates a relationship between the attachment error (rotation angle) of the exposure head 605 and the light amount on the photosensitive drum 603 in this example. The assumed value of the attachment angle of the exposure head 605 in this example is 0°, as in comparative example 2. In this example, as illustrated in FIG. 27A, none of the light rays B1 generated when the light rays A1 emitted from the first light-emitting unit 606 are reflected by the photosensitive drum 603 enter the first and second gradient index lens arrays 604-1 and 604-2. Therefore, as is not illustrated in FIG. 26A, no multireflection light occurs. As a result, as illustrated in FIG. 29, even if the exposure head 605 rotates from 0° to +0.5°, the light amount condensed on the photosensitive drum 603 is 100.00, and there is no light amount fluctuation on the photosensitive drum 603. In a case where the exposure head 605 rotates by −0.5°, none of the light rays B1 generated when the light rays A1 emitted from the first light-emitting unit 606 are reflected by the photosensitive drum 603 enter the first and second gradient index lens arrays 604-1 and 604-2. Therefore, the light amount condensed on the photosensitive drum 603 is 100.00.

On the other hand, as illustrated in FIG. 27B, regarding the light rays B2 generated when the light rays A2 emitted from the second light-emitting unit 607 are reflected by the photosensitive drum 603, a percentage of a part of the light rays B2 to the light rays B2, which part enters the first and second gradient index lens arrays 604-1 and 604-2, increases. At this time, at a position where the exposure head 605 is moved in parallel by 0.7 mm in the Z direction, the amount of the light ray C2 as multireflection light increases, as illustrated in FIG. 26B. Therefore, even if the exposure head 605 rotates by ±0.5°, an increase or decrease in multireflection light can be suppressed. As a result, as illustrated in FIG. 29, the light amount condensed on the photosensitive drum 603 in a case where the exposure head 605 is rotated +0.5° is 99.98, and the light amount condensed on the photosensitive drum 603 in a case where the exposure head 605 is rotated −0.5° is 99.99.

Thus, the light amount fluctuation on the photosensitive drum 603 in this example is a maximum of 0.02% (=|99.98−100.00|). In other words, this example can suppress the light amount fluctuation by 67% of the light amount fluctuation of 0.06% (|0.06) in comparative example 2.

Thus, this example can suppress the light amount fluctuation on the photosensitive drum 603 caused by the attachment error of the exposure head 605 more effectively than comparative example 2, and reduce the density change in the image formed on the photosensitive drum 603 from the expected density.

Example 6

An exposure head according to Example 6 will now be described. An image forming apparatus in which the exposure head according to Example 6 is used is similar to the image forming apparatus 1 described in Example 1. The exposure head according to Example 6 is different from the exposure head 405 according to Example 3 in that it has no tilt (i.e., similarly to comparative example 3) and is disposed at a position shifted parallel to the photosensitive drum, but other configurations are similar to those of the exposure head 405 according to Example 3.

Figure 30:
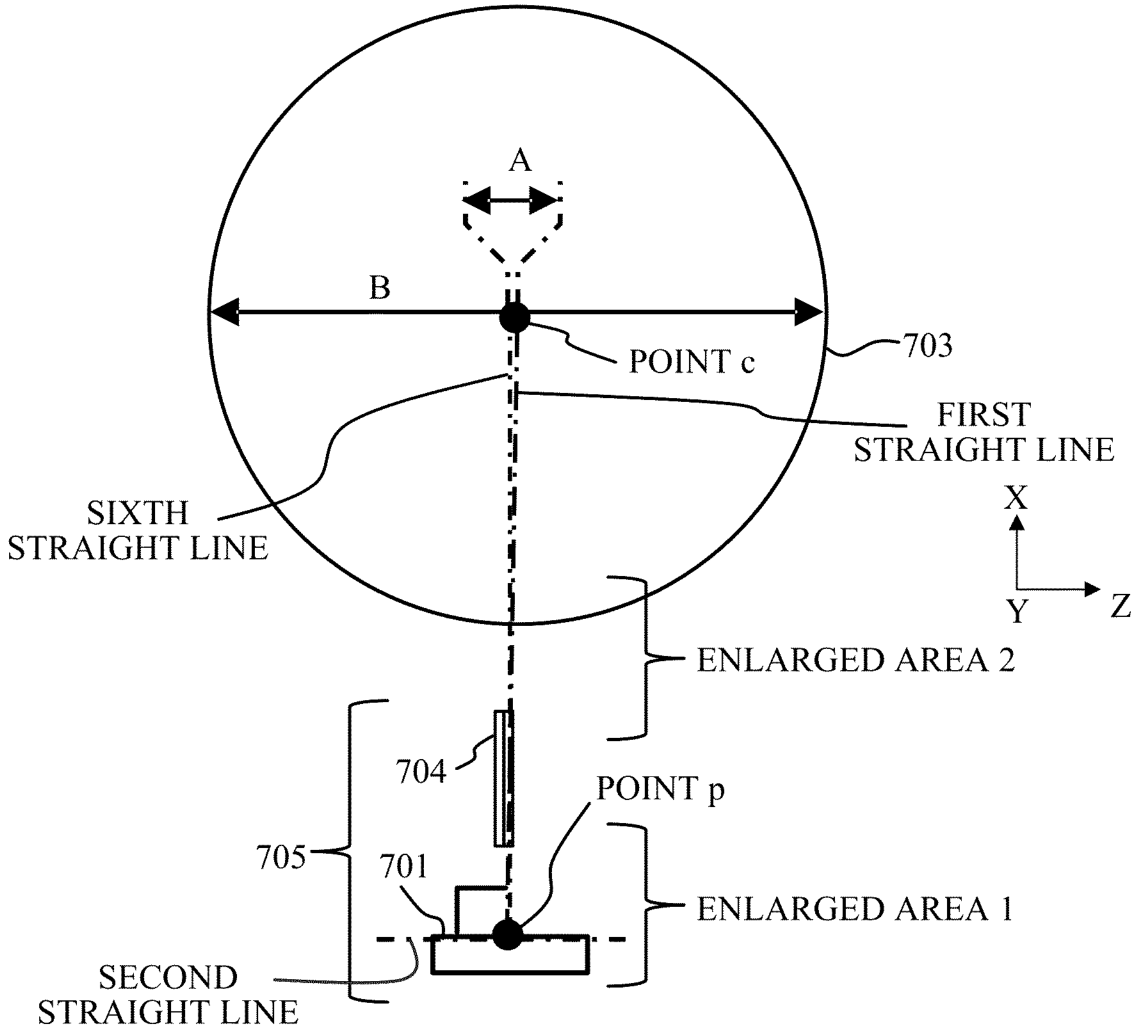
FIG. 30 is a schematic diagram illustrating an exposure head and photosensitive drum in Example 6.
Figure 31A:
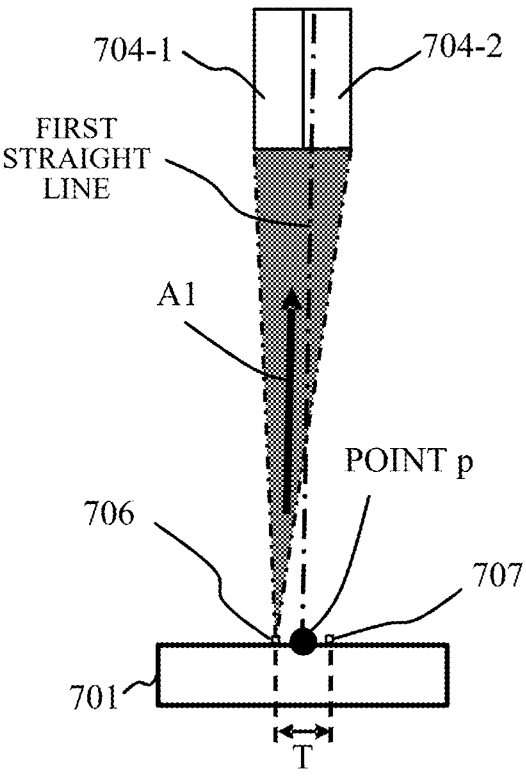
FIGS. 31A and 31B illustrate optical paths from first and second light-emitting units in Example 6.
Figure 31B:
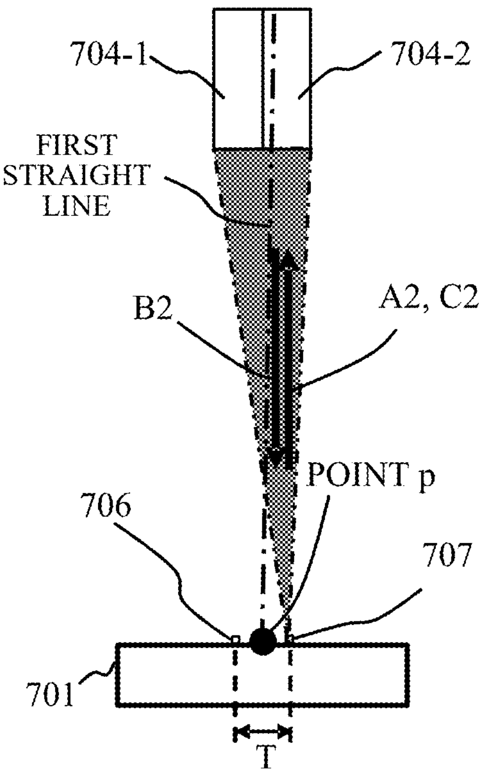

An exposure head 705 according to this example will be described with reference to FIGS. 30, 31A, 31B, 32A, 32B, 33A, 33B, and 34. FIG. 30 illustrates a ZX section when viewed from the Y direction, and the arrangement of the exposure head 705 (light-emitting substrate 701 and gradient index lens array 704) relative to the photosensitive drum 703. FIGS. 31A and 31B illustrate an enlarged view of the enlarged area 1 in FIG. 30 when viewed from the Y direction. FIG. 31A illustrates how the light ray A1 emitted from the first light-emitting unit 706 enters the first and second gradient index lens arrays 704-1 and 704-2. FIG. 31B illustrates how the light ray A2 emitted from the second light-emitting unit 707 enters the first and second gradient index lens arrays 704-1 and 704-2.

Figure 32A:
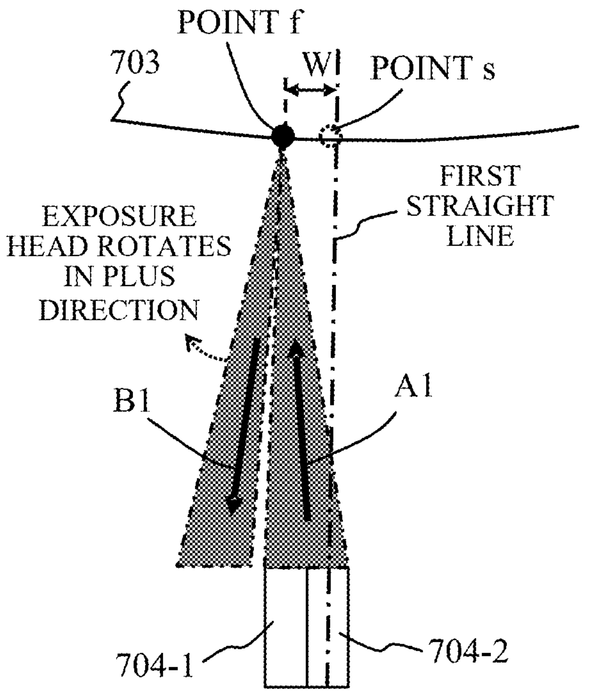
FIGS. 32A and 32B illustrate optical paths from a gradient index lens array in Example 6.
Figure 32B:
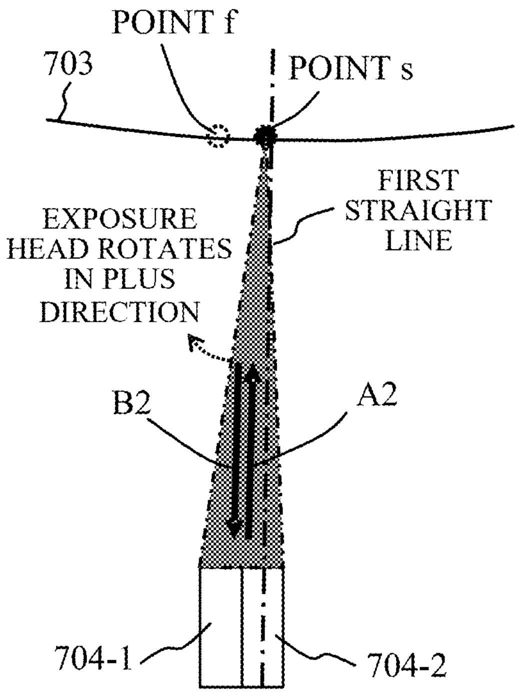

FIGS. 32A and 32B illustrate an enlarged view of the enlarged area 2 in FIG. 30. FIG. 32A illustrates how the light ray A1 emitted from the first light-emitting unit 706 and then from the first and second gradient index lens arrays 704-1 and 704-2 is condensed at the point f on the photosensitive drum 703, and the light ray B1 generated when the light ray A1 is reflected by the photosensitive drum 703. FIG. 32B illustrates how the light ray A2 emitted from the second light-emitting unit 707 and then from the first and second gradient index lens arrays 704-1 and 704-2 is condensed at the point s on the photosensitive drum 703, and the light ray B2 generated when light ray A2 is reflected by the photosensitive drum 703.

Figure 33A:
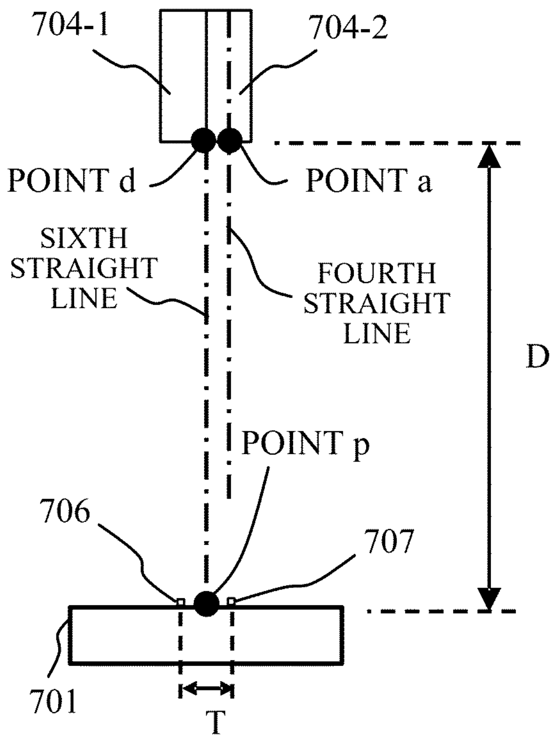
FIGS. 33A and 33B illustrates a positional relationship among the first and second light-emitting units, the gradient index lens array, and the photosensitive drum in Example 6.
Figure 33B:
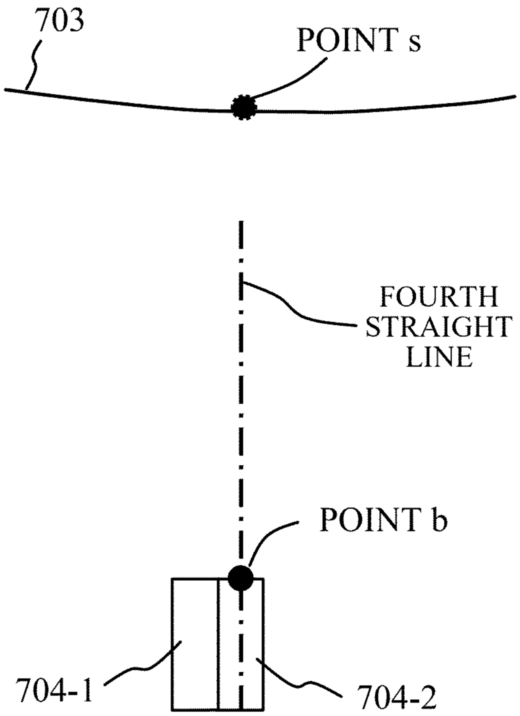

FIG. 33A illustrates a positional relationship among the first and second light-emitting units 706 and 707 and the first and second gradient index lens arrays 704-1 and 704-2. FIG. 33B illustrates a positional relationship among the first and second gradient index lens arrays 704-1 and 704-2 and the photosensitive drum 703.

In the exposure head 705 according to this example, T=0.30 mm. The exposure head 705 according to this example is disposed at a position shifted in parallel by 0.4 mm in the Z direction when viewed from the Y direction compared to comparative example 3. W=0.35 mm. Therefore, W/T=1.17, which satisfies inequality (1).

As illustrated in FIG. 30, the exposure head 705 in this example is disposed at a position where the sixth straight line does not pass through the point c as the rotation center of the photosensitive drum 703.

In this example, A=0.4 mm, B=20 mm, and D=2.74 mm. Therefore, (B×T)/(D×A)=5.5, which satisfies inequality (4). T/D=0.11, which satisfies inequality (3).

In this example, as illustrated in FIGS. 33A and 33B, when viewed from the Y direction, a fourth straight line is defined as a straight line connecting the point a as the center of the entrance surface of the gradient index lens included in each gradient index lens array (704-1 and 704-2) and the point b as the center of the exit surface of the lens. Then, the exposure head 705 is disposed so that the fourth straight line and the sixth straight line are parallel to each other. When viewed from the Y direction, the sixth straight line passes through the point d as a midpoint between the center of the entrance surface of the gradient index lens included in the first gradient index lens array 704-1 and the center of the entrance surface of the gradient index lens included in the second gradient index lens array 704-2.

Figure 34:
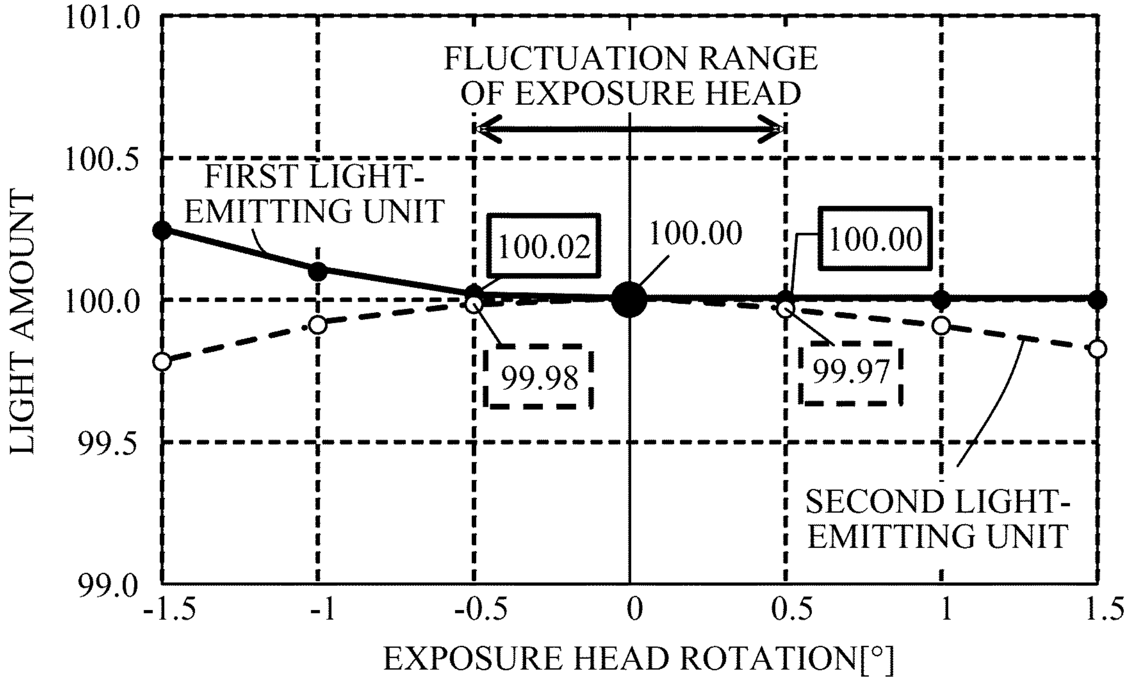
FIG. 34 illustrates a light amount on the photosensitive drum in Example 6.

FIG. 34 illustrates a relationship between the attachment error (rotation angle) of the exposure head 705 and the light amount on the photosensitive drum 703 in this example. The assumed value of the attachment angle of the exposure head 705 in this example is 0°, as in comparative example 3. In this example, as illustrated in FIG. 32A, none of the light rays B1 generated when the light rays A1 emitted from the first light-emitting unit 706 are reflected by the photosensitive drum 703 enter the first and second gradient index lens arrays 704-1 and 704-2. Therefore, no multireflection light occurs, as not illustrated in FIG. 31A. As a result, as illustrated in FIG. 34, even if the exposure head 705 rotates from 0° to +0.5°, the light amount condensed on the photosensitive drum 703 is 100.00, and there is no light amount fluctuation on the photosensitive drum 703. In a case where the exposure head 705 rotates by −0.5°, regarding the light rays B1 generated when the light rays A1 emitted from the first light-emitting unit 706 are reflected by the photosensitive drum 703, a percentage of a part of the light rays B1 to the light rays B1, which part enters the first and second gradient index lens arrays 704-1 and 704-2, increases. Therefore, the light amount condensed on the photosensitive drum 703 becomes 100.02.

On the other hand, as illustrated in FIG. 32B, regarding the light rays B2 generated when the light rays A2 emitted from the second light-emitting unit 707 are reflected by the photosensitive drum 703, a percentage of a part of the light rays B2 to the light rays B2, which part enters the first and second gradient index lens arrays 704-1 and 704-2, increases. At this time, at a position where the exposure head 705 is moved in parallel by 0.4 mm in the Z direction, the amount of the light ray C2 as multireflection light increases, as illustrated in FIG. 31B. Therefore, even if the exposure head 705 rotates by ±0.5°, an increase or decrease in multireflection light can be suppressed. As a result, as illustrated in FIG. 34, the light amount condensed on the photosensitive drum 603 in a case where the exposure head 705 is rotated by +0.5° is 99.97, and the light amount condensed on the photosensitive drum 703 in a case where the exposure head 705 is rotated by −0.5° is 99.98.

Thus, the light amount fluctuation on the photosensitive drum 703 in this example is a maximum of 0.03% (=|99.97−100.00|). That is, this example can suppress the light amount fluctuation by 80% of the light amount fluctuation of 0.15% (|0.15|) in comparative example 3.

Thus, this example can suppress the light amount fluctuation on the photosensitive drum 703 caused by the attachment error of the exposure head 705 more effectively than comparative example 3, and reduce the density change in the image formed on the photosensitive drum 703 from the expected density.

Example 7

An exposure head according to Example 7 will now be described. An image forming apparatus in which the exposure head according to Example 7 is used is similar to the image forming apparatus 1 described in Example 1. The exposure head according to Example 7 is different from the exposure head 105 according to Example 1 in that it has no tilt (i.e., similarly to comparative example 1) and the gradient index lens array is disposed while being tilted relative to the light-emitting substrate and photosensitive drum, but other configurations are similar to those of the exposure head 105 according to Example 1.

Figure 35:
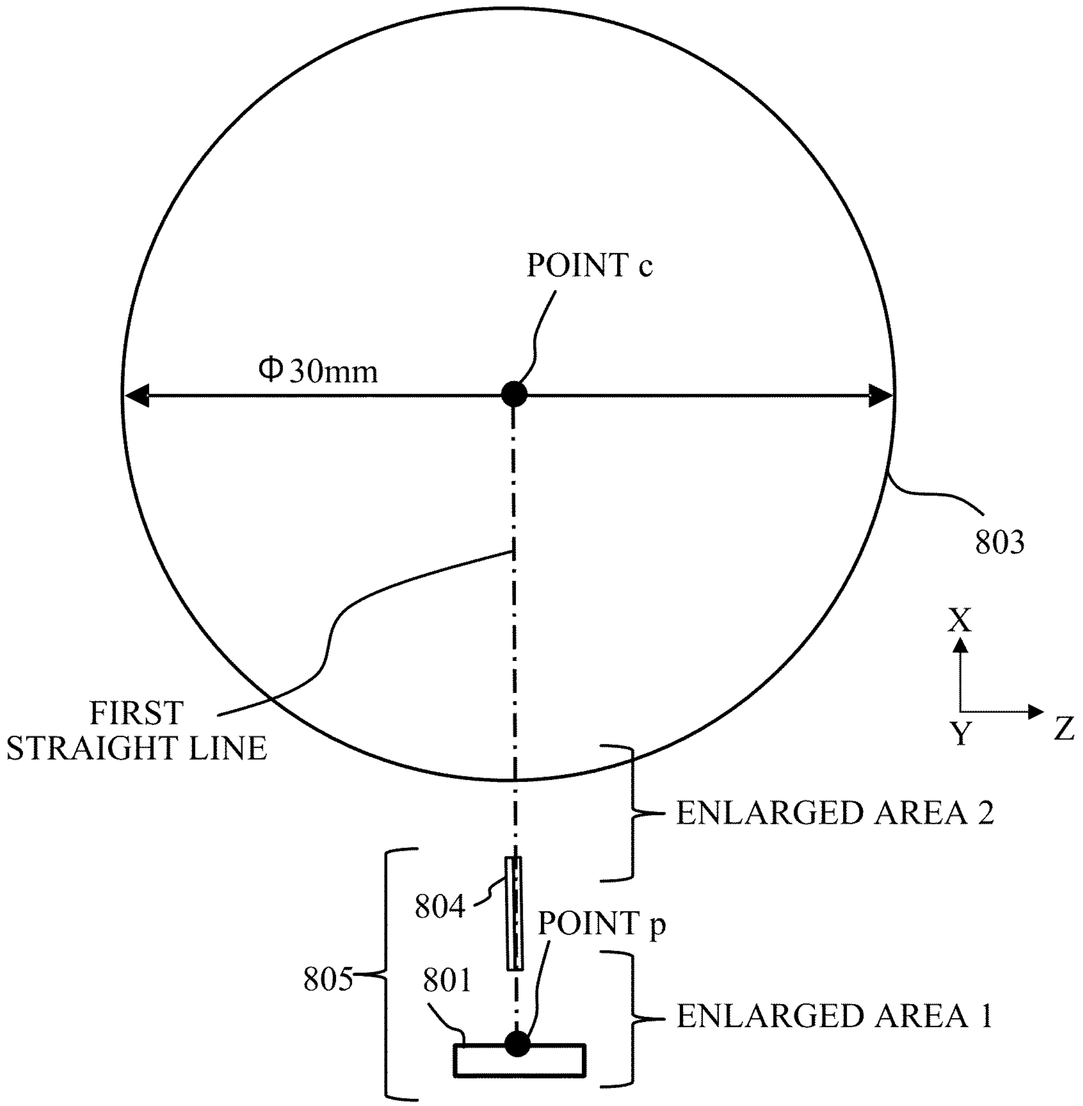
FIG. 35 is a schematic diagram illustrating an exposure head and photosensitive drum in Example 7.
Figure 36A:
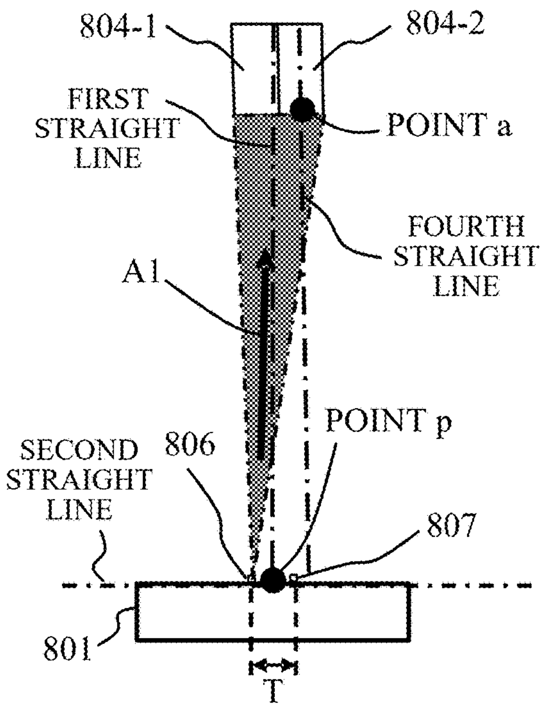
FIGS. 36A and 36B illustrate optical paths from first and second light-emitting units in Example 7.
Figure 36B:
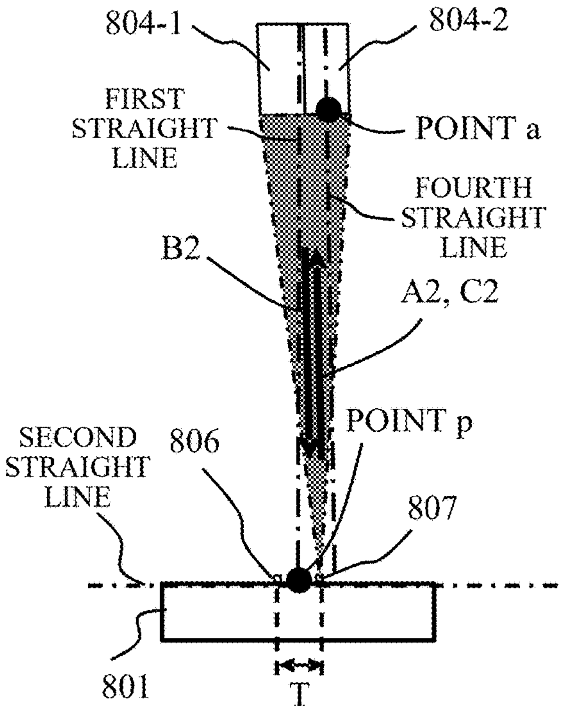

An exposure head 805 according to this example will be described with reference to FIGS. 35, 36A, 36B, 37A, 37B, 38A, 38B, and 39. FIG. 35 illustrates a ZX section when viewed from the Y direction, and the arrangement of the exposure head 805 (light-emitting substrate 801 and gradient index lens array 804) relative to the photosensitive drum 803. FIGS. 36A and 36B illustrate an enlarged view of the enlarged area 1 in FIG. 35 when viewed from the Y direction. FIG. 36A illustrates how the light ray A1 emitted from the first light-emitting unit 706 enters the first and second gradient index lens arrays 804-1 and 804-2. FIG. 36B illustrates how the light ray A2 emitted from the second light-emitting unit 807 enters the first and second gradient index lens arrays 804-1 and 804-2.

Figure 37A:
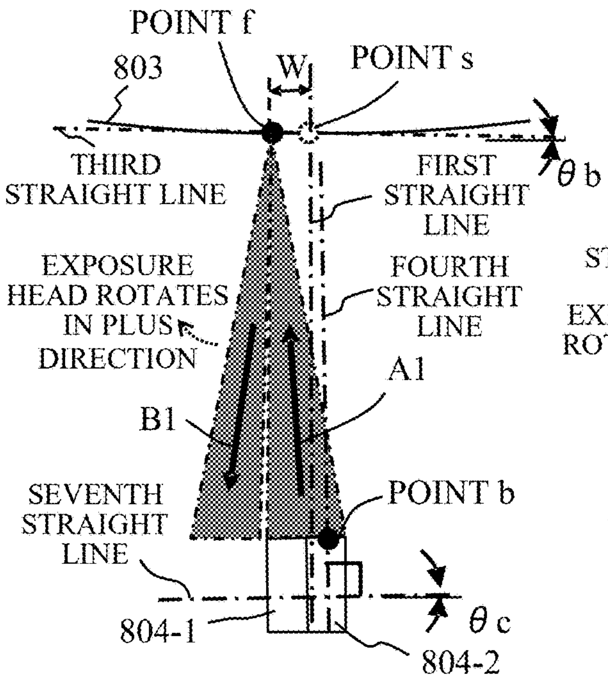
FIGS. 37A and 37B illustrate optical paths from a gradient index lens array in Example 7.
Figure 37B:
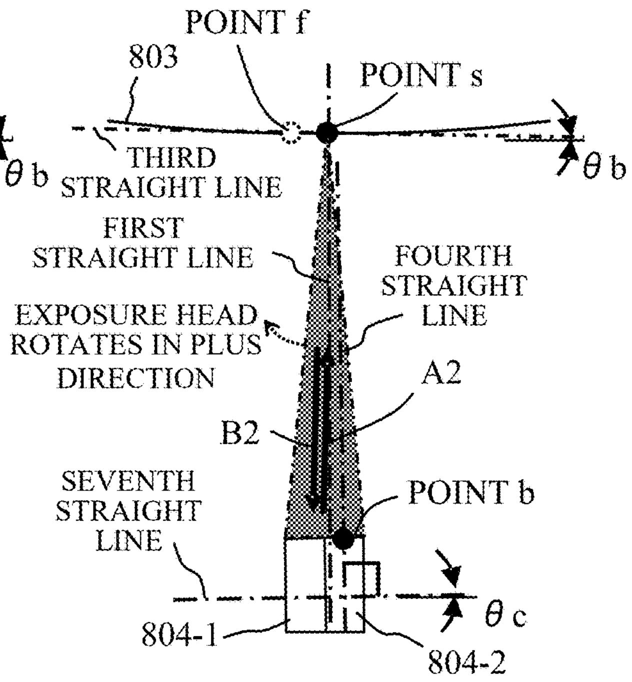

FIGS. 37A and B illustrate an enlarged view of the enlarged area 2 in FIG. 35. FIG. 37A illustrates how the light ray A1 emitted from the first light-emitting unit 706 and then from the first and second gradient index lens arrays 804-1 and 804-2 is condensed at point f on the photosensitive drum 803, and the light ray B1 generated when the light ray A1 is reflected by the photosensitive drum 803. FIG. 37B illustrates how the light ray A2 emitted from the second light-emitting unit 807 and then from the first and second gradient index lens arrays 804-1 and 804-2 is condensed at point s on the photosensitive drum 803, and the light ray B2 generated when the light ray A2 is reflected by the photosensitive drum 803.

Figure 38A:
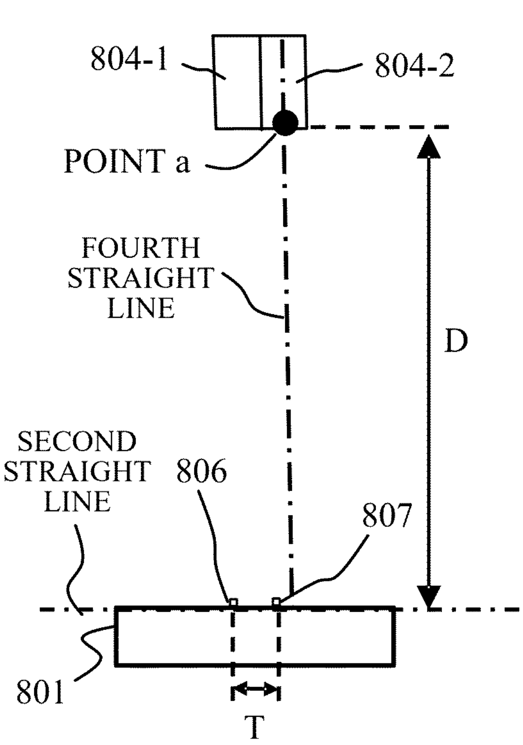
FIGS. 38A and 38B illustrate a positional relationship among the first and second light-emitting units, the gradient index lens array, and the photosensitive drum in Example 7.
Figure 38B:
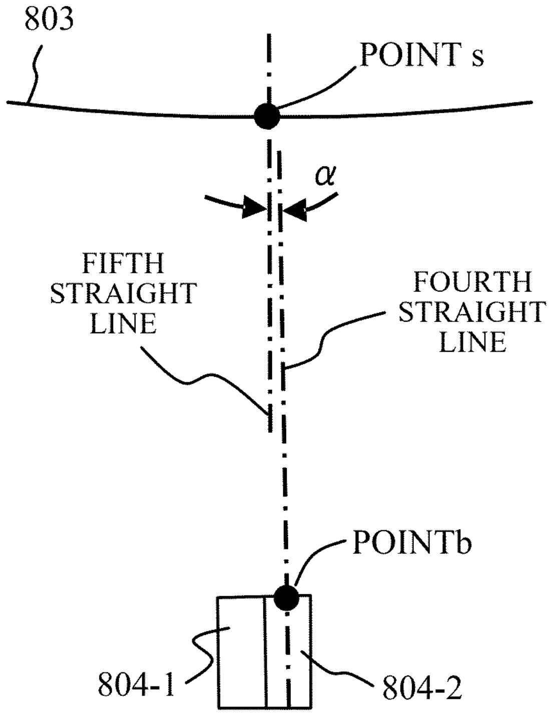

FIG. 38A illustrates a positional relationship between the first and second light-emitting units 806 and 807 and the first and second gradient index lens arrays 804-1 and 804-2. FIG. 38B illustrates a positional relationship between the first and second gradient index lens arrays 804-1 and 804-2 and the photosensitive drum 803.

In this example, the diameter of the photosensitive drum 803 is 30 mm, and T is 0.25 mm. In the exposure head 805 according to this example, the gradient index lens array 804 is tilted by 0.8° (θc described later) relative to comparative example 1 when viewed from the Y direction. W=0.26 mm. Therefore, W/T=1.04, which satisfies inequality (1).

As illustrated in FIGS. 37A and 37B, a seventh straight line is defined as a straight line orthogonal to the fourth straight line when viewed from the Y direction. Then, in the exposure head 805 according to this example, the gradient index lens arrays 804 (804-1 and 804-2) are tilted so that the third straight line and the seventh straight line are not parallel to each other. More specifically, the tilt angle of the third straight line is θb=0.5°, the tilt angle of the seventh straight line is θc=0.8°, and the third straight line and the seventh straight line are not parallel to each other.

In this example, $\alpha/\tan^{-1}(T/D)$ in inequality (2) may satisfy the following inequality (5) when viewed from the Y direction:

$$0.10 \leq \alpha/\tan^{-1}(T/D) \leq 0.20 \tag{5}$$

Inequality (5) defines a proper tilt angle α of the gradient index lens array 804 relative to the photosensitive drum 803 when viewed from the Y direction. Setting $\alpha/\tan^{-1}(T/D)$ within the range of inequality (5) can reduce the light amount fluctuation on the photosensitive drum 803 caused by the attachment error of the exposure head 805. In a case where $\alpha/\tan^{-1}(T/D)$ becomes lower than the lower limit of inequality (5), the light amount fluctuation caused by the attachment error cannot be reduced. In a case where $\alpha/\tan^{-1}(T/D)$ becomes higher than the upper limit of inequality (5), the size of the image forming apparatus 1 increases.

In this example, D=2.74 mm. The shortest distance to the first straight line is shorter at the point s than at the point f. Therefore, the fifth straight line is a normal to the photosensitive drum 803 at the point s. The tilt angle between the fourth straight line and the fifth straight line is α=0.8°. $\alpha/\tan^{-1}(T/D)$=0.15, which satisfies inequality (5). T/D=0.09, which satisfies inequality (3).

When viewed from the Y direction, the angle between the second straight line and the fourth straight line is (90°−α), more specifically (90°−0.8°)=89.2°.

The above inequalities in this example are satisfied in all combinations of the first and second light-emitting units in the plurality of first light-emitting units 806 and the plurality of second light-emitting units 807. This is similarly applicable to Examples 8 and 9 described below.

Figure 39:
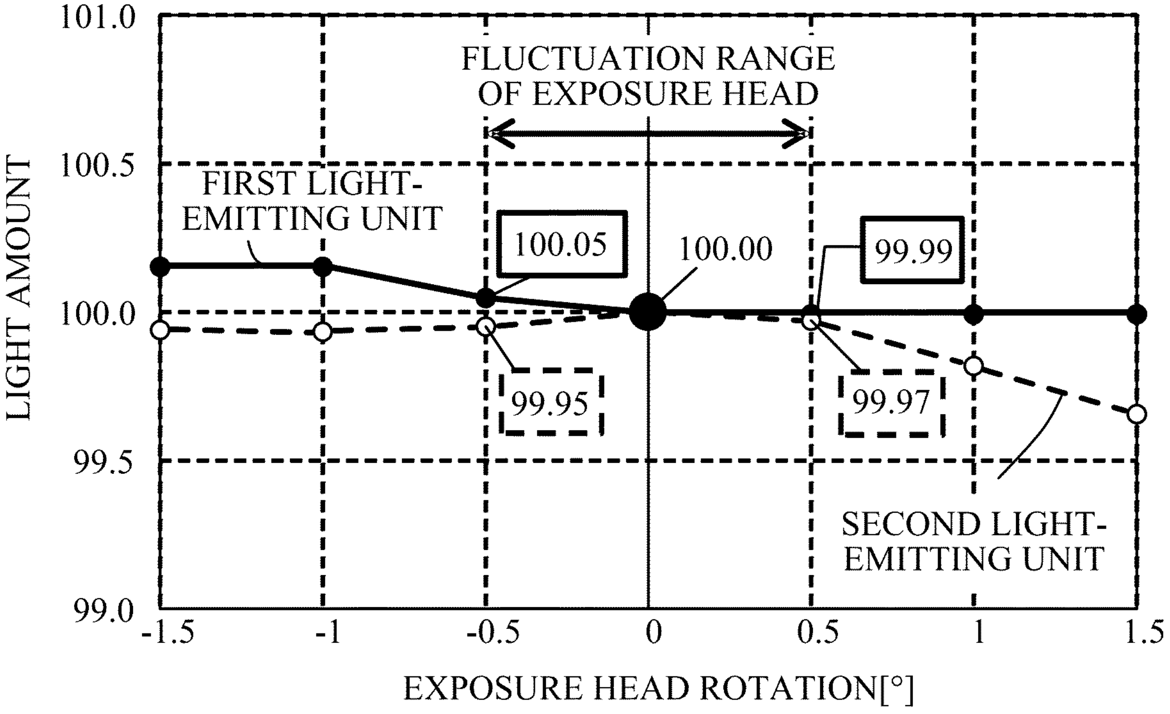
FIG. 39 illustrates a light amount on the photosensitive drum in Example 7.

FIG. 39 illustrates a relationship between the attachment error (rotation angle) of the exposure head 805 and the light amount on the photosensitive drum 803 in this example. The assumed value of the attachment angle of the exposure head 805 in this example is 0°, as in comparative example 1. As illustrated in FIG. 37A, regarding the light rays B1 generated when the light rays A1 emitted from the first light-emitting unit 806 are reflected by the photosensitive drum 803, a percentage of a part of the light rays B1 to the light rays B1, which part enters the first and second gradient index lens arrays 804-1 and 804-2, is feeble. Therefore, as is not illustrated in FIG. 36A, little multireflection light occurs. As a result, as illustrated in FIG. 39, even if the exposure head 805 rotates from 0° to +0.5°, the light amount condensed on the photosensitive drum 803 is 99.99, and little light amount fluctuation on the photosensitive drum 803 occurs. In a case where the exposure head 805 rotates by −0.5°, regarding the light rays B1 generated when the light rays A1 emitted from the first light-emitting unit 806 are reflected by the photosensitive drum 803, a percentage of a part of the light rays B1 to the light rays B1, which part enters the first and second gradient index lens arrays 804-1 and 804-2, increases. Thus, the light amount condensed on the photosensitive drum 803 becomes 100.05.

On the other hand, as illustrated in FIG. 37B, regarding the light rays B2 generated when the light rays A2 emitted from the second light-emitting unit 807 are reflected by the photosensitive drum 803, a percentage of a part of the light rays B2 to the light rays B2, which part enters the first and second gradient index lens arrays 804-1 and 804-2, increases. At this time, at a position where the gradient index lens array 804 is rotated by 0.8°, the amount of the light ray C2 as multireflection light increases, as illustrated in FIG. 36B. As a result, even if the exposure head 805 rotates by ±0.5°, an increase or decrease in multireflection light can be suppressed. Therefore, as illustrated in FIG. 39, the light amount condensed on the photosensitive drum 803 in a case where the exposure head 805 is rotated by +0.5° is 99.97, and the light amount condensed on the photosensitive drum 803 in a case where the exposure head 805 is rotated by −0.5° is 99.95.

Thus, the light amount fluctuation on the photosensitive drum 803 in this example is a maximum of 0.05% (=|99.95−100.00|). In other words, this example can suppress the light amount fluctuation by 58% of the light amount fluctuation of 0.12% (|0.12|) in comparative example 1.

Thus, this example can suppress the light amount fluctuation on the photosensitive drum 803 caused by the attachment error of the exposure head 805 more effectively than comparative example 1, and reduce the density change in the image formed on the photosensitive drum 803 from the expected density.

Example 8

An exposure head according to Example 8 will now be described. An image forming apparatus in which the exposure head according to Example 8 is used is similar to the image forming apparatus 1 described in Example 1. The exposure head according to Example 8 is different from the exposure head 305 according to Example 2 in that it has no tilt (i.e., similarly to comparative example 2) and the gradient index lens array is disposed while being tilted relative to the light-emitting substrate and the photosensitive drum, but other configurations are similar to those of the exposure head 305 according to Example 2.

Figure 40:
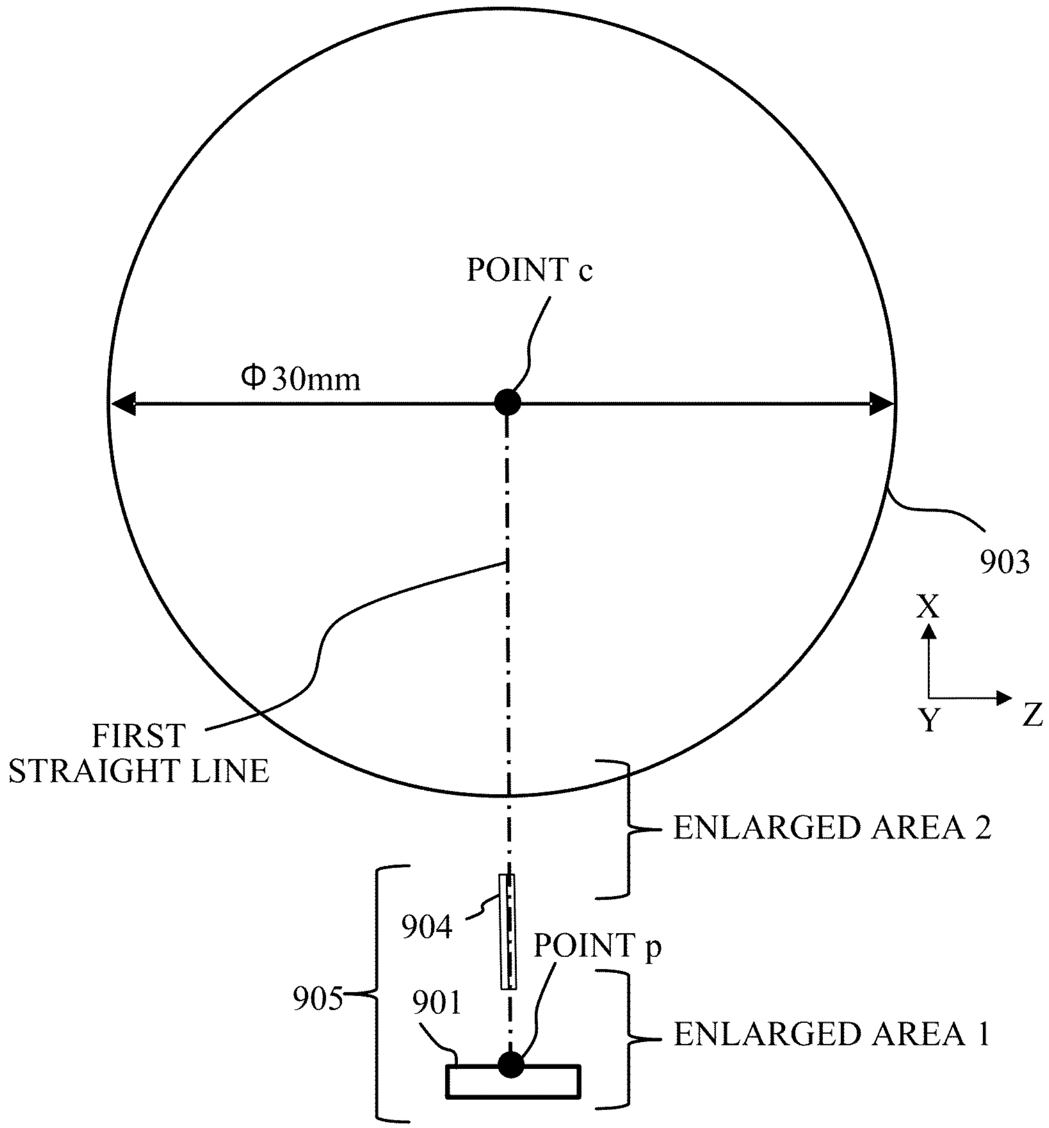
FIG. 40 is a schematic diagram illustrating an exposure head and photosensitive drum in Example 8.
Figure 41A:
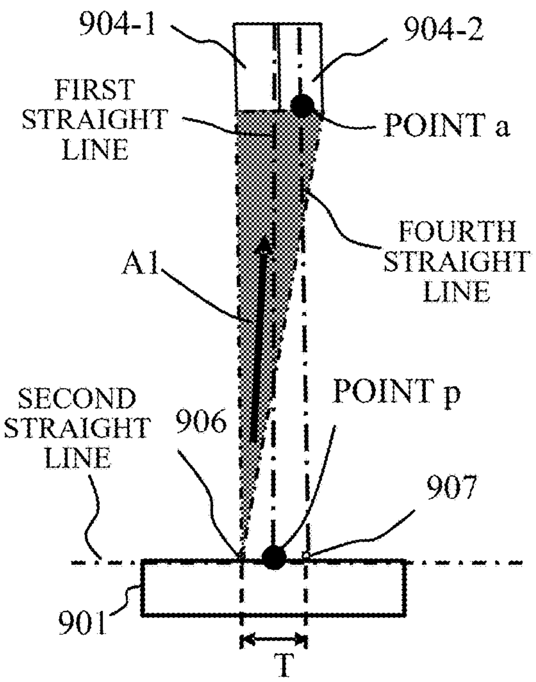
FIGS. 41A and 41B illustrate optical paths from first and second light-emitting units in Example 8.
Figure 41B:
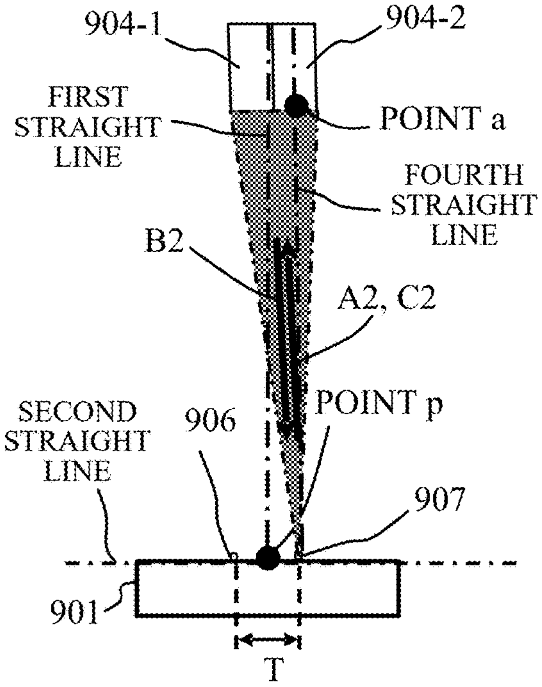

An exposure head 905 according to this example will be described with reference to FIGS. 40, 41A, 41B, 42A, 42B, 43A, 43B, and 45. FIG. 40 illustrates a ZX section when viewed from the Y direction, and the arrangement of the exposure head 905 (light-emitting substrate 901 and gradient index lens array 904) relative to the photosensitive drum 903. FIGS. 41A and 41B illustrate an enlarged view of the enlarged area 1 in FIG. 40 when viewed from the Y direction. FIG. 41A illustrates how the light ray A1 emitted from the first light-emitting unit 906 enters the first and second gradient index lens arrays 904-1 and 904-2. FIG. 41B illustrates how the light ray A2 emitted from the second light-emitting unit 907 enters the first and second gradient index lens arrays 904-1 and 904-2.

Figure 42A:
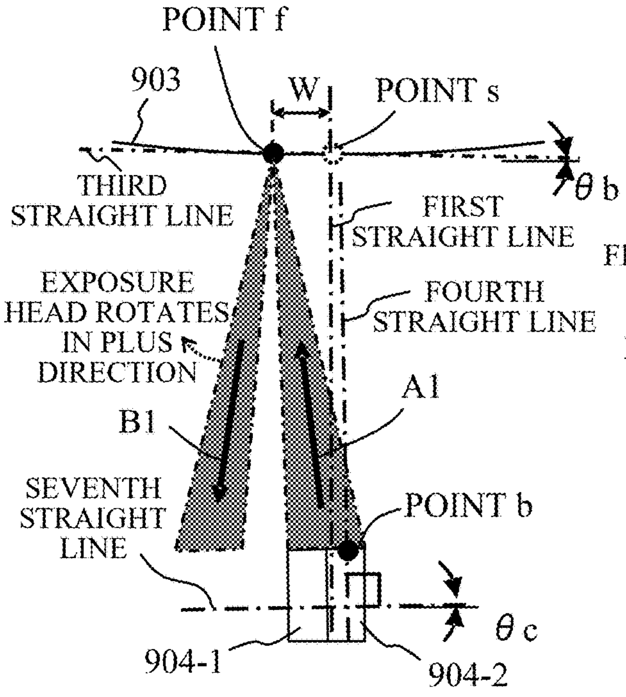
FIGS. 42A and 42B illustrate optical paths from a gradient index lens array in Example 8.
Figure 42B:
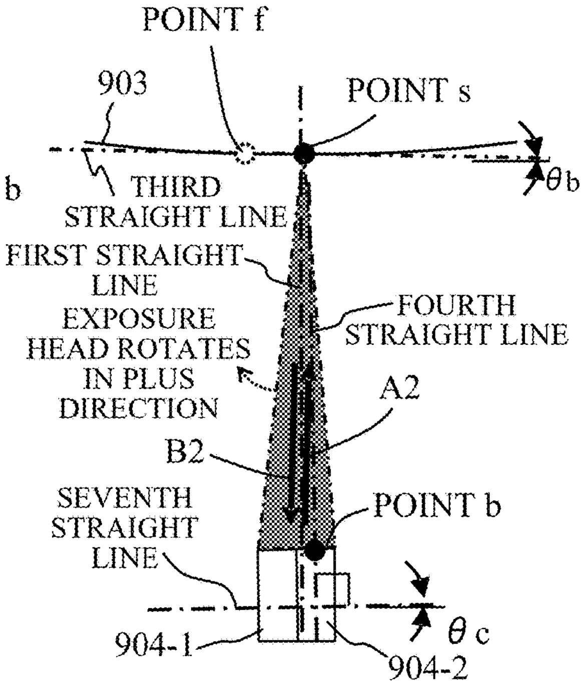

FIGS. 42A and 42B illustrate an enlarged view of the enlarged area 2 in FIG. 40. FIG. 42A illustrates how the light ray A1 emitted from the first light-emitting unit 906 and then from the first and second gradient index lens arrays 904-1 and 904-2 is condensed at the point f on the photosensitive drum 903, and the light ray B1 generated when the light ray A1 is reflected by the photosensitive drum 903. FIG. 42B illustrates how the light ray A2 emitted from the second light-emitting unit 907 and then from the first and second gradient index lens arrays 904-1 and 904-2 is condensed at the point s on the photosensitive drum 903, and the light ray B2 generated when the light ray A2 is reflected by the photosensitive drum 903.

Figure 43A:
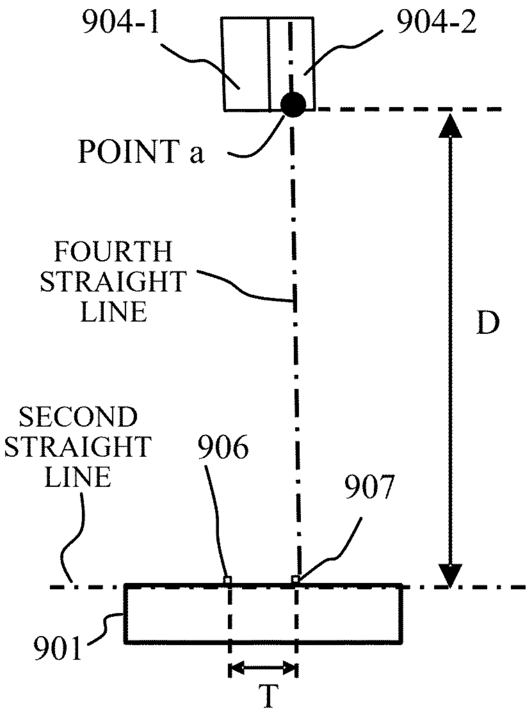
FIGS. 43A and 43B illustrate a positional relationship among the first and second light-emitting units, the gradient index lens array, and the photosensitive drum in Example 8.
Figure 43B:
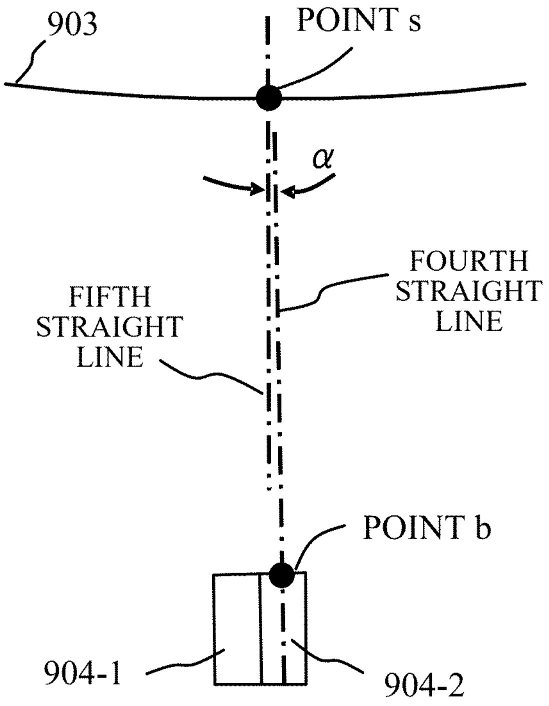

FIG. 43A illustrates a positional relationship between the first and second light-emitting units 906 and 907 and the first and second gradient index lens arrays 904-1 and 904-2. FIG. 43B illustrates a positional relationship between the first and second gradient index lens arrays 904-1 and 904-2 and the photosensitive drum 903.

In this example, the diameter of the photosensitive drum 903 is 30 mm, and T is 0.40 mm. In the exposure head 905 according to this example, the gradient index lens array 904 is tilted by 1.1° (θc) relative to comparative example 2 when viewed from the Y direction. W=0.39 mm. Therefore, W/T=0.98, which satisfies inequality (1).

As illustrated in FIGS. 42A and 42B, a seventh straight line is defined as a straight line orthogonal to the fourth straight line when viewed from the Y direction. Then, in the exposure head 905 according to this example, the gradient index lens arrays 904 (904-1 and 904-2) are tilted so that the third straight line and the seventh straight line are not parallel to each other. More specifically, the tilt angle of the third straight line is θb=0.7°, the tilt angle of the seventh straight line is θc=1.1°, and the third straight line and the seventh straight line are not parallel to each other.

In this example, D is 2.74 mm. The shortest distance to the first straight line is shorter at the point s than at the point f. Therefore, the fifth straight line is a normal to the photosensitive drum 903 at the point s. The tilt angle between the fourth straight line and the fifth straight line is α=1.1°. $\alpha/\tan^{-1}(T/D)$=0.13, which satisfies inequality (5). T/D=0.15, which satisfies inequality (3).

When viewed from the Y direction, the angle between the second straight line and the fourth straight line is (90°−α), more specifically (90°−1.1°)=88.9°.

Figure 44:
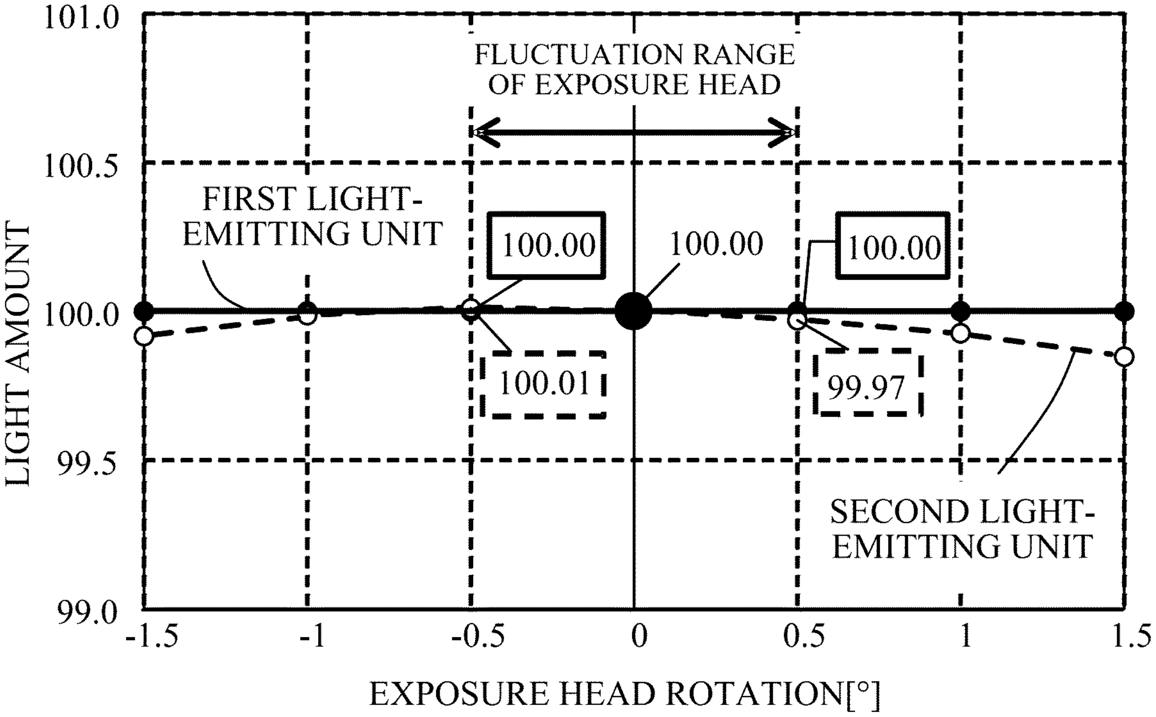
FIG. 44 illustrates a light amount on the photosensitive drum in Example 8.

FIG. 44 illustrates a relationship between the attachment error (rotation angle) of the exposure head 905 and the light amount on the photosensitive drum 903 in this example. The assumed value of the attachment angle of the exposure head 905 in this example is 0°, as in comparative example 2. In this example, as illustrated in FIG. 42A, none of the light rays B1 generated when the light rays A1 emitted from the first light-emitting unit 906 are reflected on the photosensitive drum 903 enter the first and second gradient index lens arrays 904-1 and 904-2. Therefore, as illustrated in FIG. 41A, no multireflection light occurs. As a result, as illustrated in FIG. 44, even if the exposure head 905 rotates from 0° to +0.5°, the light amount condensed on the photosensitive drum 903 is 100.00, and no light amount fluctuation occurs on the photosensitive drum 803. In a case where the exposure head 905 rotates −0.5°, none of the light rays B1 generated when the light rays A1 emitted from the first light-emitting unit 906 are reflected on the photosensitive drum 903 enter the first and second gradient index lens arrays 904-1 and 904-2. Therefore, the light amount condensed on the photosensitive drum 903 is 100.00.

On the other hand, as illustrated in FIG. 42B, regarding the light rays B2 generated when the light rays A2 emitted from the second light-emitting unit 907 are reflected by the photosensitive drum 903, a percentage of a part of the light rays B2 to the light rays B2, which part enters the first and second gradient index lens arrays 904-1 and 904-2, increases. At this time, at a position where the gradient index lens array 904 is rotated by 1.1°, the amount of the light ray C2 as multireflection light increases, as illustrated in FIG. 41B. As a result, even if the exposure head 905 rotates by ±0.5°, an increase or decrease in multireflection light can be suppressed. Therefore, as illustrated in FIG. 44, the light amount condensed on the photosensitive drum 903 in a case where the exposure head 905 rotates by +0.5° is 99.97, and the light amount condensed on the photosensitive drum 903 in a case where the exposure head 905 rotates by −0.5° is 100.01.

Thus, the light amount fluctuation on the photosensitive drum 903 in this example is a maximum of 0.03% (=|99.97−100.00|). That is, this example can suppress the light amount fluctuation by 50% of the light amount fluctuation of 0.06% (|0.12|) in comparative example 2.

Thus, this example can suppress the light amount fluctuation on the photosensitive drum 903 caused by the attachment error of the exposure head 905 more effectively than comparative example 2, and reduce the density change in the image formed on the photosensitive drum 903 from the expected density.

Example 9

An exposure head according to Example 9 will now be described. An image forming apparatus in which the exposure head according to Example 9 is used is similar to the image forming apparatus 1 described in Example 1. The exposure head according to Example 9 is different from the exposure head 405 according to Example 3 in that it has no tilt (i.e., similarly to comparative example 3) and the gradient index lens array is disposed while being tilted relative to the light-emitting substrate and photosensitive drum, but other configurations are similar to those of the exposure head 405 according to Example 3.

Figure 45:
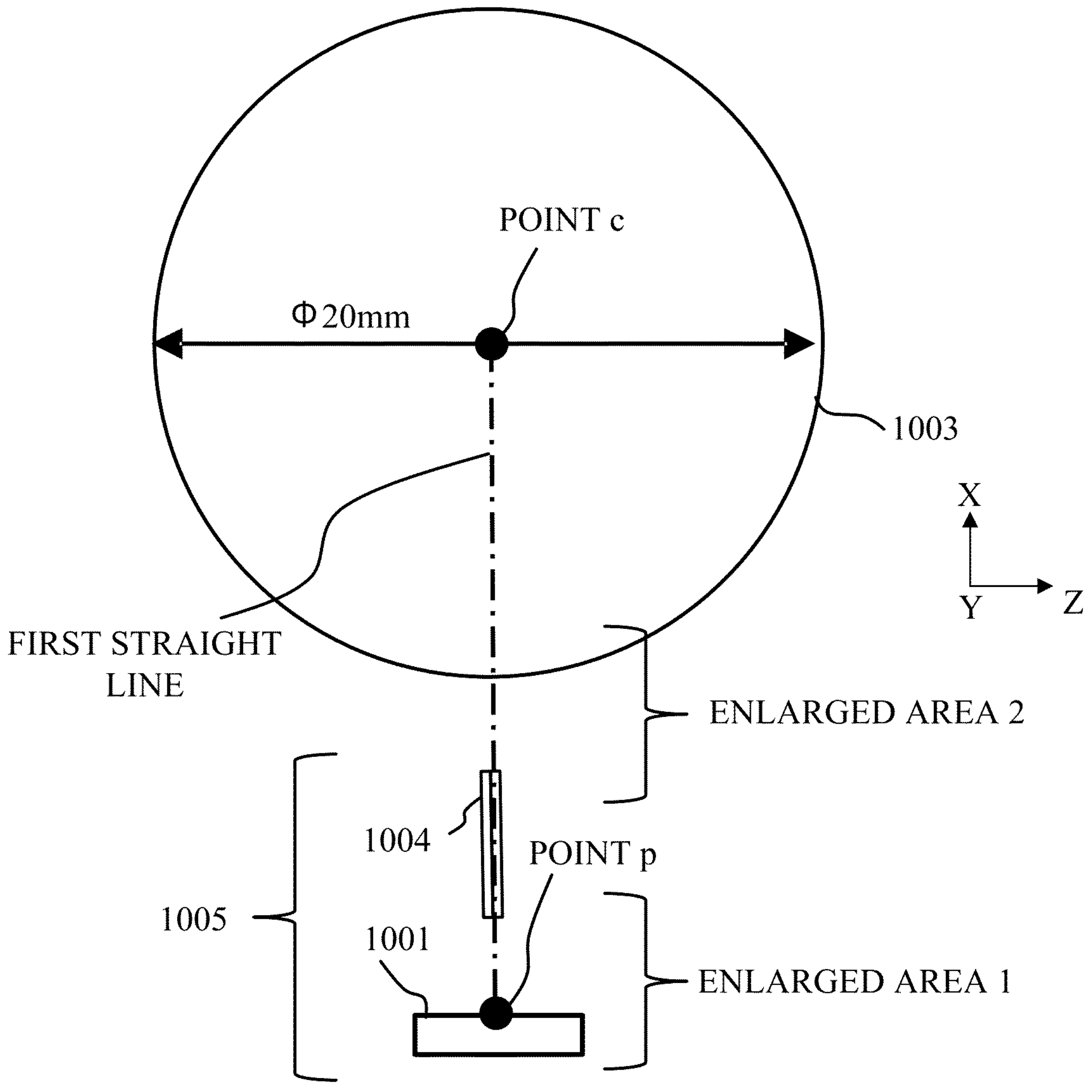
FIG. 45 is a schematic diagram illustrating an exposure head and photosensitive drum in Example 9.
Figure 46A:
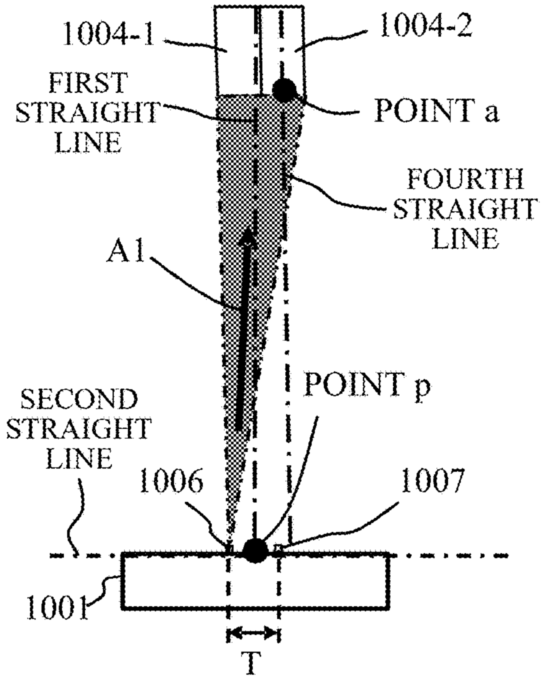
FIGS. 46A and 46B illustrate optical paths from first and second light-emitting units in Example 9.
Figure 46B:
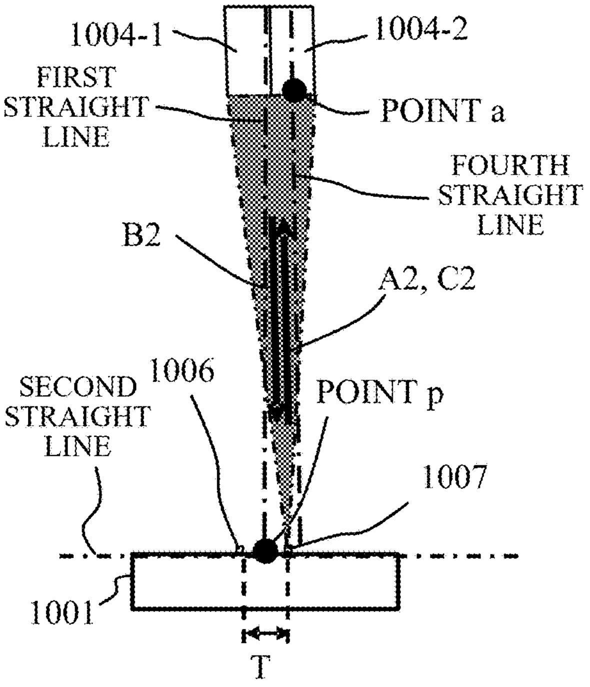

An exposure head 1005 according to this example will be described with reference to FIGS. 45, 46A, 46B, 47A, 47B, 48A, 48B, and 49. FIG. 45 illustrates a ZX section when viewed from the Y direction, and the arrangement of the exposure head 1005 (light-emitting substrate 1001 and gradient index lens array 1004) relative to the photosensitive drum 1003. FIGS. 46A and 46B illustrate an enlarged view of the enlarged area 1 in FIG. 45 when viewed from the Y direction. FIG. 46A illustrates how the light ray A1 emitted from the first light-emitting unit 1006 enters the first and second gradient index lens arrays 1004-1 and 1004-2. FIG. 46B illustrates how the light ray A2 emitted from the second light-emitting unit 1007 enters the first and second gradient index lens arrays 1004-1 and 1004-2.

Figure 47A:
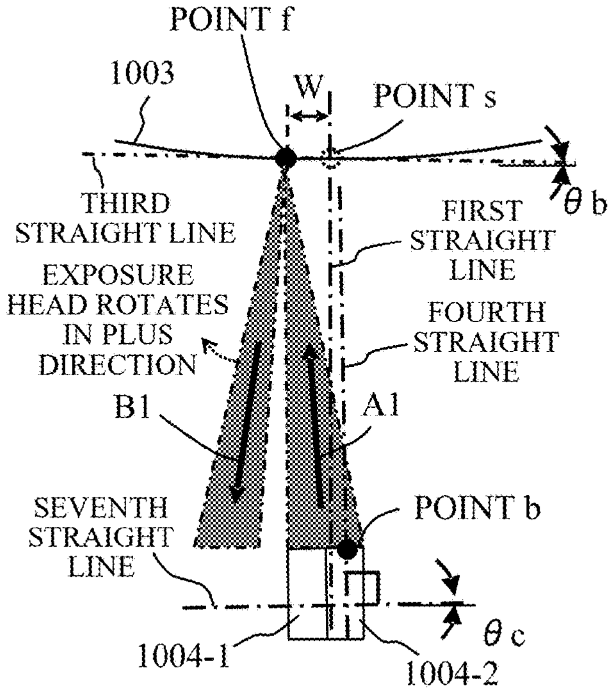
FIGS. 47A and 47B illustrate optical paths from a gradient index lens array in Example 9.
Figure 47B:
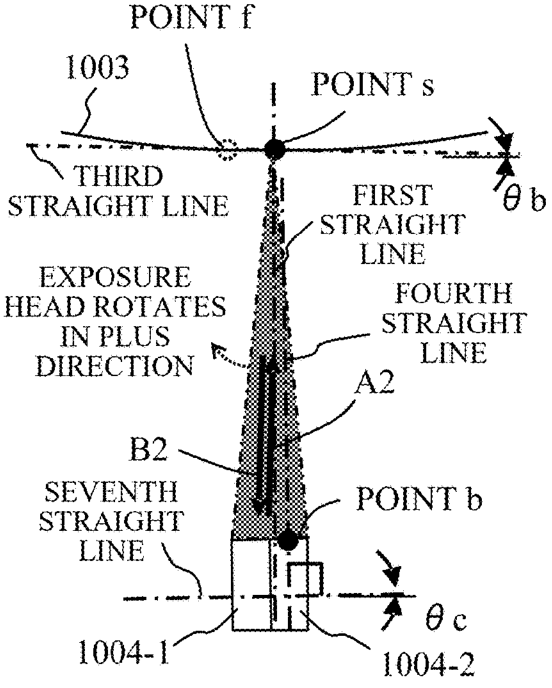

FIGS. 47A and 47B illustrate an enlarged view of the enlarged area 2 in FIG. 45. FIG. 47A illustrates how the light ray A1 emitted from the first light-emitting unit 1006 and then from the first and second gradient index lens arrays 1004-1 and 1004-2 is condensed at the point f on the photosensitive drum 1003, and the light ray B1 generated when light ray A1 is reflected by the photosensitive drum 1003. FIG. 47B illustrates how the light ray A2 emitted from the second light-emitting unit 1007 and then from the first and second gradient index lens arrays 1004-1 and 1004-2 is condensed at the point s on the photosensitive drum 1003, and the light ray B2 generated when light ray A2 is reflected by the photosensitive drum 1003.

Figure 48A:
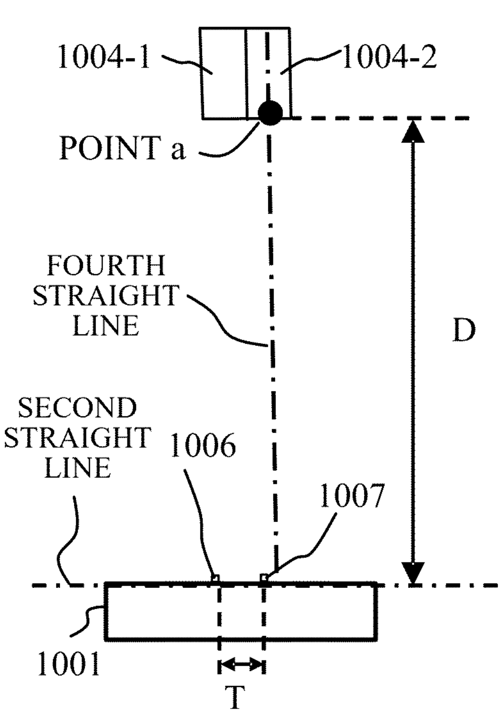
FIGS. 48A and 48B illustrate a positional relationship among the first and second light-emitting units, the gradient index lens array, and the photosensitive drum in Example 9.
Figure 48B:
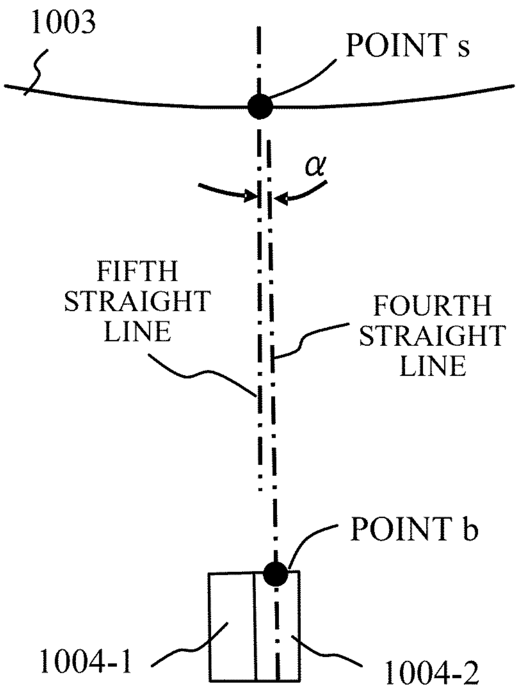

FIG. 48A illustrates a positional relationship between the first and second light-emitting units 1006 and 1007 and the first and second gradient index lens arrays 1004-1 and 1004-2. FIG. 48B illustrates a positional relationship between the first and second gradient index lens arrays 1004-1 and 1004-2 and the photosensitive drum 1003.

In this example, the diameter of the photosensitive drum 903 is 20 mm, and T is 0.30 mm. In the exposure head 1005 according to this example, the gradient index lens array 1004 is tilted by 0.9° (θc) relative to comparative example 3 when viewed from the Y direction. W=0.31 mm. Therefore, W/T=1.03, which satisfies inequality (1).

As illustrated in FIGS. 47A and 47B, a seventh straight line is defined as a straight line orthogonal to the fourth straight line when viewed from the Y direction. Then, in the exposure head 1005 according to this example, the gradient index lens arrays 1004 (1004-1 and 1004-2) are tilted so that the third straight line and the seventh straight line are not parallel to each other. More specifically, the tilt angle of the third straight line is θb=0.8°, the tilt angle of the seventh straight line is θc–0.9°, and the third straight line and the seventh straight line are not parallel to each other.

In this example, D=2.74 mm. The shortest distance to the first straight line is shorter at the point s than at the point f. Therefore, the fifth straight line is a normal to the photosensitive drum 1003 at the point s. The tilt angle between the fourth straight line and the fifth straight line is α=0.9°. $\alpha/\tan^{-1}(T/D)$=0.14, which satisfies inequality (5). T/D=0.11, which satisfies inequality (3).

When viewed from the Y direction, the angle between the second straight line and the fourth straight line is (90°–α), more specifically (90°–0.9°)=89.1°.

Figure 49:
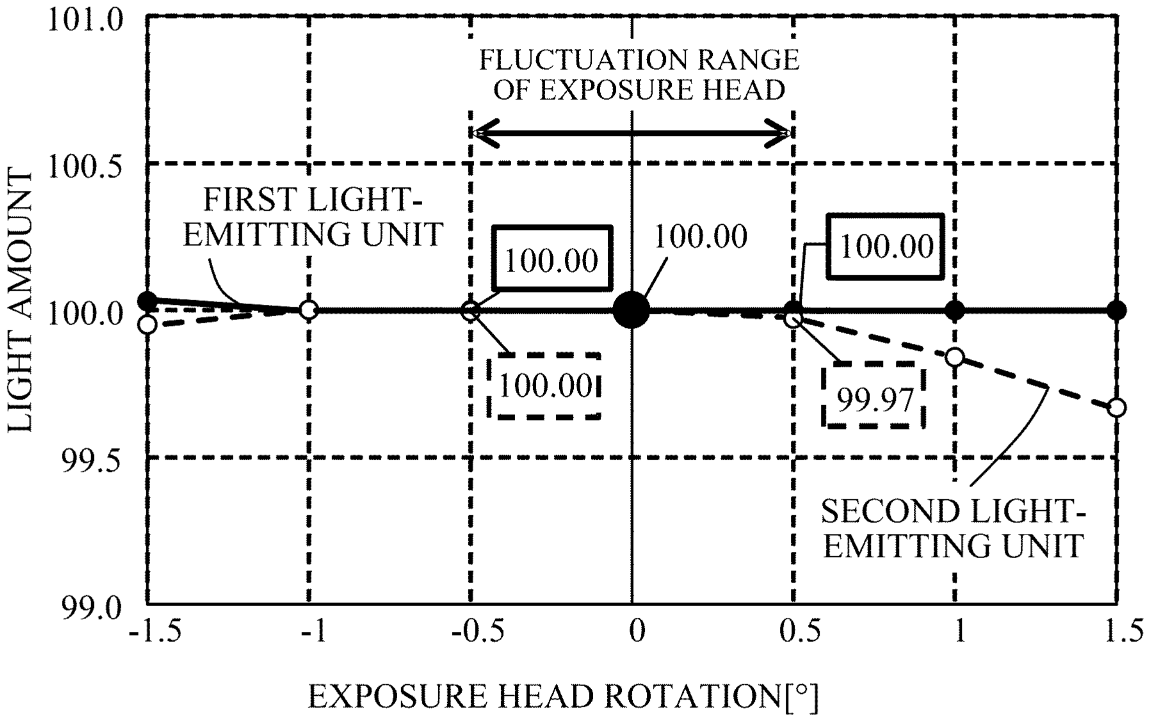
FIG. 49 illustrates a light amount on the photosensitive drum in Example 9.

FIG. 49 illustrates a relationship between the attachment error (rotation angle) of the exposure head 1005 and the light amount on the photosensitive drum 1003 in this example. The assumed value of the attachment angle of the exposure head 1005 in this example is 0°, as in comparative example 3. In this example, as illustrated in FIG. 47A, none of the light rays B1 generated when the light rays A1 emitted from the first light-emitting unit 1006 are reflected on the photosensitive drum 1003 enter the first and second gradient index lens arrays 1004-1 and 1004-2. Therefore, as illustrated in FIG. 46A, no multireflection light occurs. As a result, as illustrated in FIG. 49, even if the exposure head 1005 rotates from 0° to +0.5°, the light amount condensed on the photosensitive drum 1003 is 100.00, and no light amount fluctuation occurs on the photosensitive drum 903. In a case where the exposure head 1005 rotates –0.5°, none of the light rays B1 generated when the light rays A1 emitted from the first light-emitting unit 1006 are reflected on the photosensitive drum 1003 enter the first and second gradient index lens arrays 1004-1 and 1004-2. Therefore, the light amount condensed on the photosensitive drum 1003 is 100.00.

On the other hand, as illustrated in FIG. 47B, regarding the light rays B2 generated when the light rays A2 emitted from the second light-emitting unit 1007 are reflected by the photosensitive drum 1003, a percentage of a part of the light rays B2 to the light rays B2, which part enters the first and second gradient index lens arrays 1004-1 and 1004-2, increases. At this time, at a position where the gradient index lens array 904 is rotated by 0.9°, the amount of the light ray C2 as multireflection light increases, as illustrated in FIG. 46B. As a result, even if the exposure head 1005 rotates by ±0.5°, an increase or decrease in multireflection light can be suppressed. Therefore, as illustrated in FIG. 49, the light amount condensed on the photosensitive drum 1003 in a case where the exposure head 1005 rotates by +0.5° is 99.97, and the light amount condensed on the photosensitive drum 1003 in a case where the exposure head 1005 rotates by –0.5° is 100.00.

Thus, the light amount fluctuation on the photosensitive drum 1003 in this example is a maximum of 0.03% (=|99.97–100.00|). In other words, this example can suppress the light amount fluctuation by 80% of the light amount fluctuation of 0.15% (|0.15|) in comparative example 3.

This example can suppress the light amount fluctuation on the photosensitive drum 1003 caused by the attachment error of the exposure head 1005 more effectively than comparative example 3, and reduce the density change in the image formed on the photosensitive drum 1003 from the expected density.

Example 10

An exposure head according to Example 10 will now be described. An image forming apparatus in which the exposure head according to Example 10 is used is similar to the image forming apparatus 1 described in Example 1. The exposure head according to Example 10 is different from the exposure head 105 according to Example 1 in that it has no tilt (i.e., similarly to comparative example 1) and the first and second light-emitting units are moved parallel to the photosensitive drum, but other configurations are similar to those of the exposure head 105 according to Example 1.

Figure 50:
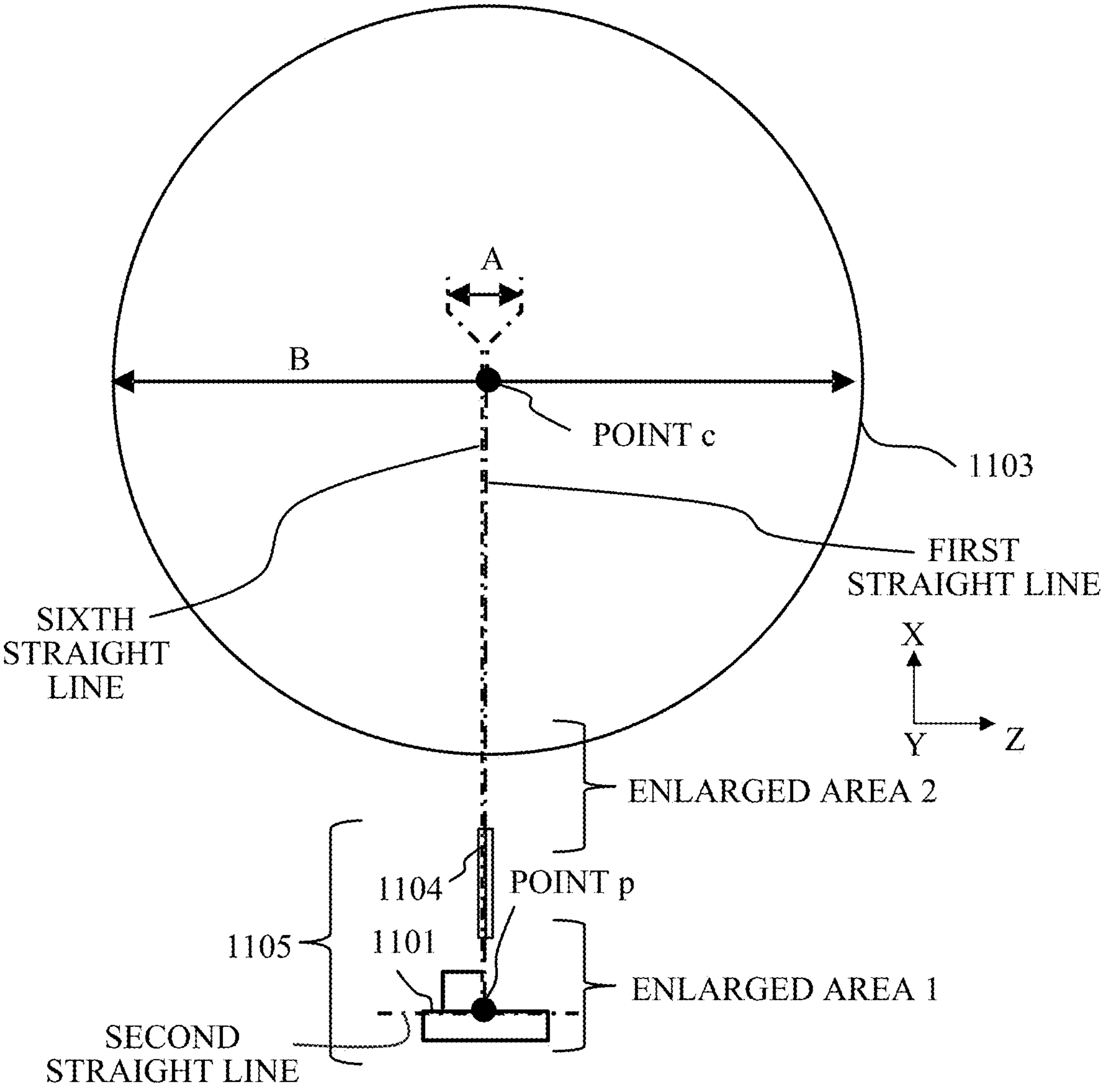
FIG. 50 is a schematic diagram illustrating an exposure head and photosensitive drum in Example 10.
Figure 51A:
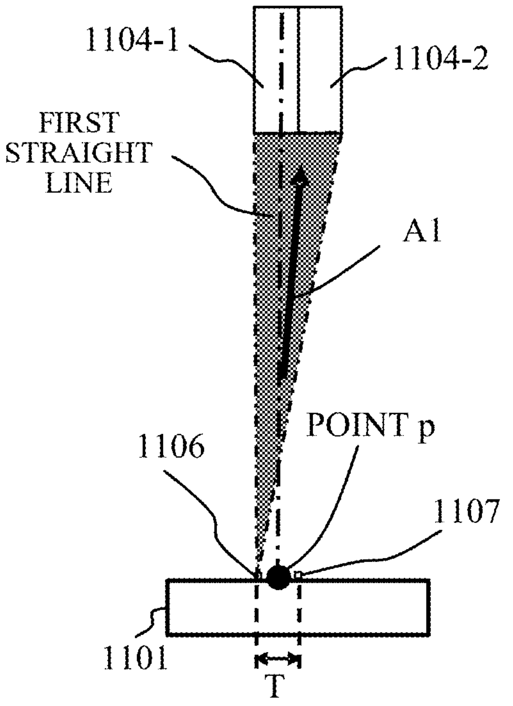
FIGS. 51A and 51B illustrate optical paths from first and second light-emitting units in Example 10.
Figure 51B:
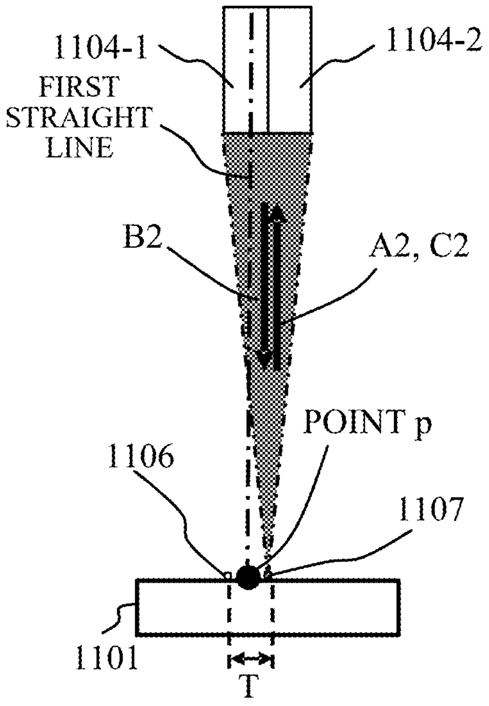

An exposure head 1105 according to this example will be described with reference to FIGS. 50, 51A, 51B, 52A, 52B, 53A, 53B, and 54. FIG. 50 illustrates a ZX section when viewed from the Y direction, and the arrangement of the exposure head 1105 (light-emitting substrate 1101 and gradient index lens array 1104) relative to the photosensitive drum 1103. FIGS. 51A and 51B illustrate an enlarged view of the enlarged area 1 in FIG. 50 when viewed from the Y direction. FIG. 51A illustrates how the light ray A1 emitted from the first light-emitting unit 1106 enters the first and second gradient index lens arrays 1104-1 and 1104-2. FIG. 51B illustrates how the light ray A2 emitted from the second light-emitting unit 1107 enters the first and second gradient index lens arrays 1104-1 and 1104-2.

Figure 52A:
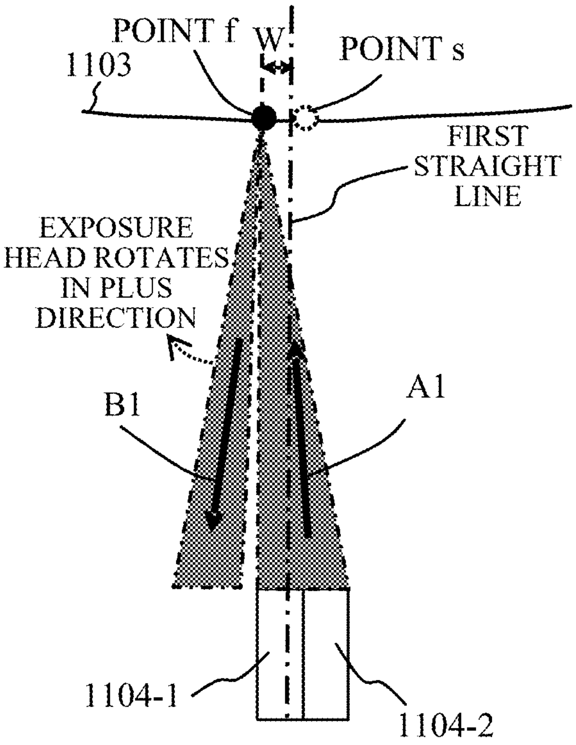
FIGS. 52A and 52B illustrate optical paths from a gradient index lens array in Example 10.
Figure 52B:
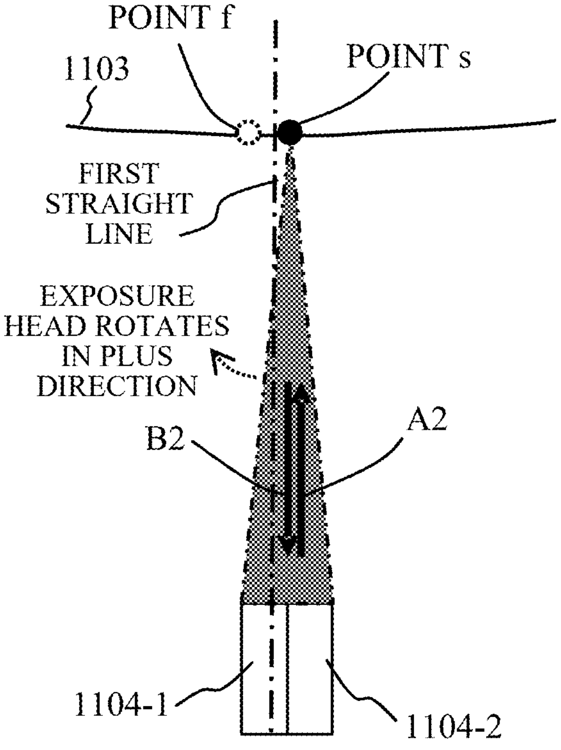

FIGS. 52A and 52B illustrate an enlarged view of the enlarged area 2 in FIG. 50. FIG. 52A illustrates how the light ray A1 emitted from the first light-emitting unit 1106 and then from the first and second gradient index lens arrays 1104-1 and 1104-2 is condensed at the point f on the photosensitive drum 1103, and the light ray B1 generated when the light ray A1 is reflected by the photosensitive drum 1103. FIG. 52B illustrates how the light ray A2 emitted from the second light-emitting unit 1107 and then from the first and second gradient index lens arrays 1104-1 and 1104-2 is condensed at the point s on the photosensitive drum 1103, and the light ray B2 generated when the light ray A2 is reflected by the photosensitive drum 1103.

Figure 53A:
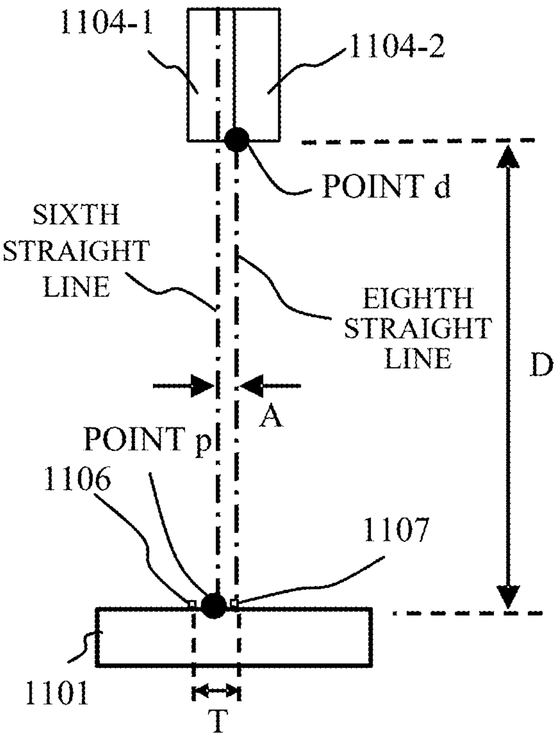
FIGS. 53A and 53B illustrate a positional relationship among the first and second light-emitting units, the gradient index lens array, and the photosensitive drum in Example 10.
Figure 53B:
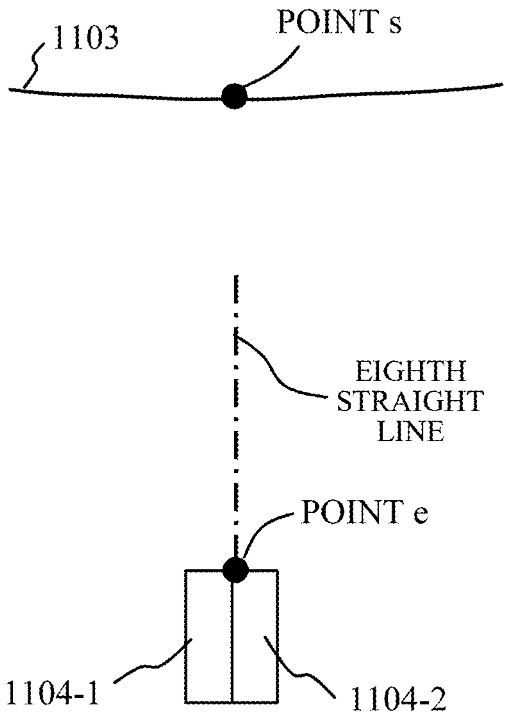

FIG. 53A illustrates a positional relationship between the first and second light-emitting units 1106 and 1107 and the first and second gradient index lens arrays 1104-1 and 1104-2. FIG. 53B illustrates a positional relationship between the first and second gradient index lens arrays 1104-1 and 1104-2 and the photosensitive drum 1103.

In the exposure head 1105 according to this example, T=0.25 mm. In the exposure head 1105 according to this example, the first and second light-emitting units 1106 and 1107 on the light-emitting substrate 1101 are disposed at positions moved in parallel by 0.125 mm in the Z direction relative to comparative example 1 when viewed from the Y direction. W=0.17 mm. Therefore, W/T=0.68, which satisfies inequality (1).

In this example, as illustrated in FIGS. 50, 53A, and 53B, the first and second light-emitting units 1106 and 1107 are disposed at positions so that a sixth straight line that passes through the point p and is orthogonal to the second straight line does not pass through the point c, which is the rotation center of the photosensitive drum 1103.

In this example, when viewed from the Y direction, point d (seventh point) is defined as a midpoint between the center of the entrance surface of the gradient index lens included in the first gradient index lens array 1104-1 and the center of the entrance surface of the gradient index lens included in the second gradient index lens array 1104-2. Point e (eighth point) is defined as a midpoint between the center of the exit surface of the gradient index lens of the first gradient index lens array 1104-1 and the center of the exit surface of the gradient index lens of the second gradient index lens array 1104-2. An eighth straight line is defined as a straight line passing through the points d and e, and D is a distance from the intersection of the eighth straight line and the second straight line to the intersection of the eighth straight line and the entrance surface of each gradient index lens. Then, the following inequality (6) may be satisfied:

$$10 \leq (B \times T)/(D \times A) \leq 30 \quad (6)$$

Inequality (6) defines a proper parallel movement amount A (a distance between the sixth straight line and the point c illustrated in FIGS. 50 and 53A) in the Z direction of the first and second light-emitting units 1106 and 1107 relative to the photosensitive drum 1103 when viewed from the Y direction. Setting (B×T)/(D×A) within the range of inequality (6) can reduce the light amount fluctuation on the photosensitive drum 1103 caused by the attachment error of the exposure head 1105. In a case where (B×T)/(D×A) becomes lower than the lower limit of inequality (6), the size of the image forming apparatus 1 increases. In a case where (B×T)/(D×A) becomes higher than the upper limit of inequality (6), the light amount fluctuation on the photosensitive drum 1103 caused by the attachment error of the exposure head 1105 cannot be reduced.

In this example, A=0.125 mm, B=30 mm, and D=2.74 mm. Therefore, (B×T)/(D×A)=21.9, which satisfies inequality (6). T/D=0.09, which satisfies inequality (3).

In this example, the eighth straight line passes through the point c when viewed from the Y direction. As illustrated in FIG. 53A, the sixth straight line and the eighth straight line are parallel to each other.

The above inequalities described in this example are satisfied in all combinations of the first and second light-emitting units in the plurality of first light-emitting units 1106 and the plurality of second light-emitting units 1107. This is similarly applicable to Examples 11 and 12 described later.

Figure 54:
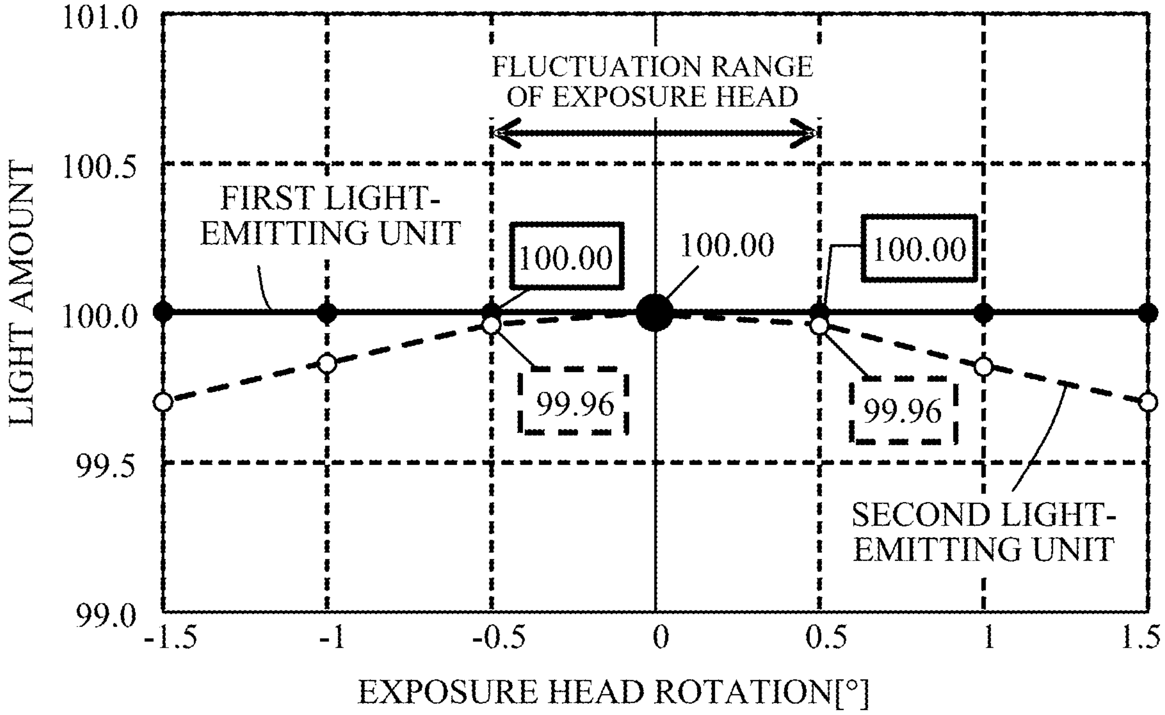
FIG. 54 illustrates a light amount on the photosensitive drum in Example 10.

FIG. 54 illustrates a relationship between the attachment error (rotation angle) of the exposure head 1105 and the light amount on the photosensitive drum 1103 in this example. The assumed value of the attachment angle of the exposure head 1105 in this example is 0°, as in comparative example 1. In this example, as illustrated in FIG. 52A, none of the light rays B1 generated when the light rays A1 emitted from the first light-emitting unit 1106 are reflected on the photosensitive drum 1103 enter the first and second gradient index lens arrays 1104-1 and 1104-2. Therefore, as is not illustrated in FIG. 51A, there is no multireflection light. As a result, as illustrated in FIG. 54, even if the exposure head 1105 rotates from 0° to +0.5°, the light amount condensed on the photosensitive drum 1103 is 100.00, and there is no light amount fluctuation on the photosensitive drum 1103. In a case where the exposure head 1105 is rotated by −0.5°, none of the light rays B1 generated when the light rays A1 emitted from the first light-emitting unit 1106 are reflected by the photosensitive drum 1103 enter the first and second gradient index lens arrays 1104-1 and 1104-2. Thus, the light amount condensed on the photosensitive drum 1103 becomes 100.00.

On the other hand, as illustrated in FIG. 52B, regarding the light rays B2 generated when the light rays A2 emitted from the second light-emitting unit 1107 are reflected by the photosensitive drum 1103, a percentage of a part of the light rays B2 to the light rays B2, which part enters the first and second gradient index lens arrays 1104-1 and 1104-2, increases. At this time, at a position where the first and second light-emitting units 1106 and 1107 are moved in parallel by 0.7 mm in the Z direction, the amount of the light ray C2 as multireflection light increases, as illustrated in FIG. 51B. Therefore, even if the exposure head 1105 rotates by ±0.5°, an increase or decrease in the multireflection light can be suppressed. As a result, as illustrated in FIG. 54, the light amounts condensed on the photosensitive drum 1103 in a case where the exposure head 1105 rotates by +0.5° and −0.5° are both 99.96.

Thus, the light amount fluctuation on the photosensitive drum 1103 in this example is a maximum of 0.04% (=|99.96−100.00|). In other words, this example can suppress the light amount fluctuation by 67% of the light amount fluctuation of 0.12% (|0.12|) in comparative example 1.

This example can suppress the light amount fluctuation on the photosensitive drum 603 caused by the attachment error of the exposure head 605 more effectively than comparative example 1, and reduce the density change in the image formed on the photosensitive drum 603 from the expected density.

Example 11

An exposure head according to Example 11 will now be described. An image forming apparatus in which the exposure head according to Example 11 is used is similar to the image forming apparatus 1 described in Example 1. The exposure head according to Example 11 is different from the exposure head 305 according to Example 2 in that it has no tilt (i.e., similarly to comparative example 2) and the first and second light-emitting units are moved parallel to the photosensitive drum, but other configurations are similar to those of the exposure head 305 according to Example 2.

Figure 55:
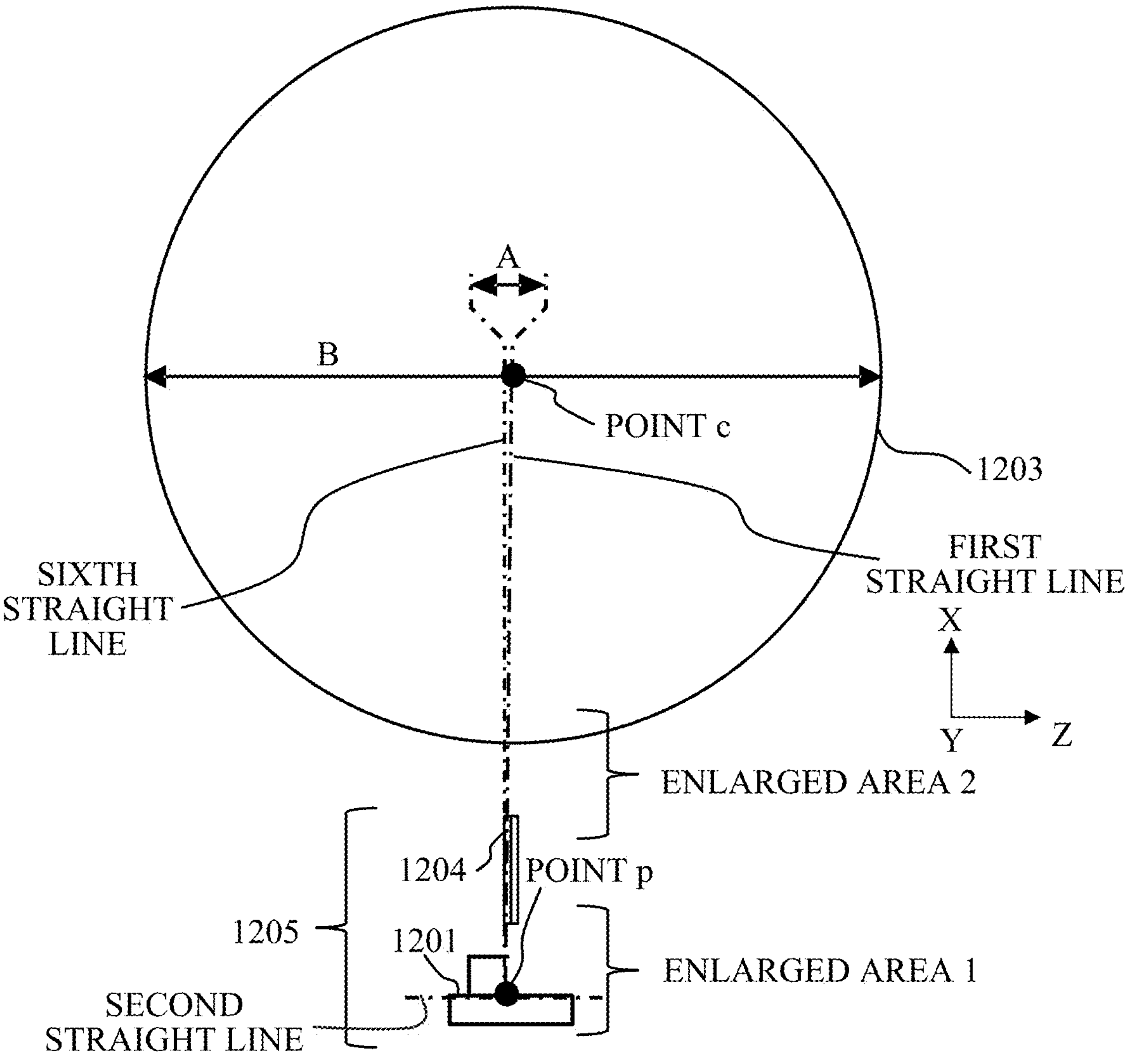
FIG. 55 is a schematic diagram illustrating an exposure head and photosensitive drum in Example 11.
Figure 56A:
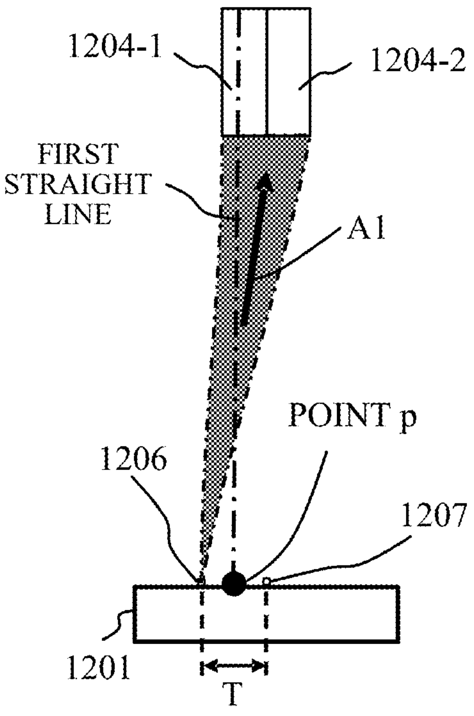
FIGS. 56A and 56B illustrate optical paths from first and second light-emitting units in Example 11.
Figure 56B:
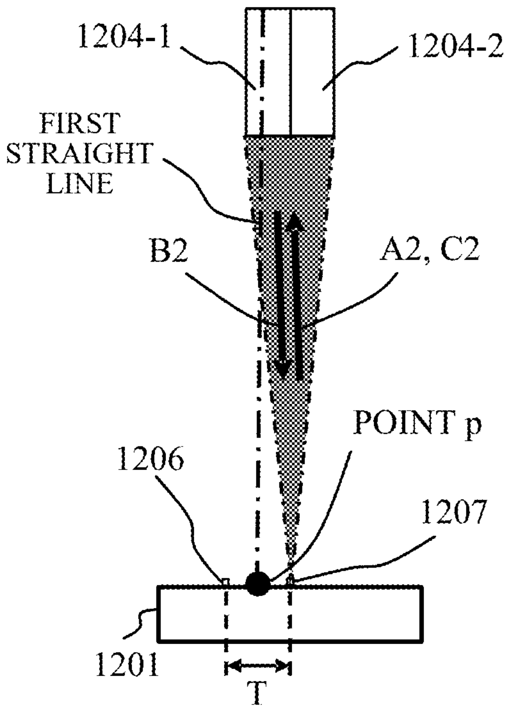

An exposure head 1205 according to this example will be described with reference to FIGS. 55, 56A, 56B, 57A, 57B, 58A, 58B, and 59. FIG. 55 illustrates a ZX section when viewed from the Y direction, and the arrangement of the exposure head 1205 (light-emitting substrate 1201 and gradient index lens array 1204) relative to the photosensitive drum 1203. FIGS. 56A and 56B illustrate an enlarged view of the enlarged area 1 in FIG. 55 when viewed from the Y direction. FIG. 56A illustrates how the light ray A1 emitted from the first light-emitting unit 1206 enters the first and second gradient index lens arrays 1204-1 and 1204-2. FIG. 56B illustrates how the light ray A2 emitted from the second light-emitting unit 1207 enters the first and second gradient index lens arrays 1204-1 and 1204-2.

Figure 57A:
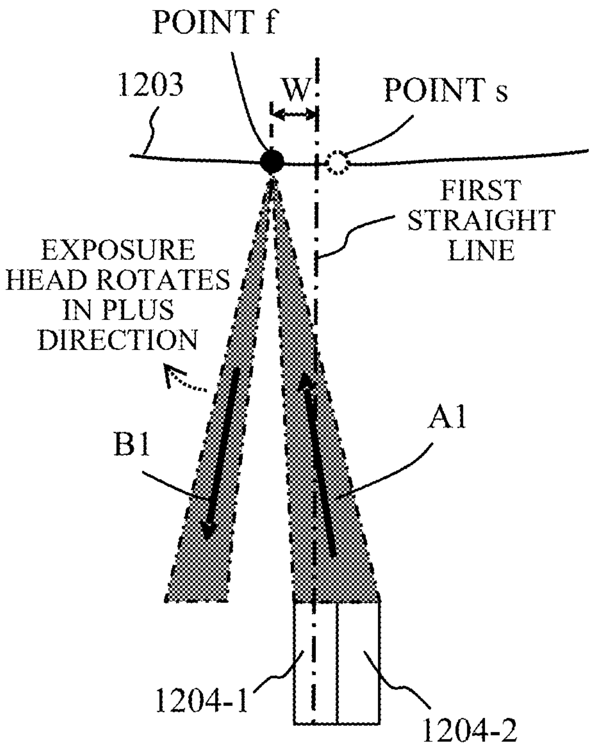
FIGS. 57A and 57B illustrate optical paths from a gradient index lens array in Example 11.
Figure 57B:
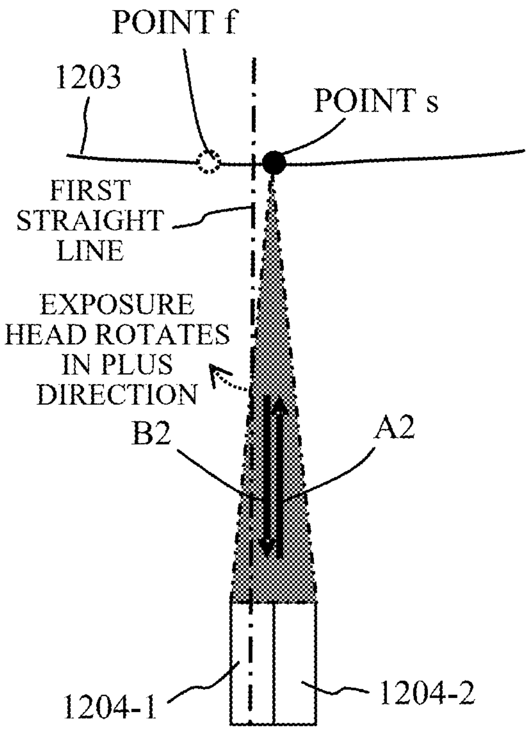

FIGS. 57A and 57B illustrate an enlarged view of the enlarged area 2 in FIG. 55. FIG. 57A illustrates how the light ray A1 emitted from the first light-emitting unit 1206 and then emitted from the first and second gradient index lens arrays 1204-1 and 1204-2 is condensed at the point f on the photosensitive drum 1203, and the light ray B1 generated when light ray A1 is reflected by the photosensitive drum 1203. FIG. 57B illustrates how the light ray A2 emitted from the second light-emitting unit 1207 and then emitted from the first and second gradient index lens arrays 1204-1 and 1204-2 is condensed at the point s on the photosensitive drum 1203, and the light ray B2 generated when light ray A2 is reflected by the photosensitive drum 1203.

Figure 58A:
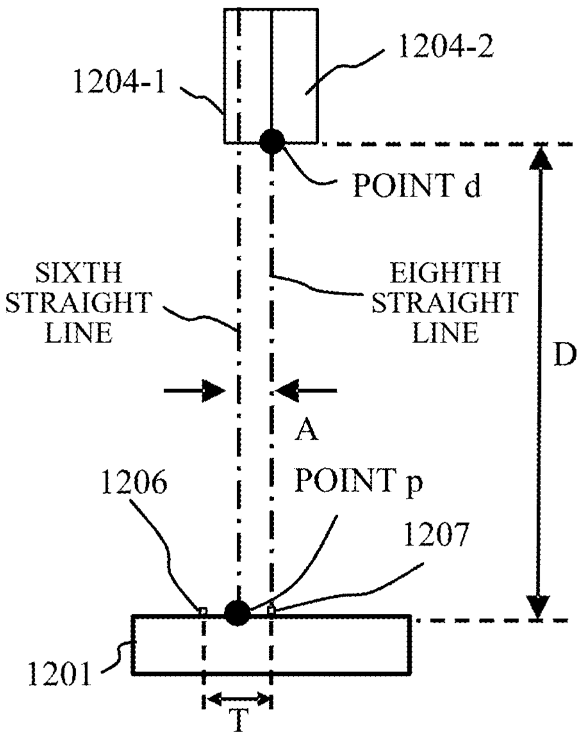
FIGS. 58A and 58B illustrate a positional relationship among the first and second light-emitting units, the gradient index lens array, and the photosensitive drum in Example 11.
Figure 58B:
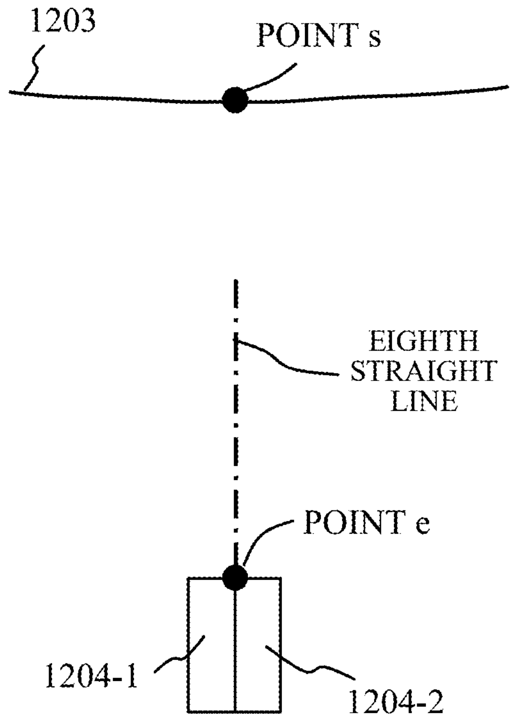

FIG. 58A illustrates a positional relationship between the first and second light-emitting units 1206 and 1207 and the first and second gradient index lens arrays 1204-1 and 1204-2. FIG. 58B illustrates a positional relationship among the first and second gradient index lens arrays 1204-1 and 1204-2 and the photosensitive drum 1203.

In the exposure head 1205 according to this example, T=0.40 mm. In the exposure head 1205 according to this example, the first and second light-emitting units 1206 and 1207 on the light-emitting substrate 1201 are disposed at a position moved by 0.2 mm in parallel in the Z direction relative to comparative example 2 when viewed from the Y direction. W=0.28 mm. Therefore, W/T=0.70, which satisfies inequality (1).

In this example, as illustrated in FIGS. 55, 58A, and 58B, the first and second light-emitting units 1206 and 1207 are disposed at positions so that the sixth straight line does not pass through the point c, which is the rotation center of the photosensitive drum 1203.

In this example, A=0.2 mm, B=30 mm, and D=2.74 mm. Therefore, (B×T)/(D×A)=21.9, which satisfies inequality (6). T/D=0.15, which satisfies inequality (3).

In this example, the eighth straight line passes through the point c when viewed from the Y direction. As illustrated in FIG. 58A, the sixth straight line and the eighth straight line are parallel to each other.

Figure 59:
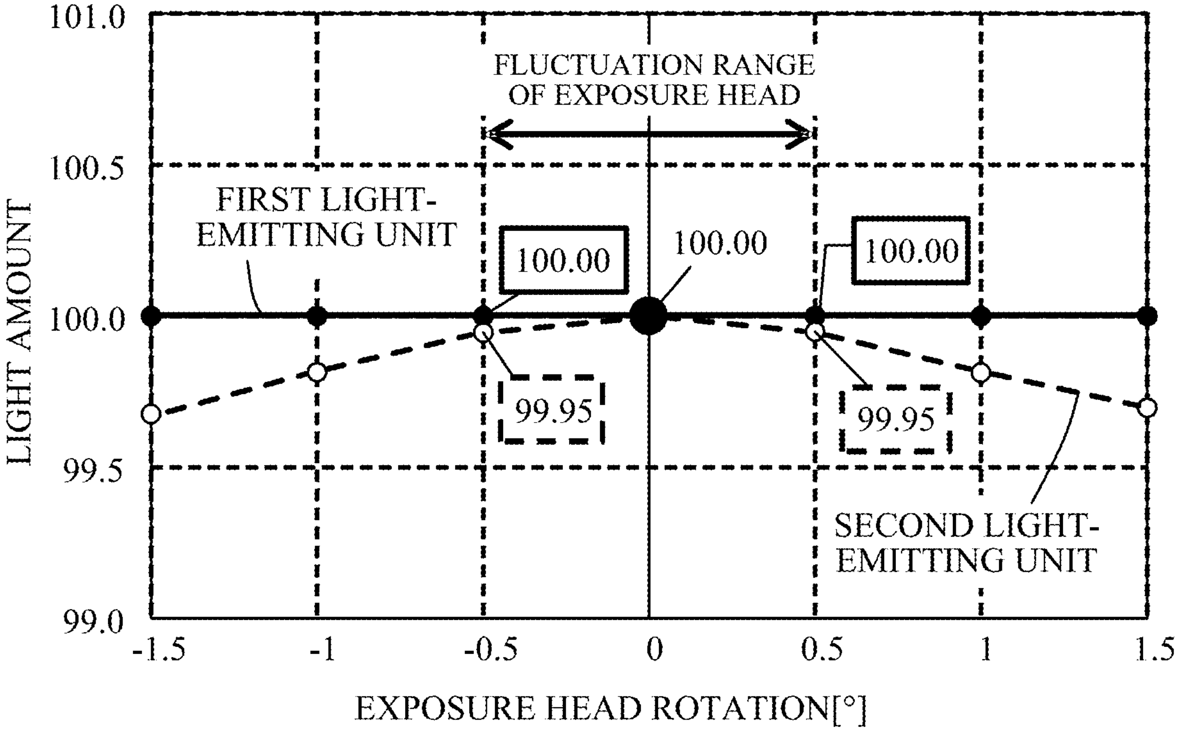
FIG. 59 illustrates a light amount on the photosensitive drum in Example 11.

FIG. 59 illustrates a relationship between the attachment error (rotation angle) of the exposure head 1205 and the light amount on the photosensitive drum 1203 in this example. The assumed value of the attachment angle of the exposure head 1205 in this example is 0°, as in comparative example 2. In this example, as illustrated in FIG. 57A, none of the light rays B1 generated when the light rays A1 emitted from the first light-emitting unit 1206 are reflected on the photosensitive drum 1203 enter the first and second gradient index lens arrays 1204-1 and 1204-2. Therefore, as not illustrated in FIG. 56A, no multireflection light occurs. As a result, as illustrated in FIG. 59, even if the exposure head 1205 rotates from 0° to +0.5°, the light amount condensed on the photosensitive drum 1203 is 100.00, and there is no light amount fluctuation on the photosensitive drum 1203. Also, in a case where the exposure head 1205 rotates −0.5°, none of the light rays B1 generated when the light rays A1 emitted from the first light-emitting unit 1206 are reflected on the photosensitive drum 1203 enter the first and second gradient index lens arrays 1204-1 and 1204-2. Therefore, the light amount condensed on the photosensitive drum 1203 is 100.00.

On the other hand, as illustrated in FIG. 57B, regarding the light rays B2 generated when the light rays A2 emitted from the second light-emitting unit 1207 are reflected by the photosensitive drum 1203, a percentage of a part of the light rays B2 to the light rays B2, which part enters the first and second gradient index lens arrays 1204-1 and 1204-2, increases. At this time, at a position where the first and second light-emitting units 1206 and 1207 are moved in parallel by 0.2 mm in the Z direction, the amount of the light ray C2 as multireflection light increases, as illustrated in FIG. 56B. Therefore, even if the exposure head 1205 rotates by ±0.5°, an increase or decrease in the multireflection light can be suppressed. As a result, as illustrated in FIG. 59, the light amounts condensed on the photosensitive drum 1203 in a case where the exposure head 1205 is rotated by +0.5° and −0.5° are both 99.95. From the above, the light amount fluctuation on the photosensitive drum 1203 in this example is a maximum of 0.05% (=|99.95−100.00|). That is, this example can suppress the light amount fluctuation by 17% of the light amount fluctuation of 0.06% (|0.06|) in comparative example 2.

Thus, this example can suppress the light amount fluctuation on the photosensitive drum 1203 caused by the attachment error of the exposure head 1205 more effectively than comparative example 2, and reduce the density change in the image formed on the photosensitive drum 1203 from the expected density.

Example 12

An exposure head according to Example 12 will be now described. An image forming apparatus in which the exposure head according to Example 12 is used is similar to the image forming apparatus 1 explained in Example 1. The exposure head according to Example 12 is different from the exposure head 405 according to Example 3 in that it has no tilt (i.e., similarly to comparative example 3) and the first and second light-emitting units are moved parallel to the photosensitive drum, but other configurations are similar to those of the exposure head 405 according to Example 3.

Figure 60:
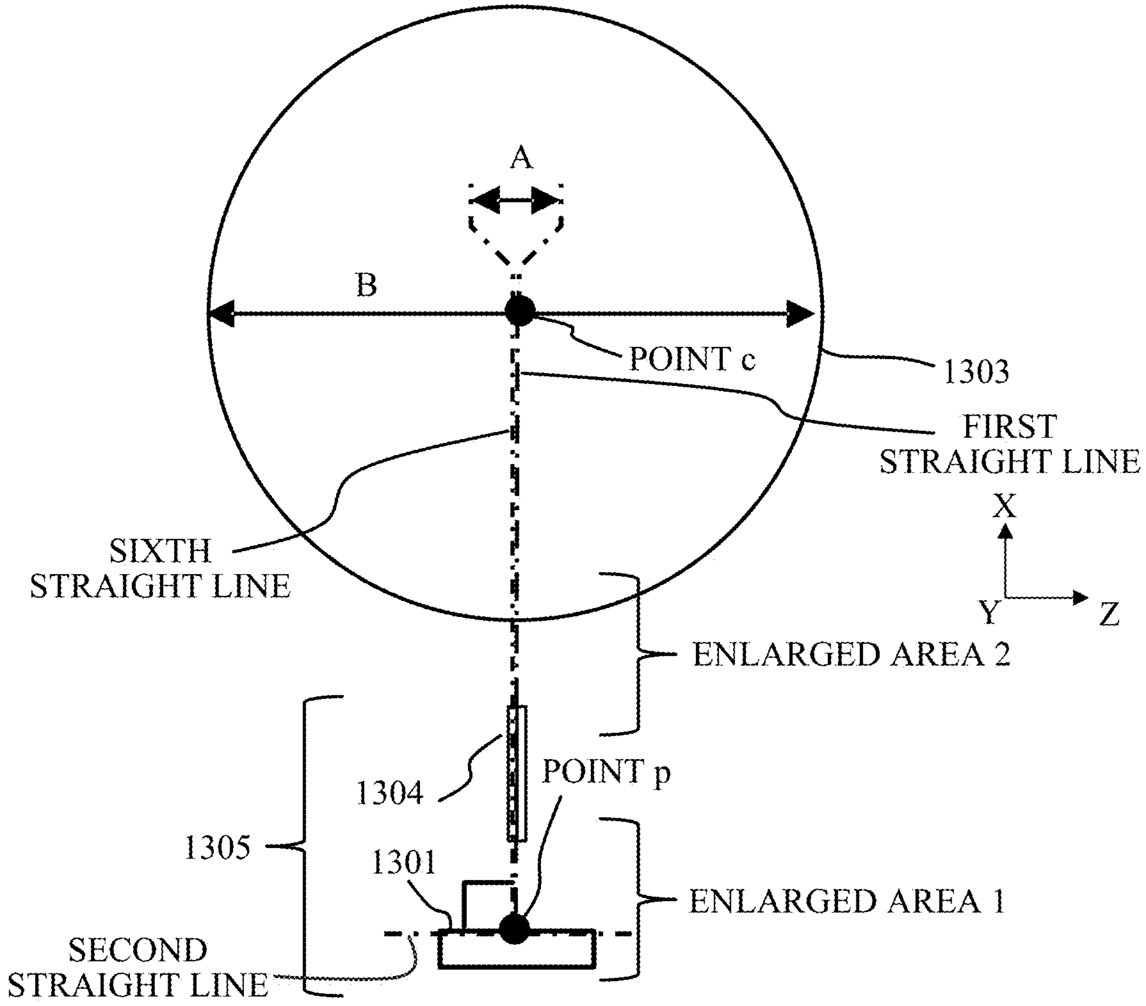
FIG. 60 is a schematic diagram illustrating an exposure head and photosensitive drum in Example 12.
Figure 61A:
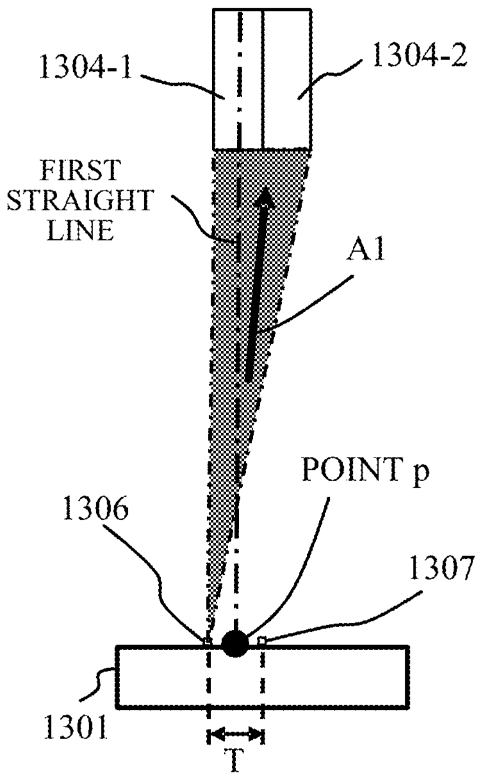
FIGS. 61A and 61B illustrate optical paths from first and second light-emitting units in Example 12.
Figure 61B:
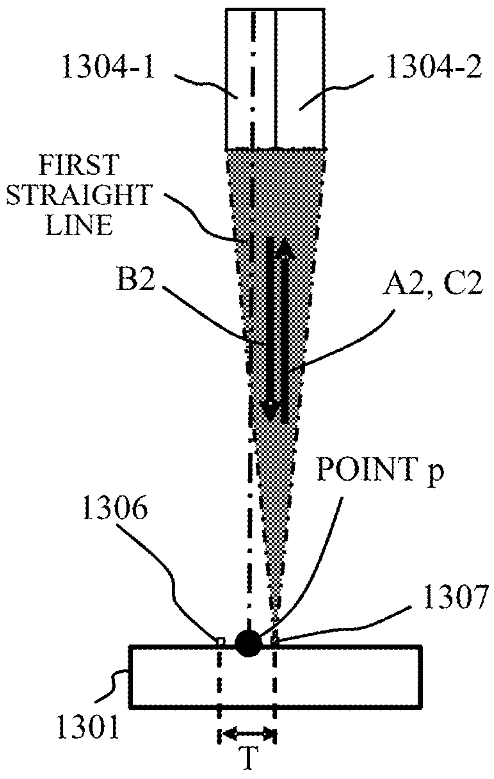

An exposure head 1305 according to this example will be described with reference to FIGS. 60, 61A, 61B, 62A, 62B, 63A, 63B, and 64. FIG. 60 illustrates a ZX section when viewed from the Y direction, and the arrangement of the exposure head 1305 (light-emitting substrate 1301 and gradient index lens array 1304) relative to the photosensitive drum 1303. FIGS. 61A and 61B illustrate an enlarged view of the enlarged area 1 in FIG. 60 when viewed from the Y direction. FIG. 61A illustrates how the light ray A1 emitted from the first light-emitting unit 1306 enters the first and second gradient index lens arrays 1304-1 and 1304-2. FIG. 61B illustrates how the light ray A2 emitted from the second light-emitting unit 1307 enters the first and second gradient index lens arrays 1304-1 and 1304-2.

Figure 62A:
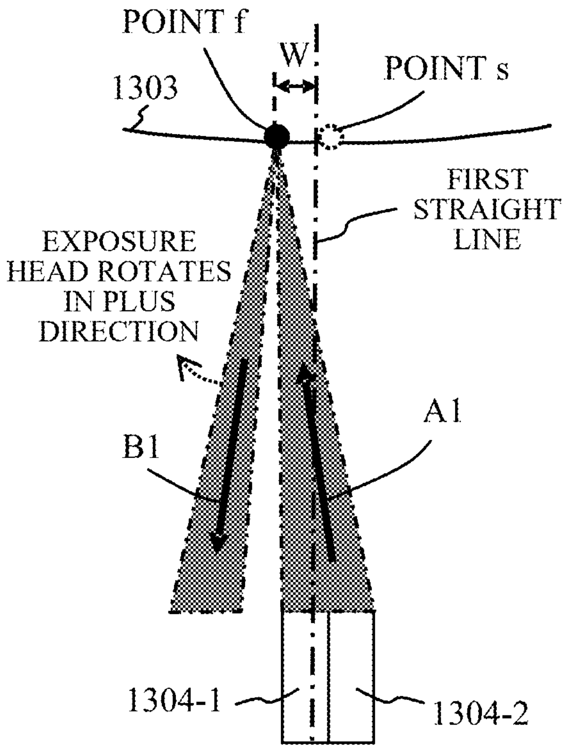
FIGS. 62A and 62B illustrate optical paths from a gradient index lens array in Example 12.
Figure 62B:
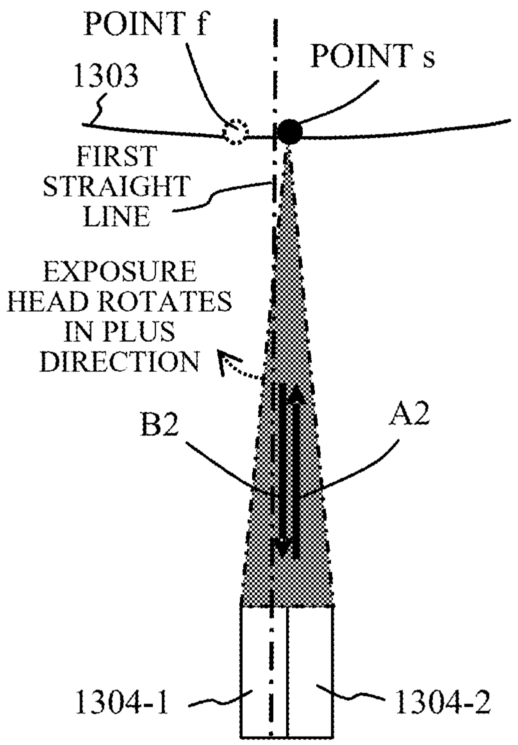

FIGS. 62A and 62B illustrate an enlarged view of the enlarged area 2 in FIG. 60. FIG. 62A illustrates how the light ray A1 emitted from the first light-emitting unit 1306 and then from the first and second gradient index lens arrays 1304-1 and 1304-2 is condensed at the point f on the photosensitive drum 1303, and the light ray B1 generated when the light ray A1 is reflected by the photosensitive drum 1303. FIG. 62B illustrates how the light ray A2 emitted from the second light-emitting unit 1307 and then from the first and second gradient index lens arrays 1304-1 and 1304-2 is condensed at the point s on the photosensitive drum 1303, and the light ray B2 generated when the light ray A2 is reflected by the photosensitive drum 1303.

Figure 63A:
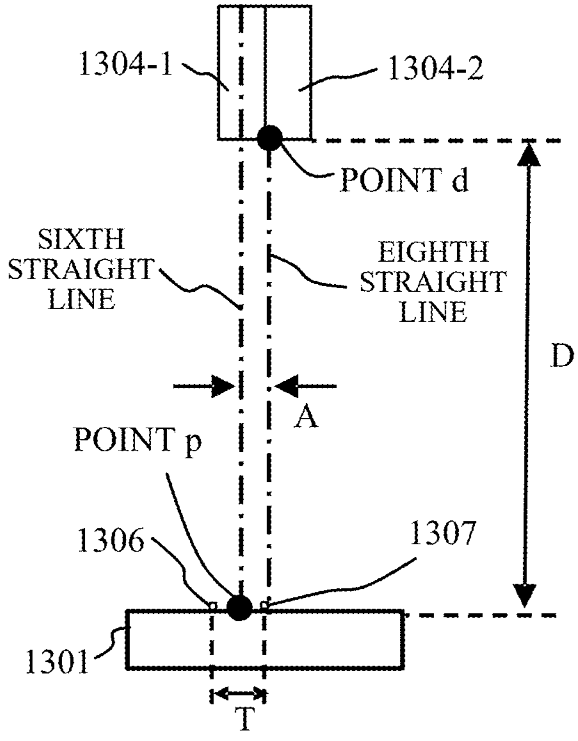
FIGS. 63A and 63B illustrate a positional relationship among the first and second light-emitting units, the gradient index lens array, and the photosensitive drum in Example 12.
Figure 63B:
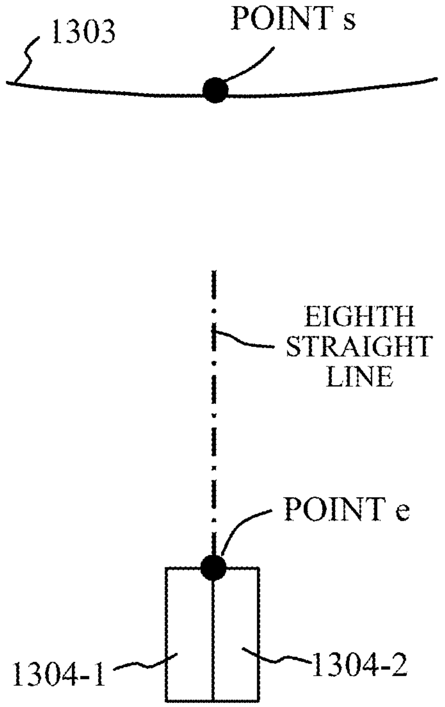

FIG. 63A illustrates a positional relationship between the first and second light-emitting units 1306 and 1307 and the first and second gradient index lens arrays 1304-1 and 1304-2. FIG. 63B illustrates a positional relationship between the first and second gradient index lens arrays 1304-1 and 1304-2 and the photosensitive drum 1303.

In the exposure head 1305 according to this example, T=0.30 mm. In the exposure head 1305 according to this example, the first and second light-emitting units 1306 and 1307 on the light-emitting substrate 1301 are disposed at a position moved by 0.15 mm in parallel in the Z direction relative to comparative example 3 when viewed from the Y direction. W=0.22 mm. Therefore, W/T=0.73, which satisfies inequality (1).

In this example, as illustrated in FIGS. 60, 63A, and 63B, the first and second light-emitting units 1306 and 1307 are disposed at a position so that the sixth straight line does not pass through the point c, which is the rotation center of the photosensitive drum 1303.

In this example, A=0.15 mm, B=20 mm, and D=2.74 mm. Therefore, (B×T)/(D×A)=14.6, which satisfies inequality (6). T/D=0.11, which satisfies inequality (3).

In this example, the eighth straight line passes through the point c when viewed from the Y direction. As illustrated in FIG. 63A, the sixth straight line and the eighth straight line are parallel to each other.

Figure 64:
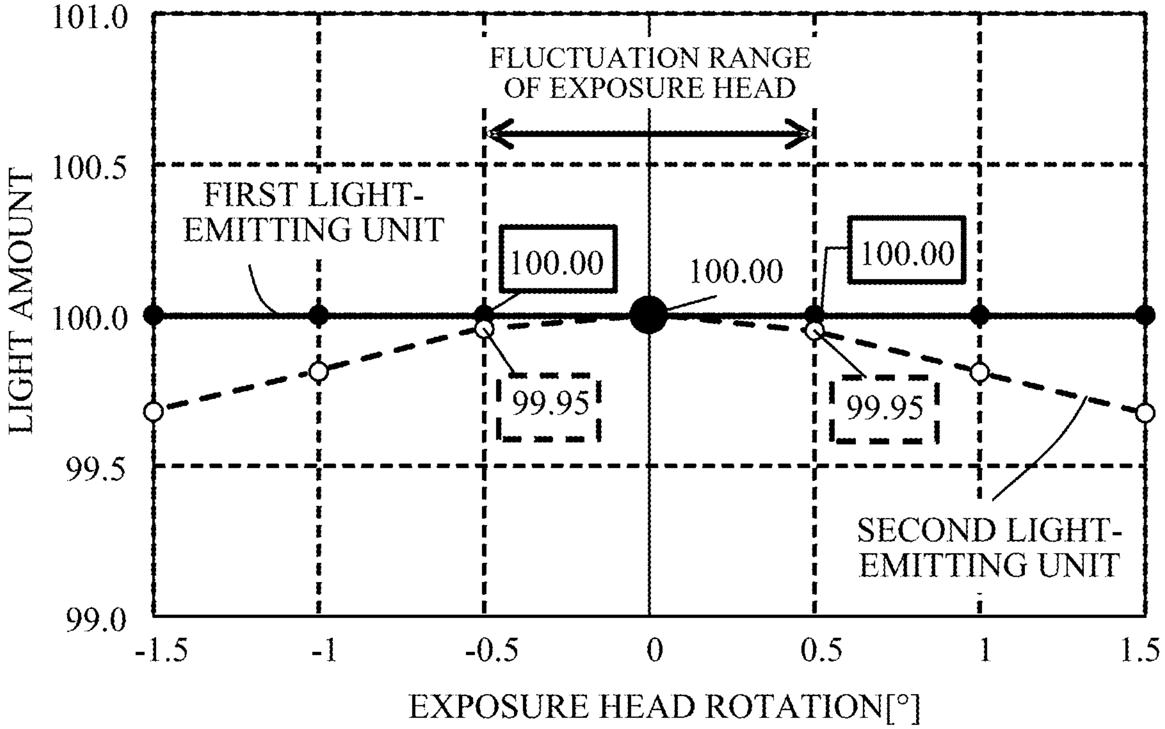
FIG. 64 illustrates a light amount on the photosensitive drum in Example 12.

FIG. 64 illustrates a relationship between the attachment error (rotation angle) of the exposure head 1305 and the light amount on the photosensitive drum 1303 in this example. The assumed value of the attachment angle of the exposure head 1305 in this example is 0°, as in comparative example 3. In this example, as illustrated in FIG. 62A, none of the light rays B1 generated when the light rays A1 emitted from the first light-emitting unit 1306 are reflected by the photosensitive drum 1303 enter the first and second gradient index lens arrays 1304-1 and 1304-2. Therefore, as not illustrated in FIG. 61A, no multireflection light occurs. As a result, as illustrated in FIG. 64, even if the exposure head 1305 rotates from 0° to +0.5°, the light amount condensed on the photosensitive drum 1303 is 100.00, and there is no light amount fluctuation on the photosensitive drum 1303. In a case where the exposure head 1305 rotates −0.5°, none of the light rays B1 generated when the light rays A1 emitted from the first light-emitting unit 1306 are reflected by the photosensitive drum 1303 enter the first and second gradient index lens arrays 1304-1 and 1304-2. Therefore, the light amount condensed on the photosensitive drum 1303 is 100.00.

On the other hand, as illustrated in FIG. 62B, regarding the light rays B2 generated when the light rays A2 emitted from the second light-emitting unit 1307 are reflected by the photosensitive drum 1303, a percentage of a part of the light rays B2 to the light rays B2, which part enters the first and second gradient index lens arrays 1304-1 and 1304-2, increases. At this time, at a position where the first and second light-emitting units 1306 and 1307 are moved in parallel by 0.15 mm in the Z direction, the amount of the light ray C2 as multireflection light increases, as illustrated in FIG. 61B. Therefore, even if the exposure head 1305 rotates by ±0.5°, an increase or decrease in the multireflection light can be suppressed. As a result, as illustrated in FIG. 64, the light amounts condensed on the photosensitive drum 1303 in a case where the exposure head 1305 is rotated by +0.5° and −0.5° are both 99.95.

Thus, the light amount fluctuation on the photosensitive drum 1303 in this example is a maximum of 0.05% (=|99.95−100.00|). In other words, this example can suppress the light amount fluctuation by 67% of the light amount fluctuation of 0.15% (|0.15|) in comparative example 3.

Thus, this example can suppress the light amount fluctuation on the photosensitive drum 1303 caused by the attachment error of the exposure head 1305 more effectively than comparative example 3 and reduce the density change in the image formed on the photosensitive drum 1303 from the expected density.

Examples 1 to 12 can suppress the light amount fluctuation on the target surface caused by the attachment error in the light source apparatus.

Examples 13 to 16 correspond to claims 9 to 13 and 19.

Example 13

Basic Configuration of Exposure Head

The basic configuration of an exposure head 2105 according to Example 13 will be described with reference to FIGS. 80A, 80B, 81, and 82. The exposure head 2105 is used in place of the exposure head 105 illustrated in FIGS. 2A and 2B in the image forming apparatus 1 illustrated in FIG. 1.

Figure 80A:
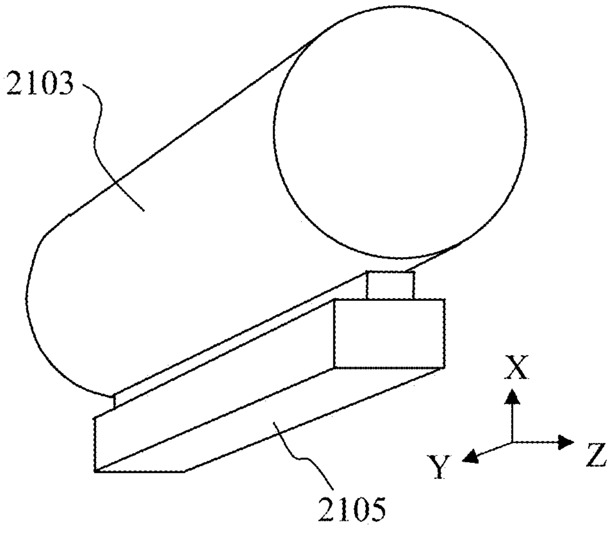
FIGS. 80A and 80B illustrate an exposure head and photosensitive drum in Example 13.
Figure 80B:
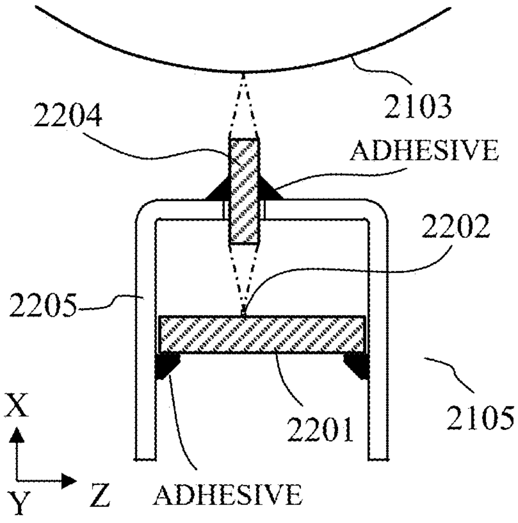

FIG. 80A illustrates the arrangement of the exposure head 2105 relative to the photosensitive drum 2103. FIG. 80B illustrates a ZX section (short side (widthwise) section, sub-scanning section), which is a plane orthogonal (perpendicular) to the Y direction when viewed from the Y direction, and illustrates how light emitted from a light source unit 2202 is condensed on a photosensitive drum 2103 by a gradient index lens array 2204 as a lens unit. This example uses a gradient index lens array as the lens unit, but may use another lens array.

Figure 81:
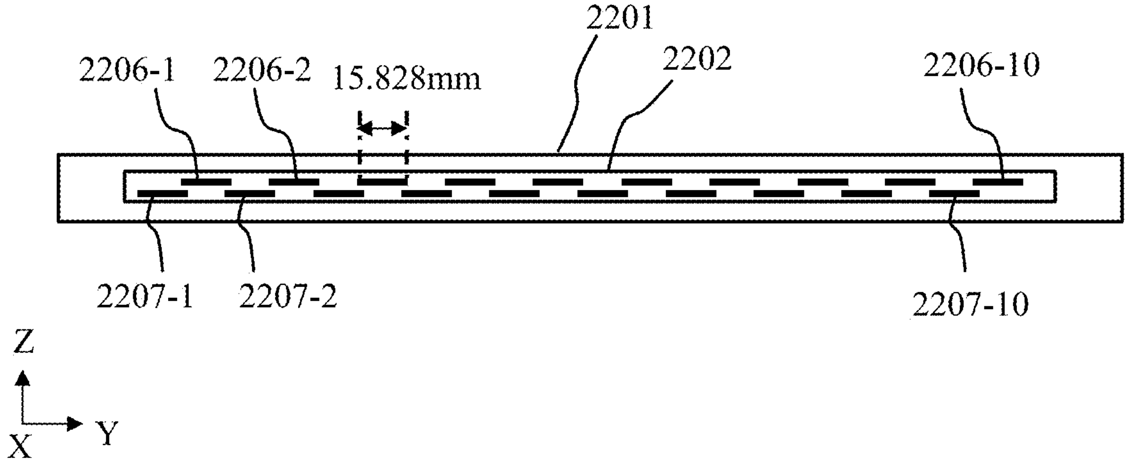
FIG. 81 illustrates a light-emitting substrate in the exposure head in Example
13.

FIG. 81 illustrates a YZ section of the light source unit 2202. The light source unit 2202 includes a plurality of first light-emitting units 2206 (2206-1 to 2206-10) and a plurality of second light-emitting units 2207 (2207-1 to 2207-10) serving as light-emitting element array chips. Each light-emitting unit has a light-emitting element row (light emitter) including a plurality of light-emitting elements arranged in a row in the Y direction. The light-emitting elements are light-emitting devices such as LEDs and organic EL.

Figure 82:
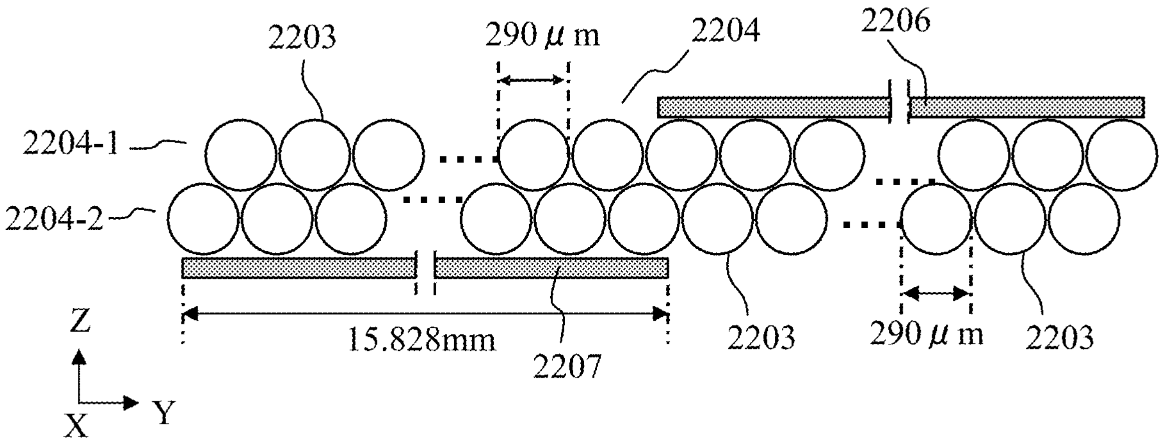
FIG. 82 illustrates a light emitter and gradient index lens array in the exposure head in Example 13.

FIG. 82 illustrates a positional relationship between the plurality of first light-emitting units 2206 and the plurality of second light-emitting units 2207 and the gradient index lens array 2204 in the YZ section.

As illustrated in FIGS. 80B and 82, the exposure head 2105 has a plurality of first light-emitting units 2206 (2206-1 to 2206-10) and a plurality of second light-emitting units 2207 (2207-1 to 2207-10) mounted on a light-emitting substrate 2201, a gradient index lens array 2204, and a housing 2205. The plurality of first light-emitting units 2206 and the plurality of second light-emitting units 2207 are mounted on a substrate mounting surface of the light-emitting substrate 2201.

The plurality of first light-emitting units 2206 (2206-1 to 2206-10) are arranged in a row in the Y direction (first direction, main scanning direction), which is the longitudinal direction of each light-emitting unit. The second light-emitting units 2207 (2207-1 to 2207-10) are arranged in a row in the Y direction at different positions in the Z direction (second direction orthogonal to the first direction, sub-scanning direction) which is the short side direction of each light-emitting unit relative to the arrangement position of the first light-emitting units 2206. The first light-emitting units 2206 and the second light-emitting units 2207 are arranged at positions offset from each other in the Y direction. Thus, the first light-emitting units 2206 and the second light-emitting units 2207 are arranged in two rows in a staggered pattern. The first light-emitting units 2206 and the second light-emitting units 2207 may be simply arranged in two rows without offset in the Y direction, instead of in a staggered pattern.

In each of the first light-emitting unit 2206 and the second light-emitting unit 2207, a light-emitting element row including a plurality of light-emitting elements is mounted on the unit mounting surface. In this example, n=748 light-emitting elements are arranged in the light-emitting element row of each light-emitting unit in the Y direction at a predetermined image resolution pitch. The image resolution pitch is, for example, 1200 dpi (approximately 21.16 μm). The length from the −Y direction end to the +Y direction end of the light-emitting element row including 748 light-emitting elements is approximately 15.8 mm.

Each of the plurality of first light-emitting units 2206 and the plurality of second light-emitting units 2207 includes 10 light-emitting units. In other words, the total number of first light-emitting units 2206 and second light-emitting units 2207 is 20. Thereby, the total number of light-emitting elements is 14960, and an image corresponding to an image width of approximately 316 mm can be formed.

This example uses light-emitting elements having the Lambertian light-emission characteristic. However, the light-emission characteristic of the light-emitting elements is not limited to this example. In this example, the light-emission spectrum of the light-emitting elements has a peak at 600 nm, but the light-emission spectrum is not limited to this example, and light-emitting elements that emit near-infrared light with a peak at 780 nm, for example, may be used.

The gradient index lens array 2204 illustrated in FIG. 82 has a first gradient index lens array (first lens array) 2204-1 extending in the Y direction, and a second gradient index lens array (second lens array) 2204-2 extending in the Y direction at a position shifted in the Z direction from the first gradient index lens array 2204-1. Each of the first and second gradient index lens arrays 2204-1 and 2204-2 includes a plurality of gradient index lenses 2203 arranged at a predetermined pitch in the Y direction. As an example, each cylindrical gradient index lens 2203 has a diameter of 290 μm.

In the ZX section illustrated in FIG. 80B, the gradient index lens array 2204 is disposed so that the distance from the row of light-emitting elements of the light source unit 2202 to each lens 2203 is a first predetermined distance, and the distance from the exit surface of each lens 2203 to the surface of the photosensitive drum 2103 is a second predetermined distance. The first predetermined distance and the second predetermined distance are approximately equal to each other. The gradient index lens array 2204 images the light emitted from the row of light-emitting elements on the photosensitive drum 2103 so that an erect image is formed at equal magnification.

The gradient index lens array 2204 and the light-emitting substrate 2201 are fixed to the housing 2205 with an adhesive (agent).

The exposure head 2105 having the above configuration is assembled individually at the factory, and is completed by performing focusing and light amount adjustment to adjust the spot at the light-condensing position to a predetermined size. In the focusing, the attachment position of the gradient index lens array 2204 is adjusted so that the distance between the gradient index lens array 2204 and the light-emitting element row is the first predetermined distance. In the light amount adjustment, each of the light-emitting elements in the light-emitting element row is sequentially made to emit light, and the drive current of each light-emitting element is adjusted so that the light condensed on the photosensitive drum 2103 via the gradient index lens array 2204 has a predetermined light amount.

Detailed Configuration of Exposure Head

The detailed configuration of the exposure head 2105 according to Example 13 will be described with reference to FIGS. 83, 84A, 84B, 85A, and 85B.

Figure 83:
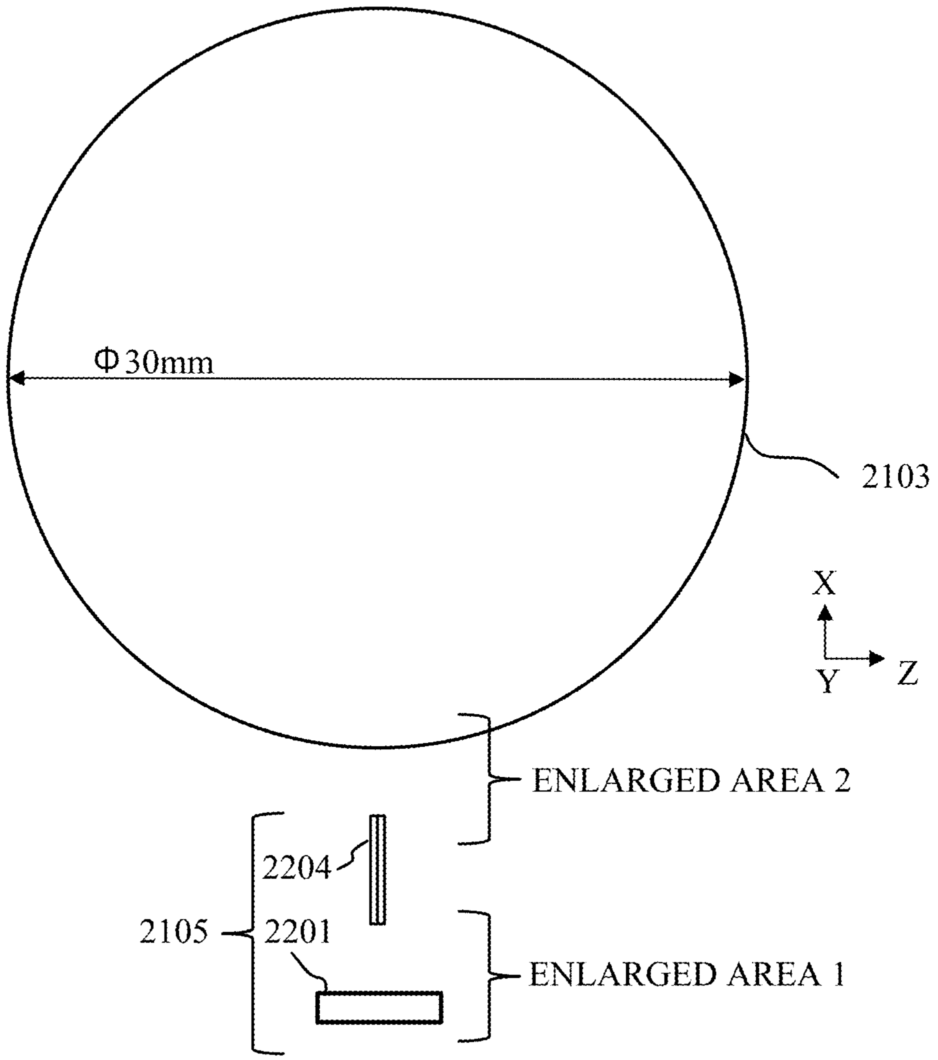
FIG. 83 is a schematic diagram illustrating an exposure head and photosensitive drum in Example 13.
Figure 84A:
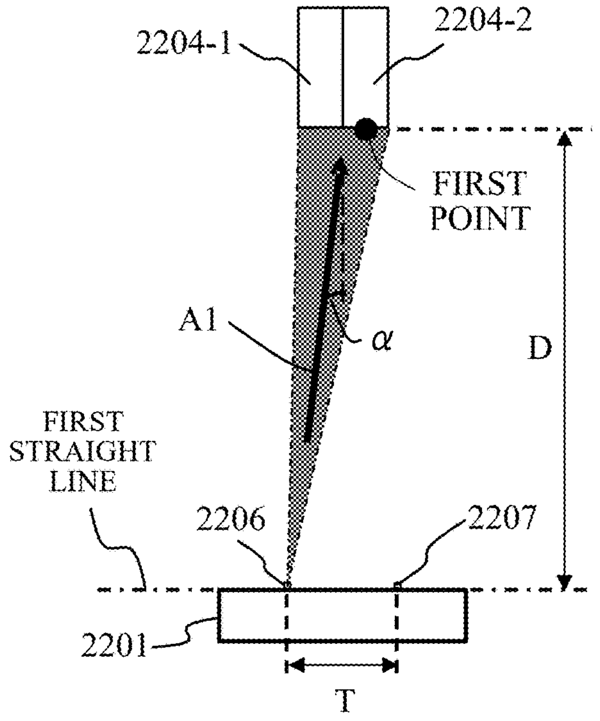
FIGS. 84A and 84B are sectional views illustrating optical paths of the exposure head in Example 13.
Figure 84B:
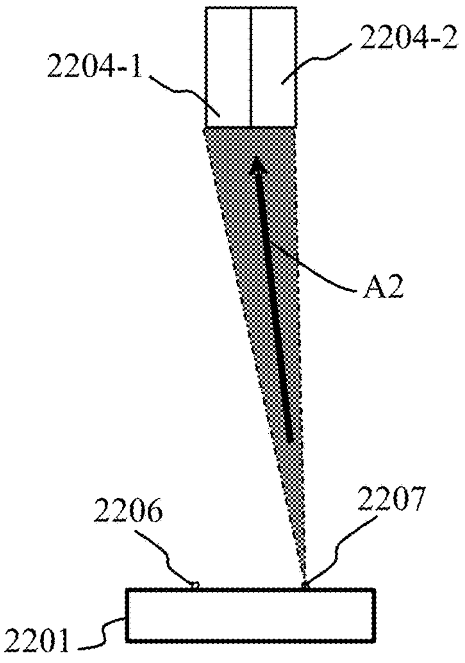

FIG. 83 illustrates a ZX section when viewed from the Y direction, and the arrangement of the exposure head 2105 relative to the photosensitive drum 2103. FIGS. 84A and 84B illustrate an enlarged view of the enlarged area 1 in FIG. 83 when viewed from the Y direction. FIG. 84A illustrates how the light ray A1 emitted from the first light-emitting unit 2206 enters the first and second gradient index lens arrays 2204-1 and 2204-2. FIG. 84B illustrates how the light ray A2 emitted from the second light-emitting unit 2207 enters the first and second gradient index lens arrays 2204-1 and 2204-2.

Figure 85A:
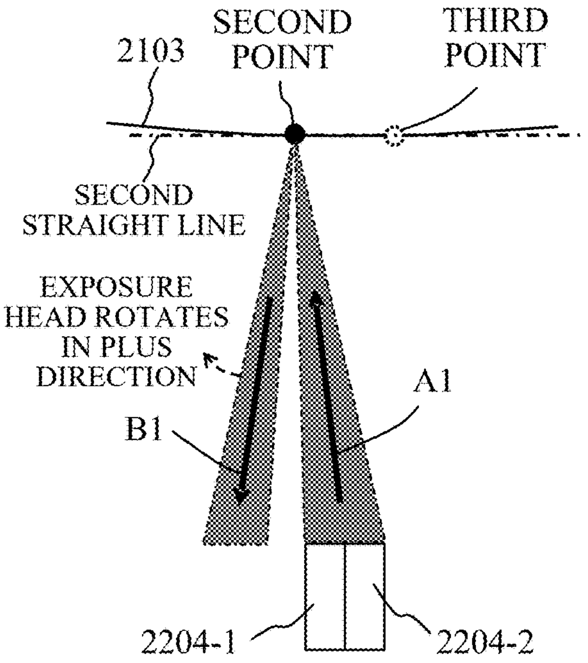
FIGS. 85A and 85B are sectional views illustrating optical paths between the exposure head and the photosensitive drum in Example 13.
Figure 85B:
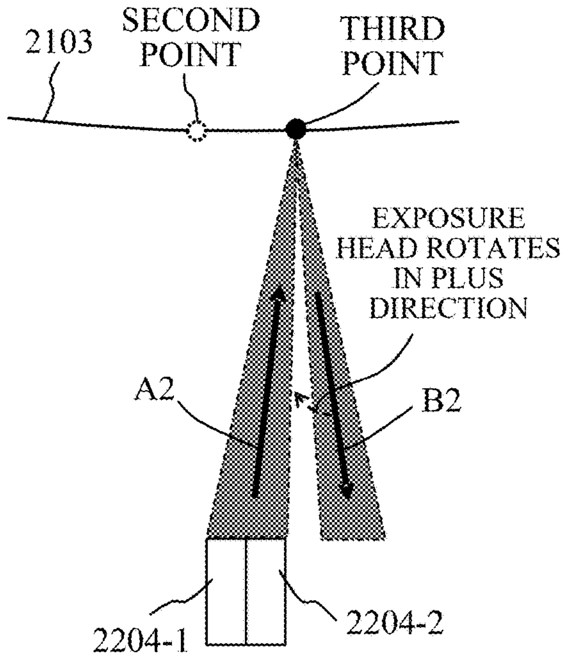

FIGS. 85A and 85B illustrate an enlarged view of the enlarged area 2 in FIG. 83. FIG. 85A illustrates how the light ray A1 emitted from the first light-emitting unit 2206 and then from the first and second gradient index lens arrays 2204-1 and 2204-2 is condensed (irradiated) on the photosensitive drum 2103, and the light ray B1 generated when the light ray A1 is reflected by the photosensitive drum 2103. FIG. 85B illustrates how the light ray A2 emitted from the second light-emitting unit 2207 and the first and second gradient index lens arrays 2204-1 and 2204-2 is condensed on the photosensitive drum 2103, and the light ray B2 generated when the light ray A2 is reflected by the photosensitive drum 2103.

In attaching the exposure head 2105 to the body (chassis) of the image forming apparatus 1, even if the attachment angle shifts from the expected value due to the attachment error, the light amount emitted from the exposure head 2105 and condensed on the photosensitive drum 2103 may not vary much from the expected light amount. The light amount fluctuation condensed on the photosensitive drum 2103 is due to unnecessary reflected light (ghost light) reaching the photosensitive drum 2103 between the exposure head 2105 and the photosensitive drum 2103 in a case where there is an attachment error. Thus, it is to reduce such unnecessary reflected light.

The exposure head 2105 according to this example has a configuration that satisfies the following inequalities in order to reduce unnecessary reflected light caused by the attachment error. In a case where the exposure head 2105 is viewed from the Y direction, T is a distance between the center of the light emitter (first light-emitting element) of the first light-emitting unit 2206 and the center of the light emitter (second light-emitting element) of the second light-emitting unit 2207, and a first straight line is a straight line connecting the centers of these light emitters (first and second light-emitting elements). When viewed from the Y direction, a first point is defined as a center of the entrance surface of the gradient index lens 2203 included in the gradient index lens array 2204, and D is a distance (shortest distance) between the first straight line and the first point. In this case, the following inequality (7) is satisfied:

$$0.16 \leq T/D \leq 0.31 \quad (7)$$

Inequality (7) defines a proper positional relationship between the gradient index lens array 2204 and the first and second light-emitting units 2206 and 2207 when viewed from the Y direction. Keeping T/D within the range of inequality (7) can reduce unnecessary reflected light (ghost light) caused by the attachment error in the exposure head 2105, and form a good image with little influence of the reflected light on density. In a case where T/D is lower than the lower limit of inequality (7), the reflected light due to the attachment error cannot be reduced, and the influence of the reflected light on the image density cannot be suppressed. In a case where T/D is higher than the upper limit of inequality (7), a light amount that cannot enter the gradient index lens array 2204 (does not reach the photosensitive drum 2103) out of the light emitted from the first and second light-emitting units 2206 and 2207 increases, and the light utilization efficiency is reduced. The upper limit of inequality (7) may be set to 0.26.

In this example, the diameter of the photosensitive drum 2103 is 30 mm, D is 2.74 mm, and T is 0.66 mm. T/D is 0.24, which satisfies inequality (7).

A second point is defined as the center of the light source image formed on the photosensitive drum 2103 (on the target surface) by the light from the light emitter of the first light-emitting unit 2206 when viewed from the Y direction, and a third point is defined as a center of the light source image formed on the photosensitive drum 2103 by the light from the light emitter of the second light-emitting unit 307. A second straight line is defined as a straight line connecting the second point and the third point, and θ is defined as an angle between the first straight line and the second straight line. Then, the exposure head 2105 may satisfy the following inequality (8):

$$-2° \leq \theta \leq 2° \quad (8)$$

Inequality (8) defines a proper positional relationship between the exposure head 2105 and the photosensitive drum 2103. By keeping θ within the range of inequality (8), ghost light generated due to the attachment error of the exposure head 2105 can be more effectively reduced. In a case where θ is lower than the lower limit value or higher than the upper limit value of inequality (8), it becomes difficult to reduce ghost light generated by reflection of light from the light emitter of either the first or second light-emitting unit 2206 and 2207.

In this example, the first straight line and the second straight line are parallel, that is, θ=0°, and inequality (8) is satisfied.

Inequalities (7) and (8) are satisfied in all combinations of the first and second light-emitting units in the plurality of first light-emitting units 2206 and the plurality of second light-emitting units 2207. This is similarly applicable to other examples described later.

Referring now to FIGS. 99, 100A, 100B, 101A, 101B, 102A, 102B, 103A, 103B, 104A, 104B, and 105, a description will be given of comparative example 4 and the occurrence of ghost light in comparative example 4.

Figure 99:
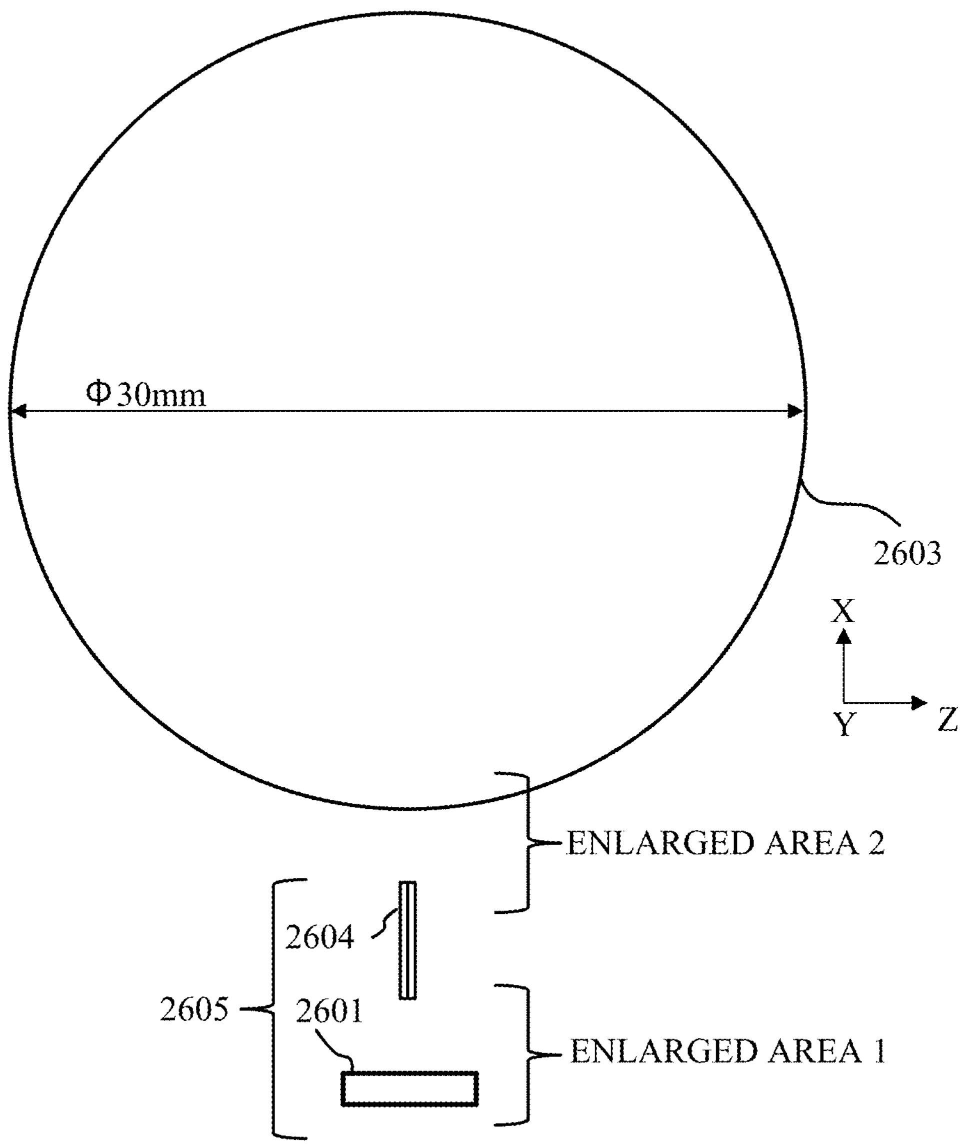
FIG. 99 is a schematic diagram illustrating an exposure head and photosensitive drum in comparative example 4.

FIG. 99 illustrates the arrangement of the exposure head 2605 relative to the photosensitive drum 2603 in the ZX section when viewed from the Y direction. The exposure head 2605 in comparative example 4 has a similar configuration to that of the exposure head 2105 according to Example 13, except that the distance T between the centers of the light emitters of the first light-emitting unit 2606 and the second light-emitting unit 2607. FIGS. 100A, 100B, 103A, 103B, 104A, and 104B illustrate enlarged views of the enlarged area 1 in FIG. 99. FIGS. 101A, 101B, 102A, and 102B illustrate enlarged views of the enlarged area 2 in FIG. 99.

Figure 100A:
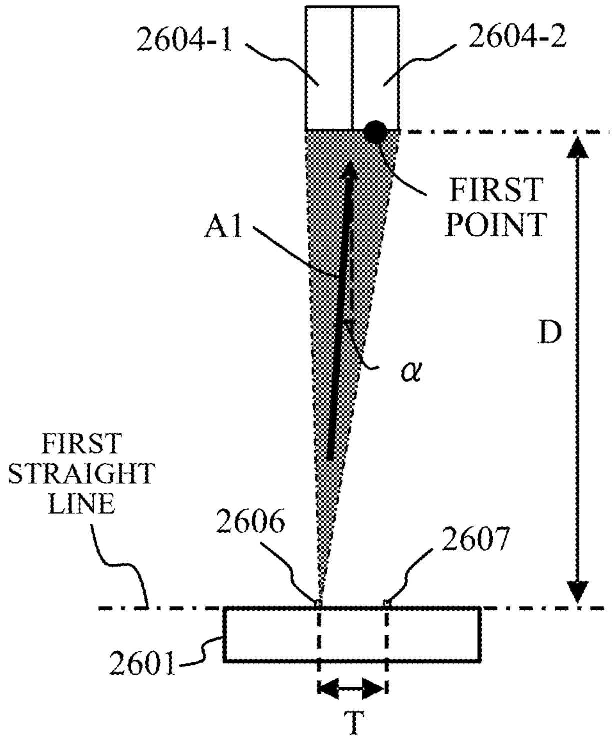
FIGS. 100A and 100B are sectional views illustrating optical paths of the exposure head in comparative example 4.
Figure 100B:
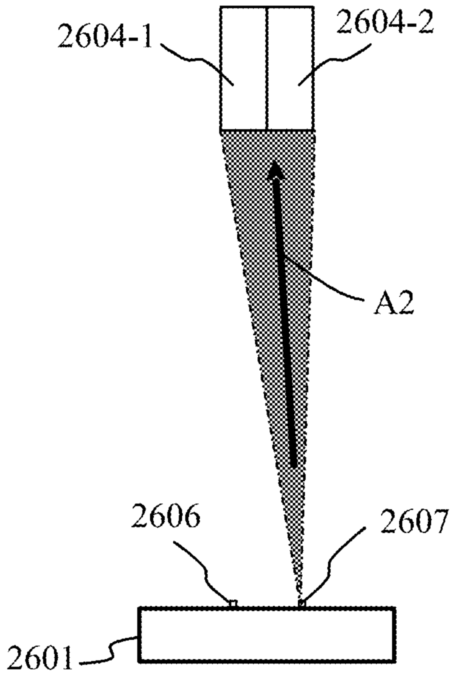
Figure 101A:
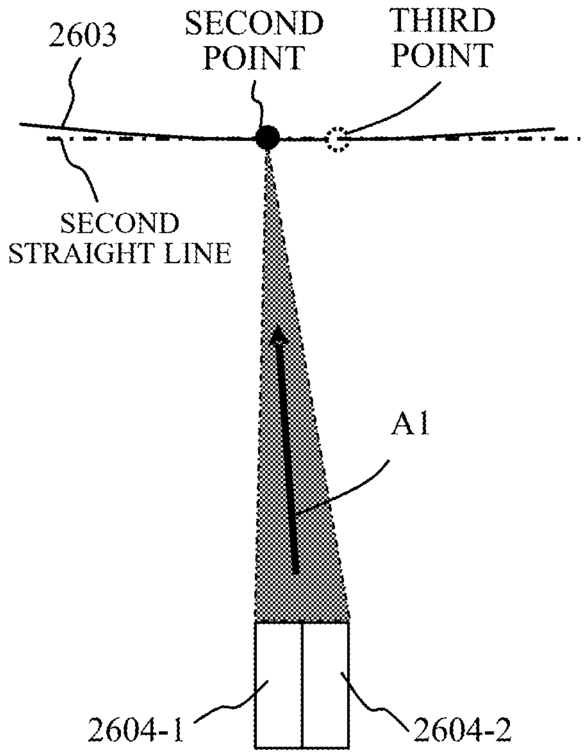
FIGS. 101A and 101B are sectional views illustrating optical paths between the exposure head and the photosensitive drum in comparative example 4.
Figure 101B:
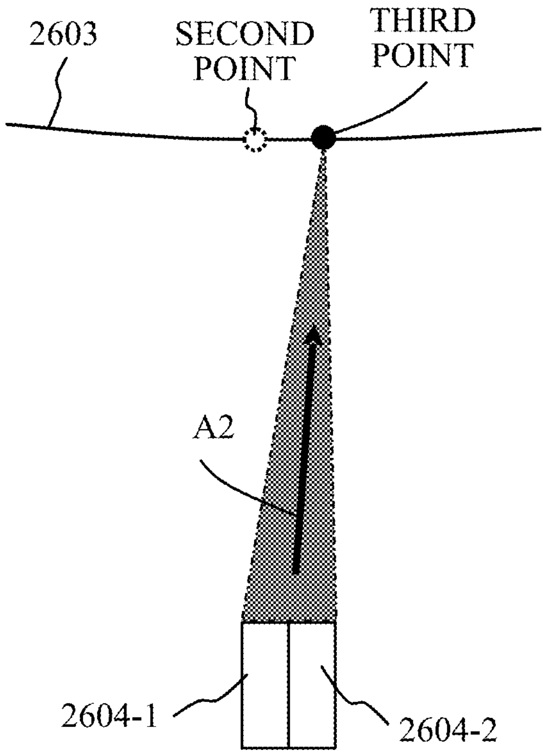

FIG. 100A illustrates how the light ray A1 emitted from the first light-emitting unit 2606 enters the first and second gradient index lens arrays 2604-1 and 2604-2. FIG. 100B illustrates how the light ray A2 emitted from the second light-emitting unit 2607 enters the first and second gradient index lens arrays 2604-1 and 2604-2. FIG. 101A illustrates how the light ray A1 emitted from the first light-emitting unit 2606 and then from the first and second gradient index lens arrays 2604-1 and 2604-2 is condensed on the photosensitive drum 2603. FIG. 101B illustrates how the light ray A2 emitted from the second light-emitting unit 2607 and then emitted from the first and second gradient index lens arrays 2604-1 and 2604-2 is condensed on the photosensitive drum 2603.

Figure 102A:
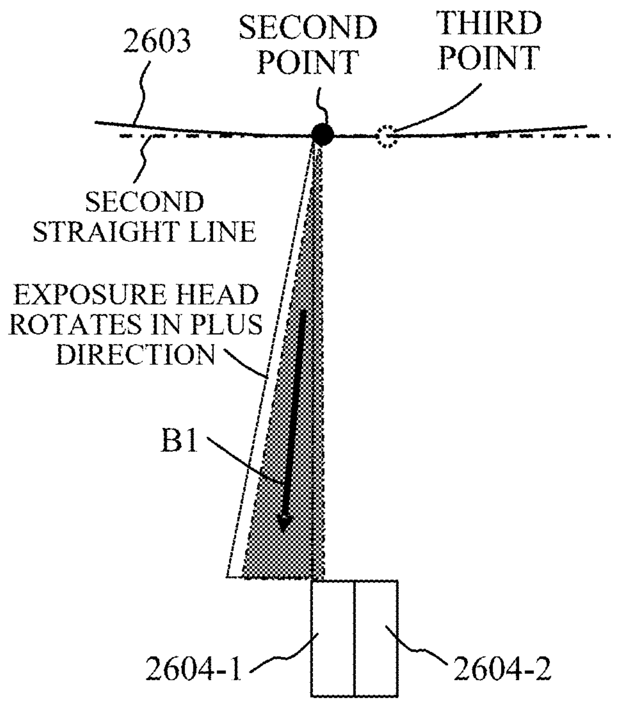
FIGS. 102A and 102B are sectional views illustrating optical paths between the exposure head and the photosensitive drum in comparative example 4.
Figure 102B:
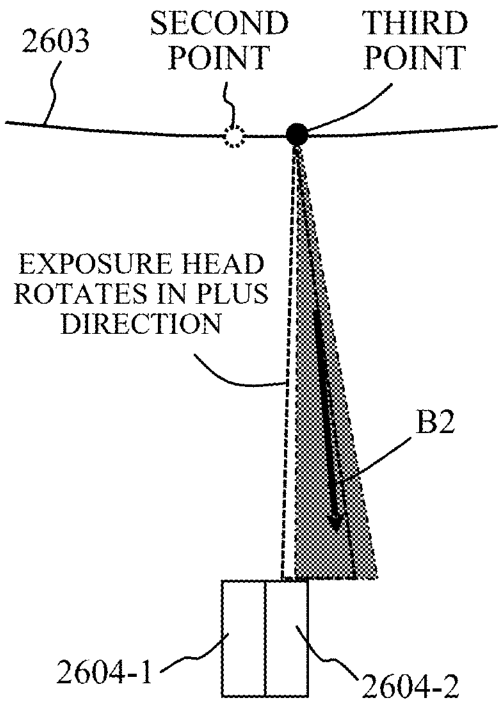

FIG. 102A illustrates the light ray B1 generated when the light ray A1 emitted from the first light-emitting unit 2606 and condensed (irradiated) on the photosensitive drum 2603 via the first and second gradient index lens arrays 2604-1 and 2604-2 is reflected by the photosensitive drum 2603. FIG. 102B illustrates the light ray B2 generated when the light ray A2 emitted from the second light-emitting unit 2607 and condensed on the photosensitive drum 2603 via the first and second gradient index lens arrays 2604-1 and 2604-2 is reflected by the photosensitive drum 2603.

Figure 103A:
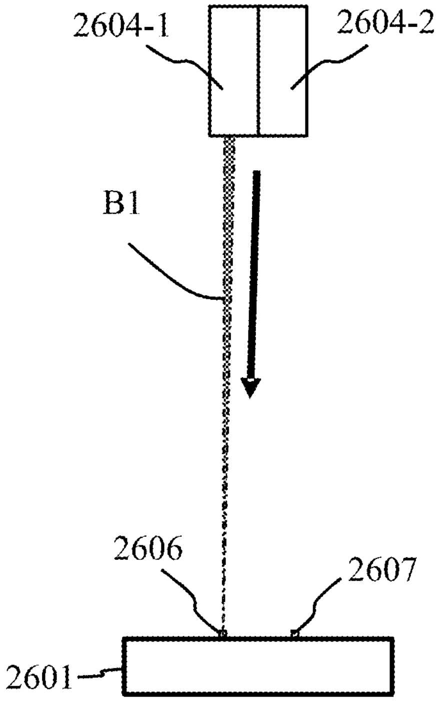
FIGS. 103A and 103B are sectional views illustrating optical paths of reflected light from a lens array toward a light-emitting unit in comparative example 4.
Figure 103B:
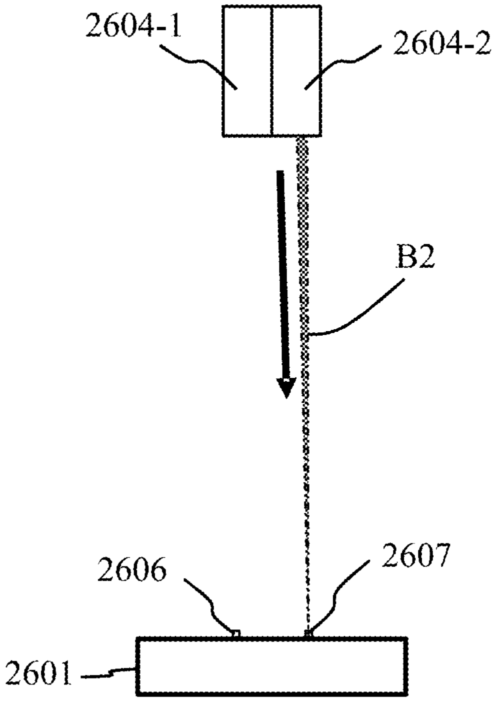

FIG. 103A illustrates how a part of the light ray B1 illustrated in FIG. 102A that passes through the first gradient index lens array 2604-1 returns to the first light-emitting unit 2606 and is condensed on it. FIG. 103B illustrates how a part of the light ray B2 illustrated in FIG. 102B that passes through the second gradient index lens array 2604-2 returns to the second light-emitting unit 2607 and is condensed on it.

Figure 104A:
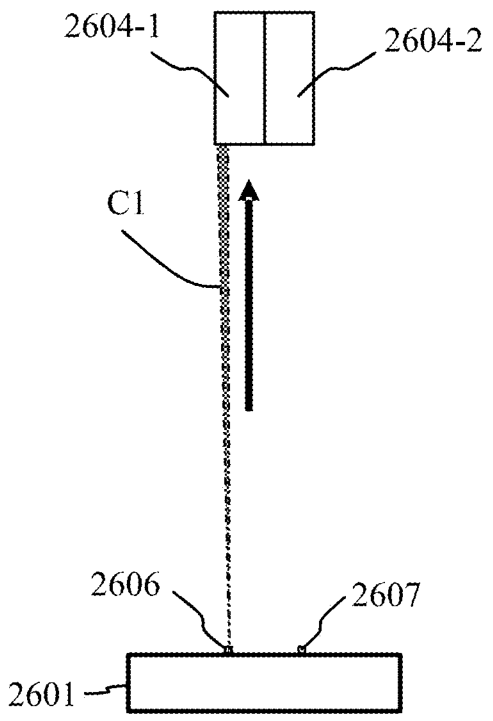
FIGS. 104A and 104B are sectional views illustrating optical path of reflected light from the light-emitting unit toward the lens array in comparative example 4.
Figure 104B:
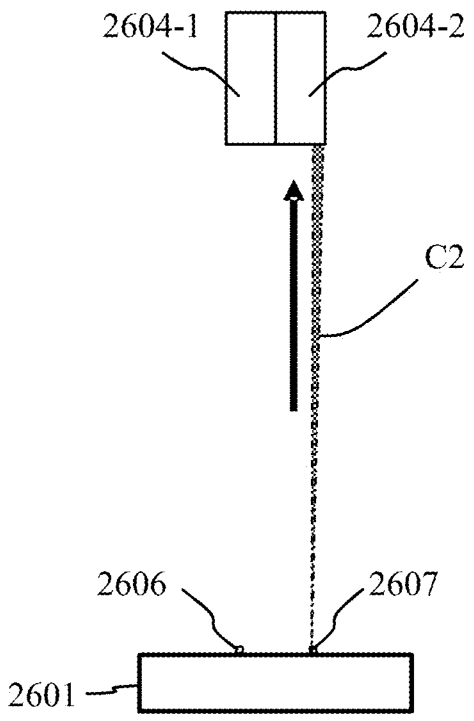

FIG. 104A illustrates how the light ray that returns to the first light-emitting unit 2606 in FIG. 103A is reflected by the first light-emitting unit 2606 and enters the first gradient index lens array 2604-1 again (is again irradiated onto the photosensitive drum 2103). FIG. 104B illustrates how the light ray that returns to the second light-emitting unit 2607 in FIG. 103B is reflected by the second light-emitting unit 2607 and enters the second gradient index lens array 2604-2 again (is again irradiated onto the photosensitive drum 2103).

In comparative example 4, the diameter of the photosensitive drum 2603 is 30 mm, D=2.74 mm, T=0.40 mm, and θ=0°. Therefore, T/D=0.15, which does not satisfy inequality (7). However, θ=0°, which satisfies inequality (8).

In attaching the exposure head 2605 to the image forming apparatus 1, the attachment angle may shift (rotate) from the expected value due to the attachment error. Now assume that a fluctuation range in the attachment angle of the exposure head 2605 due to the attachment error is ±0.5°. The assumed value of the attachment angle of the exposure head 2605 is 0°, and the light amount emitted from the first and second light-emitting units 2606 and 2607 and condensed on the photosensitive drum 2603 at this assumed angle is 100.00.

Figure 105:
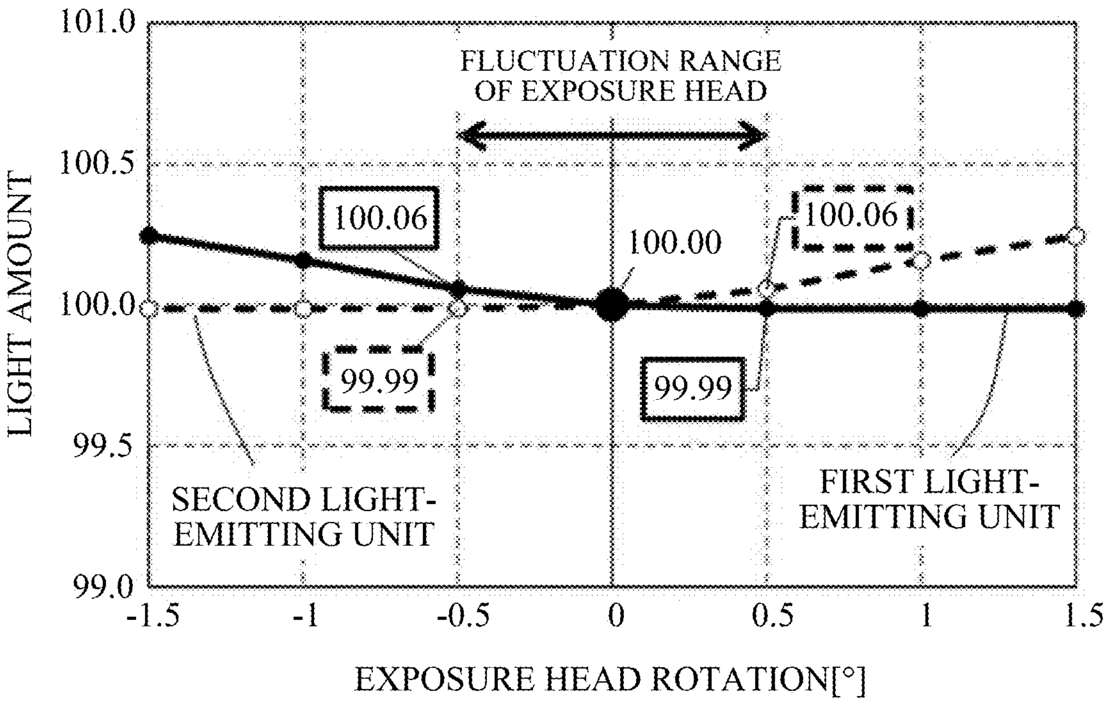
FIG. 105 illustrates a relationship between a rotation angle of the exposure head and a light amount on the photosensitive drum in comparative example 4.

FIG. 105 illustrates a relationship between the attachment error (rotation angle) of the exposure head 2605 and the light amount on the photosensitive drum 2603 in comparative example 4. In a case where the exposure head 2605 rotates by +0.5° due to the attachment error, the light amount emitted from the first light-emitting unit 2606 and condensed on the photosensitive drum 2603 decreases to 99.99. On the other hand, the light amount emitted from the second light-emitting unit 2607 and condensed on the photosensitive drum 2603 increases to 100.06. Conversely, in a case where the exposure head 2605 rotates by −0.5° due to the attachment error, the light amount emitted from the first light-emitting unit 2606 and condensed on the photosensitive drum 2603 increases to 100.06. On the other hand, the light amount emitted from the second light-emitting unit 2607 and condensed on the photosensitive drum 2603 decreases to 99.99. Thus, in a case where there is light amount fluctuation due to the attachment error of the exposure head 2605, the density of the image formed on the photosensitive drum 2603 changes, and an image with the expected density cannot be obtained.

The reason why the light amount condensed on the photosensitive drum 2603 varies in a case where the exposure head 2605 rotates due to the attachment error will be described. As illustrated in FIG. 100A, the light ray A1 emitted from the light emitter (first light-emitting element) of the first light-emitting unit 2606 enters the first and second gradient index lens arrays 2604-1 and 2604-2. The light ray A1 emitted from the first and second gradient index lens arrays 2604-1 and 2604-2 is condensed on an area centered on the second point on the photosensitive drum 2603 as illustrated in FIG. 101A to form a light source image.

Generally, the surface of the photosensitive drum has a reflectance greater than 0%. Therefore, the light ray A1 condensed on the second point is also reflected. This comparative example assumes that the reflectance of the photosensitive drum 2603 is 10.0%. As illustrated in FIG. 102A, a part of the light rays B1 generated when the light rays A1 are reflected on the photosensitive drum 2603 enters the first gradient index lens array 2604-1. The light ray B1 emitted from the first gradient index lens array 2604-1 is condensed on the first light-emitting unit 2606 as illustrated in FIG. 103A. Generally, the surface of the light-emitting unit also has a reflectance greater than 0%. Therefore, the light ray B1 is also reflected by the first light-emitting unit 2606. In this comparative example, the reflectance of the first light-emitting unit 2606 is 25.0%.

As illustrated in FIG. 104A, the light ray C1 reflected by the first light-emitting unit 2606 follows a similar optical path to that of the light ray A1 as multireflection light (ghost light) and is condensed on the photosensitive drum 2603.

As illustrated in FIG. 100B, the light ray A2 emitted from the light emitter (second light-emitting element) of the second light-emitting unit 2607 enters the first and second gradient index lens arrays 2604-1 and 2604-2. The light ray A2 emitted from the first and second gradient index lens arrays 2604-1 and 2604-2 is condensed on an area centered on the third point on the photosensitive drum 2603 as illustrated in FIG. 101B to form a light source image. As illustrated in FIG. 102B, a part of the light rays B2 generated when the light rays A2 are reflected on the photosensitive drum 2603 enters the second gradient index lens array 2604-2. The light ray B2 emitted from the second gradient index lens array 2604-2 is condensed and reflected on the second light-emitting unit 2607 as illustrated in FIG. 103B. As illustrated in FIG. 104B, the light ray C2 reflected by the second light-emitting unit 2607 follows a similar optical path to that of the light ray A2 as multireflection light and is condensed on the photosensitive drum 2603.

FIGS. 102A and 102B illustrate the light rays B1 and B2 reflected by the photosensitive drum 2603 while there is no attachment error of the exposure head 2605 (attachment angle is 0°) by alternate long and short dash lines, and the light rays B1 and B2 reflected by the photosensitive drum 2603 rotated due to the attachment error (+0.5°) by broken lines.

In a case where the exposure head 2605 rotates from 0° to +0.5°, regarding the light rays B1 (dashed line) emitted from the first light-emitting unit 2606 and reflected by the photosensitive drum 2603, a percentage of a part of the light rays B1 to the light rays B1, which part enters the first gradient index lens array 2604-1, decreases compared to the light ray (alternate long and short dash line) with no attachment error. Therefore, as illustrated in FIG. 105, the light amount emitted from the first light-emitting unit 2606 and condensed on the photosensitive drum 2603 decreases to 99.99. On the other hand, regarding the light rays (broken line) emitted from the second light-emitting unit 2607 and reflected by the photosensitive drum 2603, a percentage of a part of the light rays to the light rays, which part enters the second gradient index lens array 2604-2, increases compared to the light ray (alternate long and short dash line) with no attachment error. Thus, as illustrated in FIG. 105, the light amount emitted from the second light-emitting unit 2607 and condensed on the photosensitive drum 2603 increases to 100.06.

In a case where the exposure head 2605 rotates from 0° to −0.5°, the light amount emitted from the first light-emitting unit 2606 and condensed on the photosensitive drum 2603 increases to 100.06, contrary to the case where the exposure head 2605 is rotated by +0.5°. On the other hand, the light amount emitted from the second light-emitting unit 2607 and condensed on the photosensitive drum 2603 decreases to 99.99.

Thus, in comparative example 4, by rotating the exposure head 2605 by ±0.5°, the light amount fluctuation on the photosensitive drum 2603 due to multireflection light is a maximum of 0.06%.

In this example, the distance T (=0.66 mm) between the light emitter of the first light-emitting unit 2206 and the light emitter of the second light-emitting unit 2207 is set to be longer than T (=0.40 mm) in comparative example 4. Therefore, as illustrated in FIG. 84A, the angle α of the traveling direction of the light ray A1 emitted from the first light-emitting unit 2206 and incident on the first and second gradient index lens arrays 2204-1 and 2204-2 is larger than that in comparative example 4. As a result, as illustrated in FIG. 85A, the light ray B1 emitted from the first light-emitting unit 2206 and reflected by the photosensitive drum 2103 does not enter the first and second gradient index lens arrays 2204-1 and 2204-2. As illustrated in FIGS. 84B and 85B, the light ray B2 emitted from the second light-emitting unit 2207 and reflected by the photosensitive drum 2103 does not enter the first and second gradient index lens arrays 2204-1 and 2204-2.

Figure 86:
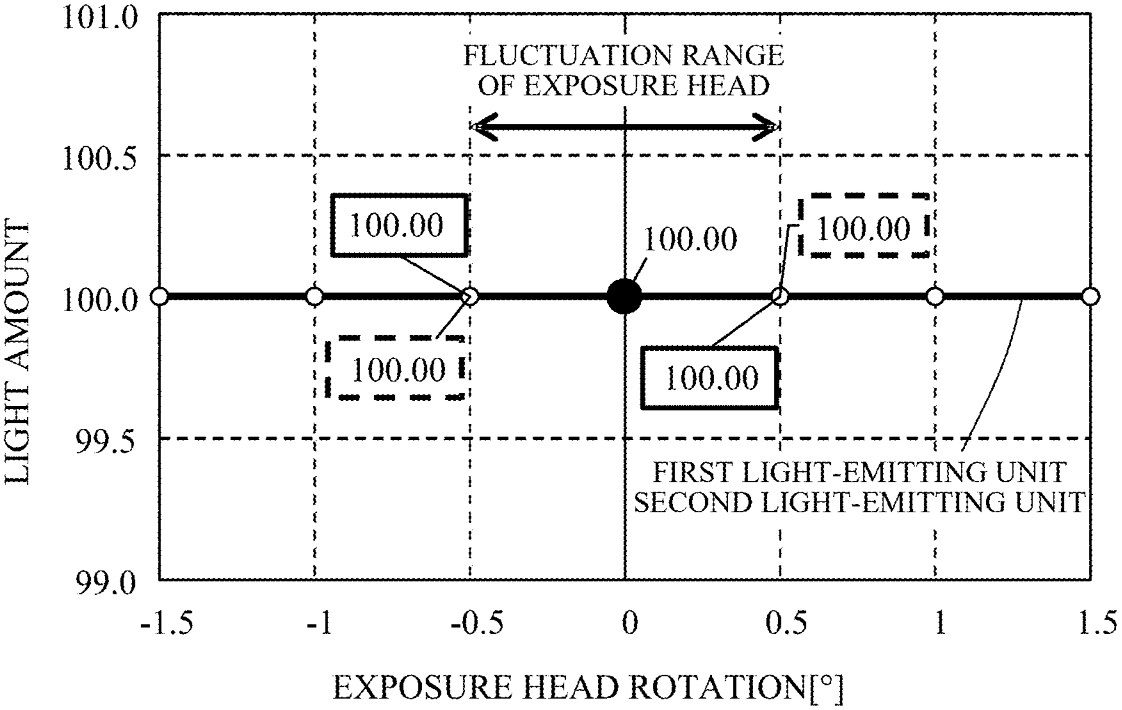
FIG. 86 illustrates a relationship between a rotation angle of the exposure head and a light amount on the photosensitive drum in Example 13.

FIG. 86 illustrates a relationship between the attachment error (rotation angle) of the exposure head 2105 and the light amount on the photosensitive drum 2103 in this example. As described above, the reflected light rays B1 and B do not enter the first and second gradient index lens arrays 2204-1 and 2204-2. Thereby, as illustrated in FIG. 86, even if the exposure head 2105 rotates from 0° to ±0.5°, the light amounts emitted from the first and second light-emitting units 2206 and 2207 and condensed on the photosensitive drum 2103 are both 100.00. In other words, there is no light amount fluctuation on the photosensitive drum 2103 due to the attachment error of the exposure head 2105.

As illustrated in FIG. 86, even if the exposure head 2105 rotates from 0° by a maximum of ±1.5°, the light amount fluctuation on the photosensitive drum 2103 can be eliminated.

Thus, this example can suppress the light amount fluctuation on the photosensitive drum 2103 caused by ghost light as multireflection light in a case where there is an attachment error in the exposure head 2105 more effectively than comparative example 4, and reduce the density change in the image caused by the ghost light.

As the reflectances of the surfaces of the photosensitive drum 2103 and the first and second light-emitting units 2206 and 2207 become higher, the light amount fluctuation on the photosensitive drum 2103 caused by multireflection light can be more effectively suppressed. Thus, the reflectance of the photosensitive drum 2103 may be 5.0% or more, and the reflectances of the first and second light-emitting units 2206 and 2207 may be 25.0% or more. This is similarly applicable to for the other embodiments described later.

Example 14

An exposure head according to Example 14 will now be described. An image forming apparatus in which the exposure head according to Example 14 is used is similar to the image forming apparatus 1 described in Example 1. The exposure head according to Example 14 is different from the exposure head 2105 according to Example 13 in the distance T, but other configurations are similar to those of the exposure head 2105 according to Example 13.

Figure 87:
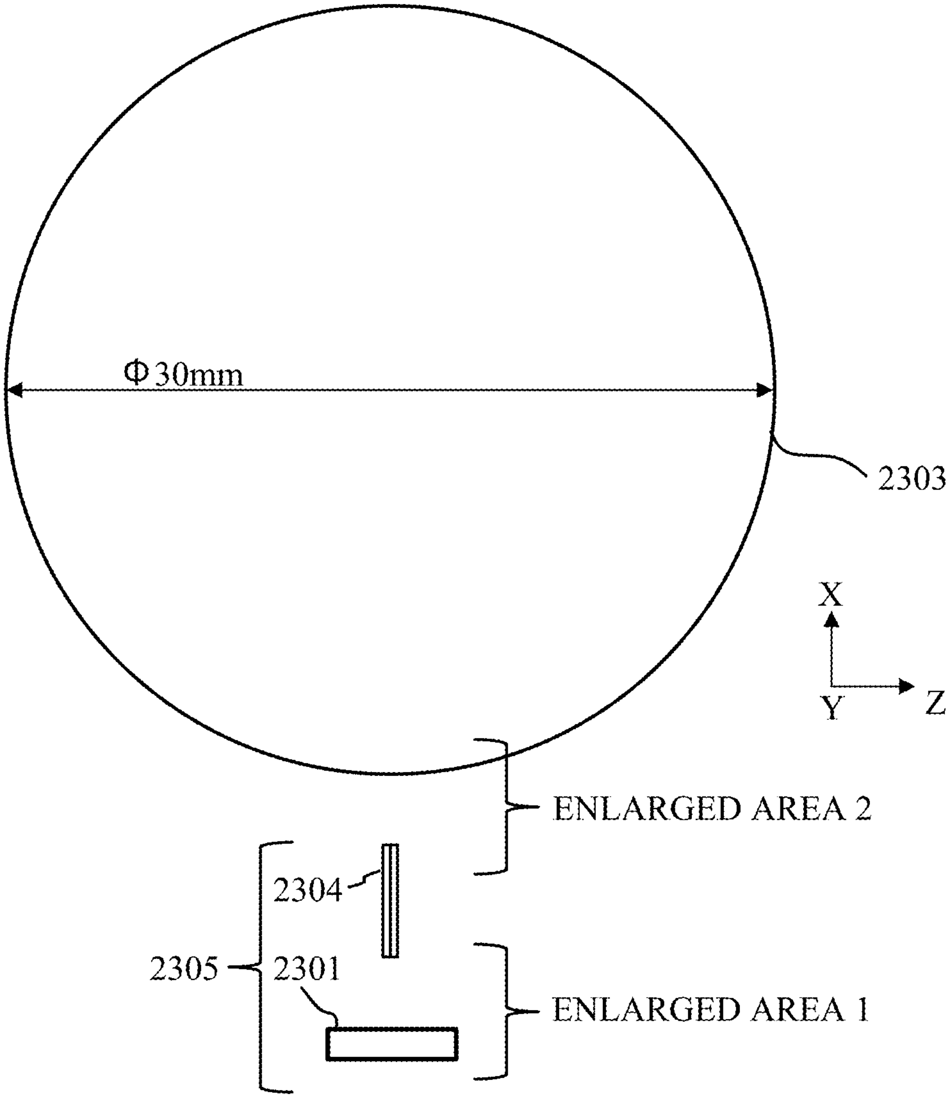
FIG. 87 is a schematic diagram illustrating an exposure head and photosensitive drum in Example 14.
Figure 88A:
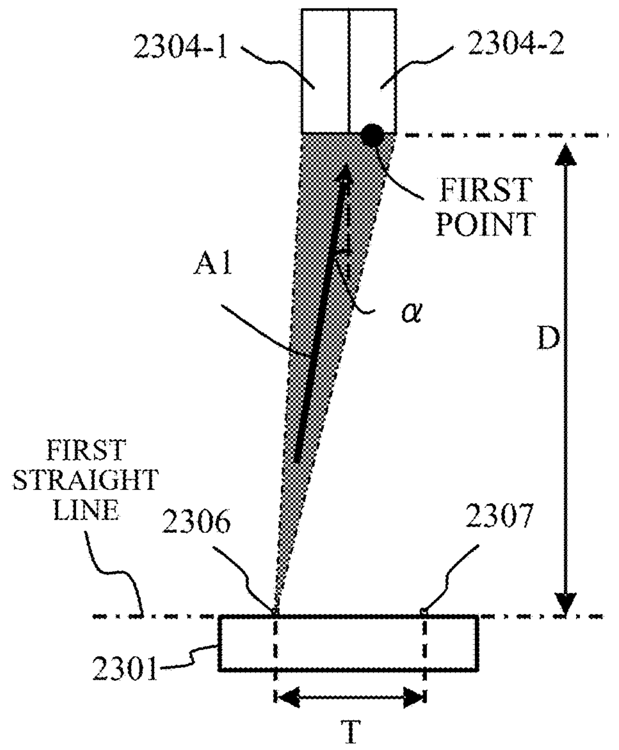
FIGS. 88A and 88B are sectional views illustrating optical paths of the exposure head in Example 14.
Figure 88B:
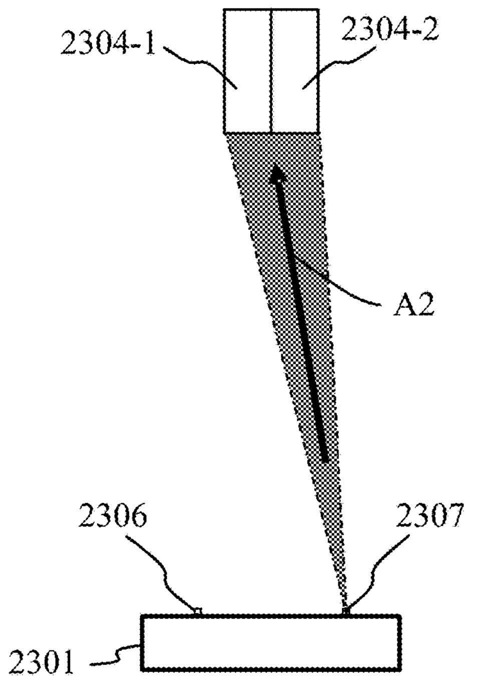

An exposure head 2305 according to this example will be described with reference to FIGS. 87, 88A, 88B, 89A, 89B, and 90. FIG. 87 illustrates a ZX section when viewed from the Y direction, and the arrangement of the exposure head 2305 relative to the photosensitive drum 2303. FIGS. 88A and 88B illustrate an enlarged view of the enlarged area 1 in FIG. 87 when viewed from the Y direction. FIG. 88A illustrates how the light ray A1 emitted from the first light-emitting unit 2306 enters the first and second gradient index lens arrays 2304-1 and 2304-2. FIG. 88B illustrates how the light ray A2 emitted from the second light-emitting unit 2307 enters the first and second gradient index lens arrays 2304-1 and 2304-2.

Figure 89A:
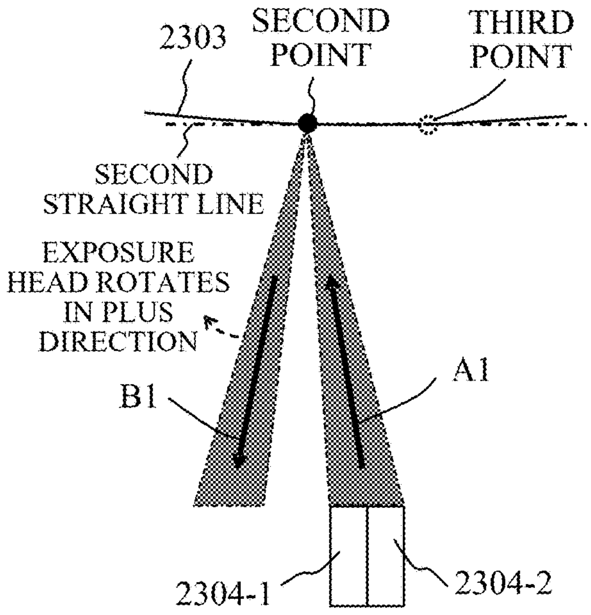
FIGS. 89A and 89B are sectional views illustrating optical paths between the exposure head and the photosensitive drum in Example 14.
Figure 89B:
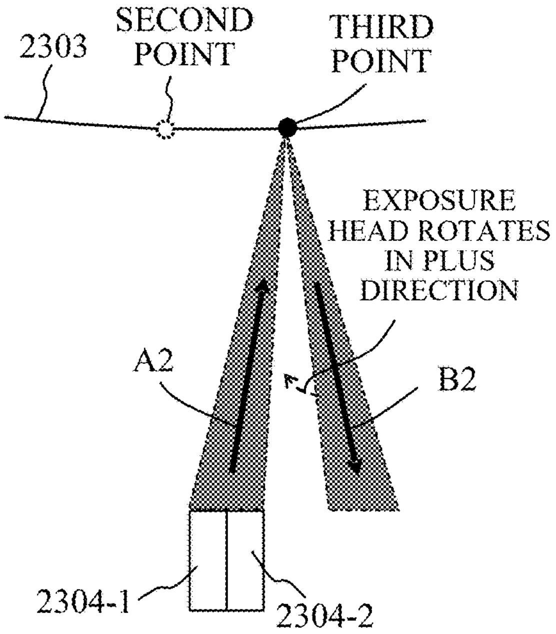

FIGS. 89A and 89B illustrate an enlarged view of the enlarged area 2 in FIG. 87. FIG. 89A illustrates how the light ray A1, which is emitted from the first light-emitting unit 2306 and then from the first and second gradient index lens arrays 2304-1 and 2304-2, is condensed at a second point on the photosensitive drum 2303, and the light ray B1 generated when the light ray A1 is reflected by the photosensitive drum 2303. FIG. 89B illustrates how the light ray A2 emitted from the second light-emitting unit 2307 and then emitted from the first and second gradient index lens arrays 2304-1 and 2304-2 is condensed at a third point on the photosensitive drum 2303, and the light ray B2 generated when the light ray A2 is reflected by the photosensitive drum 2303.

In this example, the diameter of the photosensitive drum 2303 is 30 mm, D is 2.74 mm, T is 0.86 mm, and θ is 0°. Therefore, T/D is 0.31, which satisfies inequality (7). θ is 0°, which satisfies inequality (8).

Even in this example, the distance T (=0.86 mm) between the light emitter of the first light-emitting unit 2306 and the light emitter of the second light-emitting unit 2307 is longer than T (=0.40 mm) in comparative example 4. Therefore, similarly to Example 1, the light rays B1 and B2 generated when the light rays A1 and A2 are reflected on the photosensitive drum 2303 do not enter the first and second gradient index lens arrays 2304-1 and 2304-2.

Figure 90:
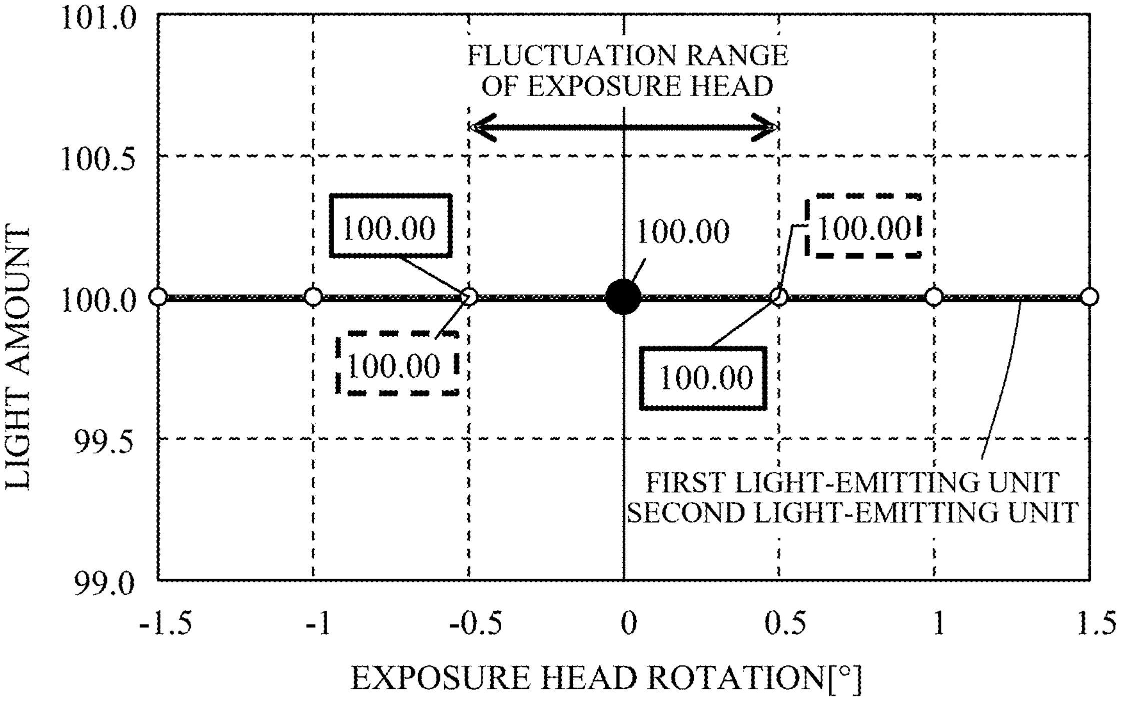
FIG. 90 illustrates a relationship between a rotation angle of the exposure head and a light amount on the photosensitive drum in Example 14.

FIG. 90 illustrates a relationship between the attachment error (rotation angle) of the exposure head 2305 and the light amount on the photosensitive drum 2303 in this example. As described above, even if the exposure head 2305 rotates from 0° to ±0.5°, the reflected light rays B1 and B2 do not enter the first and second gradient index lens arrays 2304-1 and 2304-2. Thereby, as illustrated in FIG. 90, the light amount emitted from the first and second light-emitting units 2306 and 2307 and condensed on the photosensitive drum 2303 is 100.00. In other words, there is no light amount fluctuation on the photosensitive drum 2303 due to the attachment error of the exposure head 2305. As illustrated in FIG. 90, even if the exposure head 2305 rotates from 0° by a maximum of ±1.5°, the light amount fluctuation on the photosensitive drum 2303 can be eliminated.

Thus, this example can suppress the light amount fluctuation on the photosensitive drum 2303 caused by ghost light as multireflection light more effectively than comparative example 4, and reduce the density change in the image caused by ghost light.

Example 15

An exposure head according to Example 15 will now be described. An image forming apparatus in which the exposure head according to Example 15 is used is similar to the image forming apparatus 1 described in Example 1. The exposure head according to Example 15 is different from the exposure head 2105 according to Example 13 in the distance T, but other configurations are similar to those of the exposure head 2105 according to Example 13.

Figure 91:
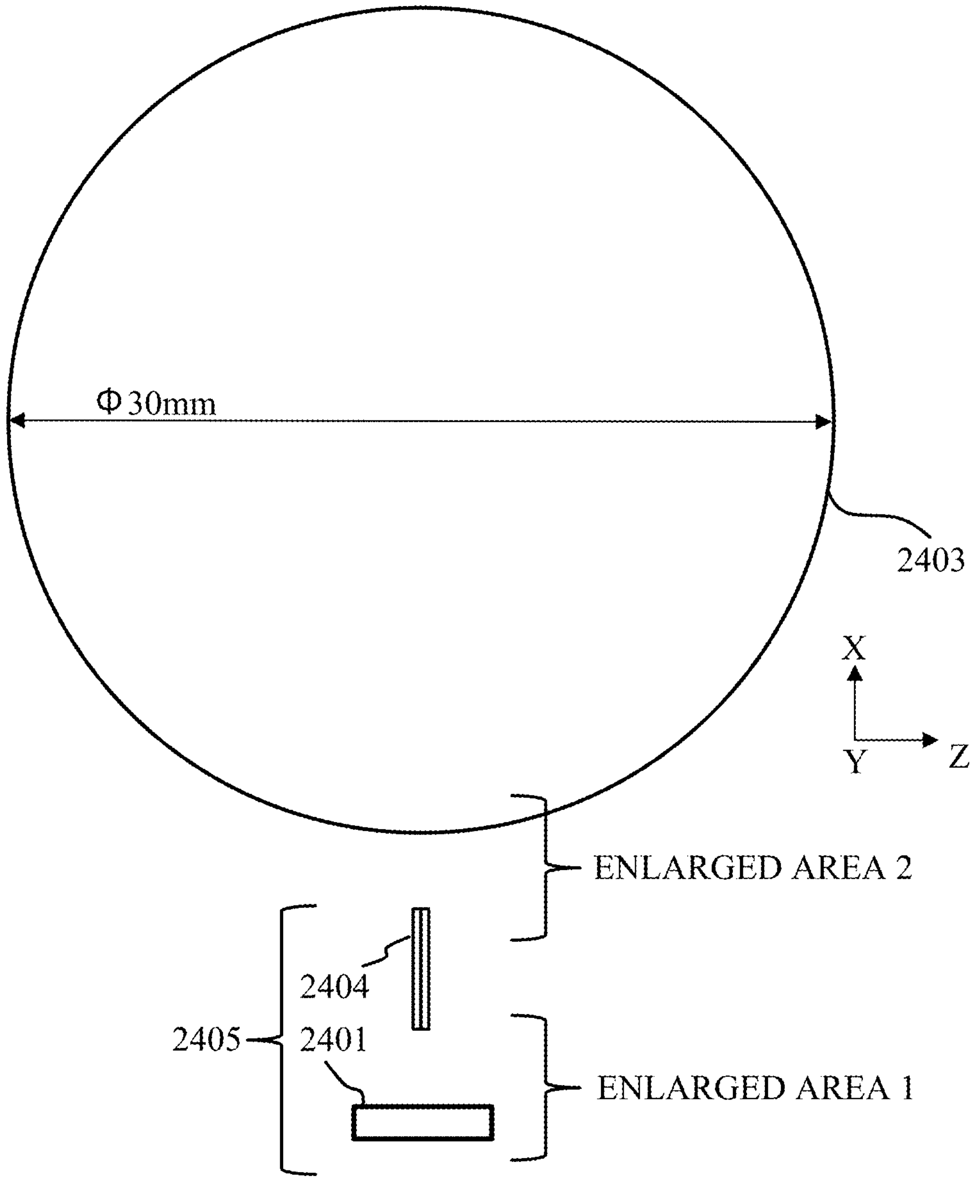
FIG. 91 is a schematic diagram illustrating an exposure head and photosensitive drum in Example 15.
Figure 92A:
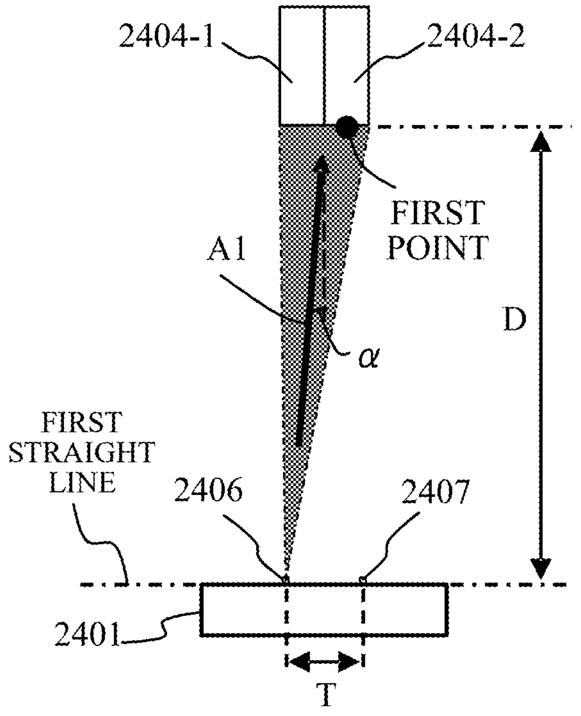
FIGS. 92A and 92B are sectional views illustrating optical paths of the exposure head in Example 15.
Figure 92B:
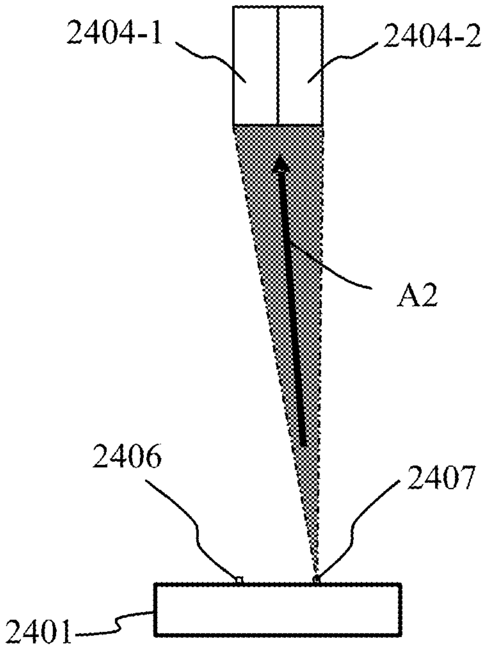

An exposure head 2405 according to this example will be described with reference to FIGS. 91, 92A, 92B, 93A, 93B, and 94. FIG. 91 illustrates a ZX section when viewed from the Y direction, and the arrangement of the exposure head 2405 according to this example relative to the photosensitive drum 2403. FIGS. 92A and 92B illustrate an enlarged view of the enlarged area 1 in FIG. 91 when viewed from the Y direction. FIG. 92A illustrates how the light ray A1 emitted from the first light-emitting unit 2406 enters the first and second gradient index lens arrays 2404-1 and 2404-2. FIG. 92B illustrates how the light ray A2 emitted from the second light-emitting unit 2407 enters the first and second gradient index lens arrays 2404-1 and 2404-2.

Figure 93A:
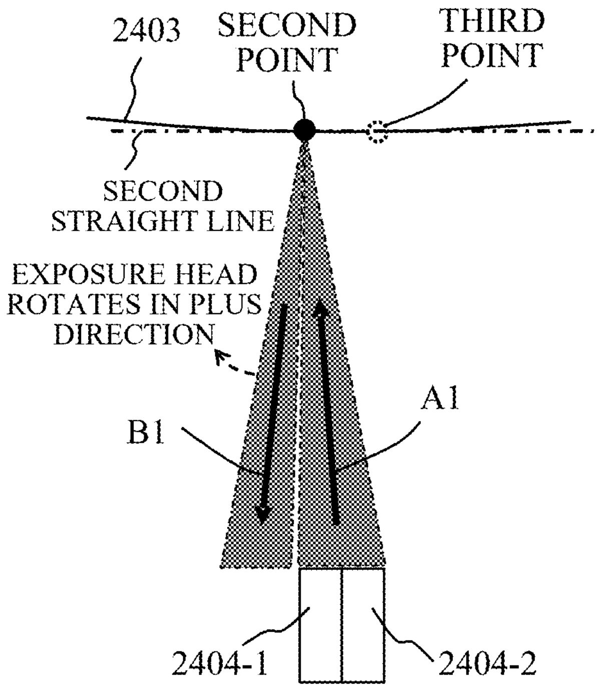
FIGS. 93A and 93B are sectional views illustrating optical paths between the exposure head and the photosensitive drum in Example 15.
Figure 93B:
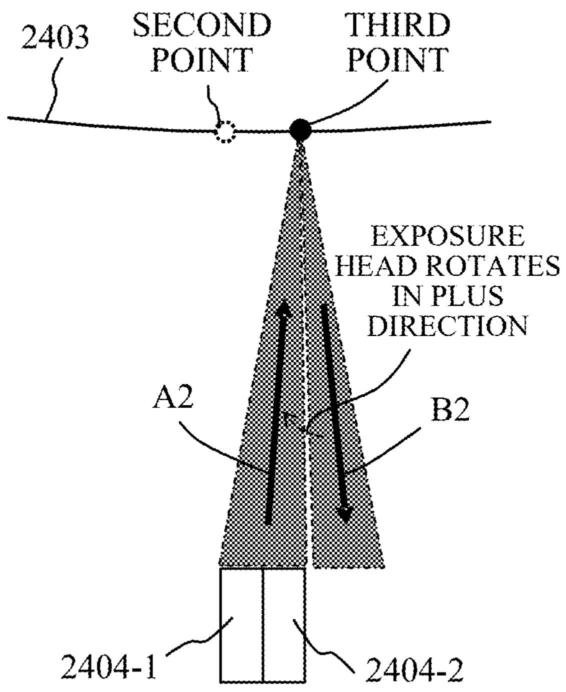

FIGS. 93A and 93B illustrate an enlarged view of the enlarged area 2 in FIG. 91. FIG. 93A illustrates how the light ray A1 emitted from the first light-emitting unit 2406 and then emitted from the first and second gradient index lens arrays 2404-1 and 2404-2 is condensed at the second point on the photosensitive drum 2403, and the light ray B1 generated when the light ray A1 is reflected by the photosensitive drum 2403. FIG. 93B illustrates how the light ray A2 emitted from the second light-emitting unit 2407 and then emitted from the first and second gradient index lens arrays 2404-1 and 2404-2 is condensed at the third point on the photosensitive drum 2403, and the light ray B2 generated when the light ray A2 is reflected by the photosensitive drum 2403.

In this example, the diameter of the photosensitive drum 2403 is 30 mm, D is 2.74 mm, T is 0.46 mm, and θ is 0°. Therefore, T/D=0.17, which satisfies inequality (7). θ=0°, which satisfies inequality (8).

In this example as well, the distance T (=0.46 mm) between the light emitter of the first light-emitting unit 2406 and the light emitter of the second light-emitting unit 2407 is longer than T (=0.40 mm) in comparative example 4. Therefore, as in Example 1, the light rays B1 and B2 generated when the light rays A1 and A2 are reflected by the photosensitive drum 2403 do not enter the first and second gradient index lens arrays 2404-1 and 2404-2.

Figure 94:
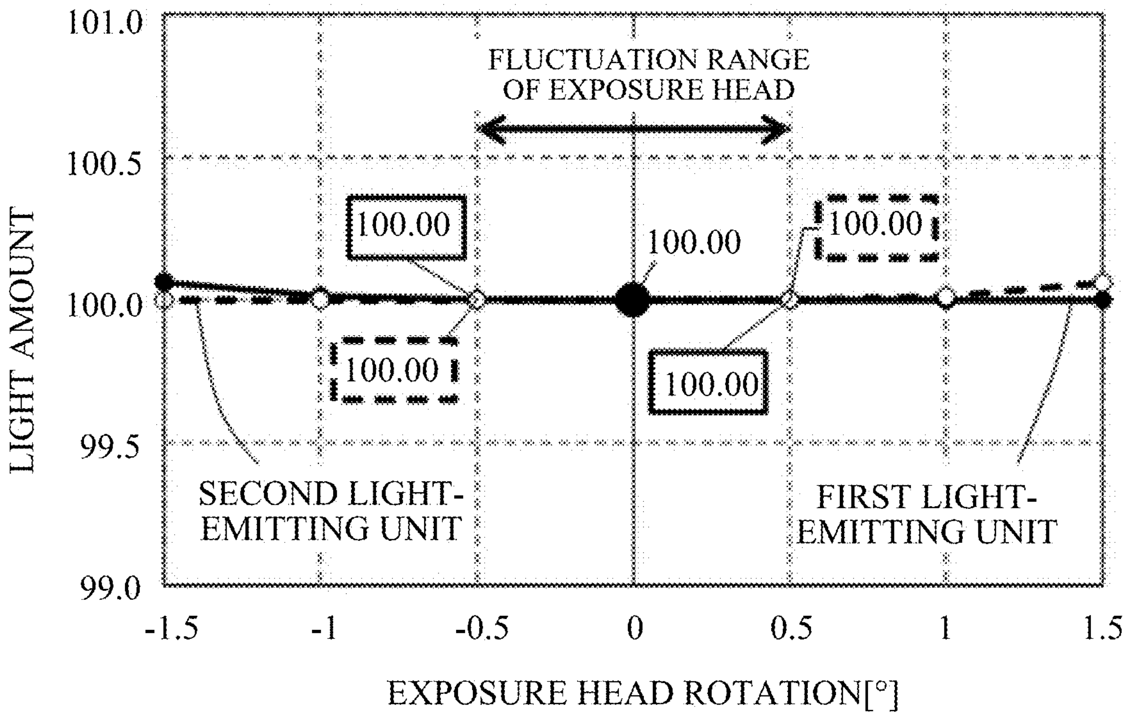
FIG. 94 illustrates a relationship between a rotation angle of the exposure head and a light amount on the photosensitive drum in Example 15.

FIG. 94 illustrates a relationship between the attachment error (rotation angle) of the exposure head 2405 and the light amount on the photosensitive drum 2403 in this example. As described above, even if the exposure head 2405 rotates from 0° to ±0.5°, the reflected light ray B1 and B2 do not enter the first and second gradient index lens arrays 2404-1 and 2404-2. Thereby, as illustrated in FIG. 94, the light amount emitted from the first and second light-emitting units 2406 and 2407 and condensed on the photosensitive drum 2403 is 100.00. In other words, there is no light amount fluctuation on the photosensitive drum 2403 due to the attachment error of the exposure head 2405. As illustrated in FIG. 94, even if the exposure head 2405 rotates from 0° to a maximum of ±1.0°, the light amount fluctuation on the photosensitive drum 2403 can be almost eliminated.

Thus, this example can also suppress the light amount fluctuation on the photosensitive drum 2403 caused by ghost light as multireflection light more effectively than comparative example 4, and reduce the density change in the image caused by ghost light.

Example 16

An exposure head according to Example 16 will now be described. An image forming apparatus in which the exposure head according to Example 16 is used is similar to the image forming apparatus 1 described in Example 1. The exposure head according to Example 16 is different from the exposure head 2105 according to Example 13 in the distance T, and other configurations are similar to the exposure head 2105 according to Example 13.

Figure 95:
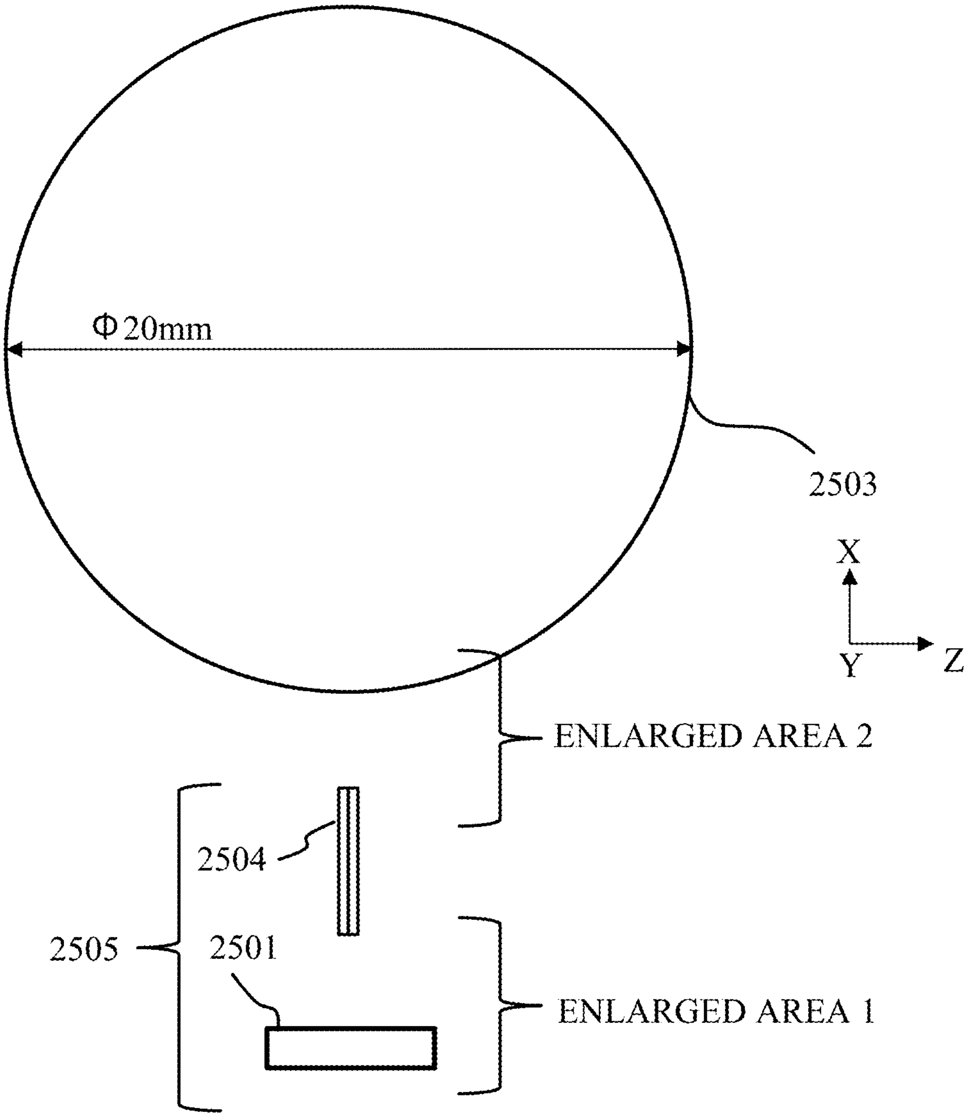
FIG. 95 is a schematic diagram illustrating an exposure head and photosensitive drum in Example 16.
Figure 96A:
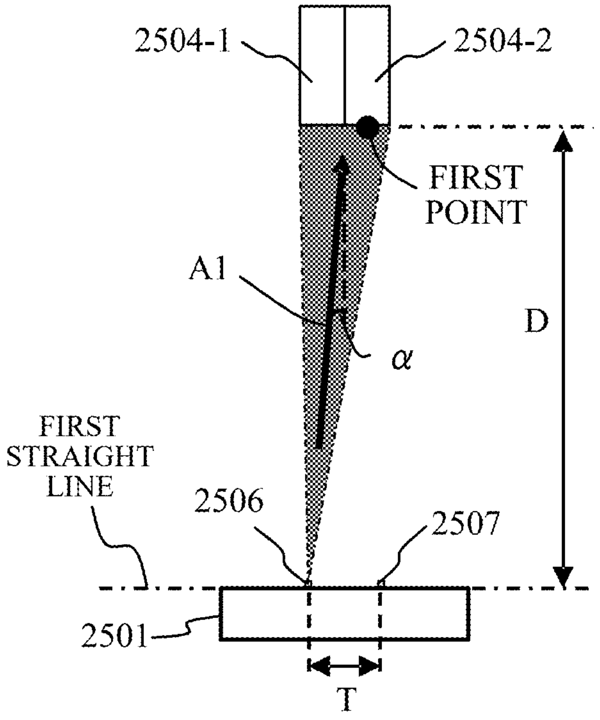
FIGS. 96A and 96B are sectional views illustrating optical paths of the exposure head in Example 16.
Figure 96B:
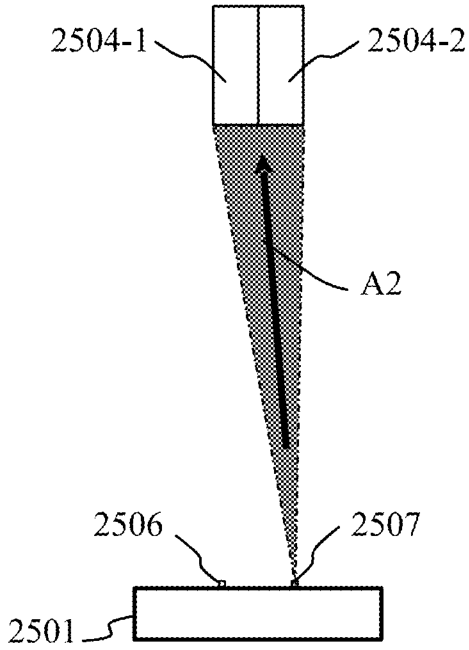

The exposure head 2505 according to this example will be described with reference to FIGS. 95, 96A, 96B, 97A, 97B, and 98. FIG. 95 illustrates a ZX section when viewed from the Y direction, and the arrangement of the exposure head 2505 according to this example relative to the photosensitive drum 2503. FIGS. 96A and 96B illustrate an enlarged view of the enlarged area 1 in FIG. 95 when viewed from the Y direction. FIG. 96A illustrates how the light ray A1 emitted from the first light-emitting unit 2506 enters the first and second gradient index lens arrays 2504-1 and 2504-2. FIG. 96B illustrates how the light ray A2 emitted from the second light-emitting unit 2507 enters the first and second gradient index lens arrays 2504-1 and 2504-2.

Figure 97A:
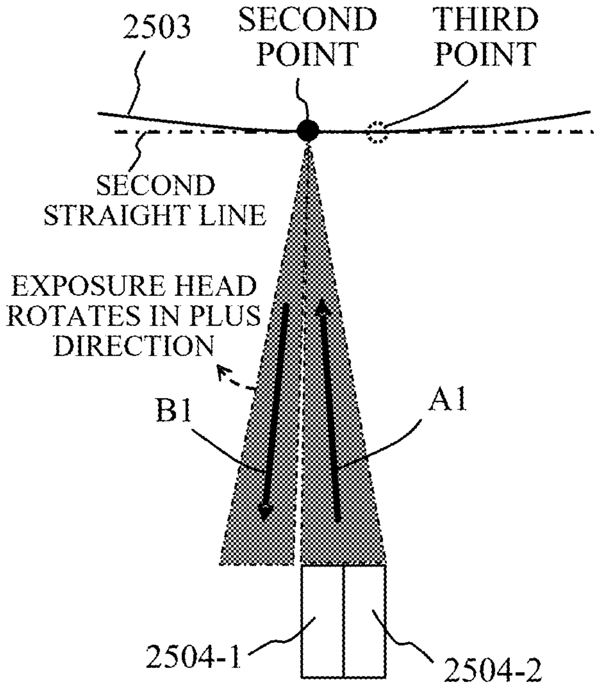
FIGS. 97A and 97B are sectional views illustrating optical paths between the exposure head and the photosensitive drum in Example 16.
Figure 97B:
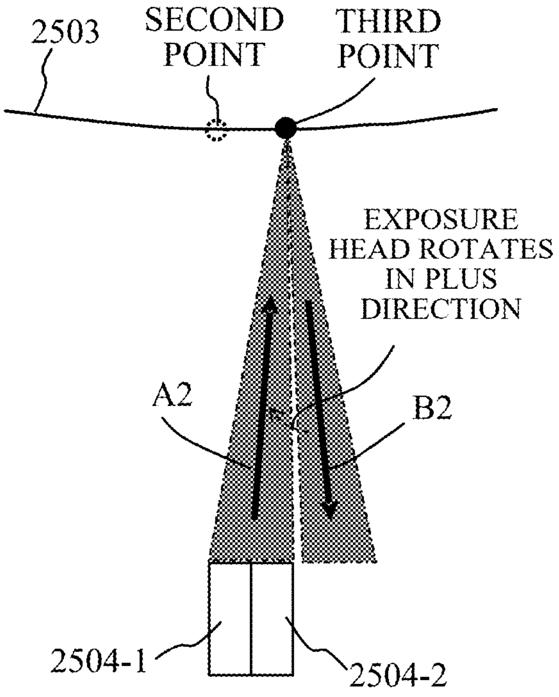

FIGS. 97A and 97B illustrate an enlarged view of the enlarged area 2 in FIG. 95. FIG. 97A illustrates how the light ray A1 emitted from the first light-emitting unit 2506 and then from the first and second gradient index lens arrays 2504-1 and 2504-2 is condensed at the second point on the photosensitive drum 2503, and the light ray B1 generated when the light ray A1 is reflected by the photosensitive drum 2503. FIG. 97B illustrates how the light ray A2 emitted from the second light-emitting unit 2507 and then emitted from the first and second gradient index lens arrays 2504-1 and 2504-2 is condensed at the third point on the photosensitive drum 2503, and the light ray B2 generated when the light ray A2 is reflected by the photosensitive drum 2503.

In this example, the diameter of the photosensitive drum 2503 is 20 mm, D is 2.74 mm, T is 0.44 mm, and θ is 0°. T/D is 0.16, which satisfies inequality (7). θ is 0°, which satisfies inequality (8).

In this example as well, the distance T (=0.44 mm) between the light emitter of the first light-emitting unit 2506 and the light emitter of the second light-emitting unit 2507 is longer than T (=0.40 mm) in comparative example 4. Therefore, similarly to Example 1, the light rays B1 and B2 generated when the light rays A1 and A2 are reflected on the photosensitive drum 2503 do not enter the first and second gradient index lens arrays 2504-1 and 2504-2.

Figure 98:
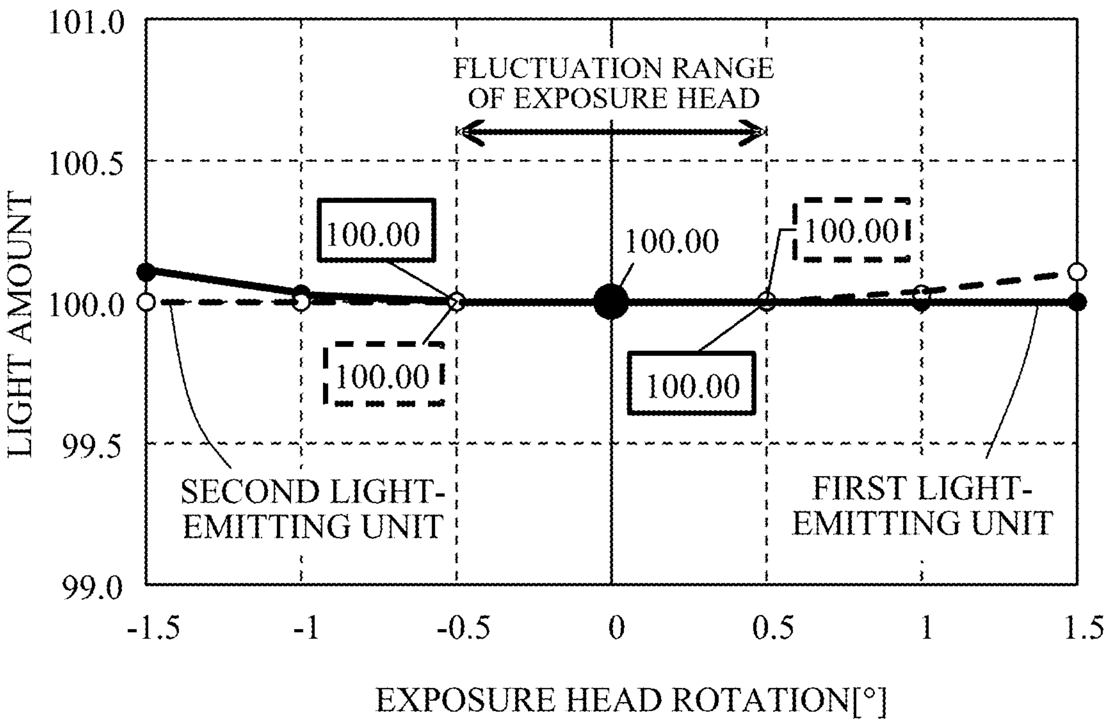
FIG. 98 illustrates a relationship between a rotation angle of the exposure head and a light amount on the photosensitive drum in Example 16.

FIG. 98 illustrates a relationship between the attachment error (rotation angle) of the exposure head 2505 and the light amount on the photosensitive drum 2503 in this example. As described above, even if the exposure head 2505 rotates from 0° to ±0.5°, the reflected light rays B1 and B2 do not enter the first and second gradient index lens arrays 2504-1 and 2504-2. As a result, as illustrated in FIG. 98, the light amount emitted from the first and second light-emitting units 2506 and 2507 and condensed on the photosensitive drum 2503 is 100.00. In other words, the light amount fluctuation on the photosensitive drum 2503 caused by the attachment error of the exposure head 2505 can be eliminated. As illustrated in FIG. 98, even in a case where the exposure head 2505 rotates from 0° by a maximum of ±0.75°, the light amount fluctuation on the photosensitive drum 2503 can be almost completely eliminated.

Thus, this example can also suppress the light amount fluctuation on the photosensitive drum 2503 caused by ghost light as multireflection light more effectively than comparative example 4, and reduce the density change in the image caused by ghost light.

In Examples 13 to 16, all of the plurality of first light-emitting units and the plurality of second light-emitting units may satisfy inequality (7), but it is not necessary that all of the plurality of first light-emitting units and the plurality of second light-emitting units satisfy inequality (7). In other words, in a case where N is the total number of first and second light-emitting units, the number of first and second light-emitting units that satisfy inequality (7) may be 0.7×N or more, or 1.0×N. The number of first and second light-emitting units that satisfy both inequalities (7) and (8) may be 0.7×N or more, or 1.0×N.

Examples 13 to 16 can reduce unnecessary reflected light caused by the attachment error of the light source apparatus.

Examples 17 to 20 below correspond to claims 14 to 17 and 20.

Example 17

Basic Configuration of Exposure Head

The basic configuration of an exposure head 3105 according to Example 17 will be described with reference to FIGS. 106A, 106B, 107A, 107B, 107C, and 108. The exposure head 3105 is used in place of the exposure head 105 illustrated in FIGS. 2A and 2B in the image forming apparatus 1 illustrated in FIG. 1.

Figure 106A:
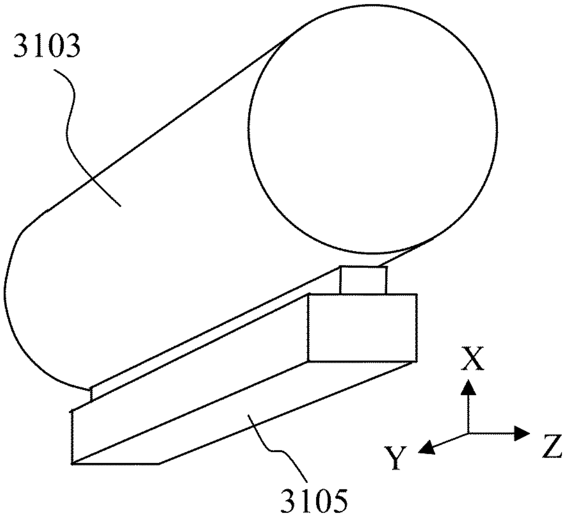
FIGS. 106A and 106B illustrate an exposure head and photosensitive drum in Example 17.
Figure 106B:
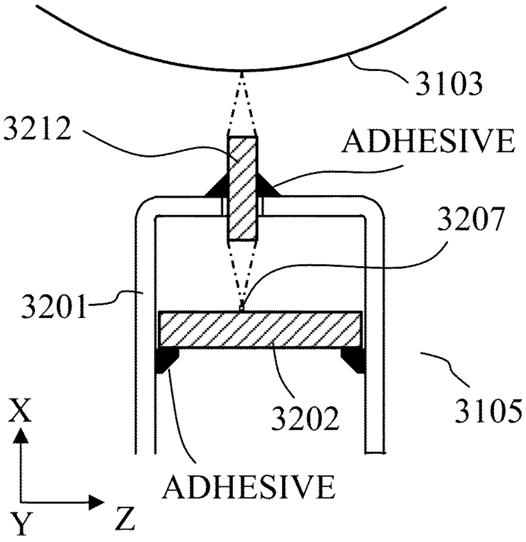

FIG. 106A illustrates the arrangement of the exposure head 3105 relative to the photosensitive drum 3103. FIG. 106B illustrates a ZX section (short side (widthwise) section, sub-scanning section), which is a plane orthogonal (perpendicular) to the Y direction when viewed from the Y direction, and illustrates how light emitted from the light-emitting element row 3207 is condensed on the photosensitive drum 3103 by a gradient index lens array 3212 serving as a lens unit. This example uses a gradient index lens array as the lens unit, but may use another lens array.

Figure 107A:
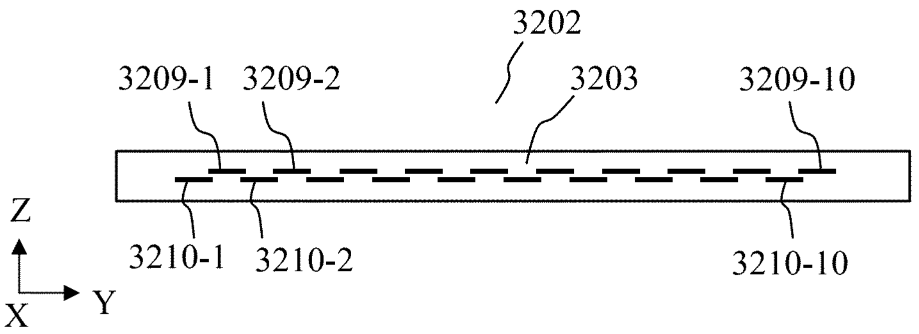
FIGS. 107A, 107B, and 107C illustrate a light-emitting substrate in the exposure head in Example 17.
Figure 107B:
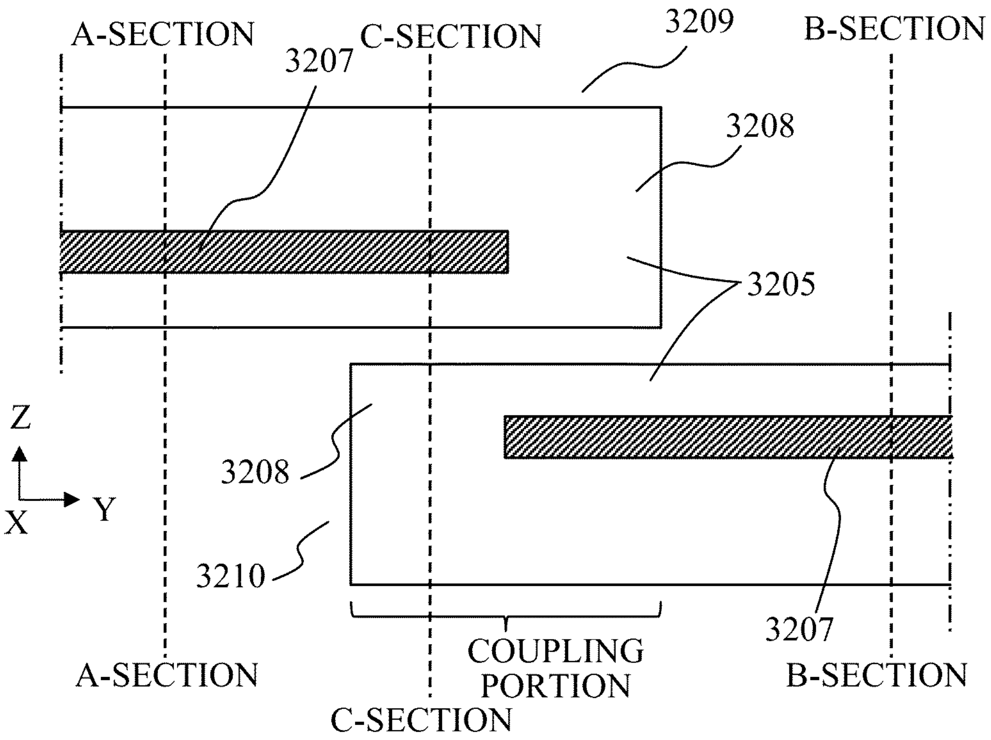

FIG. 107A illustrates a YZ section of a plurality of first light-emitting units 3209 (3209-1 to 3209-10) and a plurality of second light-emitting units 3210 (3210-1 to 3210-10) serving as light-emitting element array chips mounted on the mounting surface (first surface, referred to as a substrate mounting surface hereafter) 3203 of a light-emitting substrate 3202. FIG. 107B illustrates an enlarged YZ section of a coupling part (joint) between one of the plurality of first light-emitting units 3209 and one adjacent second light-emitting unit 3210. The coupling part is a part in the Y direction where one of the first light-emitting units 3209 and one adjacent second light-emitting unit 3210 overlap each other in the Z direction, and will also be called a coupler.

Figure 107C:
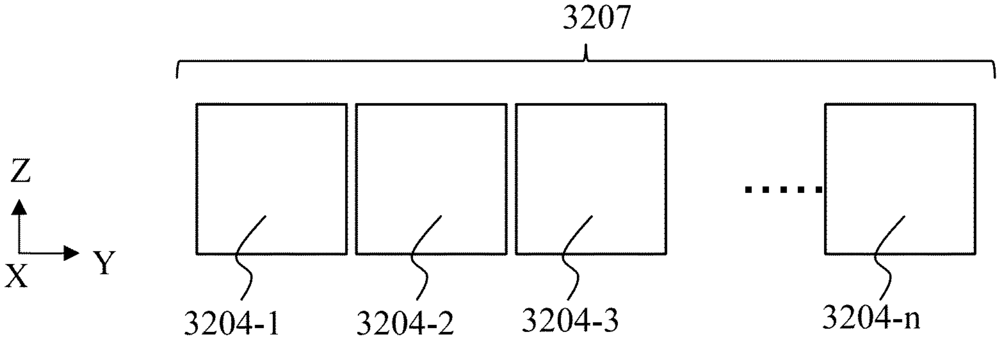

Each light-emitting unit has a light-emitting element row 3207 including a plurality of light-emitting elements 3204 (3204-1 to 3204-*n*) arranged in a row in the Y direction as illustrated in FIG. 107C. The light-emitting elements are light-emitting devices such as LEDs and organic ELs.

Figure 108:
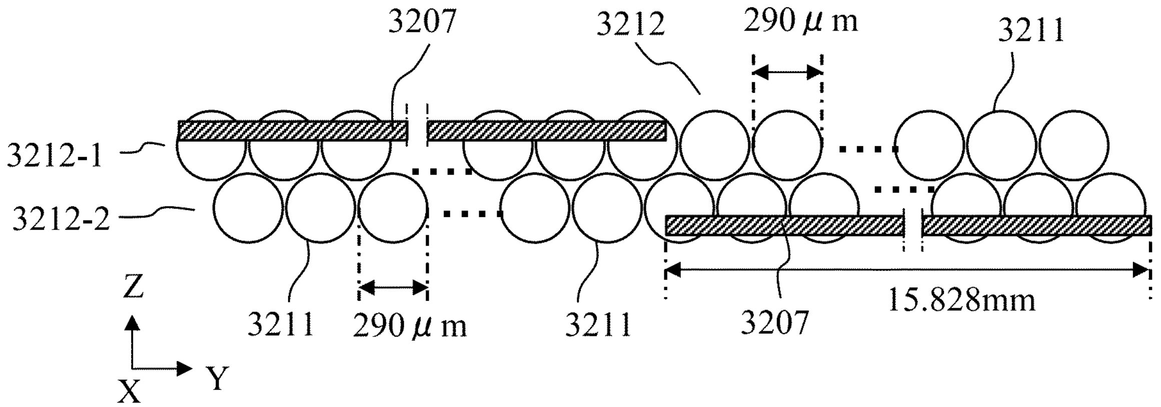
FIG. 108 illustrates a light-emitting unit and gradient index lens array in the exposure head in Example 17.

FIG. 108 illustrates a positional relationship in the YZ section among the light-emitting element row 3207 of the first light-emitting units 3209 and the second light-emitting units 3210 and the first gradient index lens array 3212-1 and the second gradient index lens array 3212-2.

As illustrated in FIGS. 106B and 107A, the exposure head 3105 includes the plurality of first light-emitting units 3209 (3209-1 to 3209-10) and the plurality of second light-emitting units 3210 (3210-1 to 3210-10) mounted on the light-emitting substrate 3202, the gradient index lens array 3212, and a housing 3201. As described above, the plurality of first light-emitting units 3209 and the plurality of second light-emitting units 3210, each having the light-emitting element row 3207, are mounted on the substrate mounting surface (first surface) 3203 of the light-emitting substrate 3202.

The plurality of first light-emitting units 3209 (3209-1 to 3210-10) are arranged in a row in the Y direction (first direction), which is the longitudinal direction of each light-emitting unit. The plurality of second light-emitting units 3210 (3210-1 to 3210-10) are arranged in a row in the Y direction at different positions in the Z direction (second direction orthogonal to the first direction, sub-scanning direction), which is the short side direction of each light-emitting unit, relative to the arrangement position of the first light-emitting units 3209. The plurality of first light-emitting units 3209 and the plurality of second light-emitting units 3210 are arranged at positions shifted from each other in the Y direction. More specifically, the first light-emitting units 3209 and the second light-emitting units 3210 are arranged so that they partially overlap each other in the Z direction, and the +Y direction end of the light-emitting element row 3207 of the first light-emitting unit 3209 and the Y direction position of the −Y direction end of the light-emitting element row 3207 of the second light-emitting unit 3210 coincide with each other. Thus, the plurality of first light-emitting units 3209 and the plurality of second light-emitting units 3210 are arranged in two staggered rows.

As illustrated in FIGS. 107B and 108, in each of the first light-emitting unit 3209 and the second light-emitting unit 3210, which are semiconductor chips, the light-emitting element row 3207 including the plurality of light-emitting elements 3204 is mounted on a mounting surface (second surface, referred to as a unit mounting surface hereinafter) 3205. The unit mounting surface 3205 has a light-emitting element row 3207 constituting a light emitter and a non-light emitter 3208. In this example, n=748 light-emitting elements 3204 are arranged in the Y direction at a predetermined image resolution pitch in the light-emitting element row 3207 of each light-emitting unit. The image resolution pitch is, for example, 1200 dpi (approximately 21.16 μm). A length from the −Y direction end to the +Y direction end of the light-emitting element row 3207 including 748 light-emitting elements 3204 is approximately 15.8 mm.

Each of the plurality of first light-emitting units 3209 and the plurality of second light-emitting units 3210 includes 10 light-emitting units. That is, the total number of first and second light-emitting units 3209 and 3210 is 20. Thereby, the total number of light-emitting elements 3204 is 14960, and an image corresponding to an image width of approximately 316 mm can be formed.

Each light-emitting unit is configured by laminating a lower electrode layer, a light-emitting layer, and an upper electrode layer in this order on a Si substrate. The light-emitting layer forms the plurality of light-emitting elements 3204, and the upper electrode layer forming the surface of the unit mounting surface 3205 increases the reflectance of the non-light emitter 3208. For example, the reflectance of the non-light emitter 3208 is 80%. Each light-emitting unit also includes an unillustrated circuit portion for controlling the plurality of light-emitting elements 3204.

Figure 130:
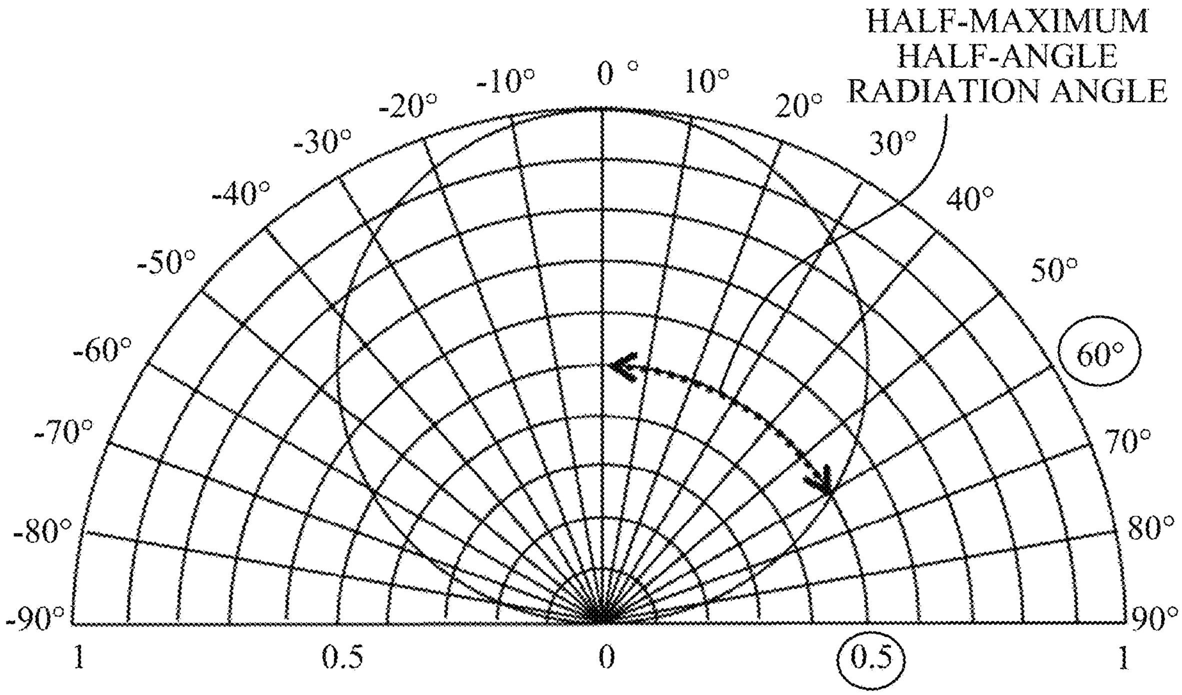

FIG. 130 illustrates a light distribution characteristic of the light emitted from the light-emitting element 3204. In this example, the light-emitting element 3204 has a Lambertian light-emission characteristic, but the light-emission characteristic of the light-emitting element is not limited to this example. In this example, the light-emission spectrum of the light-emitting element 3204 has a peak at 600 nm, but the light-emission spectrum is not limited to this example, and a light-emitting element that emits near-infrared light with a peak at 780 nm, for example, may be used.

As illustrated in FIG. 108, the gradient index lens array 3212 has a first gradient index lens array 3212-1 extending in the Y direction and a second gradient index lens array 3212-2 extending in the Y direction at a position shifted in the Z direction from that of the first gradient index lens array 3212-1. Each of the first and second gradient index lens arrays 3212-1 and 3212-2 includes a plurality of gradient index lenses 3211 arranged at a predetermined pitch in the Y direction. As an example, the diameter of each gradient index lens 3211 having a cylindrical shape is 290 μm.

In the ZX section illustrated in FIG. 106B, the gradient index lens array 3212 is disposed so that a distance from the light-emitting element row 3207 to each lens 3211 is a first predetermined distance, and a distance from the exit surface of each lens 3211 to the surface of the photosensitive drum 3103 is a second predetermined distance. The first predetermined distance and the second predetermined distance are approximately equal to each other. The gradient index lens array 3212 images the light emitted from the light-emitting element row 3207 so that an erect image is formed at equal magnification on the photosensitive drum 3103.

The gradient index lens array 3212 and the light-emitting substrate 3202 are fixed to the housing 3201 with an adhesive (agent).

The exposure head 3105 having the above configuration is assembled individually at the factory, and is completed by performing focusing and light amount adjustment to adjust the spot at the light-condensing position to a predetermined size. In the focusing, the attachment position of the gradient index lens array 3212 is adjusted so that the distance between the gradient index lens array 3212 and the light-emitting element row 3207 is the first predetermined distance. In the light amount adjustment, each of the light-emitting elements 3204 in the light-emitting element row 3207 is sequentially made to emit light, and the drive current of each light-emitting element is adjusted so that the light condensed on the photosensitive drum 3103 via the gradient index lens array 3212 has a predetermined light intensity.

Detailed Configuration of Exposure Head

The detailed configuration of the exposure head 3105 according to Example 17 will be described with reference to FIGS. 109, 110A, 110B, 110C, 111A, 111B, 112A, 112B, 113A, and 113B.

Figure 109:
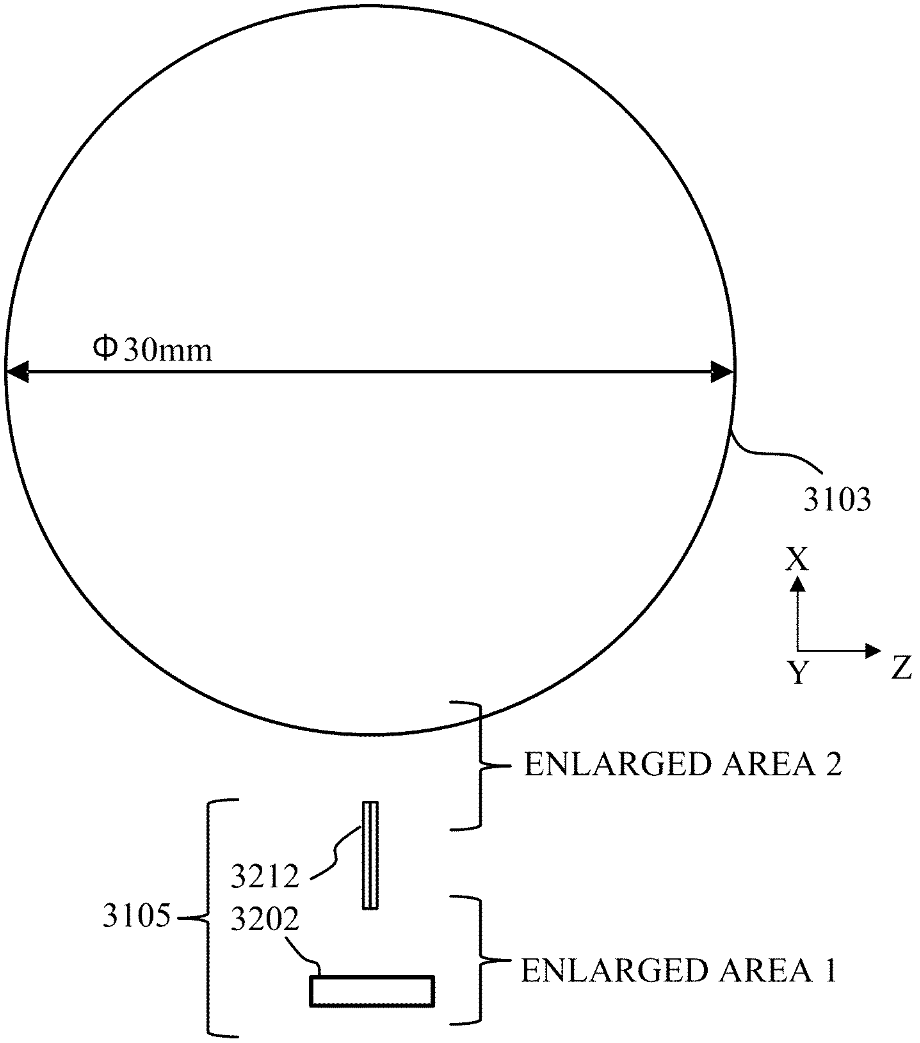
FIG. 109 is a schematic diagram illustrating the exposure head and photosensitive drum in Example 17.
Figure 110B:
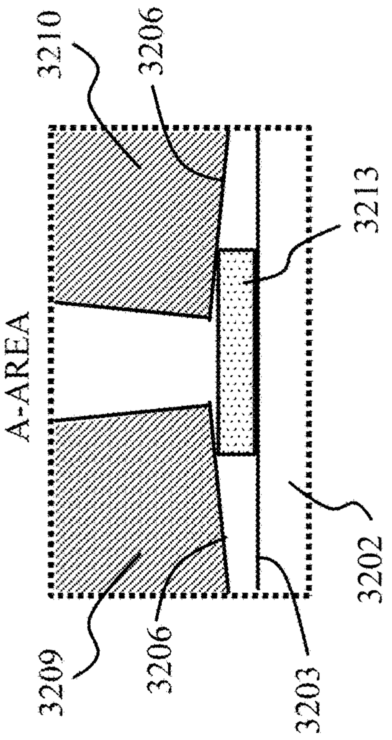
FIGS. 110A, 110B, and 110C illustrate the light-emitting substrate, first and second light-emitting units, and gradient index lens array in the exposure head in Example 17.
Figure 110C:
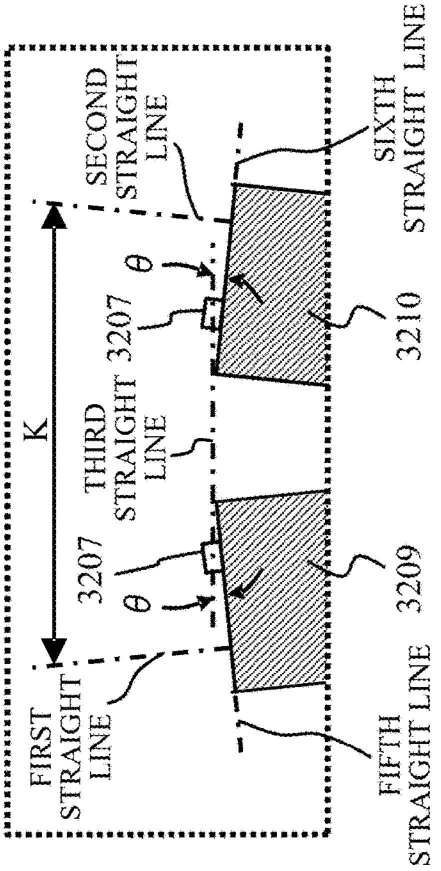
Figure 110A:
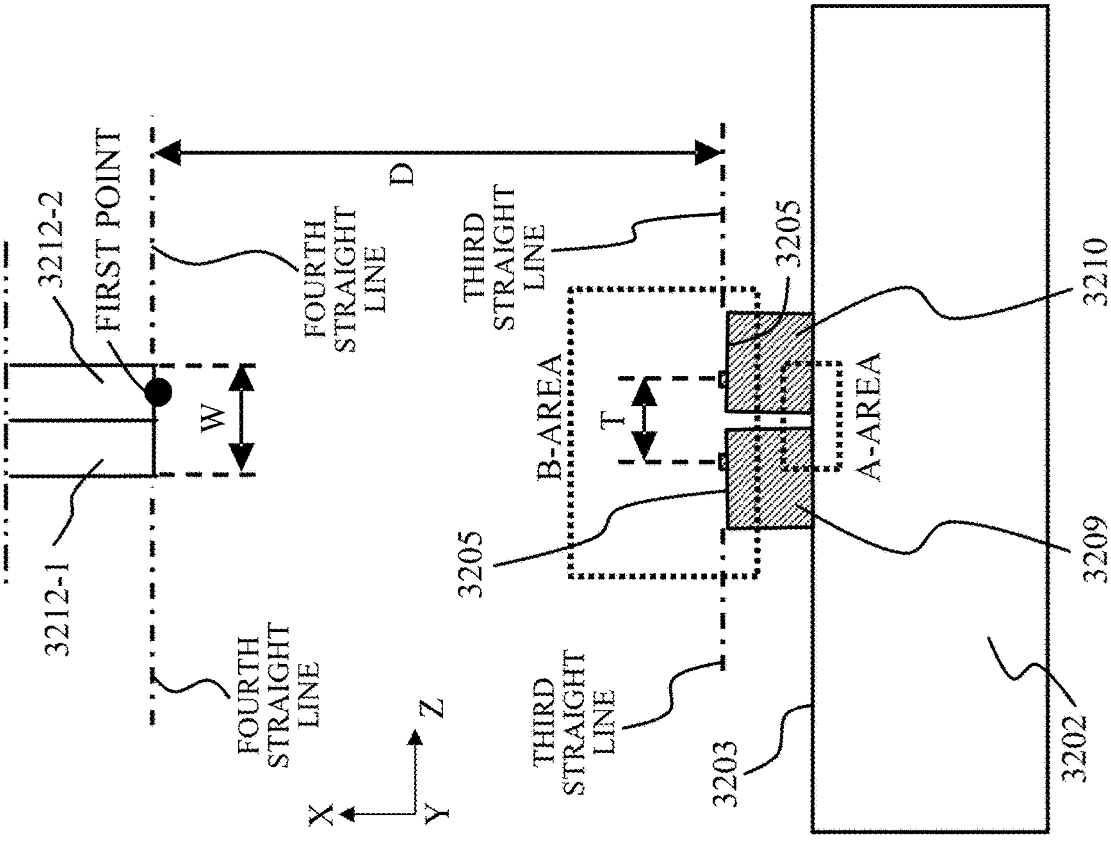

FIG. 109 illustrates a ZX section when viewed from the Y direction, and the arrangement of the exposure head 3105 relative to the photosensitive drum 3103. FIG. 110A illustrates an enlarged view of the enlarged area 1 in FIG. 109 when viewed from the Y direction. FIG. 110B illustrates an enlarged view of A-area A in FIG. 110A. FIG. 110C illustrates an enlarged view of B-area (area B) in FIG. 110A.

Figure 111A:
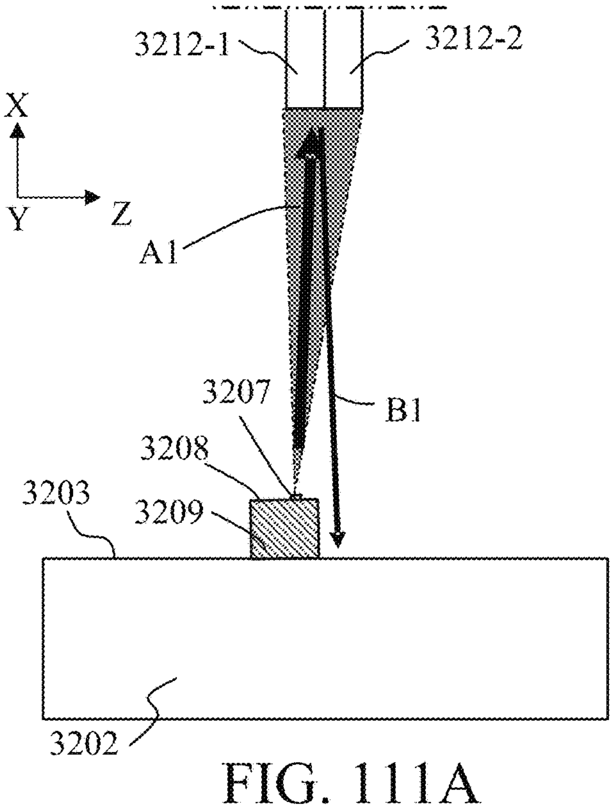
FIGS. 111A and 111B are A-sectional views illustrating optical paths of an exposure head in Example 17.
Figure 111B:
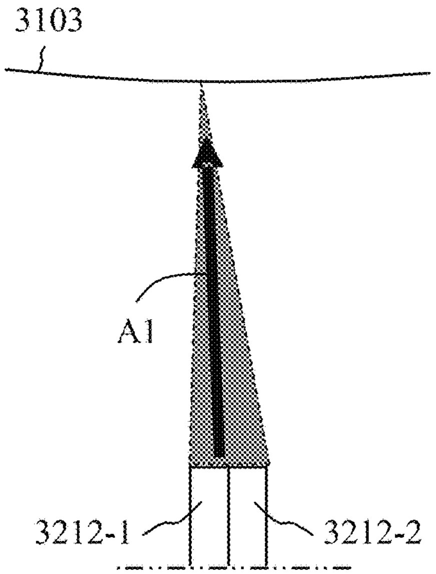

FIG. 111A illustrates the enlarged area 1 in FIG. 109 in A-section (section A) in FIG. 107B, and illustrates how light emitted from the light-emitting element array (light emitter) 3207 of the first light-emitting unit 3209 enters the first and second gradient index lens arrays 3212-1 and 3212-2. FIG. 111B illustrates the enlarged area 2 in FIG. 109 in the A-section in FIG. 107B, and illustrates how light emitted from the light-emitting element row 3207 of the first light-emitting unit 3209 and then from the first and second gradient index lens arrays 3212-1 and 3212-2 is condensed on the photosensitive drum 3103.

Figure 112A:
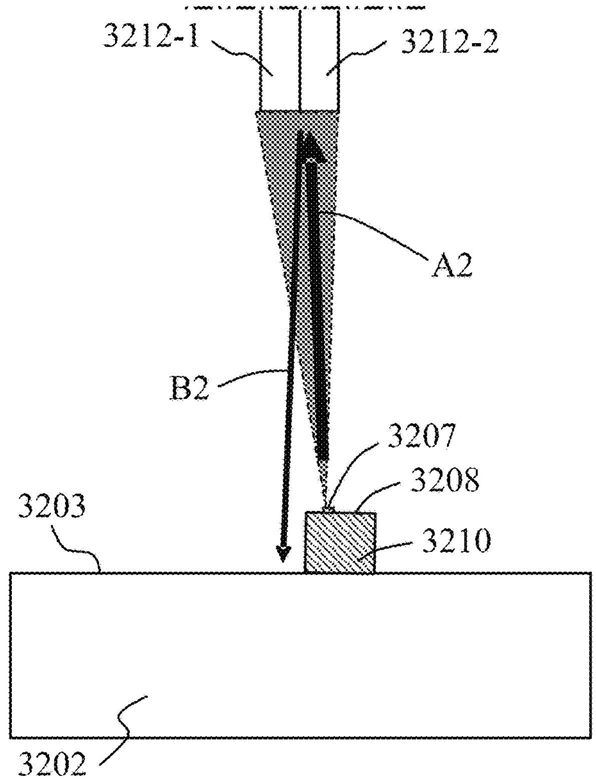
FIGS. 112A and 112B are B-sectional views illustrating optical paths of the exposure head in Example 17.
Figure 112B:
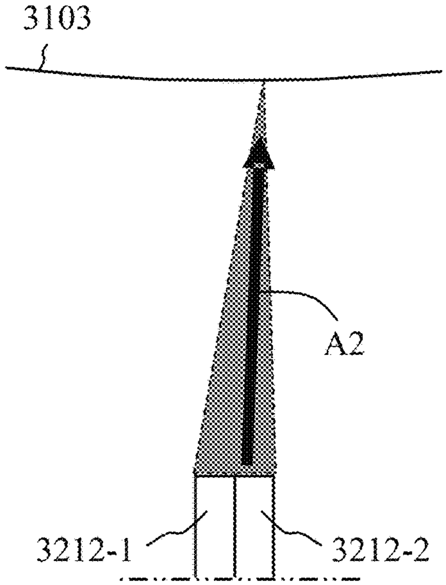

FIG. 112A illustrates the enlarged area 1 in FIG. 109 in B-section (section B) in FIG. 107B, and illustrates how light emitted from the light-emitting element row 3207 of the second light-emitting unit 3210 enters the first and second gradient index lens arrays 3212-1 and 3212-2. FIG. 112B illustrates the enlarged area 2 in FIG. 109 in the B-section in FIG. 107B, and illustrates how light emitted from the light-emitting element row 3207 of the second light-emitting unit 3210 and then from the first and second gradient index lens arrays 3212-1 and 3212-2 is condensed on the photosensitive drum 3103.

Figure 113A:
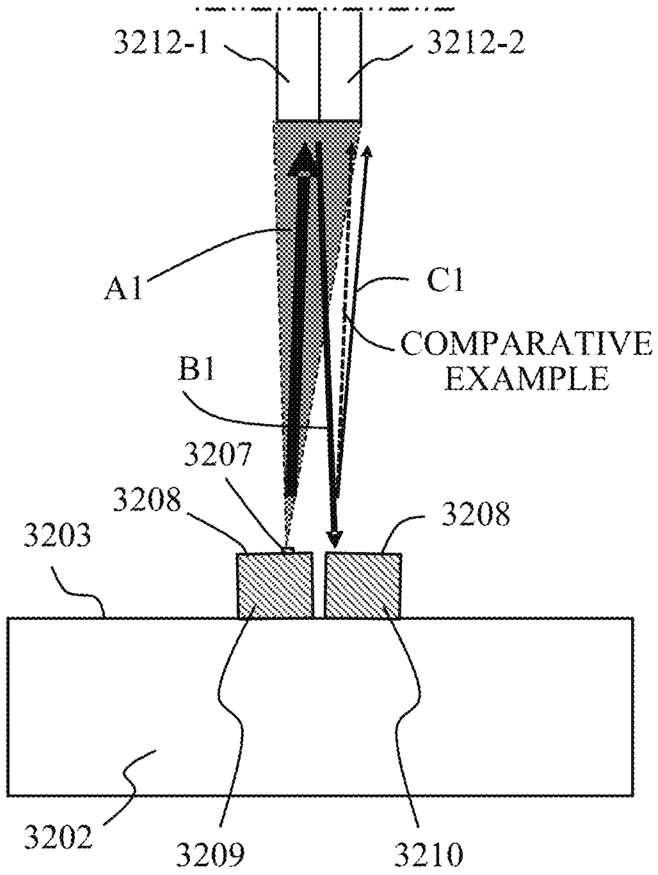
FIGS. 113A and 113B are C-sectional views illustrating optical paths of the exposure head in Example 17.
Figure 113B:
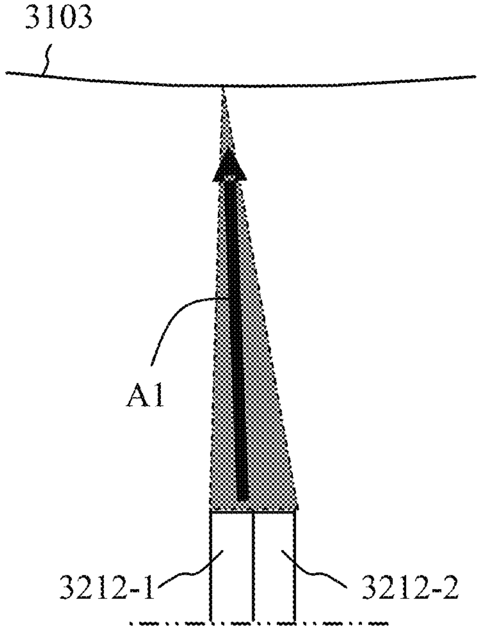

FIG. 113A illustrates the enlarged area 1 in FIG. 109 in C-section (section C) in FIG. 107B, and illustrates how light emitted from the light-emitting element row 3207 of the first light-emitting unit 3209 enters the first and second gradient index lens arrays 3212-1 and 3212-2. FIG. 113B illustrates the enlarged area 2 in FIG. 109 in the C-section in FIG. 107B, illustrating how light emitted from the light-emitting element row 3207 of the first light-emitting unit 3209 and emitted from the first and second gradient index lens arrays 3212-1 and 3212-2 is condensed on the photosensitive drum 3103.

In attaching the exposure head 3105 to the image forming apparatus 1, the light amount (ghost light) reflected by the non-light emitter 3208 at the coupling part between any one of the first light-emitting units 3209 and the adjacent second light-emitting unit 3210 may be small. Thus, in this example, in a case where the light-emitting substrate 3202 and the first light-emitting unit 3209 are viewed from the Y direction, the unit mounting surface (second surface) 3205 of the first light-emitting unit 3209 is tilted relative to the substrate mounting surface (first surface) 3203. Similarly, the unit mounting surface 3205 of the second light-emitting unit 3210 is tilted relative to the substrate mounting surface 3203 when viewed from the Y direction.

Here, the substrate mounting surface 3203 is a flat surface that occupies most of the surface excluding the lands and pads. Similarly, the unit mounting surface 3205 is also a flat surface that occupies most of the surface. The tilt of the unit mounting surface 3205 relative to the substrate mounting surface 3203 will be described in detail below.

As illustrated in FIG. 110C, a first straight line is defined as a straight line orthogonal to the unit mounting surface 3205 of the first light-emitting unit 3209, and a second straight line is defined as a straight line orthogonal to the unit mounting surface 3205 of the second light-emitting unit 3210. K is defined as a distance between the first straight line and the second straight line. Then, the unit mounting surfaces 3205 of the first and second light-emitting units 3209 and 3210 are tilted relative to the substrate mounting surface 3203 such that the distance K increases as a position approaches the gradient index lens array 3212 from the unit mounting surface 3205. The distance K is a distance in a direction parallel to a third straight line described later.

In this example, a direction in which the unit mounting surface 3205 of the first light-emitting unit 3209 is tilted relative to the substrate mounting surface 3203 is different from a direction in which the unit mounting surface 3205 of the second light-emitting unit 3210 is tilted relative to the substrate mounting surface 3203. That is, as illustrated in FIG. 110C, the unit mounting surface 3205 of the first light-emitting unit 3209 is tilted in a counterclockwise direction relative to the substrate mounting surface 3203, while the unit mounting surface 3205 of the second light-emitting unit 3210 is tilted in a clockwise direction.

A tilt angle of the unit mounting surface 3205 relative to the substrate mounting surface 3203 will now be described. As illustrated in FIG. 110A, when viewed from the Y direction, T is defined as a distance between the center of the light emitter (first light-emitting element) of the first light-emitting unit 3209 and the center of the light emitter (second light-emitting element) of the second light-emitting unit 3210. A third straight line is defined as a straight line connecting the centers of these light emitters (first and second light-emitting elements).

A first point is defined as a center of the entrance surface of any one of the gradient index lenses 3211 in the gradient index lens array 3212, and a fourth straight line is defined as a straight line including the first point and parallel to the third straight line. D is defined as a distance between the third straight line and the fourth straight line, and W is defined as a width of the gradient index lens array 3212 (the first gradient index lens array 3212-1 and the second gradient index lens array 3212-2) in the fourth straight line. As illustrated in FIG. 110C, a fifth straight line is defined as a straight line parallel to the unit mounting surface 3205 of the first light-emitting unit 3209 when viewed from the Y direction, and a sixth straight line is defined as a straight line parallel to the unit mounting surface 3205 of the second light-emitting unit 3210. θ is defined as each of angles (tilt angles) θ1 and θ2 formed by the third straight line and the fifth straight line and by the third straight line and the sixth straight line. Then, inequality (9) may be satisfied. The angle θ1 formed by the third straight line and the fifth straight line and the angle θ2 formed by the third straight line and the sixth straight line may be equal to or different from each other.

$$0.95 < (W + T + 4D\tan\theta)/(2W) < 18.50 \quad (9)$$

Inequality (9) defines a proper range of the tilt angle θ of the unit mounting surface 3205 relative to the substrate mounting surface 3203. By setting the tilt angle θ within the range of inequality (9), ghost light as reflected light generated at the coupling part between the first and second light-emitting units 3209 and 3210 adjacent to each other can be reduced to form a good image. The reason why reflected light occurs at the coupling part will be described later. In a case where the tilt angle θ is equal to or less than the lower limit value 0.95 of inequality (9), the reflected light generated at the coupling part cannot be reduced, and an image containing dark streaks is formed. In a case where the tilt angle θ is equal to or more than the upper limit value 18.50 of inequality (9), the light emitted from the light-emitting element row 3207 and incident on the gradient index lens array 3212 is feeble, the light amount reaching the photosensitive drum 3103 decreases, and the light utilization efficiency of the exposure head 3105 decreases.

Referring now to FIG. 130, a description will be given of the reason why the light incident on the gradient index lens array 3212 is feeble. In a case where the light-emitting element has the Lambertian light-emission characteristic, the half-maximum half-angle radiation angle is 60° because cos(60°)=0.5. In other words, in a case where the tilt angle θ of the unit mounting surface 3205 relative to the substrate mounting surface 3203 is greater than 60°, the light amount incident on the gradient index lens array 3212 is less than 50% of the light amount in a case where the tilt angle is 0°. Thus, since the light utilization efficiency decreases as the tilt angle θ of the unit mounting surface 3205 increases, the tilt angle θ may be within the range of equation (9). Inequality (9) may be replaced with inequality (9a) below:

$$1.00 < (W + T + 4D\tan\theta)/(2W) < 4.58 \quad (9a)$$

In this example, W=0.539 mm, T=0.40 mm, D=2.74 mm, and θ(=θ1=θ2)=0.5°. Therefore, (W+T+4D tan θ)/(2W) =0.96, which satisfies inequality (9). In this case, a percentage of reflected light from the coupling part to light that reaches the area on the photosensitive drum 3103 corresponding to the position of the coupling part is 0.07%. Since a percentage of the reflected light in the comparative example described later is 0.20%, a percentage of the reflected light can be reduced by (1−0.07/0.20)×100=65%. A percentage of light incident on the gradient index lens array 3212 to the light emitted from the light-emitting element row 3207, that is, the light utilization efficiency, is 100.0% based on cos(0.5°).

In the above description, the reflectance of the non-light emitter 3208 is 80%, but the reflectance of the non-light emitter 3208 may be greater than 0%. In a case where the reflectance is 50%, a percentage of the reflected light from the coupling part is 0.07%×50%/80%=0.04%. Similarly, in the comparative example, a percentage of the reflected light from the coupling part is 0.20%×50%/80%=0.13%. Therefore, a percentage of the reflected light can be reduced by (1−0.04/0.13)×100=69% compared to the comparative example. A 69% reduction result was obtained here because three decimal places were omitted, but if three decimal places were not omitted, the 65% reduction could be obtained, which is the same reduction rate as in a case where the reflectance of the non-light emitter 3208 is 80%. The reflectance of the non-light emitter 3208 may be 50% or greater.

Inequality (9) is satisfied in all combinations of any one of the plurality of first light-emitting units 3209 (3209-1 to 3209-10) and a second light-emitting unit adjacent to the one first light-emitting unit 3209 among the plurality of second light-emitting units 3210 (3210-1 to 3210-10).

Figure 127A:
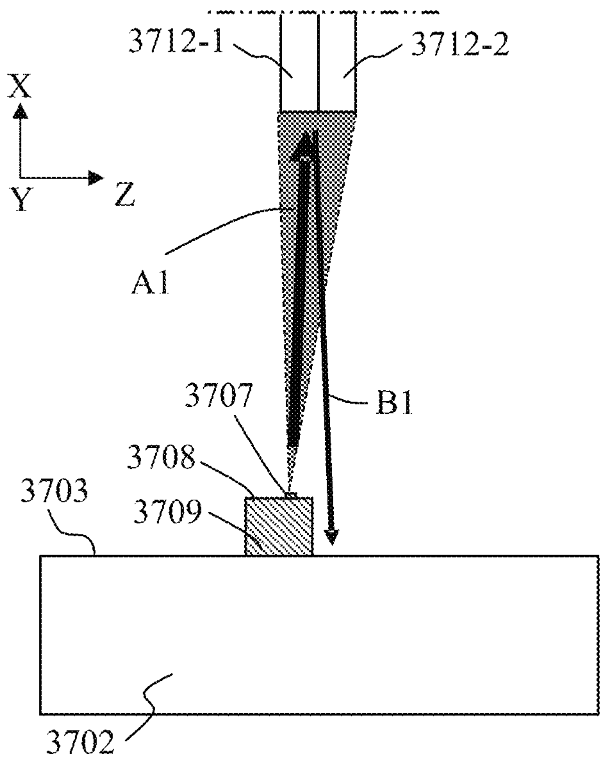
Figure 127B:
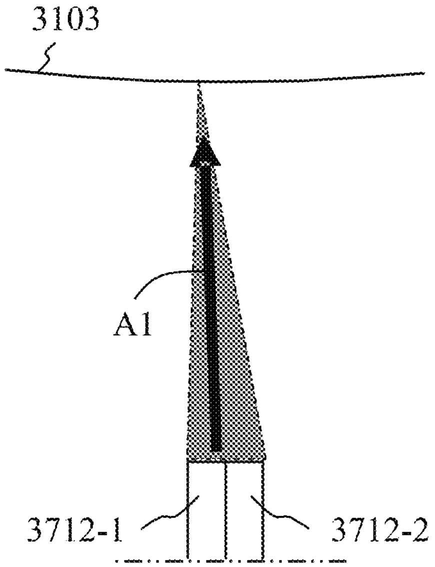

FIGS. 127A, 127B, 128A, 128B, 129A, and 129B illustrate an exposure head according to comparative example 5. In this comparative example, the same reference numerals as those of Example 1 are used. FIG. 127A illustrates an area corresponding to the enlarged area 1 in FIG. 109 in a section corresponding to the A-section in FIG. 107B. This figure illustrates how light emitted from the light-emitting element array (light emitter) 3707 of the first light-emitting unit 3709 enters the first and second gradient index lens arrays 3712-1 and 3712-2. FIG. 127B illustrates an area corresponding to the enlarged area 2 in FIG. 109 in a section corresponding to A-section in FIG. 107B. This figure illustrates how light emitted from the light-emitting element array 3707 of the first light-emitting unit 3709 and then from the first and second gradient index lens arrays 3712-1 and 3712-2 is condensed on the photosensitive drum 3103.

Figure 128A:
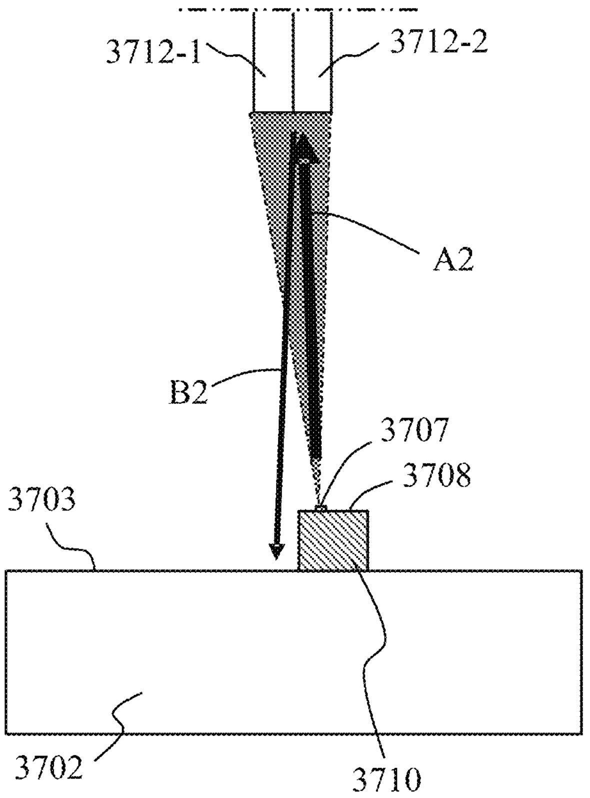
Figure 128B:
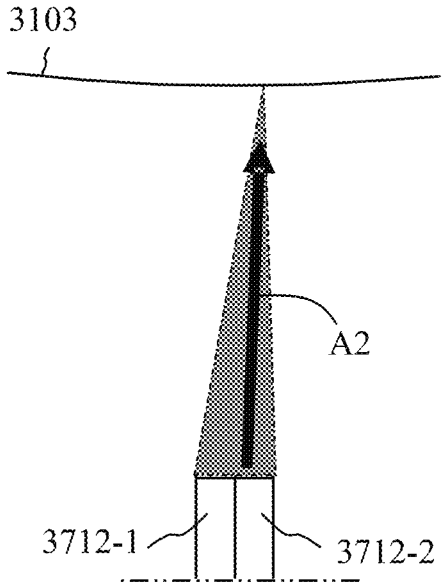

FIG. 128A illustrates an area corresponding to the enlarged area 1 in FIG. 109 in a section corresponding to the B-section in FIG. 107B. This figure illustrates how light emitted from the light-emitting element array 3707 of the second light-emitting unit 3710 enters the first and second gradient index lens arrays 3712-1 and 3712-2. FIG. 128B illustrates an area corresponding to the enlarged area 2 in FIG. 109 in a section corresponding to B-section in FIG. 107B. This figure illustrates how light emitted from the light-emitting element array 3707 of the second light-emitting unit 3710 and then from the first and second gradient index lens arrays 3712-1 and 3712-2 is condensed on the photosensitive drum 3103.

Figure 129A:
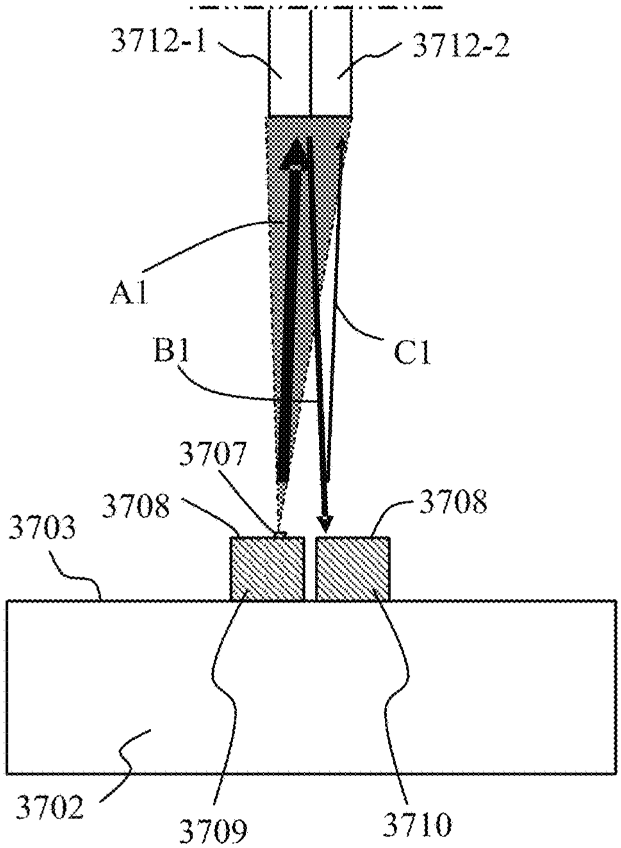
Figure 129B:
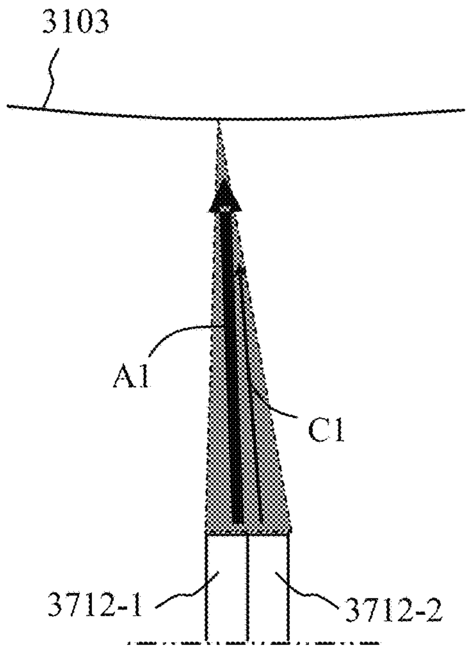

FIG. 129A illustrates an area corresponding to the enlarged area 1 in FIG. 109 in a section corresponding to the C-section in FIG. 107B. This figure illustrates how light emitted from the light-emitting element array 3707 of the first light-emitting unit 3709 enters the first and second gradient index lens arrays 3712-1 and 3712-2. FIG. 129B illustrates an area corresponding to the enlarged area 2 in FIG. 109 in a section corresponding to the C-section in FIG. 107B. This figure illustrates how light emitted from the light-emitting element array 3707 of the first light-emitting unit 3709 and emitted from the first and second gradient index lens arrays 3712-1 and 3712-2 is condensed on the photosensitive drum 3103.

The exposure head in comparative example 5 has a similar configuration to that of the exposure head 3105 in Example 17, except that the tilt angle of the unit mounting surface (second surface) 3705 relative to the substrate mounting surface (first surface) 3703 is different from that of the exposure head in Example 1.

In comparative example 5, W=0.539 mm, T=0.40 mm, D=2.74 mm, and θ=0°. Therefore, (W+T+4D tan θ)/(2W) =0.87, which does not satisfy inequality (9). Then, a percentage of reflected light (ghost light) from the coupling part of the first and second light-emitting units 3709 and 3710 to the light rays that reaches the area on the photosensitive drum 3103 corresponding to the position of the coupling part is 0.20%. Such a large amount of reflected light causes an image including dark streaks.

A description will now be given of the reason why reflected light occurs at the coupling part of the first and second light-emitting units 3709 and 3710.

As illustrated in FIG. 127A, the light ray A1 emitted from the light-emitting element array 3707 of the first light-emitting unit 3709 enters the first and second gradient index lens arrays 3712-1 and 3712-2. The light ray A1 is a representative light ray among the light rays incident on the first and second gradient index lens arrays 3712-1 and 3712-2. As illustrated in FIG. 127B, the light ray A1 emitted from the first and second gradient index lens arrays 3712-1 and 3712-2 is condensed on the photosensitive drum 3103.

From the cost reduction, gradient index lenses are generally used with their lens surfaces uncoated. In a case where the lens surface is uncoated, part of the light incident on the lens surface is reflected by Fresnel reflection (Fresnel-reflected). Of the light rays that are perpendicularly incident on the entrance surface of the gradient index lens, the number of Fresnel-reflected light rays can be calculated as $\{(n-1)/(n+1)\}^2$. As illustrated in FIG. 127A, of the light ray A1, the light ray B1 Fresnel-reflected by the lens surfaces (entrance surfaces) of first and second gradient index lens arrays 3712-1 and 3712-2 reaches the substrate mounting surface 3703 of light-emitting substrate 3702. Generally, the reflectance of the non-light emitter of the substrate mounting surface 3703 is low, and even if the light ray B1 is reflected by the substrate mounting surface (first surface) 3703, the reflected light is feeble, so the reflectance of the substrate mounting surface 3703 can be approximated as 0%. As illustrated in FIG. 128A, the light ray A2 emitted from the light-emitting element array 3707 of the second light-emitting unit 3710 is similar to the light ray A1, and the light ray B2 Fresnel-reflected on the entrance surfaces of the first and second gradient index lens arrays 3712-1 and 3712-2 reaches the substrate mounting surface 3703.

As illustrated in FIG. 129A, the light ray A1 emitted from the light-emitting element array 3707 of the first light-emitting unit 3709 enters the first and second gradient index lens arrays 3712-1 and 3712-2. The light ray B1 of the light ray A1 Fresnel-reflected on the entrance surfaces of the first and second gradient index lens arrays 3712-1 and 3712-2 reaches the non-light emitter 3708 of the second light-emitting unit 3710. Since the non-light emitter 3708 is formed from an electrode layer, it has a high reflectance of 80%. Therefore, the light ray C1 reflected by the non-light emitter 3708 becomes ghost light and enters the first and second gradient index lens arrays 3712-1 and 3712-2.

As illustrated in FIG. 129B, the light rays A1 and C1 emitted from the first and second gradient index lens arrays 3712-1 and 3712-2, respectively, are condensed on the photosensitive drum 3103. Since the light ray C1 is condensed as ghost light on the photosensitive drum 3103, a percentage of ghost light from the coupling part to the light rays reaching the area on the photosensitive drum 3103 corresponding to the position of the coupling part of the first and second light-emitting units 3709 and 3710 is 0.20%.

In this example, unlike comparative example 5, as illustrated in FIG. 110B, powder 3213 is disposed between the substrate mounting surface 3203 and a rear surface (third surface, referred to as a unit rear surface hereinafter) 3206 of the first and second light-emitting units 3209 and 3210 opposite to the unit mounting surface 3205. The powder 3213 is a member for giving the unit mounting surface 3205 a tilt relative to the substrate mounting surface 3203. Thus, the first and second light-emitting units 3209 and 3210 are adhered to and fixed to the substrate mounting surface 3203 by an unillustrated adhesive (agent) with the powder 3213 sandwiched between them. The tilt angle of the unit mounting surface 3205 relative to the substrate mounting surface 3203 can be adjusted by selecting the height (thickness) of the powder 3213. This example gives the unit mounting surface 3205 a tilt angle θ=0.5° using the powder 3213 having a height of 4 μm. When viewed from the Y direction, the powder 3213 contacts a part (near the end) of the rear surface 3206 of each of the first and second light-emitting units 3209 and 3210.

In the A-section illustrated in FIG. 111A, as in comparative example 5, even if the light ray B1 that is Fresnel-reflected from the entrance surfaces of the first and second gradient index lens arrays 3212-1 and 3212-2 is reflected by the substrate mounting surface 3203, the reflected light is feeble. Therefore, the reflectance of the substrate mounting surface 3203 can be approximated as 0%. Similarly, in the B-section illustrated in FIG. 112A, even if the light ray B2 that is Fresnel-reflected is reflected by the substrate mounting surface 3203, the reflected light is feeble, so the reflectance of the substrate mounting surface 3203 can be approximated as 0%. In the C-section illustrated in FIG. 113A, the Fresnel-reflected light ray B1 reaches the non-light emitter 3208 of the second light-emitting unit 3210. Since the unit mounting surface 3205 of the second light-emitting unit 3210 is tilted, the light ray C1 reflected by the non-light emitter 3208 is less likely to enter the first and second gradient index lens arrays 3212-1 and 3212-2 than the light ray C1 in comparative example 5 illustrated by the broken line. In other words, the light ray C1 that enters the first and second gradient index lens arrays 3212-1 and 3212-2 can be reduced. Thereby, a percentage of ghost light from the coupling part to the light rays that reach the area on the photosensitive drum 3103 corresponding to the position of the coupling part between the first and second light-emitting units 3209 and 3210 to 0.07%.

In the C-section, the light ray emitted from the light-emitting element row 3207 of the second light-emitting unit 3210 and Fresnel-reflected on the entrance surfaces of the first and second gradient index lens arrays 3212-1 and 3212-2 reaches the non-light emitter 3208 of the first light-emitting unit 3209 and is reflected there. At this time, since the unit mounting surface 3205 of the first light-emitting unit 3209 is also tilted, the light ray reflected at the non-light emitter 3208 and incident on the first and second gradient index lens arrays 3212-1 and 3212-2 can be reduced. This is similarly applicable to the other examples described below.

In the exposure head 3105 according to Example 17 described above, the unit mounting surfaces 3205 of the first and second light-emitting units 3209 and 3210 are tilted relative to the substrate mounting surface 3203 of the light-emitting substrate 3202. This tilt forms a tilt angle at which the light emitted from one light-emitting unit, reflected by the gradient index lens array 3212, reflected by the non-light emitter 3208 of the other light-emitting unit, and then incident again on the lens array 3212 is reduced compared to a case where there is no tilt relative to the substrate mounting surface 3203. Thereby, the reflected light (ghost light) that is reflected by the non-light emitter of the coupling part of the first and second light-emitting units and incident on the lens array can be reduced, and a good image with few unnecessary streaks can be formed.

Example 18

Example 18 will now be described. The configuration of an image forming apparatus using an exposure head according to Example 18 is similar to that of the image forming apparatus 1 described in Example 1.

An exposure head 3105 according to Example 18 is different from the exposure head 105 according to Example 1 in the tilt angle θ of the unit mounting surface (second surface) 3305 of the first and second light-emitting units 3309 and 3310 relative to the substrate mounting surface (first surface) 3303 of the light-emitting substrate 3302. The configuration of the exposure head 3105 according to this example will be described with reference to FIGS. 114A, 114B, 114C, 115A, 115B, 116A, 116B, 117A and 117B. The basic configuration of the exposure head 3105 according to this example is similar to that of the exposure head 3105 according to Example 17, and FIGS. 107B and 109 used in Example 17 will be used for a description thereof.

Figure 114B:
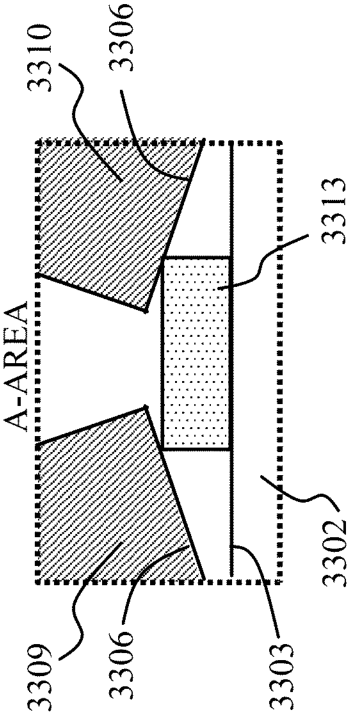
FIGS. 114A, 114B, and 114C illustrate a light-emitting substrate, first and second light-emitting units, and gradient index lens array in an exposure head in Example 18.
Figure 114C:
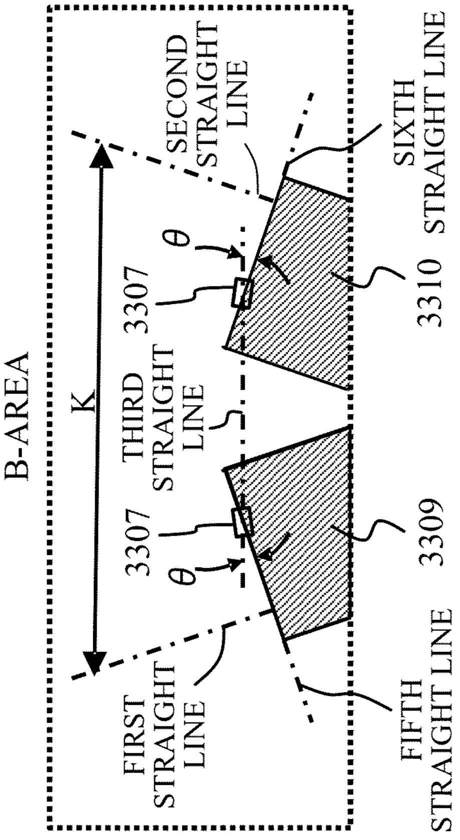
Figure 114A:
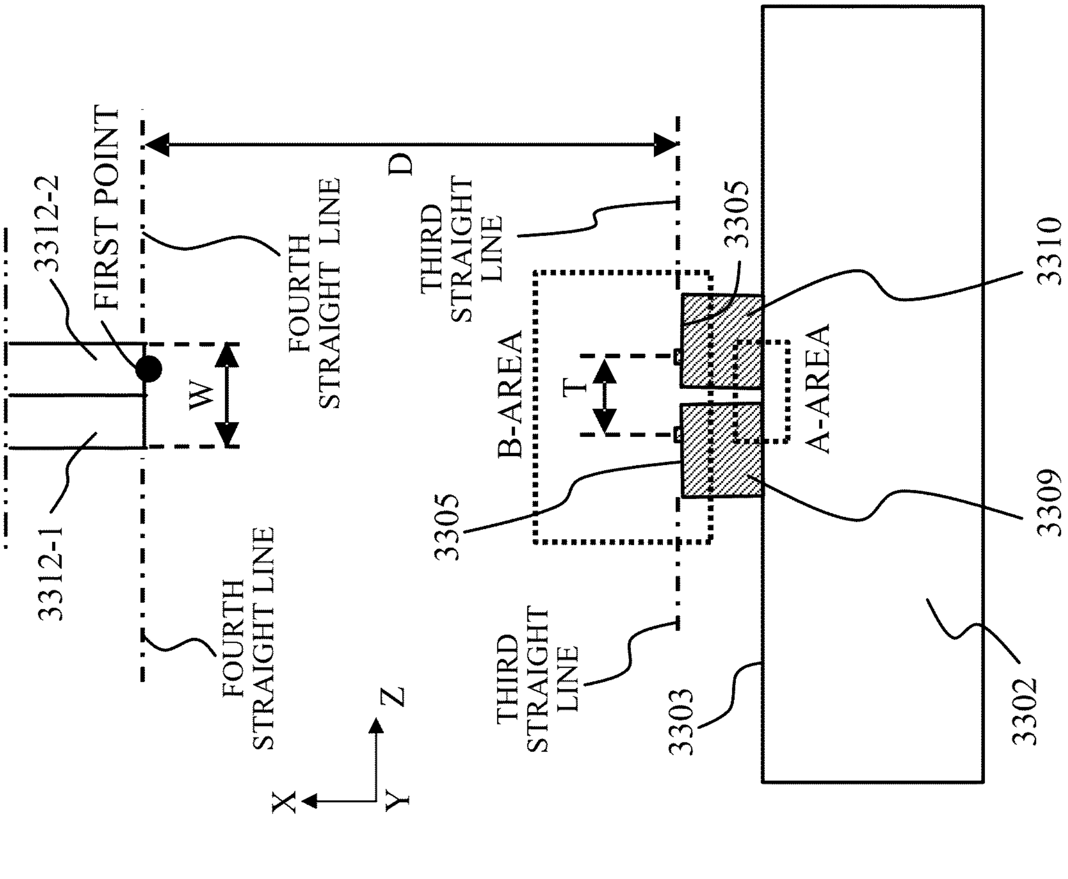

FIG. 114A illustrates the enlarged area 1 in FIG. 109. FIG. 114B illustrates an enlarged view of the A-area in FIG. 114A. FIG. 114C illustrates an enlarged view of the B-area in FIG. 114A.

Figure 115A:
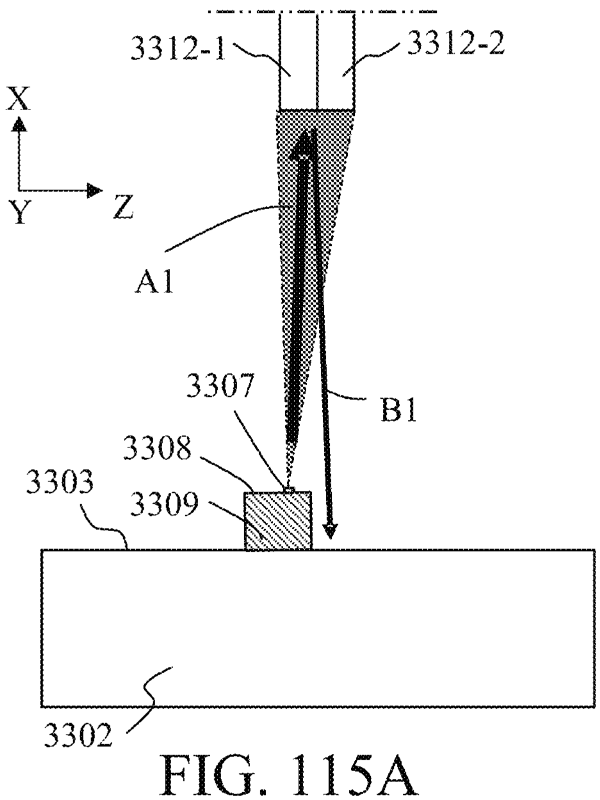
FIGS. 115A and 115B are A-sectional views illustrating optical paths of an exposure head in Example 18.
Figure 115B:
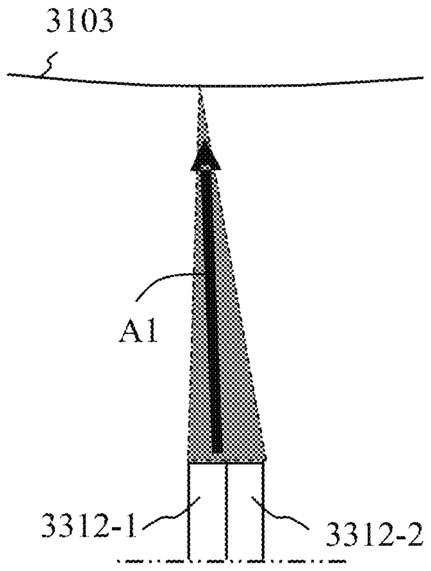

FIG. 115A illustrates the enlarged area 1 in FIG. 109 in the A-section in FIG. 107B, illustrating how light emitted from the light-emitting element row (light emitter) 3307 of the first light-emitting unit 3309 enters the first and second gradient index lens arrays 3312-1 and 3312-2. FIG. 115B illustrates the enlarged area 2 in FIG. 109 in the A-section in FIG. 107B, illustrating how light emitted from the light-emitting element row 3307 of the first light-emitting unit 3309 and then emitted from the first and second gradient index lens arrays 3312-1 and 3312-2 is condensed on the photosensitive drum 3103.

Figure 116A:
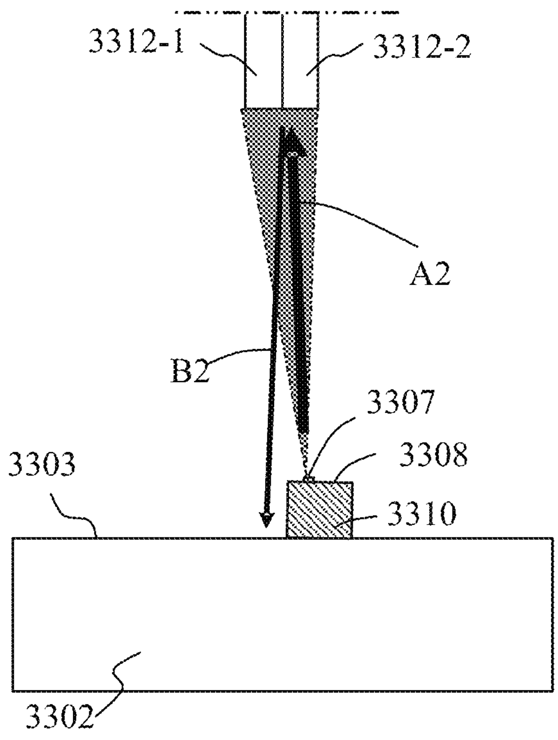
FIGS. 116A and 116B are B-sectional views illustrating optical paths of the exposure head in Example 18.
Figure 116B:
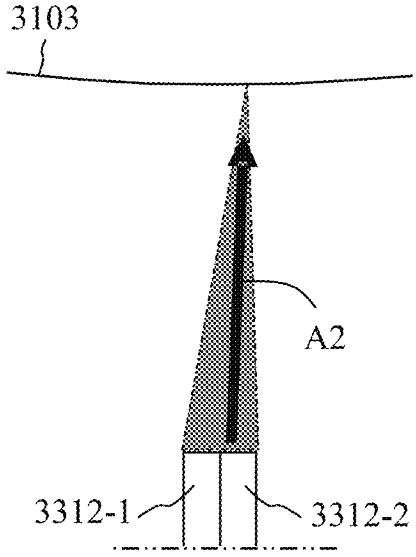
Figure 117A:
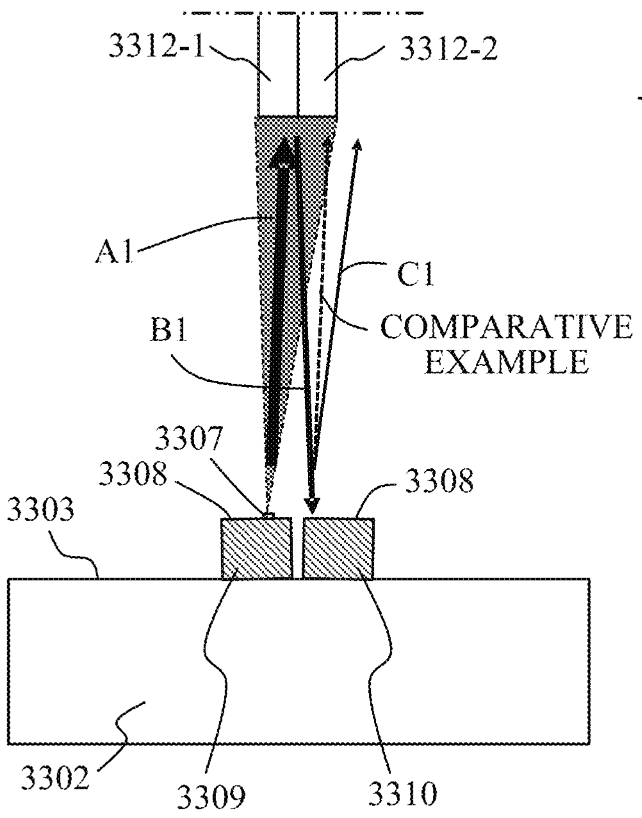
FIGS. 117A and 117B are C-sectional views illustrating optical paths of the exposure head in Example 18.
Figure 117B:
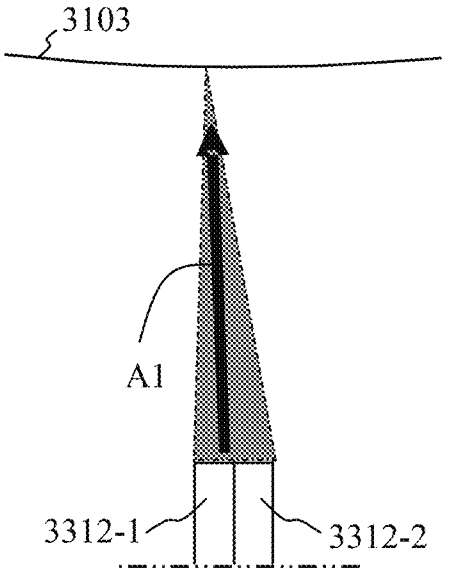

FIG. 116A illustrates the enlarged area 1 in FIG. 109 in the B-section of FIG. 107B, illustrating how the light emitted from the light-emitting element row 3307 of the second light-emitting unit 3310 enters the first and second gradient index lens arrays 3312-1 and 3312-2. FIG. 116B illustrates the enlarged area 2 in FIG. 109 in the B-section of FIG. 107B, illustrating how the light emitted from the light-emitting element row 3307 of the second light-emitting unit 3310 and then emitted from the first and second gradient index lens arrays 3312-1 and 3312-2 is condensed on the photosensitive drum 3103. FIG. 117A illustrates enlarged area 1 in FIG. 109 in the C-section in FIG. 107B, illustrating how light emitted from the light-emitting element row 3307 of the first light-emitting unit 3309 enters the first and second gradient index lens arrays 3312-1 and 3312-2. FIG. 117B illustrates the enlarged area 2 in FIG. 109 in the C-section in FIG. 107B, illustrating how light emitted from the light-emitting element row 3307 of the first light-emitting unit 3309 and then emitted from the first and second gradient index lens arrays 3312-1 and 3312-2 is condensed on the photosensitive drum 3103.

In Example 18, W=0.539 mm, T=0.40 mm, D=2.74 mm, and θ (=θ1=θ2)=1.0°. Therefore, (W+T+4D tan θ)/(2W) =1.05, which satisfies inequality (9). In this case, a percentage of reflected light (ghost light) from the coupling part of the first and second light-emitting units 3309 and 3310 to the light rays reaching the area on the photosensitive drum 3103 corresponding to the position of the coupling part is 0.00%. In contrast, a percentage of the reflected light in the comparative example 5 is 0.20%, so in this example, a percentage of the reflected light can be reduced by (1-0.00/0.20)×100=100%.

A percentage of light that enters the first and second gradient index lens arrays 3312-1 and 3312-2 to light emitted from the light-emitting element row 3307 (light utilization efficiency) is 100.0% based on cos(1.0°).

Even in this example, inequality (9) is satisfied in all combinations of any one of the plurality of first light-emitting units 3309 and a second light-emitting unit adjacent to the one first light-emitting unit 3309 among the plurality of second light-emitting units 3310.

In this example, as illustrated in FIG. 114B, silk 3313 is disposed between the substrate mounting surface 3303 and the unit rear surface (third surface) 3306. The silk 3313 is a member for imparting a tilt to the unit mounting surface 3305 relative to the substrate mounting surface 3303, and is provided by forming a single line by silk printing over the entire area (approximately 316 mm) in the Y direction on the substrate mounting surface 3303. While the silk 3313 is sandwiched between the substrate mounting surface 3303 and the unit rear surface 3306, the first and second light-emitting units 3309 and 3310 are adhered to and fixed to the substrate mounting surface 3303 by an unillustrated adhesive (agent).

By selecting the height (thickness) of the silk 3313, the tilt angle of the unit mounting surface 3305 relative to the substrate mounting surface 3303 can be adjusted. This example uses the silk 3313 with a height of 9 μm to give the unit mounting surface 3305 a tilt angle θ=1.0°. When viewed from the Y direction, the silk 3313 contacts a part (near the end) of the rear surface 3306 of each of the first and second light-emitting units 3309 and 3310.

In the A-section illustrated in FIG. 115A, as in comparative example 5, even if the light ray B1 Fresnel-reflected by the entrance surfaces of the first and second gradient index lens arrays 3312-1 and 3312-2 is reflected by the substrate mounting surface 3303, the reflected light is feeble. Thus, the reflectance of the substrate mounting surface 3303 can be approximated to 0%.

Similarly, in the B-section illustrated in FIG. 116A, even if the Fresnel-reflected light ray B2 is reflected by the substrate mounting surface 3303, the reflected light is feeble, so the reflectance of the substrate mounting surface 3303 can be approximated as 0%.

In the C-section illustrated in FIG. 117A, the Fresnel-reflected light ray B1 reaches the non-light emitter 3308 of the second light-emitting unit 3310. Since the unit mounting surface 3305 of the second light-emitting unit 3310 is tilted, the light ray C1 reflected by the non-light emitter 3308 is less likely to enter the first and second gradient index lens arrays 3312-1 and 3312-2 than the light ray C1 in comparative example 5 illustrated by the broken line. That is, the amount of the light amount C1 incident on the second gradient index lens arrays 3312-1 and 3312-2 can be reduced. Thereby, a percentage of ghost light to the light reaching the area on the photosensitive drum 3103 corresponding to the coupling part between the first and second light-emitting units 3309 and 3310 can be reduced to 0.00%.

The exposure head 3105 according to Example 18 described above can reduce the reflected light (ghost light) reflected by the non-light emitter at the coupling part between the first and second light-emitting units and incident on the lens array, and form a good image with few unnecessary streaks.

Example 19

Example 19 will now be described. The configuration of an image forming apparatus using an exposure head according to Example 19 is similar to that of the image forming apparatus 1 described in Example 1.

In an exposure head 3105 according to Example 19, the tilt angle θ of the unit mounting surface (second surface)

3405 of the first and second light-emitting units 3409 and 3410 relative to the substrate mounting surface (first surface) 3403 of the light-emitting substrate 3402 is different from that of the exposure head 3105 according to Example 17. The configuration of the exposure head 3105 according to this example will be described with reference to FIGS. 118, 119A, 119B, 120A, 120B, 121A, and 121B. The basic configuration of the exposure head 3105 according to this example is similar to that of the exposure head 3105 according to Example 17, and the description thereof will use FIGS. 3B and 5, which are used for Example 17.

Figure 118:
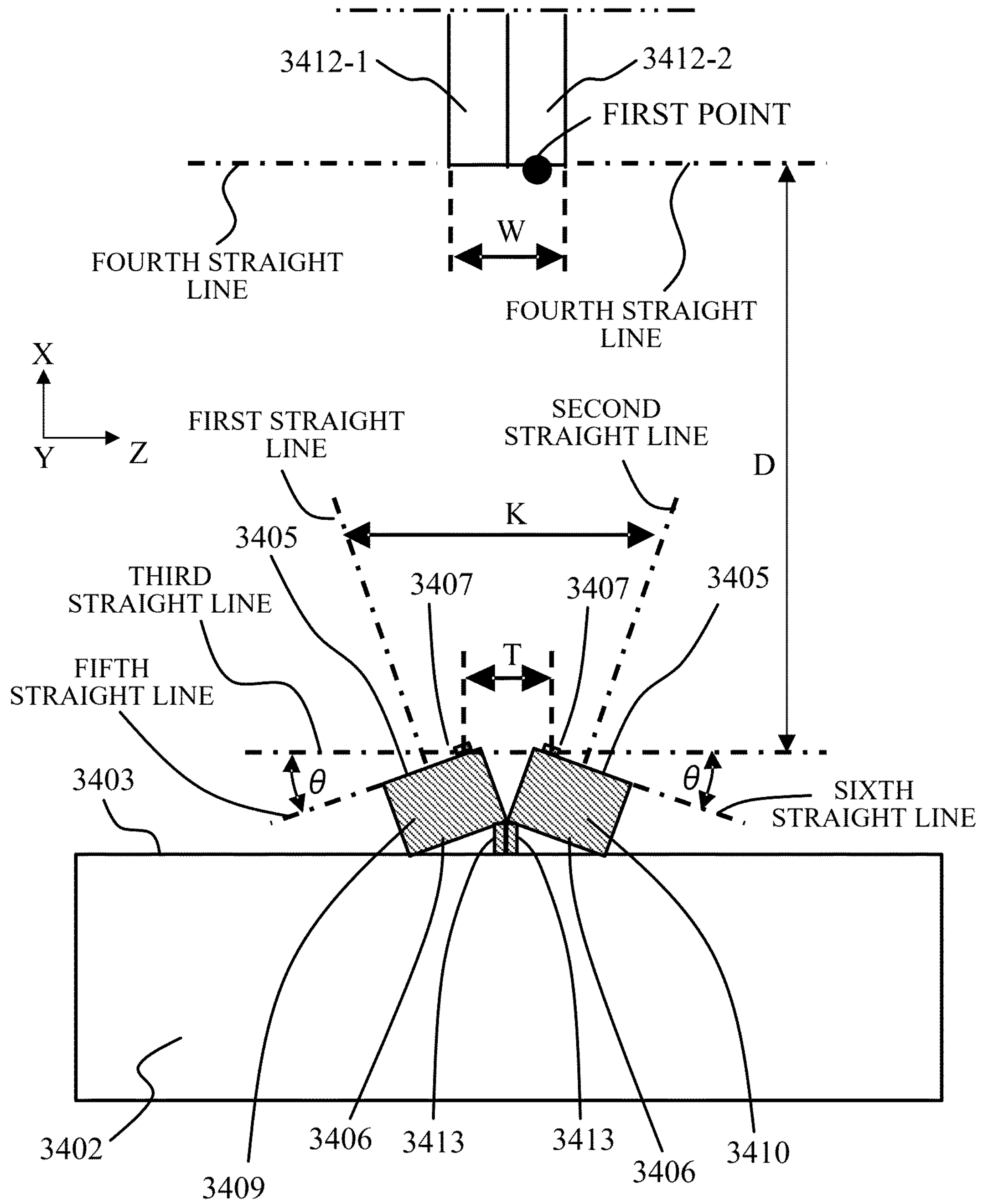
FIG. 118 illustrates a light-emitting substrate, first and second light-emitting units, and a gradient index lens array in Example 19.
Figure 119A:
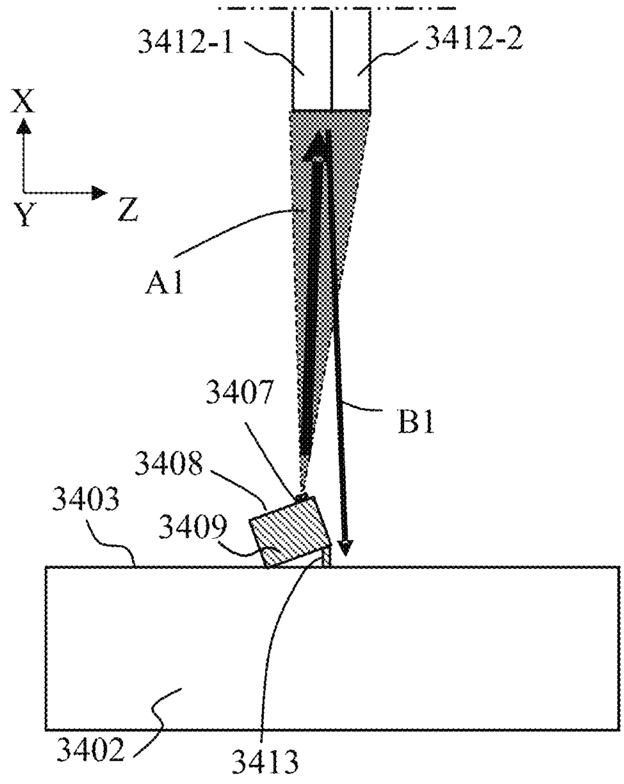
FIGS. 119A and 119B are A-sectional views illustrating optical paths of an exposure head in Example 19.
Figure 119B:
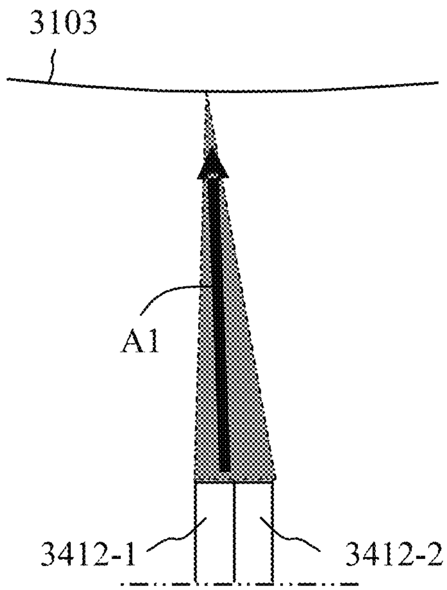

FIG. 118 illustrates enlarged area 1 in FIG. 109. FIG. 119A illustrates the enlarged area 1 in FIG. 109 in the A-section of FIG. 107B, illustrating how light emitted from the light-emitting element array (light emitter) 3407 of the first light-emitting unit 3409 enters the first and second gradient index lens arrays 3412-1 and 3412-2. FIG. 119B illustrates the enlarged area 2 in FIG. 109 in the A-section of FIG. 107B, illustrating how light emitted from the light-emitting element row 3407 of the first light-emitting unit 3409 and then from the first and second gradient index lens arrays 3412-1 and 3412-2 is condensed on the photosensitive drum 3103.

Figure 120A:
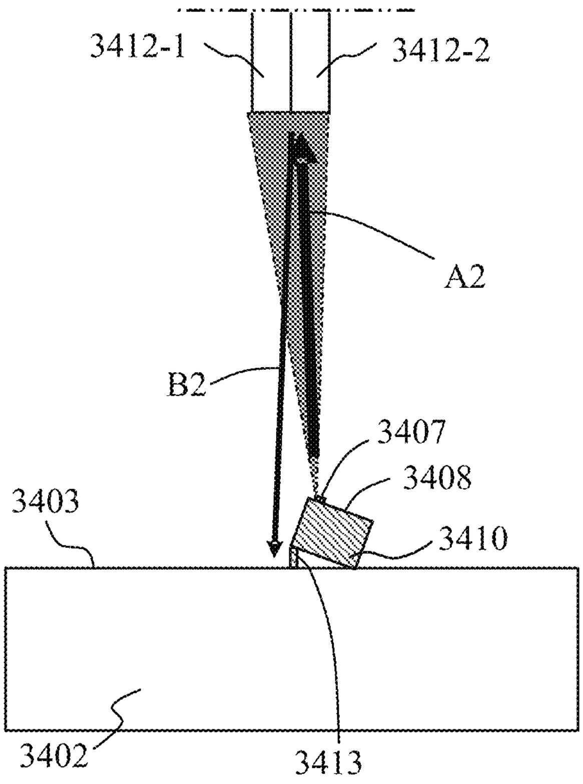
Figure 120B:
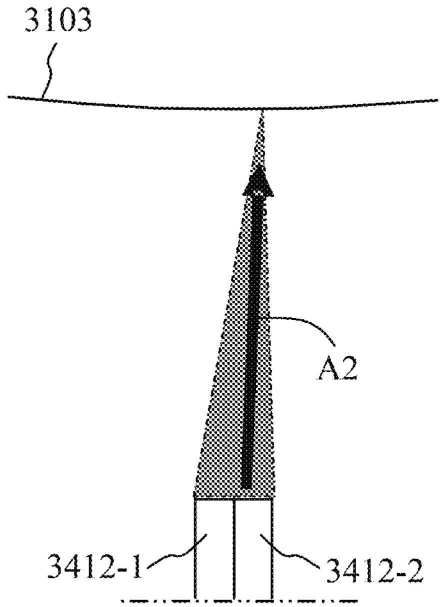

FIG. 120A illustrates the enlarged area 1 in FIG. 109 in the B-section of FIG. 107B, illustrating how light emitted from the light-emitting element row 3407 of the second light-emitting unit 3410 enters the first and second gradient index lens arrays 3412-1 and 3412-2. FIG. 120B illustrates the enlarged area 2 in FIG. 109 in the B-section of FIG. 107B, illustrating how light emitted from the light-emitting element row 3407 of the second light-emitting unit 3410 and then from the first and second gradient index lens arrays 3412-1 and 3412-2 is condensed on the photosensitive drum 3103.

Figure 121A:
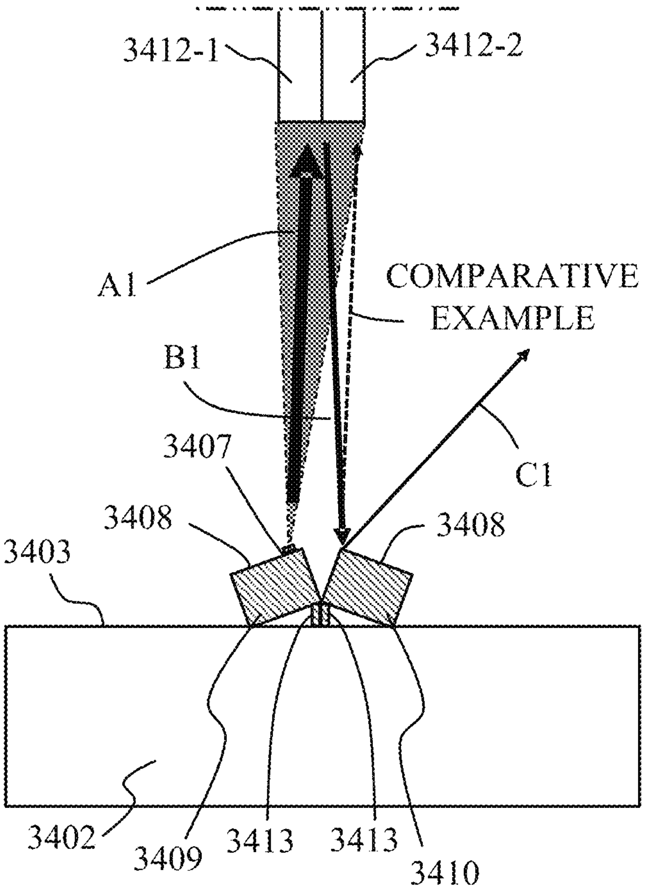
Figure 121B:
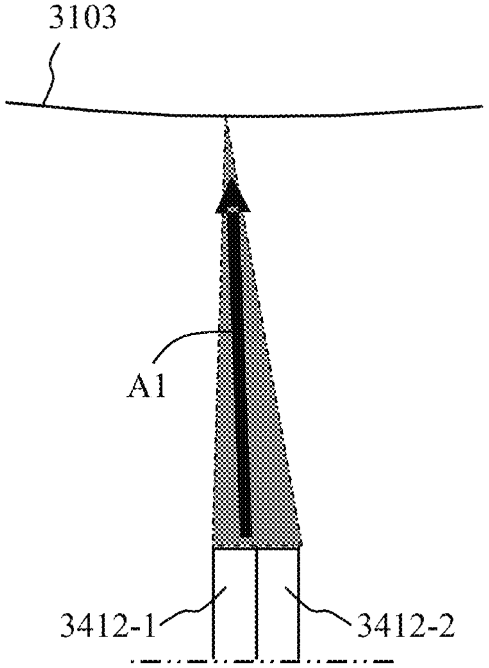

FIG. 121A illustrates the enlarged area 1 in FIG. 109 in the C-section of FIG. 107B, and illustrates how light emitted from the light-emitting element row 3407 of the first light-emitting unit 3409 enters the first and second gradient index lens arrays 3412-1 and 3412-2. FIG. 121B illustrates the enlarged area 2 in FIG. 109 in the C-section of FIG. 107B, illustrating how the light emitted from the light-emitting element row 3407 of the first light-emitting unit 3409 and the first and second gradient index lens arrays 3412-1 and 3412-2 is condensed on the photosensitive drum 3103.

In this example, W=0.539 mm, T=0.40 mm, D=2.74 mm, and $\theta$ (=$\theta 1$=$\theta 2$)=20.0°. Therefore, $(W+T+4D \tan \theta)/(2W)=4.57$, which satisfies inequality (9). At this time, a percentage of reflected light (ghost light) from the coupling part to the light rays reaching the area on the photosensitive drum 3103 corresponding to the position of the coupling part of the first and second light-emitting units 3409 and 3410 is 0.00%. Since a percentage of the reflected light in comparative example 5 is 0.20%, a percentage of the reflected light can be reduced by $(1-0.00/0.20)\times 100=100\%$.

A percentage of light that enters the first and second gradient index lens arrays 3412-1 and 3412-2 to the light emitted from the light-emitting element row 3407 (light utilization efficiency) is 94.0% based on COS(20.0°).

In this example as well, inequality (9) is satisfied in all combinations of any one of the plurality of first light-emitting units 3409 and a second light-emitting unit adjacent to the one first light-emitting unit 3409 out of the plurality of second light-emitting units 3410.

In this example, as illustrated in FIG. 118, a protrusion 3413 is integrally provided on the unit rear surface (third surface) 3406 of each of the first and second light-emitting units 3409 and 3410, and the protrusion 3413 is in contact with the substrate mounting surface 3403. The protrusion 3413 is a member for imparting a tilt to the unit mounting surface 3405 relative to the substrate mounting surface 3403. Due to the protrusion 3413 in contact with the substrate mounting surface 3403 in this manner, the first and second light-emitting units 3409 and 3410 are adhered to and fixed to the substrate mounting surface 3403 with an unillustrated (agent).

By selecting the height of the protrusion 3413, the tilt angle of the unit mounting surface 3405 relative to the substrate mounting surface 3403 can be adjusted. This example provides the protrusion 3413 with a height of 182 μm to impart a tilt angle $\theta$=20.0° to the unit mounting surface 3405. When viewed from the Y direction, the protrusion 3413 contacts a part (near the end) of the unit rear surface 3406 of each of the first and second light-emitting units 3409 and 3410.

In the A-section illustrated in FIG. 119A, as in comparative example 5, even if the light ray B1 that is Fresnel-reflected by the entrance surfaces of the first and second gradient index lens arrays 3412-1 and 3412-2 is reflected by the substrate mounting surface 3403, the reflected light is feeble. Therefore, the reflectance of the substrate mounting surface 3403 can be approximated as 0%.

In the B-section illustrated in FIG. 120A, similarly, even if the Fresnel-reflected light ray B2 is reflected by the substrate mounting surface 3403, the reflected light is feeble, so the reflectance of the substrate mounting surface 3403 can be approximated as 0%.

In the C-section illustrated in FIG. 121A, the Fresnel-reflected light ray B1 reaches the non-light emitter 3408 of the second light-emitting unit 3410. Since the unit mounting surface 3405 of the second light-emitting unit 3410 is tilted, the light ray C1 reflected by the non-light emitter 3408 is less likely to enter the first and second gradient index lens arrays 3412-1 and 3412-2 than the light ray C1 in comparative example 5 illustrated by the broken line. In other words, the amount the light ray C1 that enters the first and second gradient index lens arrays 3412-1 and 3412-2 can be reduced. Thereby, a percentage of ghost light from the coupling part to the light rays that reach the area on the photosensitive drum 3103 corresponding to the position of the coupling part of the first and second light-emitting units 3409 and 3410 can be reduced to 0.00%.

The exposure head 3105 according to Example 19 described above can reduce the reflected light (ghost light) reflected at the non-light emitter of the coupling part between the first and second light-emitting units and incident on the lens array, and form a good image with few no unnecessary streaks.

Example 20

Example 20 will now be described. The configuration of an image forming apparatus using an exposure head according to Example 20 is similar to that of the image forming apparatus 1 described in Example 1.

In an exposure head 3105 according to Example 20, a tilt angle $\theta$ of the unit mounting surface (second surface) 3505 of the first and second light-emitting units 3509 and 3510 relative to the substrate mounting surface (first surface) 3503 of the light-emitting substrate 3502 is different from that of the exposure head 3105 according to Example 17. The configuration of the exposure head 3105 according to this example will be described with reference to FIGS. 122, 123A, 123B, 124A, 124B, 125A, and 125B. The basic configuration of the exposure head 3105 according to this example is similar to that of the exposure head 3105 according to Example 17, and its description will use FIGS. 107B and 109, which are used for Example 17.

Figure 122:
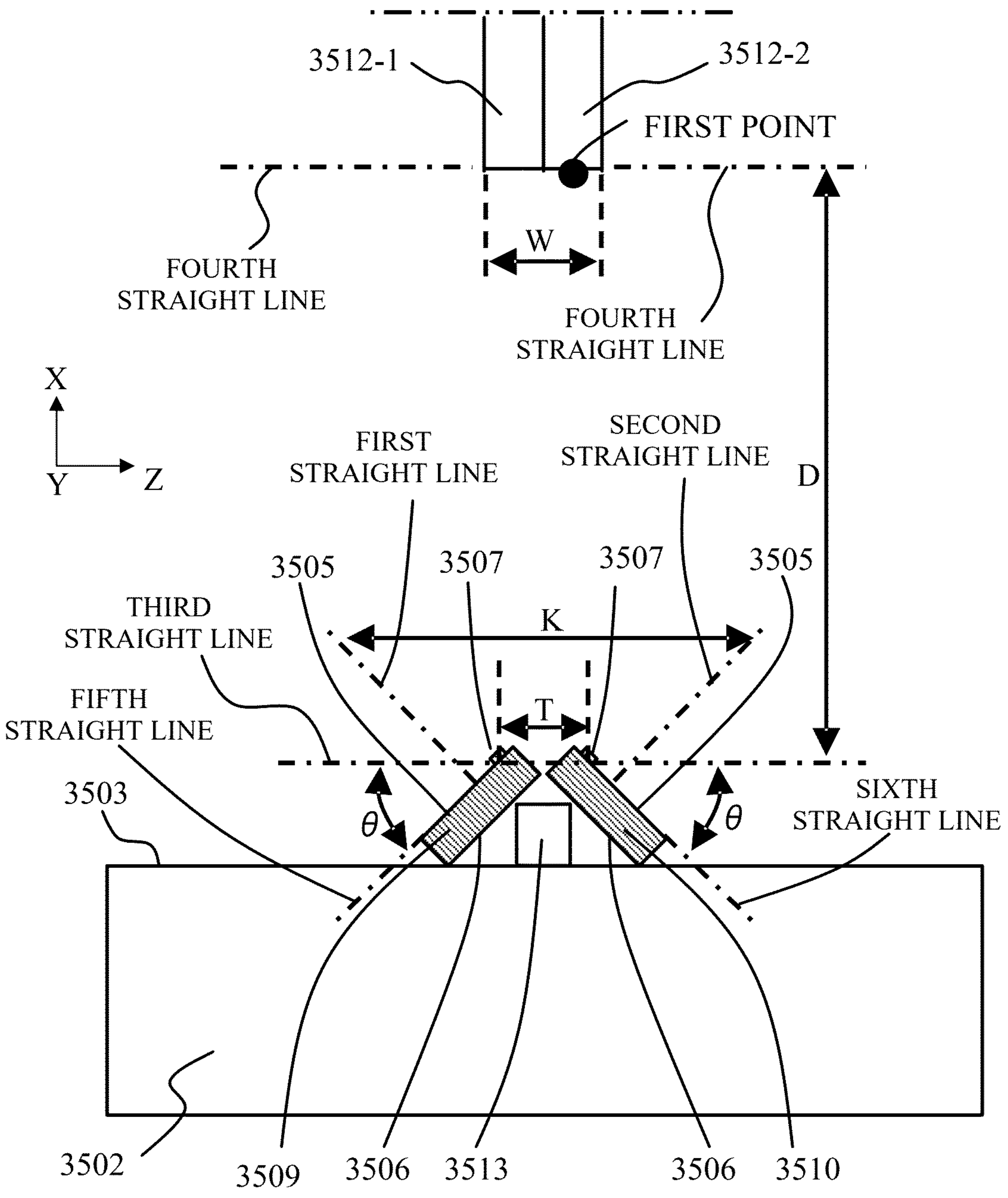

FIG. 122 illustrates the enlarged area 1 in FIG. 109.

Figure 123A:
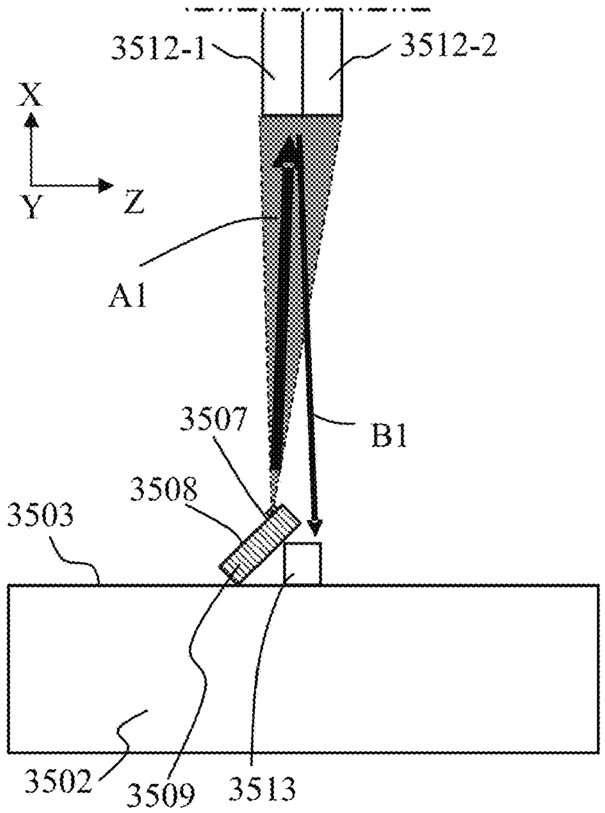
Figure 123B:
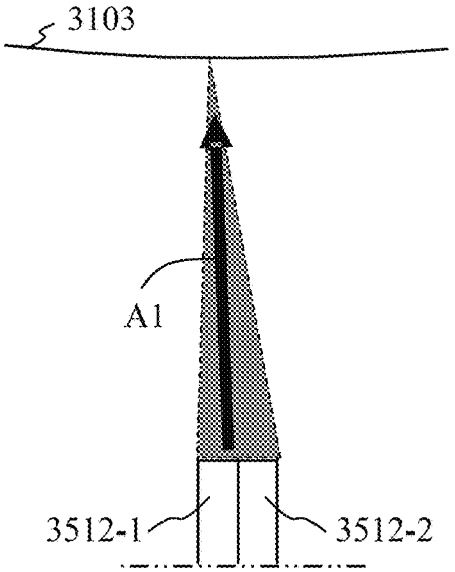

FIG. 123A illustrates the enlarged area 1 in FIG. 109 in the A-section of FIG. 107B, illustrating how light emitted from the light-emitting element array (light emitter) 3507 of the first light-emitting unit 3509 enters the first and second gradient index lens arrays 3512-1 and 3512-2. FIG. 123B illustrates the enlarged area 2 in FIG. 109 in the A-section of FIG. 107B, illustrating how light emitted from the light-emitting element row 3507 of the first light-emitting unit 3509 and then from the first and second gradient index lens arrays 3512-1 and 3512-2 is condensed on the photosensitive drum 3103.

Figure 124A:
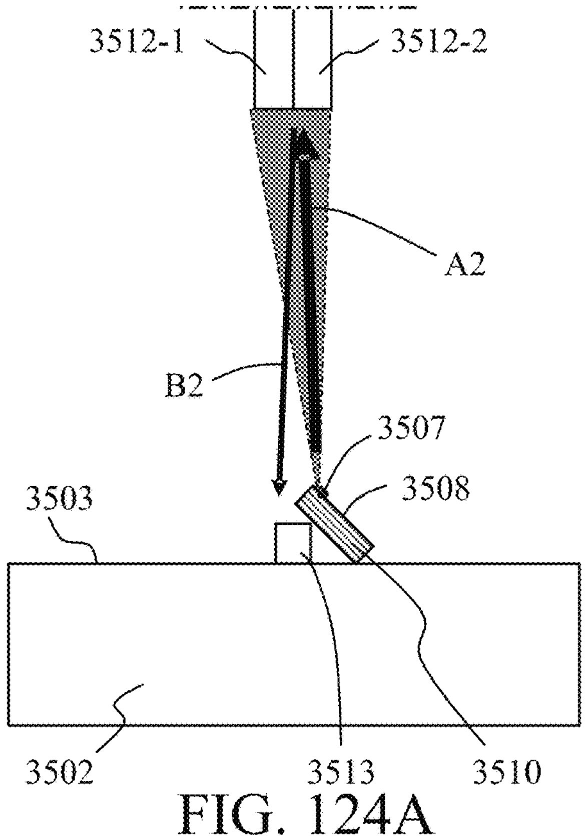
Figure 124B:
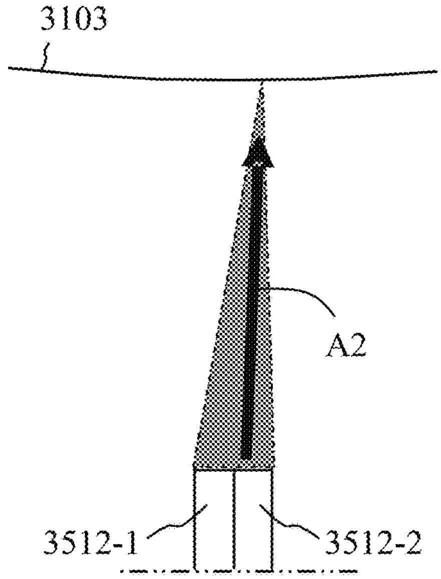

FIG. 124A illustrates the enlarged area 1 in FIG. 109 in the B-section of FIG. 107B, illustrating how light emitted from the light-emitting element row 3507 of the second light-emitting unit 3510 enters the first and second gradient index lens arrays 3512-1 and 3512-2. FIG. 124B illustrates the enlarged area 2 in FIG. 109 in the B-section of FIG. 107B, illustrating how light emitted from the light-emitting element row 3507 of the second light-emitting unit 3510 and then from the first and second gradient index lens arrays 3512-1 and 3512-2 is condensed on the photosensitive drum 3103.

Figure 125A:
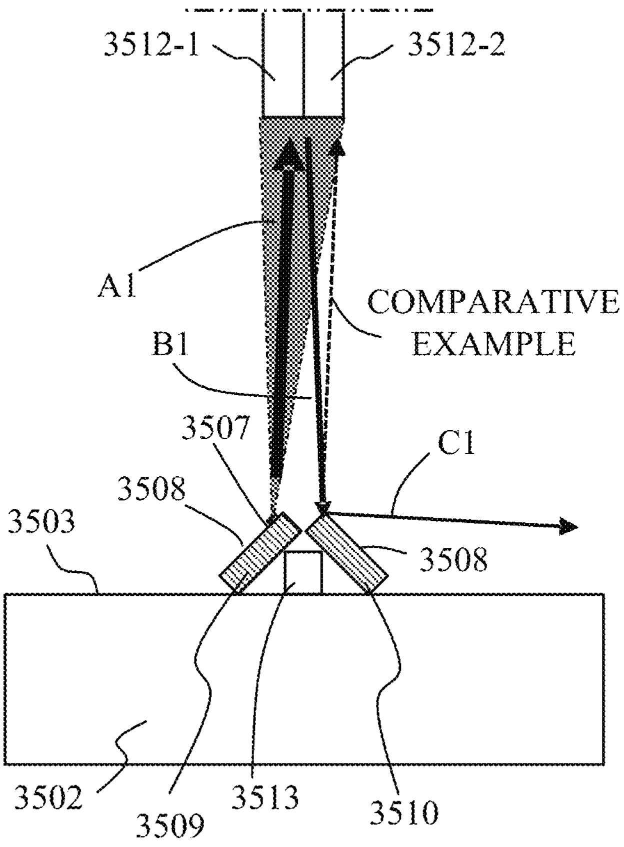
Figure 125B:
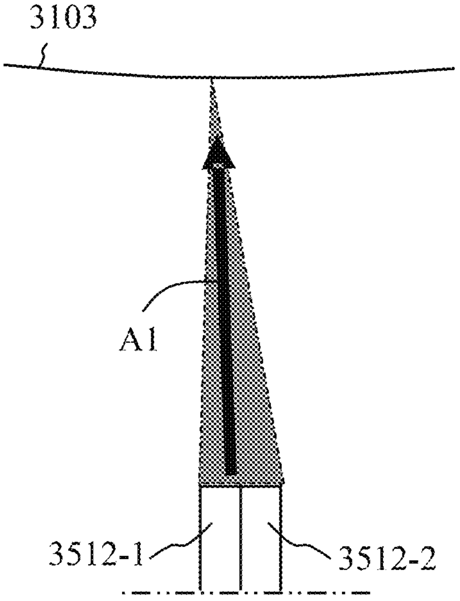

FIG. 125A illustrates the enlarged area 1 in FIG. 109 in the C-section in FIG. 107B, illustrating how light emitted from the light-emitting element row 3507 of the first light-emitting unit 3509 enters the first and second gradient index lens arrays 3512-1 and 3512-2. FIG. 125B illustrates the enlarged area 2 in FIG. 109 in the C-section in FIG. 107B, illustrating how light emitted from the light-emitting element row 3507 of the first light-emitting unit 3509 and then emitted from the first and second gradient index lens arrays 3512-1 and 3512-2 is condensed on the photosensitive drum 3103.

In this example, W=0.539 mm, T=0.40 mm, D=2.74 mm, and θ (=θ1=θ2)=45.0°. Therefore, $(W+T+4D \tan \theta)/(2W)=11.04$, which satisfies inequality (9). At this time, a percentage of reflected light (ghost light) from the coupling part of the first and second light-emitting units 3509 and 3510 to the light rays reaching the area on the photosensitive drum 3103 corresponding to the position of the coupling part is 0.00%. Since a percentage of the reflected light in comparative example 5 is 0.20%, a percentage of the reflected light can be reduced by $(1-0.00/0.20)\times 100=100\%$.

A percentage of light that enters the first and second gradient index lens arrays 3512-1 and 3512-2 (light utilization efficiency) to light emitted from the light-emitting element row 3507 is 70.7% based on cos(45.0°).

Even in this example, inequality (9) is satisfied for all combinations of any one of the plurality of first light-emitting units 3509 and a second light-emitting unit adjacent to the one first light-emitting unit 3509 among the plurality of second light-emitting units 3510.

In this example, as illustrated in FIG. 122, a protrusion 3513 is provided integrally with the substrate mounting surface 3503, and the protrusion 3513 is in contact with the unit rear surface (third surface) 3506 of each of the first and second light-emitting units 3509 and 3510. The protrusion 3513 is a member for imparting a tilt to the unit mounting surface 3505 relative to the substrate mounting surface 3503, and is provided over the entire area of the substrate mounting surface 3503 in the Y direction (approximately 316 mm). Thus, due to the protrusions 3513 in contact with the unit rear surfaces 3506, the first and second light-emitting units 3509 and 3510 are adhered to and fixed to the substrate mounting surface 3503 with an unillustrated adhesive (agent).

The tilt angle of the unit mounting surface 3505 relative to the substrate mounting surface 3503 can be adjusted by selecting the height of the protrusions 3513. In this example, the protrusion 3513 with a height of 500 μm is provided to give the unit mounting surface 3505 a tilt angle θ=45.0°. When viewed from the Y direction, the protrusions 3513 are in contact with a part (near the end) of the unit rear surfaces 3506 of the first and second light-emitting units 3509 and 3510.

In the A-section illustrated in FIG. 123A, as in comparative example 5, even if the light ray B1 that is Fresnel-reflected by the entrance surfaces of the first and second gradient index lens arrays 3512-1 and 3512-2 is reflected by the substrate mounting surface 3503, the reflected light is feeble. Thus, the reflectance of the substrate mounting surface 3503 can be approximated as 0%.

In the B-section illustrated in FIG. 124A, similarly, even if the Fresnel-reflected light ray B2 is reflected by the substrate mounting surface 3503, the reflected light is feeble, so the reflectance of the substrate mounting surface 3503 can be approximated as 0%.

In the C-section illustrated in FIG. 125A, the Fresnel-reflected light ray B1 reaches the non-light emitter 3508 of the second light-emitting unit 3510. Since the unit mounting surface 3505 of the second light-emitting unit 3510 is tilted, the light ray C1 reflected by the non-light emitter 3508 is less likely to enter the first and second gradient index lens arrays 3512-1 and 3512-2 than the light ray C1 in comparative example 5 illustrated by the broken line. In other words, the amount of the light ray C1 incident on the first and second gradient index lens arrays 3512-1 and 3512-2 can be reduced. Thereby, a percentage of ghost light to the light rays that reach the area on the photosensitive drum 3103 corresponding to the position of the coupling part between the first and second light-emitting units 3509 and 3510 can be reduced to 0.00%.

The exposure head 3105 according to Example 20 described above can reduce the reflected light (ghost light) that is reflected by the non-light emitter of the coupling part between the first and second light-emitting units and enters the lens array, and form a good image with few unnecessary streaks.

In Examples 17 to 20, all of the first and second light-emitting units may satisfy inequality (9), but it is unnecessary that all of the first and second light-emitting units satisfy inequality (9). In other words, where N is the total number of first and second light-emitting units, the number of first and second light-emitting units that satisfy inequality (9) may be 0.7×N or more, or 1.0×N.

Variation

Figure 126:
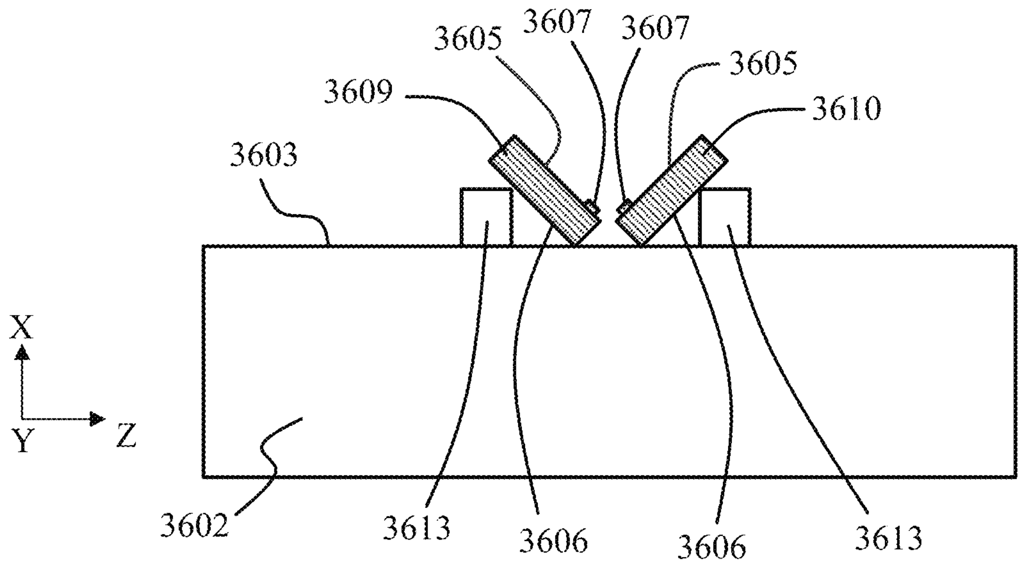

A variation of each example will now be described. In Examples 17 to 20, the unit mounting surface of the first light-emitting unit is tilted in a counterclockwise direction relative to the substrate mounting surface when viewed from the Y direction, and the unit mounting surface of the second light-emitting unit is tilted in the clockwise direction. However, each example is not limited to this implementation. For example, as illustrated in FIG. 126, the unit mounting surface 3605 of the first light-emitting unit 3609 may be tilted in the clockwise direction relative to the substrate mounting surface 3603 of the light-emitting substrate 3602, and the unit mounting surface 3605 of the second light-emitting unit 3610 may be tilted in the counterclockwise direction. In FIG. 126, two protrusions 3613 are integrally provided on the substrate mounting surface 3603, and the unit rear surfaces 3606 of the first and second light-emitting units 3609 and 3610 contact these protrusions 3613 so as to tilt the unit mounting surface 3605 relative to the substrate mounting surface 3603. In this case, the optical path of the light from the light-emitting element row 3607 of the first and second light-emitting units 3609, 3610 is similar to that of Examples 1 to 4.

In Examples 1 to 4, the unit mounting surfaces of both the first and second light-emitting units are tilted relative to the substrate mounting surface. However, it is unnecessary that the unit mounting surfaces of both the first and second light-emitting units are tilted relative to the substrate mounting surface, as long as the unit mounting surface of at least one of the first and second light-emitting units is tilted relative to the substrate mounting surface.

Examples 17 to 20 can reduce the light that is reflected by the light-emitting units in the light source apparatus and enters the lens unit.

While the disclosure has described example embodiments, it is to be understood that the disclosure is not limited to the example embodiments. The scope of the following claims is to be accorded the broadest interpretation so as to encompass all such modifications and equivalent structures and functions.

This application claims priority to Japanese Patent Application Nos. 2024-064389, 2024-064411 and 2024-064433, which were filed on Apr. 12, 2024, and which are hereby incorporated by reference herein in its entirety.

What is claimed is:

1. A light source apparatus comprising:

a first light-emitting unit and a second light-emitting unit having centers located at different positions in a first direction and a second direction orthogonal to the first direction; and a lens unit configured to condense light from the first light-emitting unit and the second light-emitting unit onto a target surface that is rotatable, wherein each of the first light-emitting unit and the second light-emitting unit includes a plurality of light-emitting elements arranged in the first direction, and wherein the following inequality is satisfied:

$$0.6 \leq W/T \leq 2.0$$

where when viewed from the first direction, T is a distance between a center of a first light-emitting element in the first light-emitting unit and a center of a second light-emitting element in the second light-emitting unit, a first straight line is a straight line passing through a first point that is a midpoint between the center of the first light-emitting element and the center of the second light-emitting element, a second point that is a rotation center of the target surface, and W is a longer one of a distance between the first straight line and a third point that is a center of an image of the first light-emitting element formed on the target surface by the lens unit, and a distance between the first straight line and a fourth point that is a center of an image of the second light-emitting element formed on the target surface by the lens unit.

2. The light source apparatus according to claim 1, wherein when viewed from the first direction, a second straight line that is a straight line passing through the center of the first light-emitting unit and the center of the second light-emitting unit, and a third straight line that is a straight line passing through the third point and the fourth point are not parallel to each other.

3. The light source apparatus according to claim 2, wherein the following inequality is satisfied:

$$0.15 \leq \alpha/\tan^{-1}(T/D) \leq 0.50$$

where when viewed from the first direction, α is an angle between a fourth straight line and a fifth straight line, the fourth straight line being a straight line passing through a fifth point that is a center of an entrance surface of a lens included in the lens unit, and a sixth point that is a center of an exit surface of the lens, and the fifth straight line being a normal to the target surface at one of the third point and the fourth point, which is has a shorter distance from the first straight line, and D is a distance from an intersection of the fourth straight line and the second straight line to an intersection of the fourth straight line and the entrance surface of the lens.

4. The light source apparatus according to claim 3, wherein the following inequality is satisfied:

$$0.05 \leq T/D \leq 0.20.$$

5. The light source apparatus according to claim 3, wherein an angle between the second straight line and the fourth straight line is (90°−α) when viewed from the first direction.

6. The light source apparatus according to claim 1, wherein, when viewed from the first direction, a second straight line is a straight line passing through the center of the first light-emitting unit and the center of the second light-emitting unit, and the first light-emitting unit and the second light-emitting unit are disposed so that another straight line that passes through the first point and is orthogonal to the second straight line does not pass through the second point.

7. The light source apparatus according to claim 6, wherein the following inequality is satisfied:

$$2 \leq (B \times T)/(D \times A) \leq 10$$

wherein when viewed from the first direction, A is a distance between the other straight line and the second point, B is a diameter of the target surface, and D is a distance from the first point that is an intersection of the other straight line and the second straight line to an intersection of the other straight line and an entrance surface of the lens included in the lens unit.

8. The light source apparatus according to claim 6, wherein the lens unit includes a first lens array and a second lens array each including a plurality of lenses arranged in the first direction, and wherein when viewed from the first direction, a straight line that passes a midpoint between a center of an entrance surface of the lens included in the first lens array and a center of an entrance surface of the lens included in the second lens array, and a midpoint between a center of an exit surface of the first lens array and a center of an exit surface of the second lens array passes through the second point.

9. An image forming apparatus comprising:

a light source apparatus according to claim 1; and a developer configured to develop an electrostatic latent image formed on the target surface by the light source apparatus.

10. A light source apparatus comprising:

a first light-emitting unit and a second light-emitting unit, the first light-emitting unit and the second light-emitting unit having centers located at different positions in a first direction and a second direction orthogonal to the first direction; and a lens unit configured to condense light from the first light-emitting unit and the second light-emitting unit, wherein each of the first light-emitting unit and the second light-emitting unit includes a plurality of light-emitting elements arranged in the first direction, and wherein the following inequality is satisfied:

$$0.16 \leq T/D \leq 0.31$$

where when viewed from the first direction, T is a distance between a center of a first light-emitting element in the first light-emitting unit and a center of a second light-emitting element in the second light-emitting unit, and D is a distance from a first straight line that passes the center of a first light-emitting element and the center of the second light-emitting element and a center of an entrance surface of the lens unit.

11. The light source apparatus according to claim 10, wherein the distance T is a distance such that light reflected from a target surface among light emitted from the first light-emitting unit and the second light-emitting unit and irradiated onto the target surface via the lens unit, does not enter the lens unit.

12. The light source apparatus according to claim 10, wherein the following inequality is satisfied:

$$-2^\circ \leq \theta \leq 2^\circ$$

where when viewed from the first direction, θ is an angle between the first straight line and a second straight line that is a straight line passing through the center of the first light-emitting unit and the center of the second light-emitting unit.

13. The light source apparatus according to claim 10, wherein a plurality of first light-emitting unit are arranged in the first direction, and a plurality of second light-emitting unit are arranged in the first direction, and wherein where N is the total number of first and second light-emitting units, the number of first and second light-emitting units that satisfy the inequality is 0.7×N or more.

14. The light source apparatus according to claim 13, wherein the number of first and second light-emitting units that satisfy the inequality is 1.0×N.

15. An image forming apparatus comprising:

a light source apparatus according to claim 10; and a developer configured to develop an electrostatic latent image formed on a target surface by the light source apparatus.

16. A light source apparatus comprising:

a first light-emitting unit and a second light-emitting unit disposed on a first surface of a substrate; and a lens unit configured to condense light from the first light-emitting unit and the second light-emitting unit, wherein the first light-emitting unit and the second light-emitting unit have centers located at different positions in a first direction and a second direction orthogonal to the first direction;

wherein each of the first light-emitting unit and the second light-emitting unit includes a second surface, and a plurality of light-emitting elements arranged in the first direction on the second surface;

wherein when viewed from the first direction, the second surface of at least one of the first light-emitting unit and the second light-emitting unit is tilted relative to the first surface; and wherein a light amount that is emitted from a light-emitting unit including the second surface tilted relative to the first surface, is reflected by the lens unit, is reflected by the second surface of another light-emitting unit, and enters the lens unit is less than a light amount in a case where the second surface is not tilted.

17. The light source apparatus according to claim 16, wherein when viewed from the first direction, a distance between a normal on the second surface of the first light-emitting unit and a normal on the second surface of the second light-emitting units increases as a position approaches the lens unit.

18. The light source apparatus according to claim 16, wherein the second surface of the first light-emitting unit and the second surface of the second light-emitting unit are tilted in different directions relative to the first surface.

19. The light source apparatus according to claim 18, wherein the following inequality is satisfied:

$$0.95 < (W + T + 4D\tan\theta)/(2W) < 18.50$$

where when viewed from the first direction, T is a distance between a center of a first light-emitting element in the first light-emitting unit and a center of a second light-emitting element in the second light-emitting unit, a third straight line is a straight line connecting the center of the first light-emitting unit and the center of the second light-emitting unit, a first point is a center of an entrance surface of a lens included in the lens unit, a fourth straight line is a straight line including the first point and parallel to the third straight line, D is a distance between the third straight line and the fourth straight line, W is a width of the lens unit on the fourth straight line, a fifth straight line is a straight line parallel to the second surface of the first light-emitting unit, a sixth straight line is a straight line parallel to the second surface of the second light-emitting unit, and θ includes θ1 that is an angle formed by the third straight line and the fifth straight line and θ2 that is an angle formed by the third straight line and the sixth straight line.

20. An image forming apparatus comprising:

a light source apparatus according to claim 16; and a developer configured to develop an electrostatic latent image formed on a target surface by the light source apparatus.

* * * * *